United States Patent [19]

Douglas et al.

[11] Patent Number: 5,353,412
[45] Date of Patent: Oct. 4, 1994

[54] PARTITION CONTROL CIRCUIT FOR SEPARATELY CONTROLLING MESSAGE SENDING OF NODES OF TREE-SHAPED ROUTING NETWORK TO DIVIDE THE NETWORK INTO A NUMBER OF PARTITIONS

[75] Inventors: David C. Douglas, Concord; John J. Earls, Newton; W. Daniel Hillis, Cambridge; Mahesh N. Ganmukhi, Littleton, all of Mass.

[73] Assignee: Thinking Machines Corporation, Cambridge, Mass.

[21] Appl. No.: 746,035

[22] Filed: Aug. 16, 1991

Related U.S. Application Data

[63] Continuation-in-part of Ser. No. 592,029, Oct. 3, 1990, abandoned.

[51] Int. Cl.[5] .............................. G06F 13/00
[52] U.S. Cl. ........................ 395/325; 395/200; 395/800; 370/60.1; 340/825.02; 364/229.41; 364/231.9; 364/284.3; 364/931.01; 364/929.1; 364/949.91; 364/DIG. 2
[58] Field of Search ............ 395/800, 200, 325; 370/60, 60.1, 61; 364/133; 340/825.02

[56] References Cited

U.S. PATENT DOCUMENTS

| | | | |
|---|---|---|---|
| 3,693,155 | 9/1972 | Crafton et al. | 340/825.02 |
| 4,344,134 | 8/1982 | Barnes | 395/800 |
| 4,347,498 | 8/1982 | Lee et al. | 340/825.02 |
| 4,412,285 | 10/1983 | Neches et al. | 395/650 |
| 4,583,164 | 4/1986 | Tolle | 395/600 |
| 4,740,954 | 4/1988 | Cotton et al. | 370/60 |
| 4,763,329 | 8/1988 | Green | 371/11.2 |
| 4,780,873 | 10/1988 | Mattheyses | 370/60 |
| 5,187,671 | 2/1993 | Cobb | 364/490 |
| 5,265,207 | 11/1993 | Zak et al. | 395/200 |

*Primary Examiner*—Thomas C. Lee
*Assistant Examiner*—Paul Harrity
*Attorney, Agent, or Firm*—Richard A. Jordan

[57] ABSTRACT

A digital computer having a plurality of message generating elements each generating and receiving messages and a network for transferring messages among the message generating elements. The network includes a plurality of node clusters interconnected in a tree pattern from a lower leaf level to an upper root level, each node cluster including at least one node group with node clusters in a level above at least one predetermined level having a larger number of node groups than node clusters of the predetermined level for transferring messages among the message generating elements. Each node group in the node clusters of the predetermined level include a selective message coupling circuit for selectively coupling messages between the node group and a selected one of the upper-level node groups, the message coupling circuits of the node groups being separately controlled by a partition control circuit so as to facilitate partitioning of the network into a plurality of partitions so that messages generated by the lower-level node groups for transfer to each of at least one selected group of message generating elements are in response to messages generated thereby.

19 Claims, 40 Drawing Sheets

FIG 4A-2

SYSTEM 10

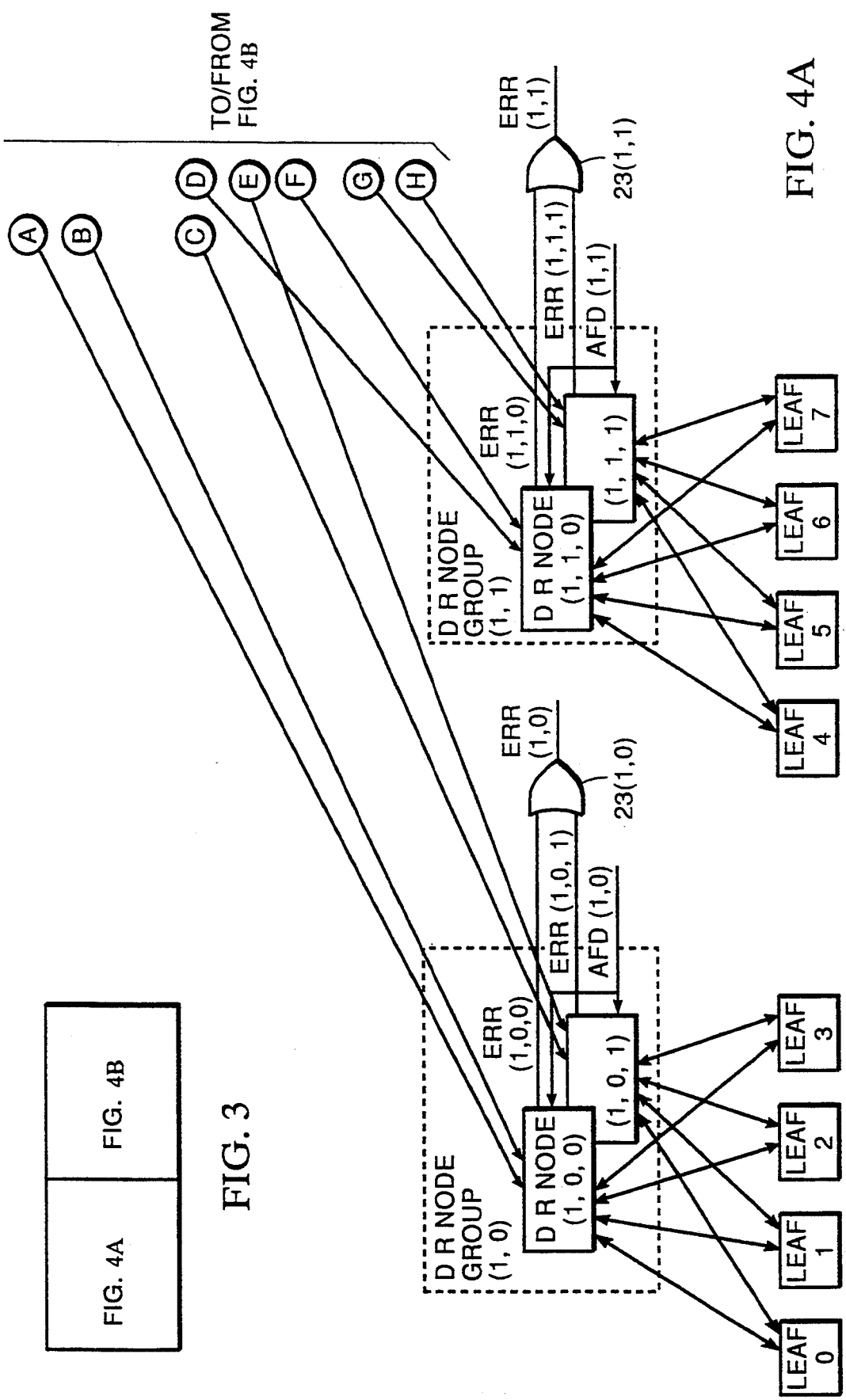

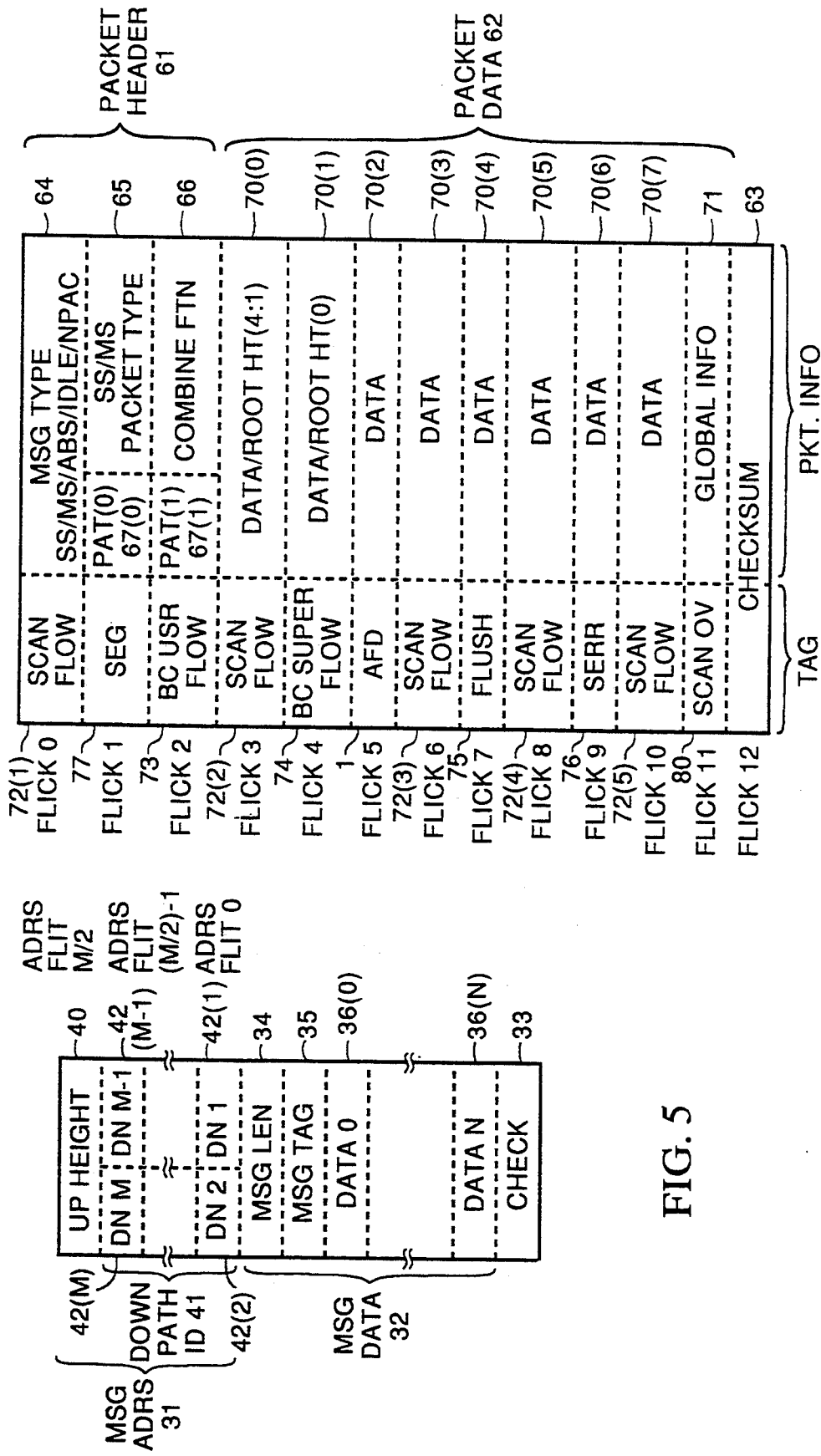
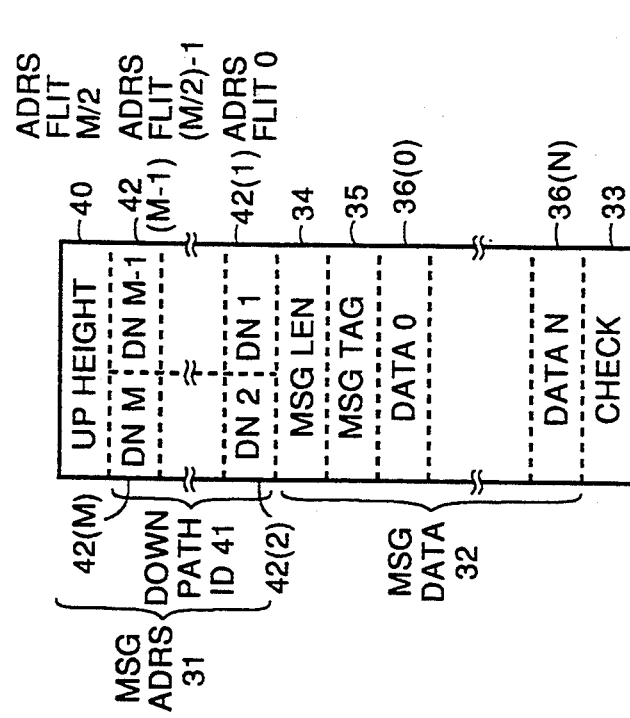
FIG. 17
FIG. 5

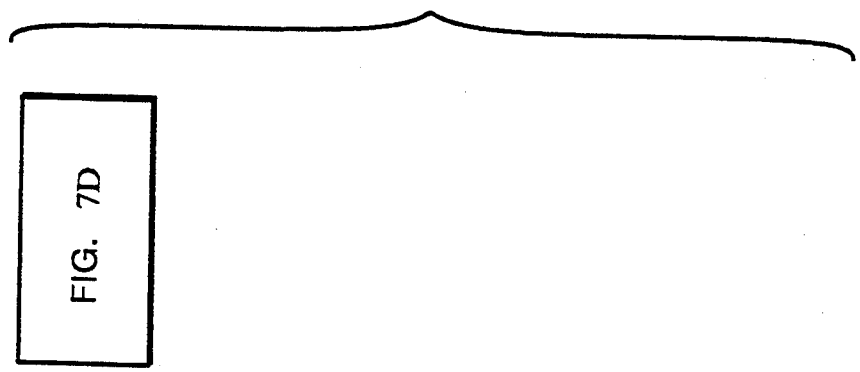
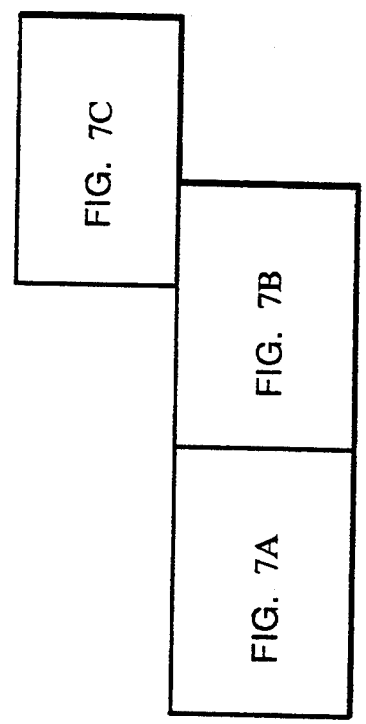
FIG. 6

| FIG. 14A | FIG. 14B | FIG. 14C |

DRF MIDDLE INTERFACE
REGISTERS 230
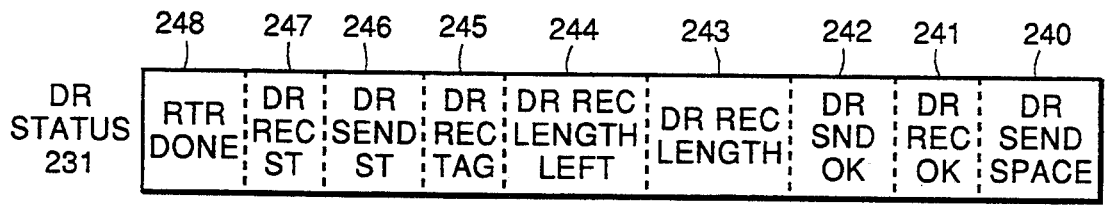
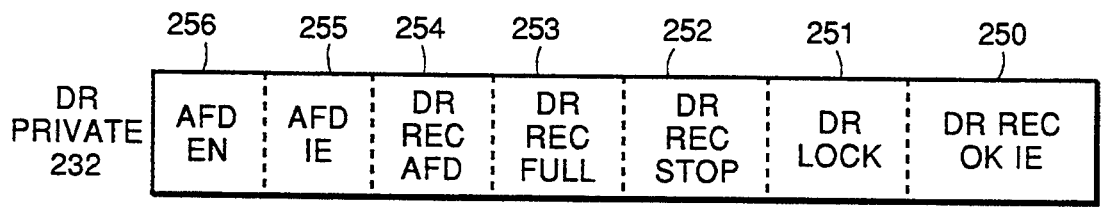
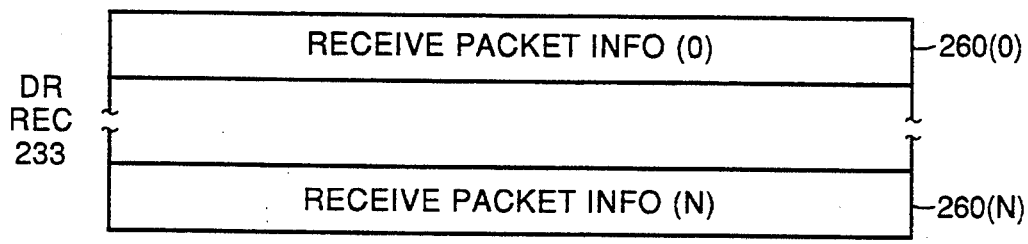
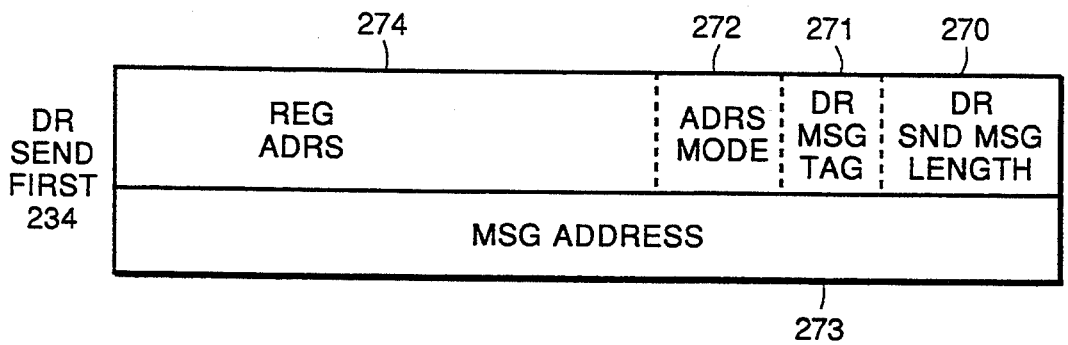
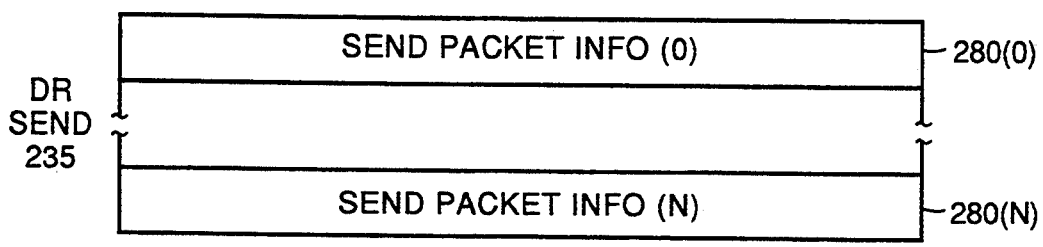
FIG. 22A

PARTITION CONTROL CIRCUIT FOR SEPARATELY CONTROLLING MESSAGE SENDING OF NODES OF TREE-SHAPED ROUTING NETWORK TO DIVIDE THE NETWORK INTO A NUMBER OF PARTITIONS

CROSS REFERENCE TO RELATED APPLICATION

This application is a continuation in part of U.S. patent application Ser. No. 07/592,029, entitled Parallel Computer System, filed Oct. 3, 1990 (now abandoned) in the name of David C. Douglas, et al., and assigned to the assignee of the current application, incorporated by reference.

FIELD OF THE INVENTION

The invention relates generally to the field of digital computer systems, and more particularly to massively parallel computing systems. The invention particularly provides arrangements for controlling processors in a computing system having a large number of processors, for facilitating transfer of data among the processors and for facilitating diagnosis of faulty components in the computing system.

BACKGROUND OF THE INVENTION

A digital computer system generally comprises three basic elements, namely, a memory element, an input/output element and a processor element. The memory element stores information in addressable storage locations. This information includes data and instructions for processing the data. The processor element fetches information from the memory element, interprets the information as either an instruction or data, processes the data in accordance with the instructions, and returns the processed data to the memory element. The input/output element, under control of the processor element, also communicates with the memory element to transfer information, including instructions and the data to be processed, to the memory, and to obtain processed data from the memory.

Most modern computing systems are considered "von Neumann" machines, since they are generally constructed according to a paradigm attributed to John von Neumann. Von Neumann machines are characterized by having a processing element, a global memory which stores all information in the system, and a program counter that identifies the location in the global memory of the instruction being executed. The processing element executes one instruction at a time, that is, the instruction identified by the program counter. When the instruction is executed, the program counter is advanced to identify the location of the next instruction to be processed. (In many modern systems, the program counter is actually advanced before the processor has finished processing the current instruction.)

Von Neumann systems are conceptually uncomplicated to design and program, since they do only one operation at a time. A number of advancements have been made to the original von Neumann paradigm to permit the various parts of the system, most notably the various components of the processor, to operate relatively independently and achieve a significant increase in processing speed. One such advancement is pipelining of the various steps in executing an instruction, including instruction fetch, operation code decode (a typical instruction includes an operation code which identifies the operation to be performed, and in most cases one or more operand specifiers, which identify the location in memory of the operands, or data, to be used in executing the instruction), operand fetch, execution (that is, performing the operation set forth in the operation code on the fetched operands), and storing of processed data, which steps are performed relatively independently by separate hardware in the processor. In a pipelined processor, the processor's instruction fetch hardware may be fetching one instruction while other hardware is decoding the operation code of another instruction, fetching the operands of still another instruction, executing yet another instruction, and storing the processed data of a fifth instruction. Since the five steps are performed sequentially, pipelining does not speed up processing of an individual instruction. However, since the processor begins processing of additional instructions before it has finished processing a current instruction, it can speed up processing of a series of instructions.

A pipelined processor is obviously much more complicated than a simple processor in a von Neumann system, as it requires not only the various circuits to perform each of the operations (in a simple von Neumann processor, many circuits could be used to perform several operations), but also control circuits to coordinate the activities of the various operational circuits. However, the speed-up of the system can be dramatic.

More recently, some processors have been provided with execution hardware which includes multiple functional units each being optimized to perform a certain type of mathematical operation. For example, some processors have separate functional units for performing integer arithmetic and floating point arithmetic, since they are processed very differently. Some processors have separate hardware functional units each of which performs one or only several types of mathematical operations, including addition, multiplication, and division operations, and other operations such as branch control and logical operations, all of which can be operating concurrently. This can be helpful in speeding up certain computations, most particularly those in which several functional units may be used concurrently for performing parts of a single computation.

In a von Neumann processor, including those which incorporate pipelining or multiple functional units (or both, since both may be incorporated into a single processor), a single instruction stream operates on a single data stream. That is, each instruction operates on data to enable one calculation at a time. Such processors have been termed "SISD," for single-instruction/single-data." If a program requires a segment of a program to be used to operate on a number of diverse elements of data to produce a number of calculations, the program causes the processor to loop through that segment for each calculation. In some cases, in which the program segment is short or there are only a few data elements, the time required to perform such a calculation may not be unduly long.

However, for many types of such programs, SISD processors would require a very long time to perform all of the calculations required. Accordingly, processors have been developed which incorporate a large number of processing elements all of which may operate concurrently on the same instruction stream, but with each processing element processing a separate data stream. These processors have been termed "SIMD" processors, for "single-instruction/multiple-data."

SIMD processors are useful in a number of applications, such as image processing, signal processing, artificial intelligence, database operations, and computer simulation of a number of things, such as electronic circuits and fluid dynamics. In image processing, each processing element may be used to perform processing on a pixel ("picture element") of the image to enhance the overall image. In signal processing, the processors concurrently perform a number of the calculations required to perform such computations as the "Fast Fourier transform" of the data defining the signal. In artificial intelligence, the processors perform searches on extensive rule bases representing the stored knowledge of the particular application. Similarly, in database operations, the processors perform searches on the data in the database, and may also perform sorting and other operations. In computer simulation of, for example, electronic circuits, each processor may represent one part of the circuit, and the processor's iterative computations indicate the response of the part to signals from other parts of the circuit. Similarly, in simulating fluid dynamics, which can be useful in a number of applications such as weather predication and airplane design, each processor is associated with one point in space, and the calculations provide information about various factors such as fluid flow, temperature, pressure and so forth.

Typical SIMD systems include a SIMD array, which includes the array of processing elements and a router network, a control processor and an input/output component. The input/output component, under control of the control processor, enables data to be transferred into the array for processing and receives processed data from the array for storage, display, and so forth. The control processor also controls the SIMD array, iteratively broadcasting instructions to the processing elements for execution in parallel. The router network enables the processing elements to communicate the results of a calculation to other processing elements for use in future calculations.

Several routing networks have been used in SIMD arrays and others have been proposed. In one routing network, the processing elements are interconnected in a matrix, or mesh, arrangement. In such an arrangement, each processing element is connected to, and communicates with, four "nearest neighbors" to form rows and columns defining the mesh. This arrangement can be somewhat slow if processing elements need to communicate among themselves at random. However, the arrangement is inexpensive and conceptually simple, and may suffice for some types of processing, most notably image processing. The "Massively Parallel Processor" manufactured by Goodyear Aerospace Corporation is an example of a SIMD array having such a routing network.

In another routing network, processing elements are interconnected in a cube or hypercube arrangement, having a selected number of dimensions, for transferring data, in the form of messages, among the processing elements. The arrangement is a "cube" if it only has three dimensions, and a "hypercube" if it has more than three dimensions. U.S. Pat. No. 4,598,400, entitled Method and Apparatus For Routing Message Packets, issued Jul. 1, 1986 to W. Daniel Hillis, and assigned to the assignee of the present application, describes a system having a hypercube routing network. In the system described in the '400 patent, multiple processing elements are connected to a single routing node, and the routing nodes are interconnected in the hypercube.

Another routing arrangement which has been proposed is a crossbar switch, through which each processing element can communicate directly with any of the other processing elements. The crossbar switch provides the most efficient communications of any of the routing networks proposed. However, a crossbar switch also has the most connections and switching elements, and thus is the most expensive and also the most susceptible to failure due to broken connections and faulty switching elements. Thus, crossbar switch arrangements are rarely used, except when the number of processing elements is fairly small, since the complexity of a crossbar switch increases with the square of the number of processing elements.

Yet another routing arrangement is an butterfly network, in which switching is performed through a number of serially-connected stages. Each stage has two inputs, each connected to the outputs of a prior stage or processing elements, has two outputs which may be connected to the inputs of a subsequent stage or processing elements. The "Butterfly" computer system manufactured by Bolt Beranek & Newman uses such a network. A number of other routing networks, such as a Benes network, have been developed based on the butterfly network.

SUMMARY OF THE INVENTION

The invention provides a new and improved parallel computer system.

In brief summary, the invention in one aspect provides a digital computer comprising a plurality of message generating elements each generating and receiving messages and a network for transferring messages among the message generating elements. The network comprises a plurality of node clusters interconnected in a tree pattern from a lower leaf level to an upper root level, each node cluster including at least one node group with node clusters in a level above at least one predetermined level having a larger number of node groups than node clusters of the predetermined level, such that i. node groups of the lower leaf level receiving messages from, respectively, at least one message generating element and a higher-level node group and generating in response messages for transfer to, respectively, a higher-level node group and a message generating element, ii. the respective node groups between the lower leaf level and the upper root level receiving messages from, respectively, at least one lower-level node group and a higher-level node group and generating in response messages for transfer to, respectively, a higher level node group and a lower level node group, and iii. node groups of the upper root level receiving messages from at least one lower-level node group and generating in response messages for transfer thereto.

Each node group in the node clusters of the predetermined level include a selective message coupling circuit conditionable to selectively couple messages between the node group and a selected one of the upper-level node groups, the message coupling circuits of the node groups being separately selectively conditionable so as to facilitate partitioning of the network into a plurality of partitions so that messages generated by the lower-level node groups for transfer to each of at least one selected group of message generating elements are in response to messages generated thereby.

In another aspect, the invention provides a digital computer comprising a plurality of control processors each generating control messages, a plurality of processing elements each receiving at least some of the control messages and performing processing operations in response thereto, and a control network for transferring the control messages from the scalar processors to the processing elements. The control network comprises a plurality of node clusters interconnected in a tree pattern from a lower leaf level to an upper root level. Each node cluster including at least one node group with node clusters in a level above at least one predetermined level having a larger number of node groups than node clusters of the predetermined level, such that i. in a plurality of up-tree paths each from one of the control processors to a node group of the physical root level, a node group of the lower leaf level receiving messages from the one control processor and generating in response messages for transfer to a higher-level node group along the up-tree path, each node groups between the lower leaf level and the physical root level along the up-tree path receiving control message from a node group at a lower level and generating in response control messages for transfer to a node group at a higher level along the up-tree path, ii. each node group in down-tree paths between the upper root level and the processing elements receiving messages from a higher-level node group and generating in response messages for transfer to, respectively, at least one lower level node group or processing element, and iii. each node group of the upper root level receiving messages from a lowerlevel node group of one of the up-tree paths and generating in response messages for transfer to at least one node group of a down-tree path.

Each node group in the node clusters of the predetermined level include a message coupling circuit conditionable to selectively couple messages between the node group and a selected one of the upper-level node groups, the message coupling circuits of the node groups being separately selectively conditionable so as to facilitate partitioning of the network into a plurality of partitions such that within each partition a selected set of the processing elements receives control messages in response to control messages generated by at least one of the control processors through one of the node groups at the upper root level.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 5 is a diagram depicting the structure of message packets transferred over the data router;

FIG. 17 is a diagram depicting the structure of message packets transferred over the control network;

FIGS. 22A and 22B depicts registers used in the data router interface depicted in FIG. 21;

DETAILED DESCRIPTION OF AN ILLUSTRATIVE EMBODIMENT

I. General Description

A. General Description of Computer System

Figure 1:
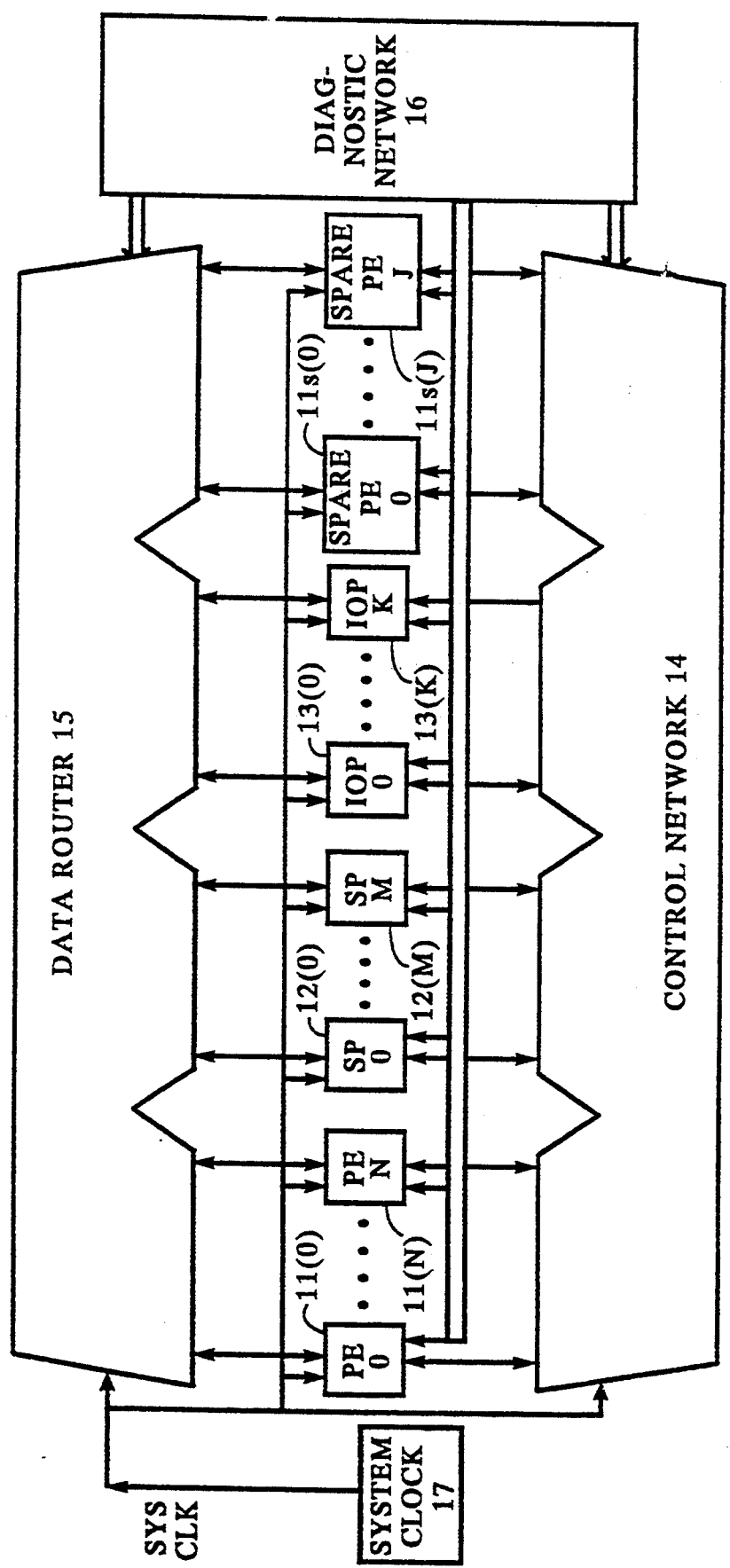
FIG. 1 is a general block diagram of a massively parallel computer system constructed in accordance with the invention.

FIG. 1 is a general block diagram of a massively parallel computer system 10 constructed in accordance with the invention. With reference to FIG. 1, system 10 includes a plurality of processing elements 11(0) through 11(N) (generally identified by reference numeral 11), scalar processors 12(0) through 12(M) (generally identified by reference numeral 12) and input/output processors 13(0) through 13(K) (generally identified by reference numeral 13). Input/output units (not shown), such as, for example, disk and tape storage units, video display devices, printers and so forth may be connected to the input/output processors to supply information, including data and program commands, for processing by the processing elements 11 and scalar processors 12 in the system, and may also receive processed data for storage, display and printing. The scalar processors 12 may also be connected to input/output units including, for example, video display terminals which permit one or more operators to generally control system 10. The system 10 may also include a plurality of spare processing elements 11s(0) through 11s(J) (generally identified by reference numeral 11s) which may be used as described below.

The system 10 further includes a control network 14, a data router 15 and a diagnostic network 16. The control network 14 permits one or more scalar processors 12 to broadcast program commands to processing elements 11. The processing elements 11 which receive the commands execute them generally concurrently. The control network 14 also permit the processing elements 11 to generate status information which they may supply to the scalar processors 12. The control network 14 is also used by the processing elements 11 to perform selected types of arithmetic operations, termed "scan" and "reduce" operations, as described below. The control network 14 may also be used to provide status and synchronization information among the processing elements 11.

The data router 15 transfers data among the processing elements 11, scalar processors 12 and input/output processors 13. In particular, under control of the scalar processors 12, the input/output processors 13 retrieve data to be processed from the input/output units and distributes it to the respective scalar processors 12 and processing elements 11. During processing, the scalar processors 12 and processing elements 11 can transfer data among themselves over the data router 15. In addition, the processing elements 11 and scalar processors 12 can transfer processed data to the input/output processors 13. Under control of the scalar processors 12, the input/output processors 13 can direct the processed data that they receive from the data router 15 to particular ones of the input/output units for storage, display, printing, or the like. The data router 15 in one particular embodiment is also used to transfer input/output commands from the scalar processors 12 to the input/output processors 13 and input/output status information from the input/output processors 13 to the scalar processors 12.

The diagnostic network 16, under control of a diagnostic processor (not shown in FIG. 1), facilitates testing of other portions of the system 10 to identify, locate and diagnose defects. The diagnostic processor may comprise one or more of the scalar processors 12. In addition, the diagnostic network 16 may be used to establish selected operating conditions in the other portions of the system 10 as described below.

The system 10 is synchronous, that is, all of its elements operate in accordance with a global SYS CLK system clock signal provided by a clock circuit 17.

One particular embodiment of system 10 may include hundreds or many thousands of processing elements 11 operating on a single problem in parallel under control of commands broadcast to them by the scalar processors 12. In that embodiment, the processing elements 11 operate in parallel on the same command on their individual sets of data, thereby forming a parallel computer system.

In addition, the system 10 may be dynamically logically partitioned, by logical partitioning of the control network 14 as described below, into multiple logical subsystems which may concurrently operate on separate problems or separate parts of a single problem. In that case, each partition includes at least one scalar processor 12 and a plurality of processing elements 11, the scalar processor 12 supplying the commands for processing by the processing elements in its partition. The spare processing elements 11s, which except for the positions of their connections to the control network 14 and data router 15 are otherwise similar to processing elements 11, may be used to substitute for failed processing elements 11 in a partition as described below, to augment the number of processing elements in a partition if there are insufficient processing elements 11 to form a partition with a desired number of processing elements 11, or to provide additional processing elements which may themselves be formed into partitions. In the following, unless otherwise stated explicitly, a reference to a processing element 11, in either the singular or plural, will also be taken as a corresponding singular or plural reference to a spare processing element 11s; that is, the processing elements 11 and spare processing elements 11s will be jointly referred to herein generally as processing elements 11.

It should be noted from the following description that the partitioning is only in relation to the control network 14, but not the data router 15. This facilitates transfer of data between processing elements of different partitions if they are, for example, processing different parts of a particular problem, or, more generally, for inter-process communications, if each processing elements of the diverse partitions are processing correspondingly diverse, but possibly interacting, processes. This further facilitates transfer of data from processing elements of any partition to the input/output processors 13 to permit storage or display of data, as well as transfer from the input/output processors 13 of stored data to processing elements of any partition.

B. General Description of Communications Networks

1. Data Router 15

Figure 2:
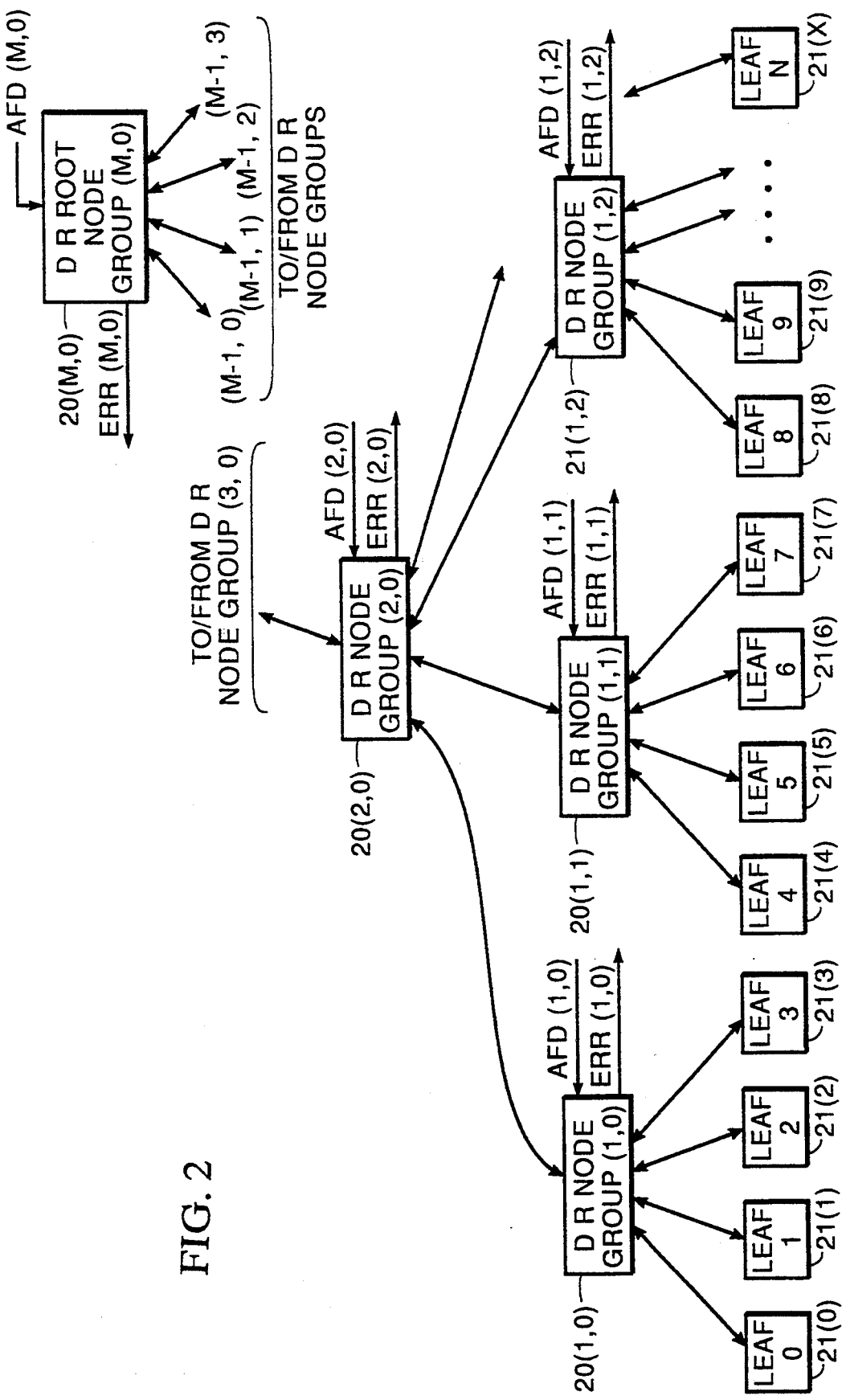
FIG. 2 is a general block diagram illustrating the structure of the data router depicted in FIG. 1, and FIGS. 4A and 4B, when joined as shown in FIG. 3, is a more detailed block diagram of the data router.
Figure 4B:
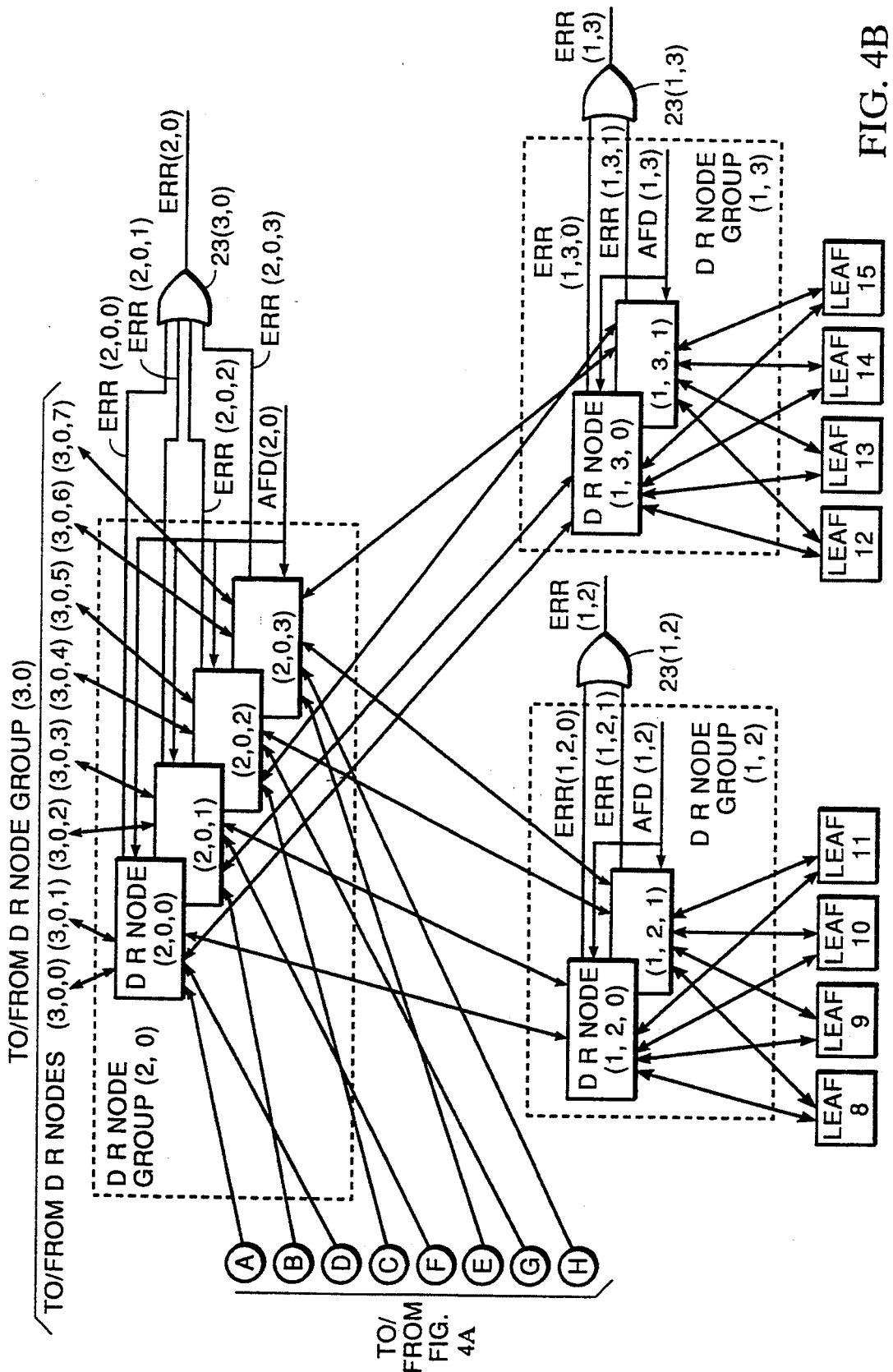

Before proceeding to a detailed description of the system 10 and its various components, it would be helpful to generally describe the structures of the control network 14 and data router 15. The data router 15 and control network 14 both transfer information in the form of message packets, which will be described in detail below in connection with FIGS. 5 and 17, respectively. FIGS. 2 and 3, along with FIGS. 4A through 4B, depict the general structure of the data router 15 and FIGS. 6 through 16 depict the general structure of the control network 14, and further illustrates partitioning of the control network 14.

With reference to FIG. 2, the data router 15 is generally tree-structured, having a plurality of data router node groups 20(i,j) ("i" and "j" are integers) organized in a plurality of levels each identified by the index "i" in reference numeral 20(i,j). A data router node group 20(i,j) at each level "i" is connected to a selected number of data router node groups 20(i−1,j) in the next lower level "i−1" to form a tree. As will be described in detail below, the data router node groups 20(i,j) perform message switching operations to transfer data, in the form of data router message packets, among the processing elements 11, scalar processors 12 and input/output processors 13, which are collectively identified as leaves 21(0) through 21(x) (generally identified by reference numeral 21). Each data router node group 20(1,j) in the lowest level is connected to one or more leaves 21. In the reference numeral 20(i,j), the index (j) uniquely identifies each of the data router node groups 20(i,j) at each level "i."

In the data router 15 represented in FIG. 2, the data router node group 20(M,0) at the highest level "M" is termed the "physical root" of the tree. At each level "i", each data router node group 20(i,j) is termed the "parent" of the data router node groups 20(i−1,j) connected thereto, and each data router node group 20(i−1,,j) is termed a "child" of the data router node group 20(i,j) to which it is connected. It will be appreciated that the data router node group 20(i,j) will also be a child of the data router node group 20(i+1,j) connected thereto. In one particular embodiment, each data router node group 20(i,j) in a particular level "i" is connected to four child data router node groups 20(i−1,j); in that embodiment, the "fan-out" of the tree, that is, the number of child data router node groups connected to each parent, is four. It will be appreciated from the following that the fan-out need not be constant, but may vary from level to level and also among data router node groups 20(i,j) within the same level.

It will further be recognized that the values for the indices "j" in the reference numerals for a data router node group 20(i,j) and its child data router node groups 20(i−1,j), as used in the preceding paragraphs, are not necessarily the same, and further that the relationships between the values will be determined by the respective fan-outs at each level. In particular, if the fan-out at a particular level is four, and if the indices start at zero, the value of the index "j" of a parent data router node group will be the greatest integer in the value of any of the indices of the child data router node groups 20(i−1,j) divided by four. Thus, for example, as shown in FIG. 2, the data router node group 20(2,0) at level 2 is connected to data router node groups 20(1,0) through 20(1,3) as children. In each case of the indices "j" in the reference numerals for the child data router node groups 20(1,0) through 20(1,3), the greatest integer in the value of the index divided by four is zero, which is the value of the index "j" of the parent data router node group 20(2,0).

The structure of the data router 15 is further termed a "fat-tree", and will be particularly described in connection with FIG. 2B. With reference to FIG. 3, along with FIGS. 4A and 4B, at least some of the data router node groups 20(i,j) includes at least one, and typically two or more data router nodes 22(i,j,k), wherein "k" is an integer that uniquely identifies each data router node within a data router node group 20(i,j). Each data router node 22(i,j,k) in a data router node group 20(i,j) is connected to a plurality of data router nodes 22(i+1,j,k) in level "i+1", with the connections being established so that the data router nodes 22(i,j,k) in each data router node group 20(i,j) are connected to different ones of the data router nodes 22(i+1,j,k) in the data router node group 20(i,j) in level "i+1." For example, in data router node group 20(1,0), data router node 22(1,0,0) is connected to data router nodes 22(2,0,0) and 22(2,0,1) of data router node group 20(2,0), and data router node 22(1,0,1) is connected to data router nodes 22(2,0,2) and 22(2,0,3) of data router node group 20(2,0). In addition, each data router node 22(i,j,k) in a parent data router node group 20(i,j) is connected to one data router node 22(i−1,j,k) in that parent's child data router node groups 20(i−1,j). Accordingly, as shown in FIG. 3, data router node (2,0,0) in data router node group 20(2,1) is connected to one data router node 22(1,j,O), where "j" equals 0, 1, 2 and 3, in each of the data router node groups 20(1,0) through 21(1,3).

It will be appreciated that the collection of data router nodes 22(i,j,k) from each leaf 21 to and including the data router nodes 22(M,0,k) in the root data router node group 20(M,0) essentially forms an inverted tree. Each leaf 21 effectively comprises the root of one inverted tree and the data router nodes 22(M,0,k) of the root data router node group 20(M,O) form all of the leaves of all of the inverted trees defined by the collection of leaves 21. The number of data router nodes 22(i,j,k) in each data router node group 20(i,j) at a particular level "i" in the tree defining data router 15 will be determined by the fan-out at each level from level "1" to level "i" in the inverted tree. The fan-out at a particular level "i" is the number of data router nodes 22(i+1,j,k) at level "i+1" to which each data router node 22(i,j,k) at level "i" is connected. Thus, for example, since data router node 22(1,0,0) of data router node group 20(1,0) in level "1" is connected to two data router nodes 22(2,0,0) and 22(2,0,1) of data router node groups 20(2,0) in level "2," the fan-out from data router node 22(1,0,0) is two. In one particular embodiment, the fan-out from data router nodes 22(i,j,k) at a particular level "i" is the same for the entire level, but it may differ from level to level as described below. As with the values of indices "j" as among the data router nodes 20(i,j) as described above, it will be recognized that the values for the indices "k" in the reference numerals for a data router node 22(i,j,k) and its child data router nodes 22(i−1,j,k), as used here, are not necessarily the same, and further that the relationships between the values will be determined by the respective fan-outs at each level.

As noted above, the data router 15 transfers message packets among the processing elements 11, scalar processors 12 and input/output processors 13, all of which are represented by leaves 21. Each connection shown in FIG. 3 between a leaf 21 and a data router node 22(1,j,k) of level 1, which is represented by a line therebetween, actually represents two unidirectional data paths, one for transferring a message packet in each direction. Thus, for example, the connection between leaf 21(0) and data router node 22(1,0,0) of data router node group 20(1,0) represents two data paths. One data path is used by the leaf 21(0) to transmit a message packet to the data router node 22(1,0,0) for delivery to another leaf 21(x). The other data path is used by the data router node 22(1,0,0) to deliver message packets originating at other leaves 21 destined for the leaf 21(0).

Similarly, each connection between a data router node 22(i,j,k) of a level "i" and a data router node 22(i+1,j,k) of a level "i+1," which is also represented in FIG. 3 by a line, represents two unidirectional data paths, one for transferring a message packet in each direction. Thus, for example, the connection between data router node 22(1,0,0) of data router node group 20(1,0) and data router node 22(2,0,0) represents two data paths, one used to transfer message packets from data router node 22(1,0,0) to data router node 22(2,0,0)

and the other to transfer message packets in the opposite direction, that is, from data router node 22(2,0,0) to data router node 22(1,0,0).

Transfer of a message packet from one leaf 21(x) to another leaf 21(y) through the data router 15 message transfer proceeds in two general operations. First, the data router nodes 22(i,j,k) transfer the message packet first "up the tree," that is, to data router nodes in successively higher levels, until it reaches a selected maximum level determined in part by the separation between the source and destination leaves. After a message packet has reached the selected maximum level, the transfer continues "down the tree", during which the data router nodes 22(i,j,k) transfer the message packet to data router nodes at successively lower levels until it is delivered to the destination leaf 21(y). The data router 15 can transfer a plurality of messages concurrently, and any of the data router nodes 22(i,j,k) can direct messages up the tree and other messages down the tree at the same time.

Before proceeding further, it may be helpful to describe the structure of a message packet transferred over the data router 15. With reference to FIG. 5, a data router message packet 30 includes three general portions, including a message address portion 31, a message data portion 32, and a checksum portion 33, each comprising one or more "flits." In one embodiment, each flit comprises four bits, which are transferred in parallel over a data router connection, that is, between a leaf 21 and a data router node 22(i,j,k) or between two data router nodes 22(i,j,k).

The message data portion 32 includes several elements, including a length flit 34, a tag flit 35 and one or more data flits 36(0) through 36(N) (generally identified by reference numeral 36). The tag flit 35 contains control information which may be used by the destination leaf, identified herein by reference numeral 21(y), in processing the data. In one particular embodiment, the leaves 21 may selectively operate in a supervisor operating mode, as when it is processing an operating system program, or a user operating mode, as when it is processing a user application program. In that case, the contents of the tag flit 35 of a particular data router message packet may, for example, identify the operating mode in which the leaf was operating when it generated the data router message packet 30. Tag flit contents identifying the supervisor operating mode, may be particularly useful in identifying the data router message packet as being for input/output purposes or for transfers between partitions for, for example, inter-process communications. On the other hand, tag flit contents identifying the user operating mode may be particularly useful in identifying the message packet as being for intra-partition transfers, for, for example, intra-process communications.

The data flits 36 generally contain the actual message data being transferred over the data router 15, which may vary from packet to packet. The contents of the length flit 34 identify the number of flits in the message data portion 32, in particular, the number of data flits 36, and may vary depending on the amount of data being transferred in a particular packet 30. In one particular embodiment, the contents of length flit 34 identify the number of thirty-two bit words in the data flits 36 of the message packet. In that embodiment, the number of data flits 36 in the message packet is eight times the value in the length flit 34.

In addition, in data router message packets generated by leaves in the supervisor operating mode in that embodiment, the first eight data flits 36, corresponding to the first thirty-two bit word, may contain sequence information for the data contained in the remainder of the message portion 32. This may be particularly useful since, as will be appreciated, data router message packets, even if they are transmitted by the input/output processors 13 in a particular ordered sequence, may be received by the destination leaves 21(y) in random order. In addition, the first word may contain a process identification portion to identify the particular process in which the data is to be processed.

The checksum portion 33 contains a value which is used in detecting errors in packet transmission over the data router 15.

The data router 15 uses the contents of the message address portion 31 to determine a path to be traversed by the message packet 30 from the source leaf to the destination leaf. The message address portion 31 includes a header 40, which identifies the selected maximum level to which the message packet is to be transferred when going up the tree, and a down path identification portion 41 which identifies the path down the tree to the destination leaf 21(y) when going down the tree. When directing a message packet up the tree, a data router node 22(i,j,k) at level "i," randomly selects one of the data router nodes 22(i+1,j,k) connected thereto in level "i+1" in data router node group 20(i+1,j) to receive the message packet. Other than specifying the selected maximum height for the message packet, the packet does not otherwise specify the particular path it is to take up the tree.

The down path identification portion 41 of message packet 30 defines the path the packet is to take down the tree from the data router node group 20(i,j) at the selected maximum level to the destination leaf 21(y). The down path identification portion includes one or more down path identifier fields 42(1) through 42(M) (generally identified by reference numeral 42). The successive down path identifier fields 42, beginning with field 42(M), are used by the data router nodes 22(i,j,k) at successively lower levels as they direct the packet downwardly in the tree.

The down path identifier field 42(i) for level "i" identifies the child data router node group 20(i−1,j) to which the parent data router node group 20(i,j) that receives the packet at level "i" is to direct the message packet 30. It will be appreciated that the down path identifier fields 42 need not specifically identify one of the data router nodes 22(i−1,j,k) in the data router node group 20(i,j) at each level to which the message packet is to be directed, since the path down the tree is effectively a traversal of the inverted tree of which the destination leaf 21(y) is the root.

In one embodiment, in which each parent data router node group 20(i,j) is connected to four child data router node groups 20(i−1,j) or four leaves 21, each down path identifier field 42 comprises two bits that are binary encoded to identify one of the four children to which the message is to be directed. As indicated by FIG. 5, two fields 42 are packed into a single four-bit flit in the message packet 30. Since one down path identifier field 42 is used to at each level (i) in the downward traversal, the number of down path identifier fields 42 required to define the downward path corresponds to the selected maximum level in the path up the tree, which, in turn, corresponds to the contents of header 40. During the downward traversal mode, the data router nodes 22(i,j,k) through which a message packet 30 passes decrement the contents of the header 40 and, after both down path identifier fields 42 contained in a flit have been used, discard the flit. Thus, the length and content of a message packet 30 may change as it is being passed down the tree.

It will be appreciated that the addressing arrangement provided by the header 40 and down path identification portion 41 can be viewed as follows. The selected maximum height in header 40 effectively identifies the data router node group 20(i,j) which is the root of a sub-tree, preferably the smallest sub-tree, of the data router 15 that contains both the source leaf 21(x) and the destination leaf 21(y). On the other hand, the down path identification portion 41 details the exact path from that root to the destination leaf 21(y).

The provision of increasing numbers of data router nodes 22(i,j,k) in data router node groups 20(i,j) at higher levels in the data router 15, thereby resulting in a "fat-tree" design, provides several advantages. In a massively parallel computer SIMD system, processing elements 11 typically transfer messages during a message transfer operation, initiated by commands from the scalar processors 12. During a message transfer operation, a large number of processing elements 11 may transfer messages concurrently. If the data router 15 did not have increasing numbers of data router nodes 22(i,j,k) at higher levels to which the message packets 30 can be directed when going up the tree, the bandwidth of the data router 15, that is, the rate at which it can transfer message packets 30, would decrease at higher levels.

Since increasing numbers of data router nodes 22(i,j,k) are provided at higher levels in the "fat-tree" design, the reduction in bandwidth at higher levels can be minimized or controlled. As noted above, the fan-out of data router node groups 20(i,j), that is, the number of data router nodes 22(i+1,j,k) at level "i+1" connected to each data router node 22(i,j,k) at level "i" can vary from level to level, and can be selected to maintain a desired minimum bandwidth between the respective levels "i" and "i+1." Alternatively, the fan-outs from each level to the next higher level can be selected so that the entire data router 15 has a selected minimum bandwidth.

Further, as noted above, each data router node 22(i,j,k) randomly selects the data router node 22(i+1,j,k) in the next higher level to which it directs a message packet 30 in the path up the tree. Accordingly, the message packets are randomly distributed through the higher levels of the tree, which minimizes the likelihood of bottlenecks through the data router 15 and maximizes the bandwidth in the higher levels.

As shown in FIGS. 2 and 3, each data router node group 20(i,j), and in particular each data router node 22(i,j,k), in the data router 15 receives an AFD(i,j) all-fall-down (i,j) signal. The AFD(i,j) all-fall-down (i,j) signal is provided by the control network 14, as will be described below in connection with FIGS. 6 through 7B and 8. The AFD(i,j) signal is generated under control of the processing elements 11 within a partition during a context switch operation of the processing elements 11 within the partition. The AFD(i,j) all-fall-down (i,j) signal, when asserted, enables selected node groups 20(i,j) of the data router 15, that is, those data router node groups 20(i,j) in a sub-tree just including the processing elements in the partition, to enter an all-fall-down mode, in which that sub-tree quickly empties itself of data router message packets. In response to the AFD(i,j) all-fall-down (i,j) signal, the appropriate data router node groups 20(i,j) direct all message packets 30 directly down the tree to the leaves 21, where they are stored until the context in which the data router message packets were generated is restored. At that point, the leaves 21 which receive such messages can transmit them over the data router 15, which will deliver them to the intended destinations.

In contrast to normal operation described above, in which the contents of the header 40 are decremented and flits containing down path identifier fields 42 discarded as the message packet 30 is directed down the tree, when the AFD(i,j) all-fall-down (i,j) signal is asserted the contents of the header 40 are not decremented and no changes are made to the flits containing the down path identifier fields 42. When the context is restored and the leaves 21 return the message packets to the data router 15, they will be delivered to the proper destination leaves. This can be seen from the following explanation.

In the following explanation, reference numerals 21(x) and 21(y) will refer to the original source and destination leaves, respectively, for a message packet 30 and reference numeral 21(x') will refer to the intermediate storage leaf which receives and stores the message packet 30 while the context in which the data router message packet 30 was generated is being switched out. First, for those message packets that are being transferred up the tree or that have reached the selected maximum height when the AFD(i,j) all-fall-down (i,j) signal is asserted, the contents of the header 40 and down path identification portion 41 are the same as when they were originally transmitted by the source leaf 21(x). Since the intermediate storage leaf 21(x') receives the message packet 30 it must be part of a sub-tree of the data router 15 that includes both the source leaf 21(x) and the destination leaf 21(y). Further, the sub-tree has the same root data router node group 20(i,j) that the message packet 30 would have reached had the AFD(i,j) all-fall-down (i,j) signal not been asserted. Accordingly, when the intermediate storage leaf 21(x') transmits the message packet over the data router 15, the packet will go up the tree and reach the same data router node group 20(i,j) that it would have reached if the AFD(i,j) all-fall-down (i,j) signal had not been asserted, and from there will follow the same downward path, defined by the down path identification portion 41, that it would have taken.

On the other hand, if a message packet is being transferred down the tree when the AFD(i,j) all-fall-down (i,j) signal is asserted, prior to the signal's assertion the contents of the header field 40 are decremented as the message packet is passed from level to level. Accordingly, it will be appreciated that, when the message packet 30 is transmitted by the intermediate storage leaf 21(x'), in its path up the tree it will go only to a data router node group 20(i,j) at the level indicated in the header field 40, which, in turn, corresponds to the data router node group 20(i,j) which controlled the direction of transfer of the message packet 30 when the AFD(i,j) all-fall-down (i,j) signal was asserted. It will be appreciated that the data router node group 20(i,j) that the message packet 30 reaches may not be the root of a sub-tree that includes the source leaf 21(x). However, it will be the root of a subtree that includes both the intermediate storage leaf 21(x'), since the message packet 30 was transferred from that data router node group 20(i,j) to the intermediate storage leaf 21(x'), and the destination leaf 21(y), since the message packet 30 could have been transferred from that data router node group 20(i,j) to the destination leaf had the AFD all-fall-down (i,j) signal not been asserted.

In addition, each data router node 22(i,j,k) generates an error signal, identified as ERR (i,j,k) which is asserted if it detects selected error conditions. A data router node 22(i,j,k) may assert its ERR (i,j,k) signal to indicate, for example, the occurrence of an error in connection with transfer of a message packet 30. Each data router node group 20(i,j) has an associated OR gate 23(i,j) which receives the ERR (i,j,k) node error signals from the data router nodes 22(i,j,k) connected thereto and generates a consolidated ERR (i,j) node group error signal if any of the received error signals is asserted. The ERR (i,j) node group error signals from the OR gates 23(i,j) are coupled to the control network 14 and used as described below.

As will be described in further detail below, each leaf 21 maintains a message counter that it increments when it transmits a message packet over the data router 15, and that it decrements when it receives a message packet from the data router 15. As noted above, the control network 14 performs selected arithmetic operations, whose results can be provided to the processing elements 11 and scalar processors 12. By enabling the control network 14 to perform selected arithmetic operations using the values of the message counters, the results can identify when all of the message packets that were transmitted over the data router 15 have been received by the leaves 21, thereby indicating that the data router 15 is empty. This can be used to indicate that a message transfer operation has been completed, or that the router 15 is empty as a result of the assertion of an AFD(i,j) all-fall-down (i,j) signal so that a context switch can occur.

2. Control Network 14

As noted above, the control network 14 may be used to transfer program commands from the scalar processors 12 to the processing elements 11, return status information to the scalar processors 12, and may also be used to provide status and synchronization information among the processing elements 11. In addition, the control network 14 may be used to perform selected types of arithmetic operations. The control network 14 will be generally described in connection with block diagrams depicted in FIGS. 6 through 16, and with FIG. 17, which depicts the structure of a control network message packet.

FIGS. 7A through 7D, as laid out as shown in FIG. 6, generally depict the structure of the control network 14. With reference to FIGS. 7A through 7D, the control network 14, like the data router 15, is generally tree-structured, having a plurality of control network node clusters 50(i,j) ("i" and "j" are integers) organized in a plurality of levels each identified by the index "i" in reference numeral 50(i,j). In the reference numeral 50(i,j), the index (j) distinguishes the with diverse control network node clusters 50(i,j) at each level "i." The tree structure of the control network 14 is generally similar to that of the data router 15. In particular, each control network node cluster 50(i,j) is generally associated with a data router node group 20(i,j) having the same values for indices "i" and "j", and connections among control network node clusters 50(i,j) follow a similar tree-like pattern as connections among data router node groups 20(i,j). Each control network node cluster 50(1,j) in the lowest level may be connected to one or more leaves 21, in a similar tree-like pattern as the connections in the data router 15.

Similar terminology will be used in describing the control network 14 as was used in describing the data router 15 above. In particular, in the control network 15 represented in FIG. 2, the control network node cluster 50(M,0) at the highest level "M" is termed the "physical root" of the tree. At each level "i", each control network node cluster 50(i,j) is termed the "parent" of control network node cluster 50(i−1,j) connected thereto, and each control network node cluster 50(i−1,j) is termed a "child" of the control network node cluster 50(i,j) to which it is connected. The control network node cluster 50(i,j) will also be a child of the control network node cluster 50(i+1,j) connected thereto. In one particular embodiment, each control network node cluster 50(i,j) in a particular level "i" is connected to four child control network node clusters 50(i−1,j), in which case the "fan-out" of the tree, that is, the number of children connected to each parent, is four.

Figure 7A:
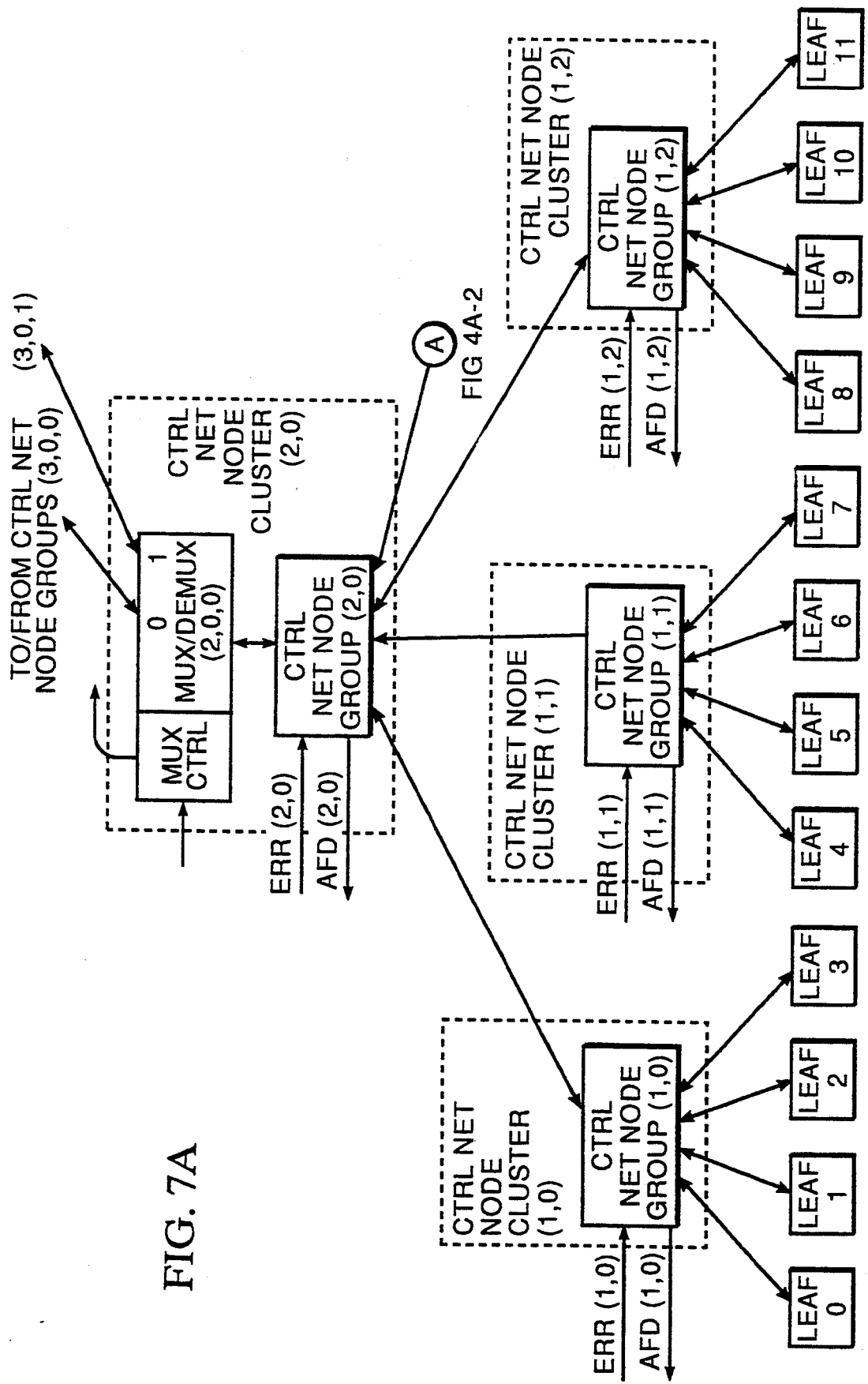
FIGS. 7A through 7D, when joined as shown in FIG. 6, is a general block diagram illustrating the structure of the control network depicted in FIG. 1.
Figure 7B:
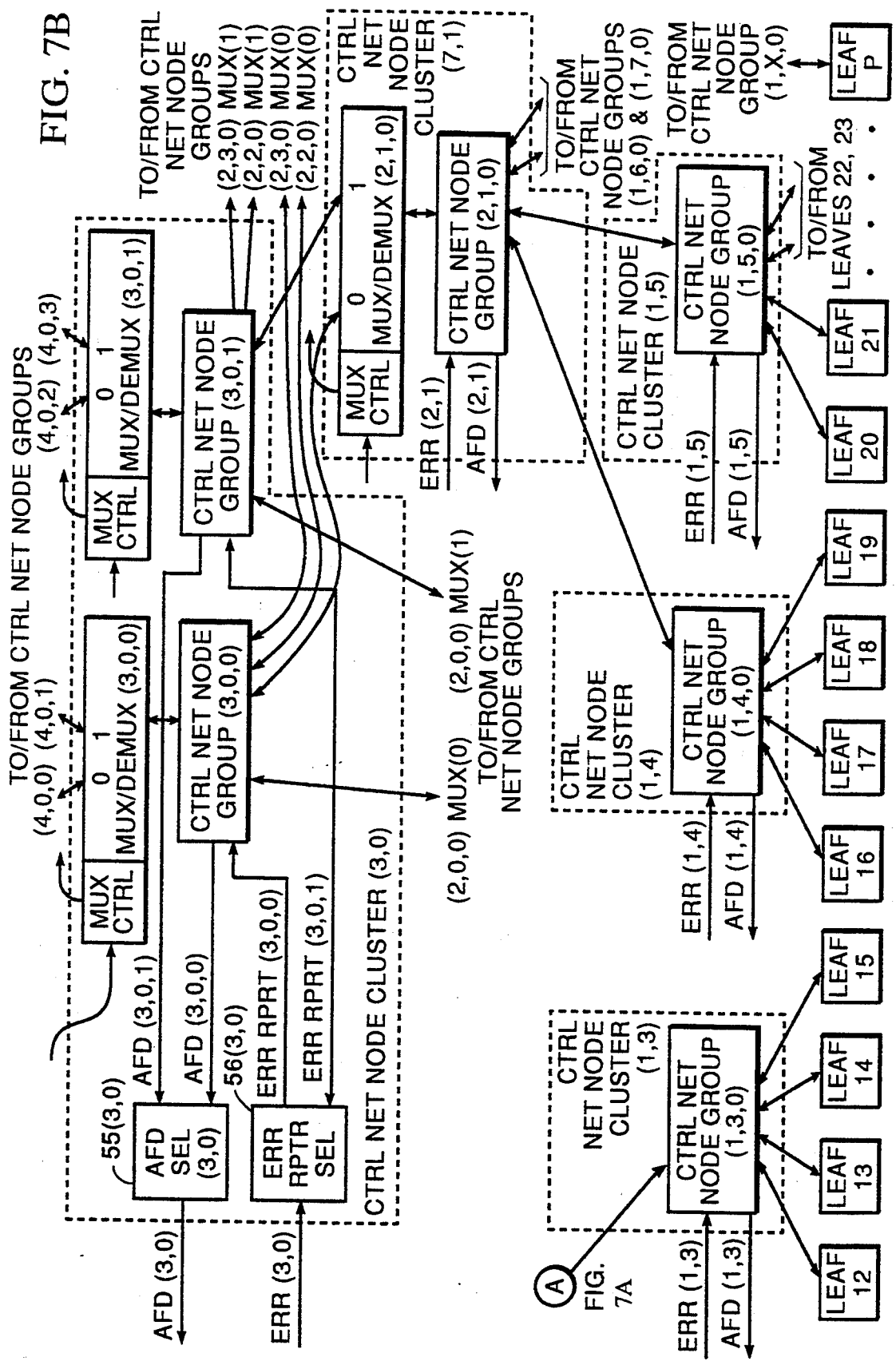
Figure 7C:
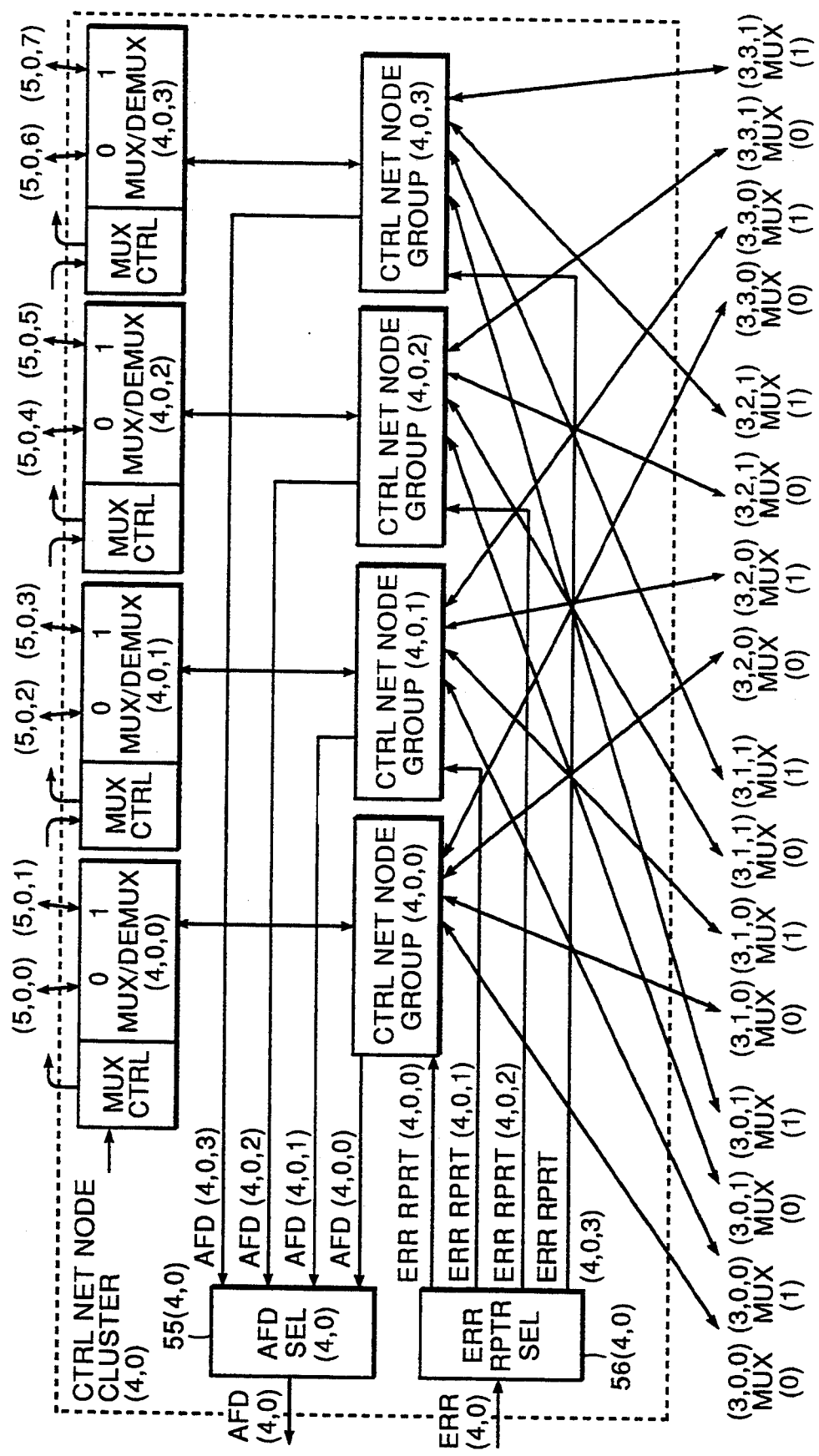
Figure 7D:
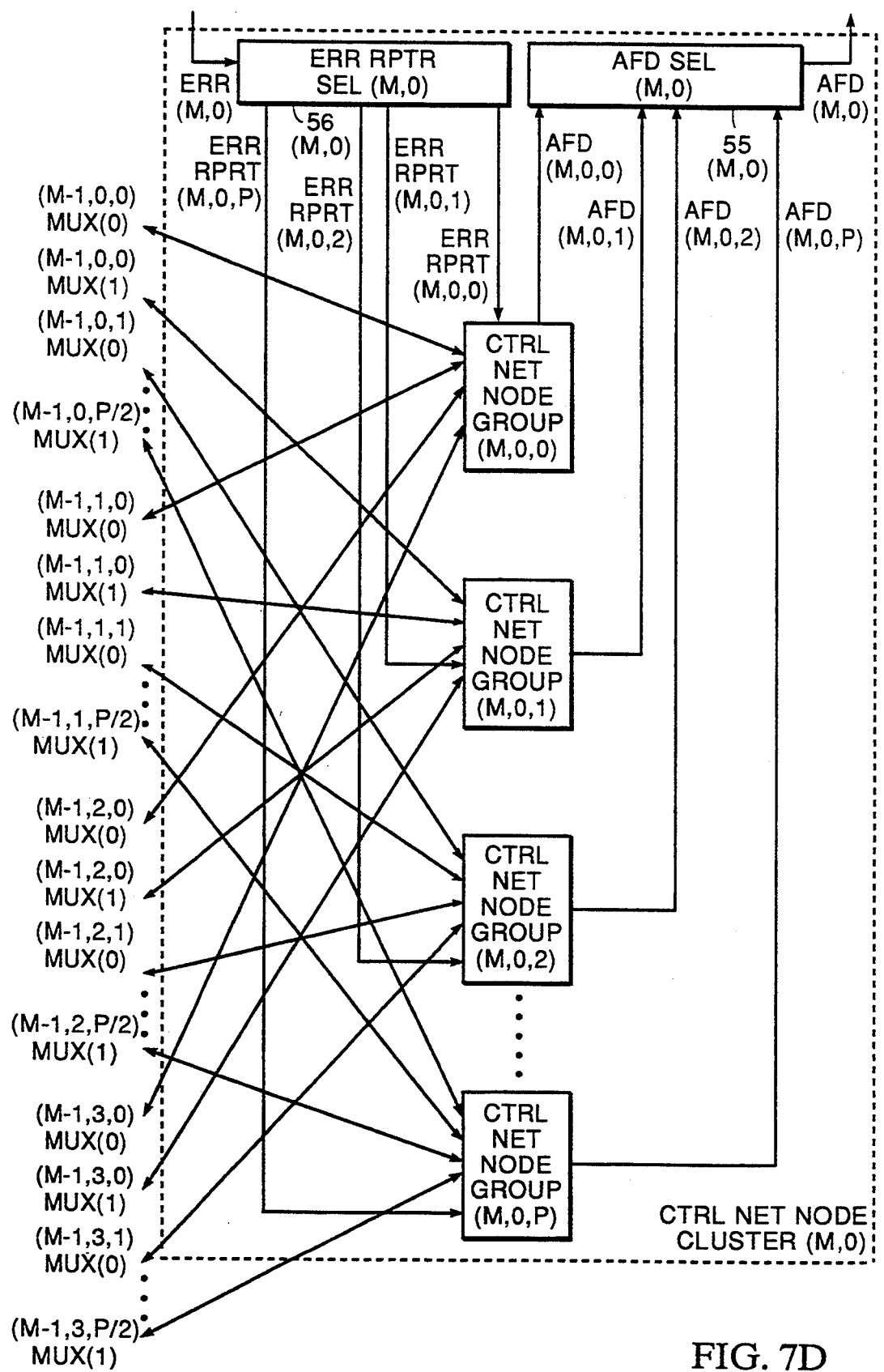

As was the case with the values of index "j" in the reference numerals for each data router node group 20(i,j) and its child data router node groups 20(i−1,j), as described above, the values for "j" in the reference numerals 50(i,j) for the respective parent and child control network node clusters 50(i,j) and 50(i−1,j) may not be the same, and will in particular be determined by the respective fan-outs at each level. In particular, if the fan-out at a particular level is four, and if the indices start at zero, the value of the index "j" of a parent control network node cluster will be the greatest integer in the value of any of the indices of the child control network node cluster 50(i−1,j) divided by four. Thus, for example, as shown in FIGS. 7A and 7B, the control network node cluster 50(2,0) at level 2 is connected to control network node clusters 50(1,0) through 50(1,3) as children. In each case of the indices "j" in the reference numerals for the child control network node clusters 50(1,0) through 50(1,3), the greatest integer in the value of the index divided by four is zero, which is the value of the index "j" of the parent control network node cluster 50(2,0).

The structure of a control network node cluster 50(i,j) will be described in connection with FIGS. 7A through 7D. As shown in those Figures, each control network node cluster 50(i,j) includes at least one control network node group 51(i,j,k), with each cluster 50(i,j) in the upper levels including a plurality of control network node groups. Like the data router 15 described above, the control network 14 has generally a fat-tree structure, in which the control network 14 has multiple paths from each leaf 21 to the root control network node cluster 50(M,0). Unlike the data router 15, however, the control network 14 is, what will be termed herein, a switched fat-tree structure. That is, each control network node group 51(i,j,k) above a predetermined level includes a multiplexer/demultiplexer 53(i,j,k) that is connected to two control network node groups 51(i+1,j,k) in the parent control network node cluster 50(i+1,j). Each control network node group 51(i+1,j,k) in the parent control network node cluster 50(i+1,j) is connected to a most one control network node group 51(i,j,k) through the associated multiplexer 53(i,j,k) in each of the control network node clusters 50(i,j) constituting its children.

Each multiplexer/demultiplexer 53(i,j,k) is connected to a multiplexer control circuit 54(i,j,k) to selectively connect the control network node group 51(i,j,k) to one of the control network node groups 51(i+1,j,k) in the parent control network node cluster 50(i+1,j,k). Each multiplexer control circuit 54(i,j,k) is controlled by the diagnostic network 16 to selectively establish a connection from the control network node group 51(i,j,k) to one of the control network node groups 51(i+1,j,k) connected thereto in its parent control network node cluster 50(i+1,j). The connection so established is maintained until changed by the diagnostic network 16. The connections among the control network node groups 51(i,j,k) are configured to establish within the switched fat-tree structure one or more tree networks, with each tree network defining a partition. Each tree network so established within the control network 14 has a flat tree structure, that is, a tree network in which connections are established between each control network node group 51(i,j,k) and one of the control network node groups 51(i+1,j,k) in its parent control network node cluster 50(i+1,j). In one particular embodiment, the control network node clusters 50(i,j) starting at level two have multiplexer/demultiplexers 53(i,j,k), and so it will be appreciated that in that embodiment the minimum number of consecutive leaves 21 in tree network, and thus in a partition, will be sixteen.

Figure 8:
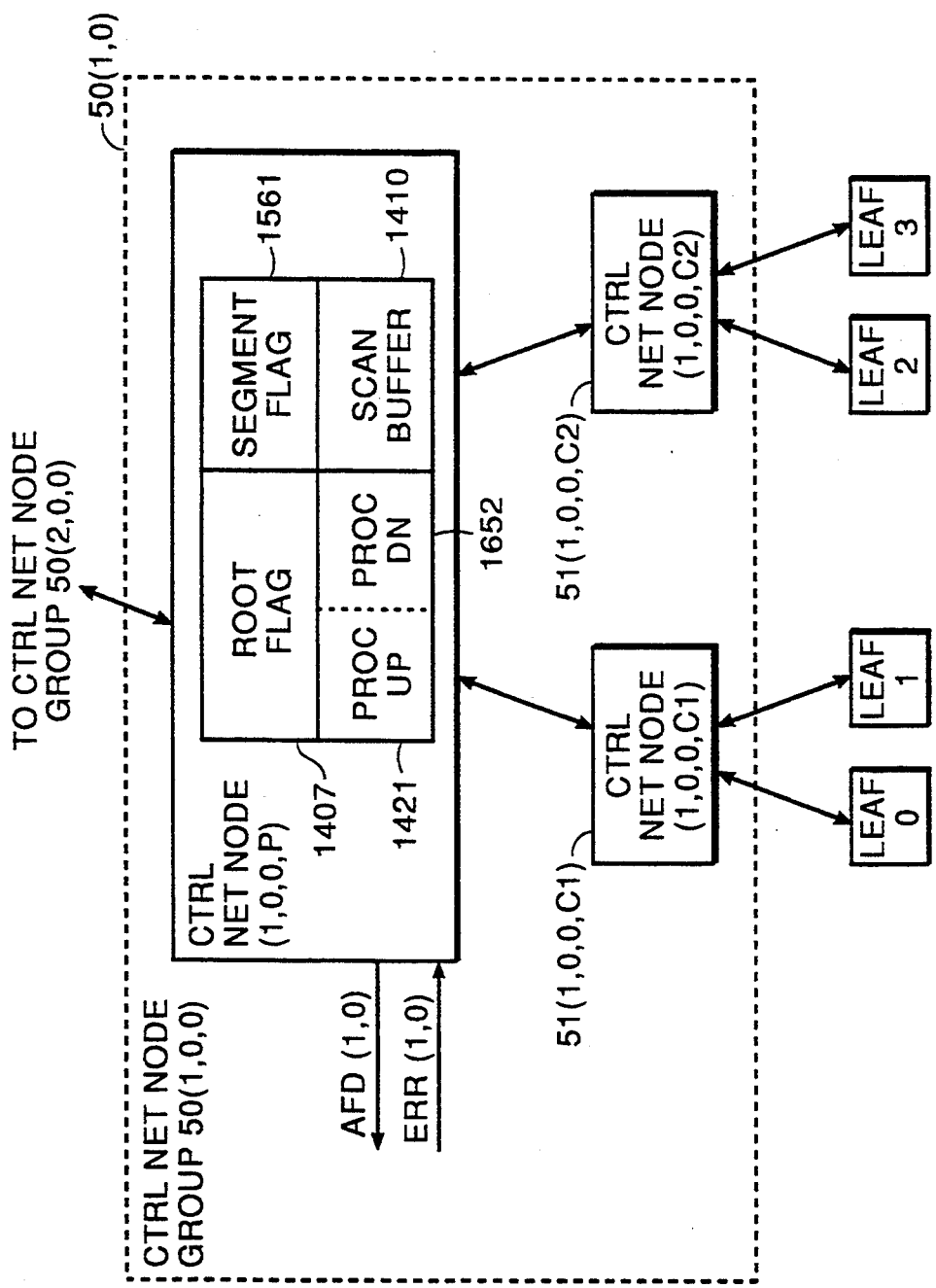
FIG. 8 is a general block diagram illustrating the structure of a control network node group forming an element of the control network shown in FIGS. 6 and 7A through 7D.

The control network node groups 51(i,j,k) and their respective multiplexer/demultiplexers 53(i,j,k) and multiplexer control circuits 54(i,j,k) can be configured by the diagnostic network 16 to form diverse flat tree networks within the control network 14, as will be described below in connection with FIGS. 9 through 14C. First, however, the structure of a control network node group 51(i,j,k) will be described in connection with FIG. 8. The structure of a control network node group 51(i,j,k), which is shown on FIG. 8, differs from the structure of a data router node group 20(i,j). With reference to FIG. 8, a control network node cluster 50(i,j) includes three control network nodes 52(i,j,k,l), where "l" can have the values "P," "$C_1$" or "$C_2$." Within a control network node cluster 50(i,j), the control network nodes are connected so that control network node 52(i,j,k,P) is parent of child control network nodes 52(i,j,k,$C_1$) and 5 1(i,j,$C_2$), all within the same control network node group 52(i,j,k). It will be appreciated that parent control network node 52(i,j,k,P) of control network node cluster 50(i,j) is itself a child of a control network node 52(i+1,j,$C_1$) or control network node 52(i+1,j,$C_2$) of a control network node cluster 50(i,j) of the next higher level "i+1." Similarly, each child control network node 52(i,j,k,$C_i$) is a parent of either a leaf 21 or a control network node 52(i−1,j,P) of the next lower level "i−1."

It should be noted that, in FIGS. 7A through 14C, the indices "j" for control network nodes 52(i,j,k,l) in each level increase from left to right. In the following, for each parent control network node 52(i+1,j,k,l), the child control network node 52(i,j,k,l) connected thereto with the lower index "j" will be termed the "left" child, and the control network node 52(i,j,k,l) with the higher index "j" will be termed the "right" child. If control network nodes 52(i,j,k,l) are in the same control network node group 52(i,j,k), they will have the same indices; in that case, the child control network node 52(i,j,k,$C_1$) will identify the "left" child, and child control network node 52(i,j,k,$C_2$) will identify the "right" child, both of parent control network node 52(i,j,k,P).

Each control network node group 51(i,j,k) thus contains two sub-levels of control network nodes 52(i,j,k,l), one defined by parent control network node 52(i,j,k,P), and the other defined by child control network nodes 52(i,j,k,$C_1$) and 52(i,j,k,$C_2$). This enables the control network node clusters 50(i,j) to have the same fan-out connection pattern within the control network 14 as the corresponding data router node groups 20(i,j) within the data router 15, while at the same time providing a two-child/one-parent connection for the control network nodes 52(i,j,k,l) which simplifies performance of the arithmetic operations as described below.

As in the data router 15, each connection between control network nodes 52(i,j,k,l) represents two unidirectional data paths, which transfer control network message packets in opposite directions between the respective nodes, and lines for propagating an error signal between the respective nodes.

Figures 9, 10A:
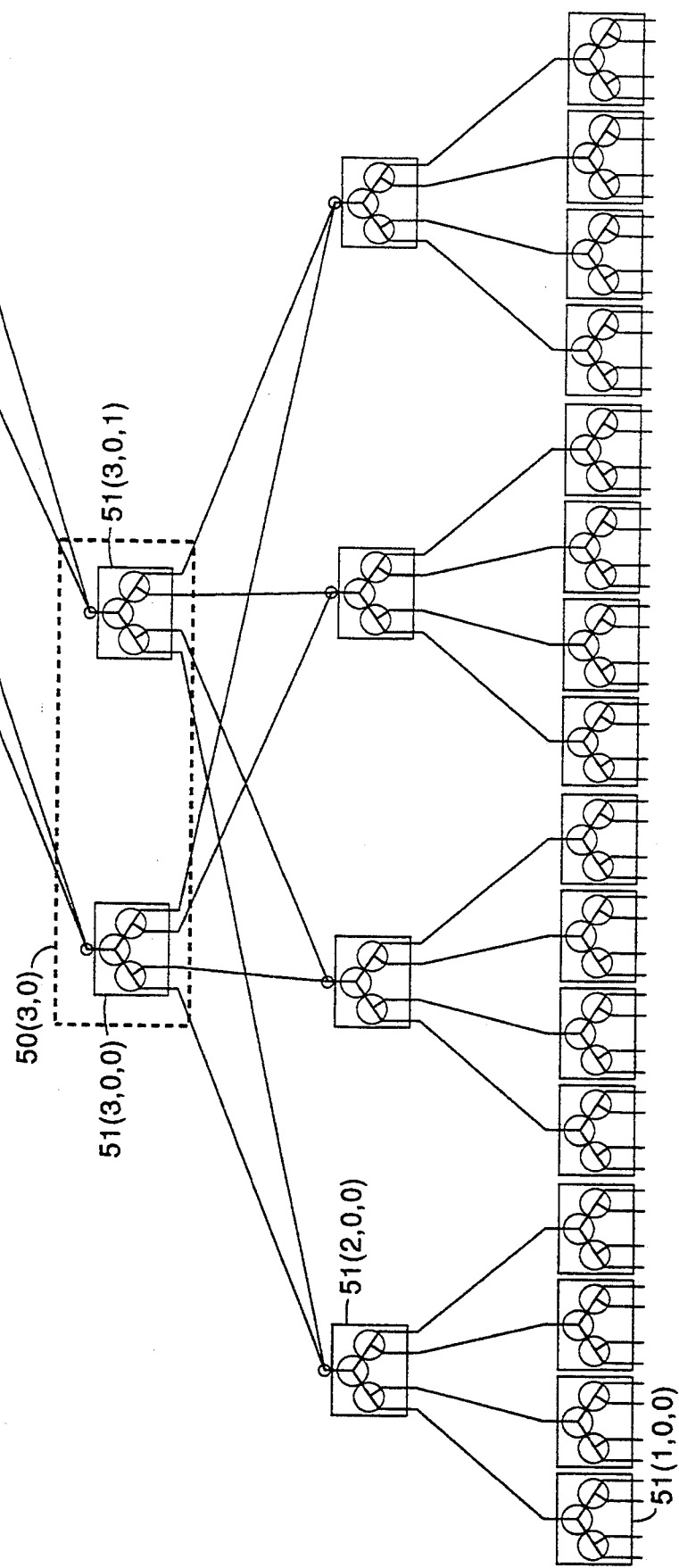
FIGS. 10A through 10C, when joined as shown in FIG. 9, is a general block diagram of a specific control network depicted in FIGS. 6 and 7A through 7D.
Figure 10B:
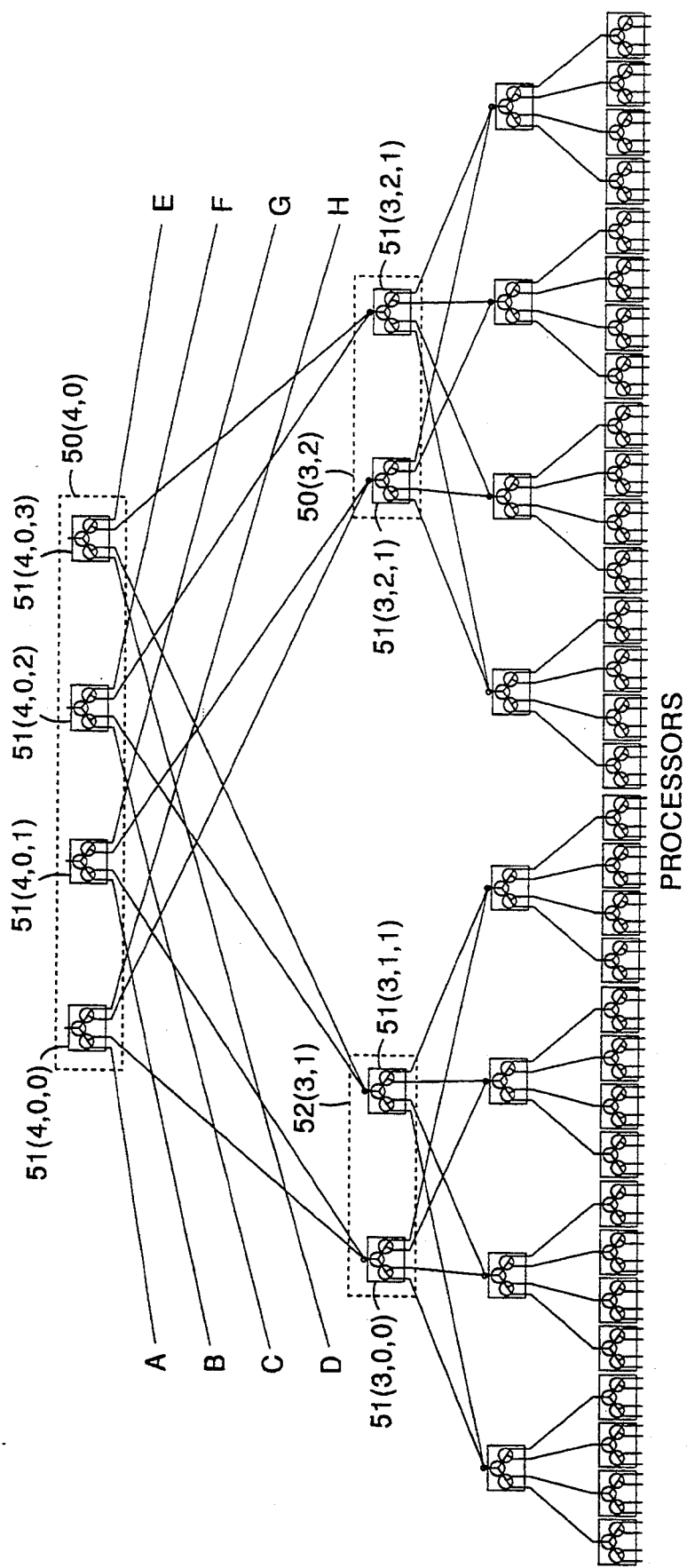
Figure 10C:
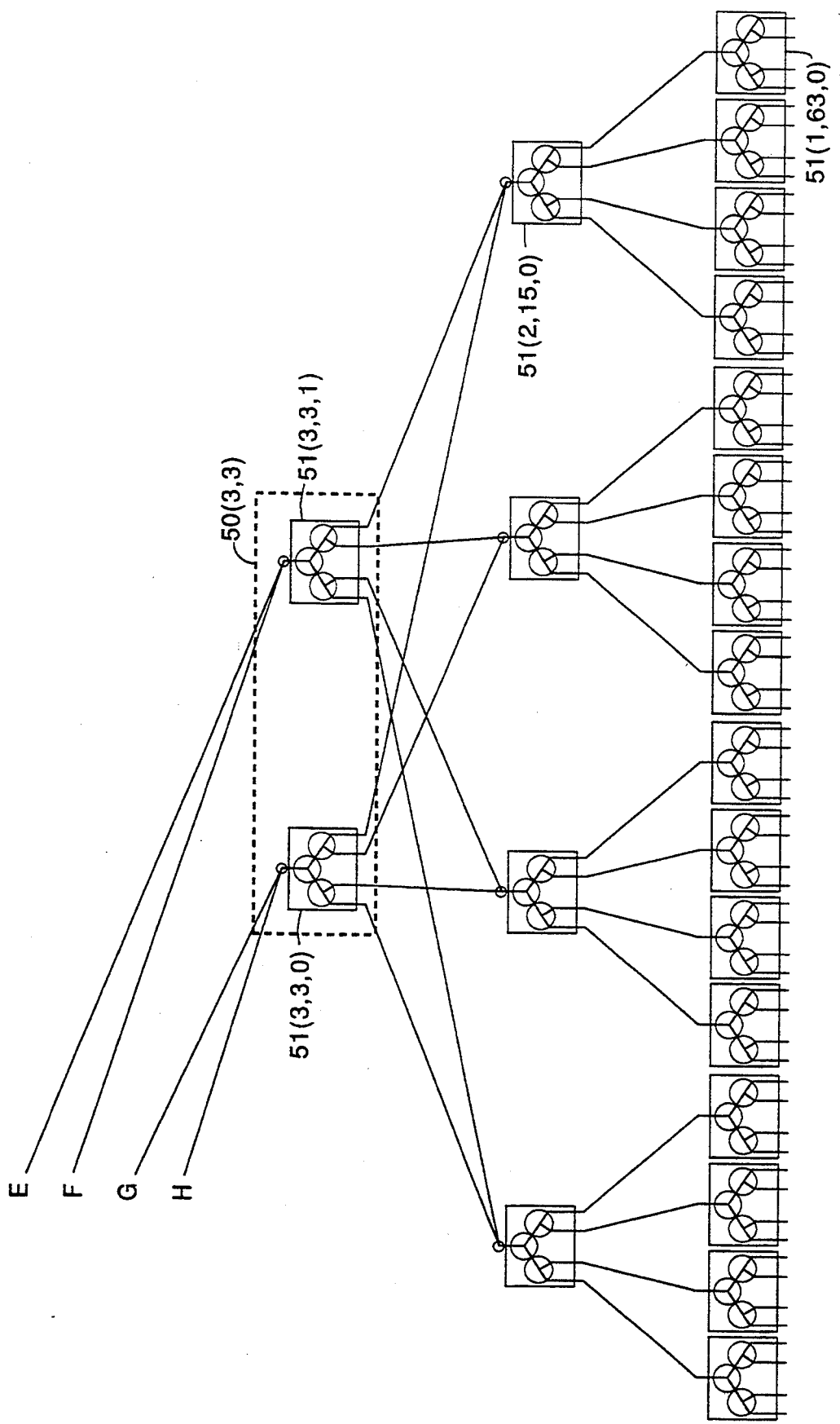

The structure of control network 14 will be further described in connection with FIGS. 9 through 14C. FIGS. 10A through 10C, when put together as shown in FIG. 9 depicts a portion of control network 14, specifically depicting control network node clusters 50(i,j) with connections available for a maximum of two hundred and fifty-six leaves 21, with processing elements 11 (not shown) being connected as leaves 21 toward the left and scalar processors 12 being connected toward the right. The portion depicted in FIGS. 10A through 10C will accommodate one hundred and twenty eight processing elements 11 (not shown). Four scalar processors 12, identified as Scalar 1 through Scalar 4, are included, although any number up to the number of connections, that is one hundred and twenty eight, may be included.

The portion of control network 14 depicted in FIGS. 10A through 10C comprises control network node clusters 50(i,j) organized into four levels. As described above, each control network node cluster 50(i,j) depicted in FIGS. 9 through 14C includes at least one control network node group 51(i,j,k), with the control network node clusters 50(3,j) and 50(4,0) above level two comprising multiple control network node groups. In FIGS. 9 through 14C, each control network node group 51(i,j,k) is represented as a box surrounding three circles each representing a control network node 52(i,j,k,l) (not identified by reference numeral in the Figures). Each multiplexer/demultiplexer 53(i,j,k) and associated multiplexer control circuit 54(i,j,k) (neither of which are identified in FIGS. 9 through 14C by reference numeral) is represented in FIGS. 9 through 14C as a circle just above the associated control network node group 51(i,j,k). It will be appreciated that, if the control network 14 includes additional levels (not shown) which may accommodate connections for more than two hundred and fifty six leaves, the control network nodes groups 51(4,j,k) in the fourth level will also have associated multiplexer/demultiplexers 53(4,j,k) and multiplexer control circuits 54(4,j,k), which are not depicted in the Figures. The additional connections may be used for additional processing elements 11 or scalar procesors 12, and they may also be used for input-/output processors 13 and spare processing elements 11s.

As noted above, the control network node clusters 50(i,j), comprising respective control network node groups 51(i,j,k) and their associated multiplexer/demultiplexers 53(i,j,k) and multiplexer control circuits 54(i,j,k), can be configured to form diverse flat tree networks within the control network 14, with each tree including at least one leaf 21 comprising a scalar processor 12 and a plurality of leaves 21 comprising processing elements 11. This will be described in connection with FIGS. 9 through 14C. Effectively, the diagnostic network 16 conditions selected multiplexer control circuits 54(i,j,k) to establish a connection between its associated control network node group 51(i,j,k) and one of the two control network node groups 51(i+1,j,k) in the next higher level connected thereto. The multiplexer control circuits 54(i,j,k) of the control network node groups so conditioned are selected to form, from the switched fat-tree structure, a flat tree network structure including a scalar processor 12 and a plurality of processing elements 11, with each tree thus formed defining a partition. Each flat tree that is formed to create a partition includes one control network node group 51(i,j,k) within those of the control network node clusters 50(i,j) required to form a tree including the processing elements 11 and scalar processor 12 to be included in the partition, as well as any input/output processors 13 and spare processing elements 11s to be included.

Figures 11, 12C:
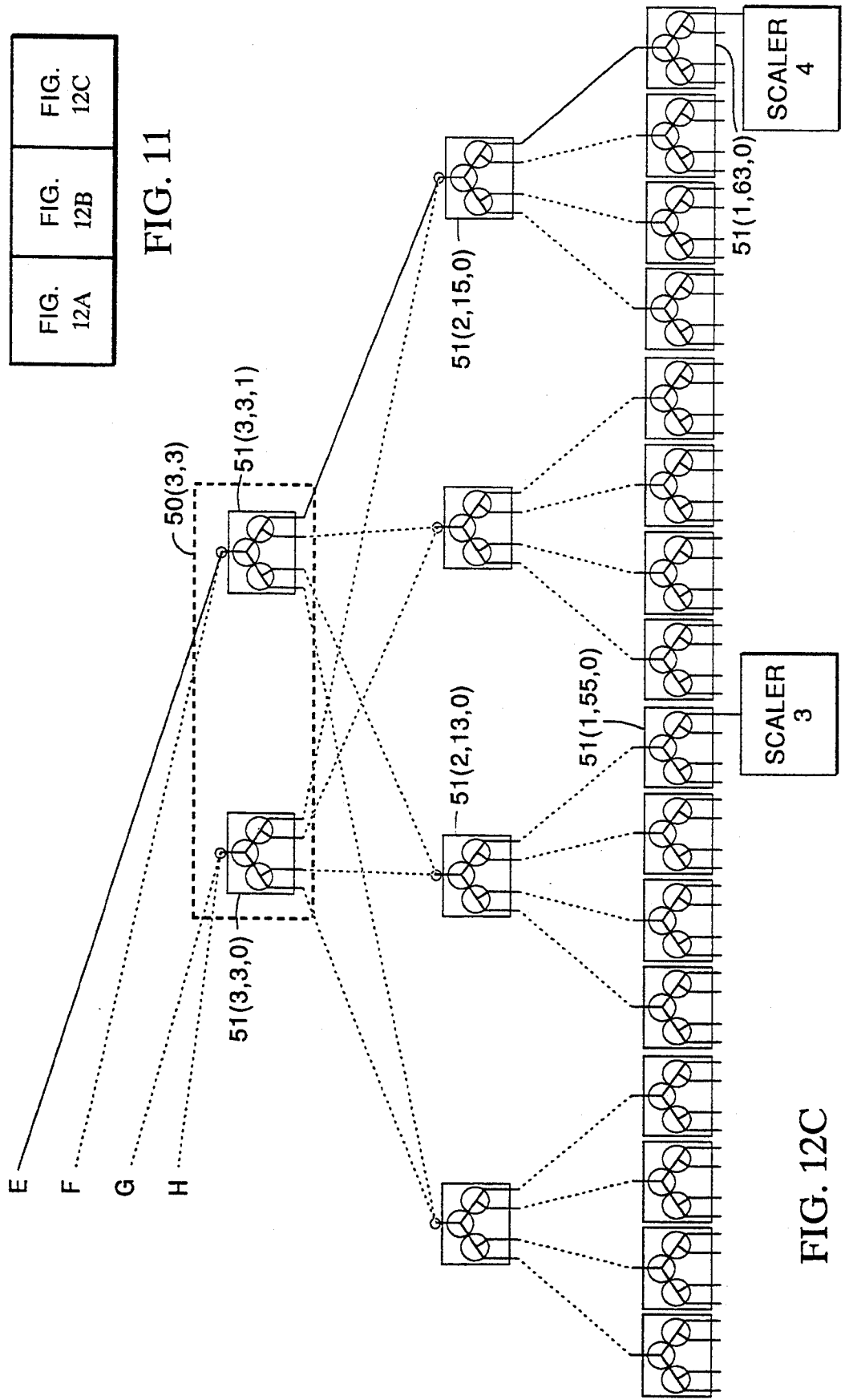
FIGS. 12A through 12C, when joined as shown in FIG. 11, illustrates a specific partitioning of the control network depicted in FIGS. 10A through 10C.
Figure 12A:
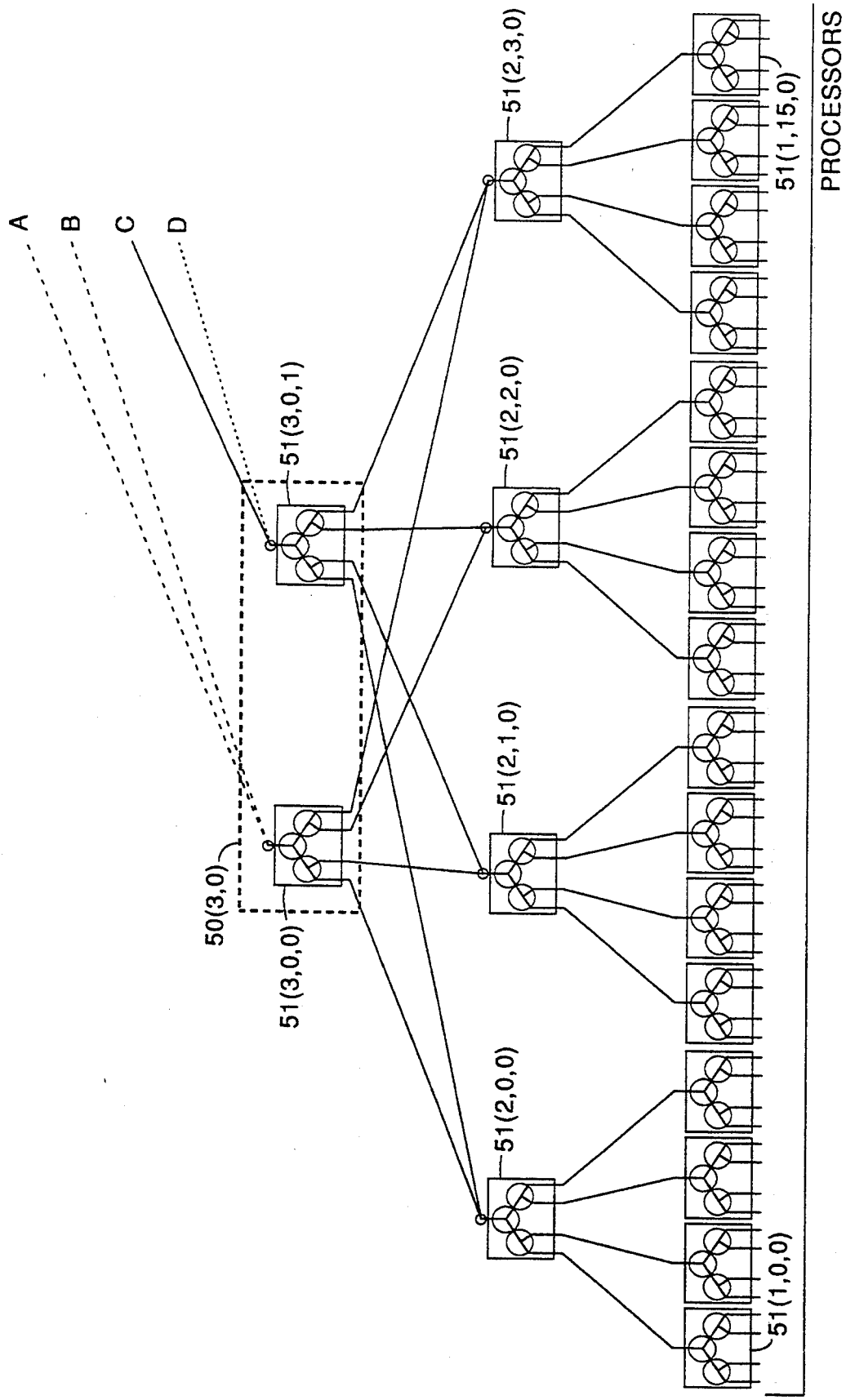
Figure 12B:
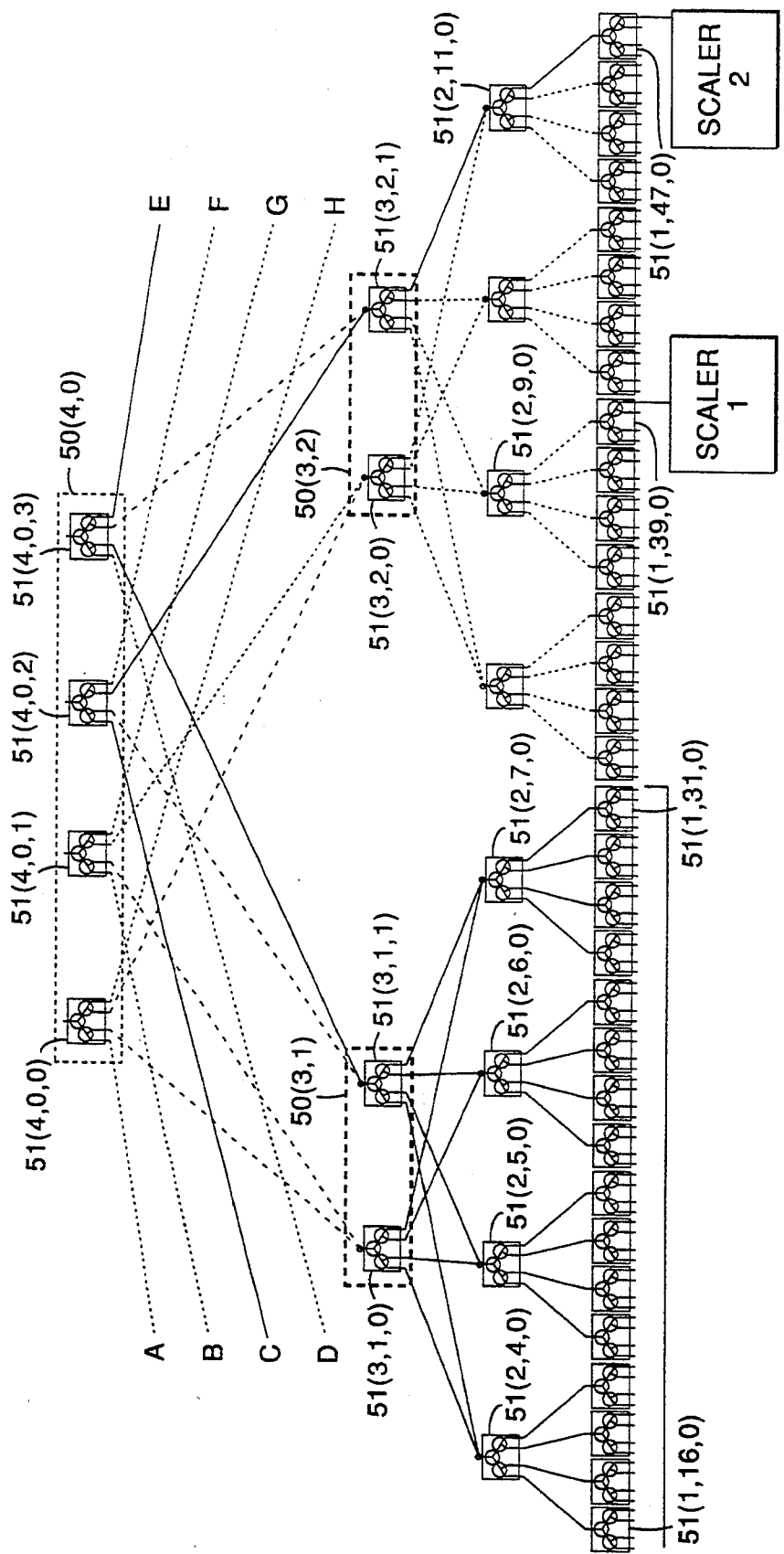

FIGS. 12A through 12C, when put together as shown in FIG. 11, together depict the control network 14 as shown in FIGS. 10A through 10C, in which connections defining two partitions have been established, one including scalar processor 12 identified as "Scalar 2" and the other including scalar processor 12 identified as "Scalar 4." To form the partition including the Scalar 4 scalar processor, the multiplexer control circuits 54(i,j,k) condition the multiplexer/demultiplexers 53(i,j,k) to establish the connections among control network node groups 51(i,j,k) as depicted in heavy solid lines. Similarly, to form the partition including Scalar 2, the multiplexer control circuits 54(i,j,k) condition the multiplexer/demultiplexers 53(i,j,k) to establish the connections among control network node groups 51(i,j,k) as depicted in light solid lines. The other lines interconnecting the control network node groups 51(i,j,k) are depicted in broken lines.

It will be appreciated that the interconnections among the control network node groups 51(i,j,k) to establish each partition establishes a tree of control network node groups. In the tree established for the partition including the Scalar 4 scalar processor 12, the root node comprises control network node group 51(4,0,3) in level 4, and connections are established through the respective multiplexer/demultiplexers 53(i,j,k) to include control network node group 51(3,1,1) in level 3, control network node groups 51(2,4,0) through 51(2,7,0) in level 2 and control network node groups 51(1,16,0) through 51(1,31,0) in level 1. This partition includes the processing elements 11 (not shown) which are connected to control network node groups 51(1,16,0) through 51(1,31,0). In addition, connections are established through the respective multiplexer/demultiplexers 53(i,j,k) to include control network node group 51(3,3,1) in level 3, control network node group 51(2,15,0) in level 2 and control network node group 51(1,63,0) in level 1, to provide an interconnection from scalar 4 to the root node 51(4,0,3) in level 4.

Similarly, in the tree established for the partition including the Scalar 2 scalar processor 12, the root node comprises control network node group 51(4,0,2) in level 4, and connections are established through the respective multiplexer/demultiplexers 53(i,j,k) to include control network node group 51(3,0,1) in level 3, control network node groups 51(2,0,0) through 51(2,3,0) in level 2 and control network node groups 51(1,0,0) through 51(1,15,0) in level 1. This partition includes the processing elements 11 (not shown) which are connected to control network node groups 51(1,0,0) through 51(1,15,0). In addition, the connections are established through the respective multiplexer/demultiplexers 53(i,j,k) to include control network node group 51(3,2,1) in level 3, control network node group 51(2,11,0) in level 2 and control network node group 51(1,47,0) in level 1, to provide an interconnection from scalar 4 to the root node 51(4,0,2) in level 4.

Although not shown in FIGS. 9 through 12C, as described above in connection with FIG. 1, the system 10 also includes input/output processors 13 and spare processing elements 11s, which may be connected to control network node groups 51(1,j,k) of higher index "j" than is shown in FIGS. 10B and 12B. In that case, additional levels of control network node clusters 50(i,j) will also be provided to connect the control network node groups 51(i,j,k) of higher index "j" to the control network node groups 51(i,j,k) shown in the Figures. A partition may be created including these components by establishing a root control network node group at a higher level, and conditioning the paths from the root node to the required processing elements 11, spare processing elements 11s, scalar processor 12 and input/output processors 13.

Figures 13, 14A:
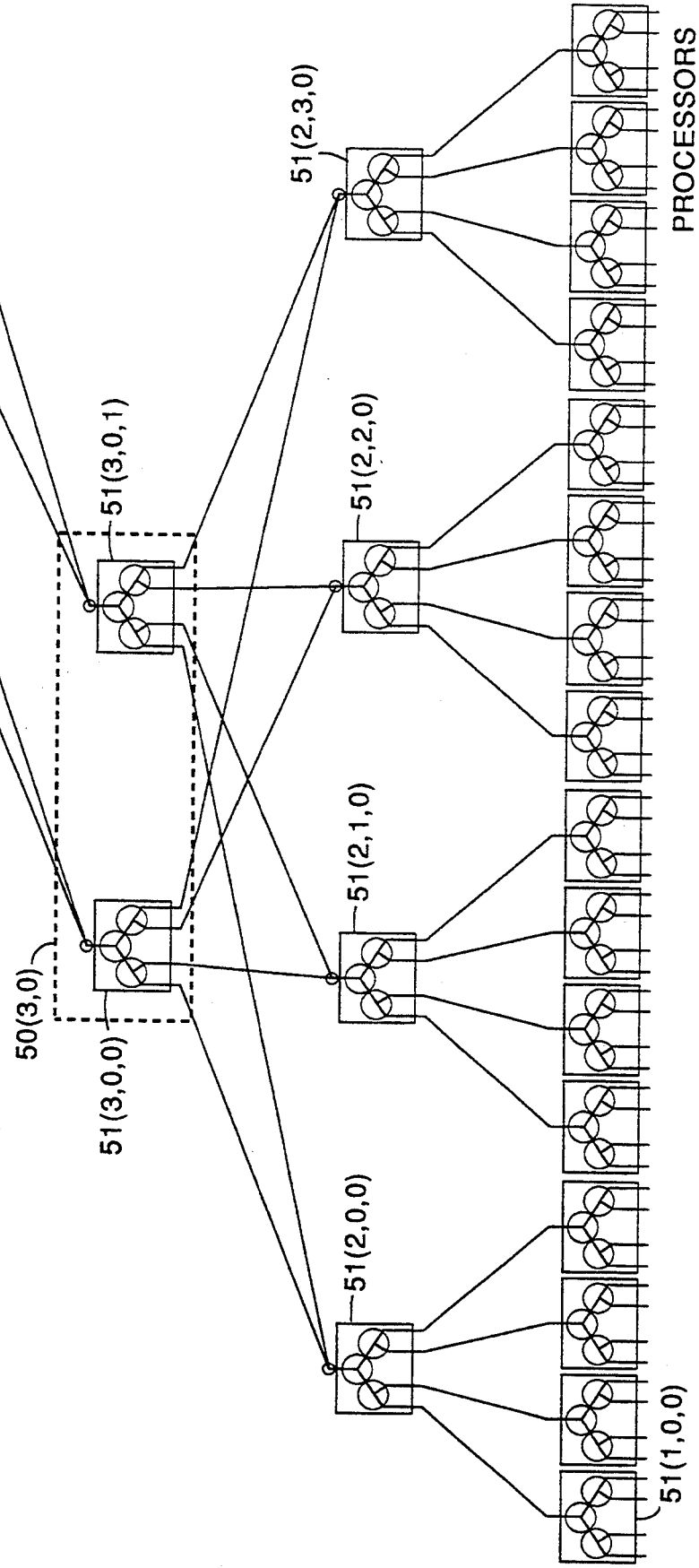
FIGS. 14A through 14C, when joined as shown in FIG. 13, is a general block diagram of a modification to the control network depicted in FIGS. 9 and 10A through 10C.
Figure 14B:
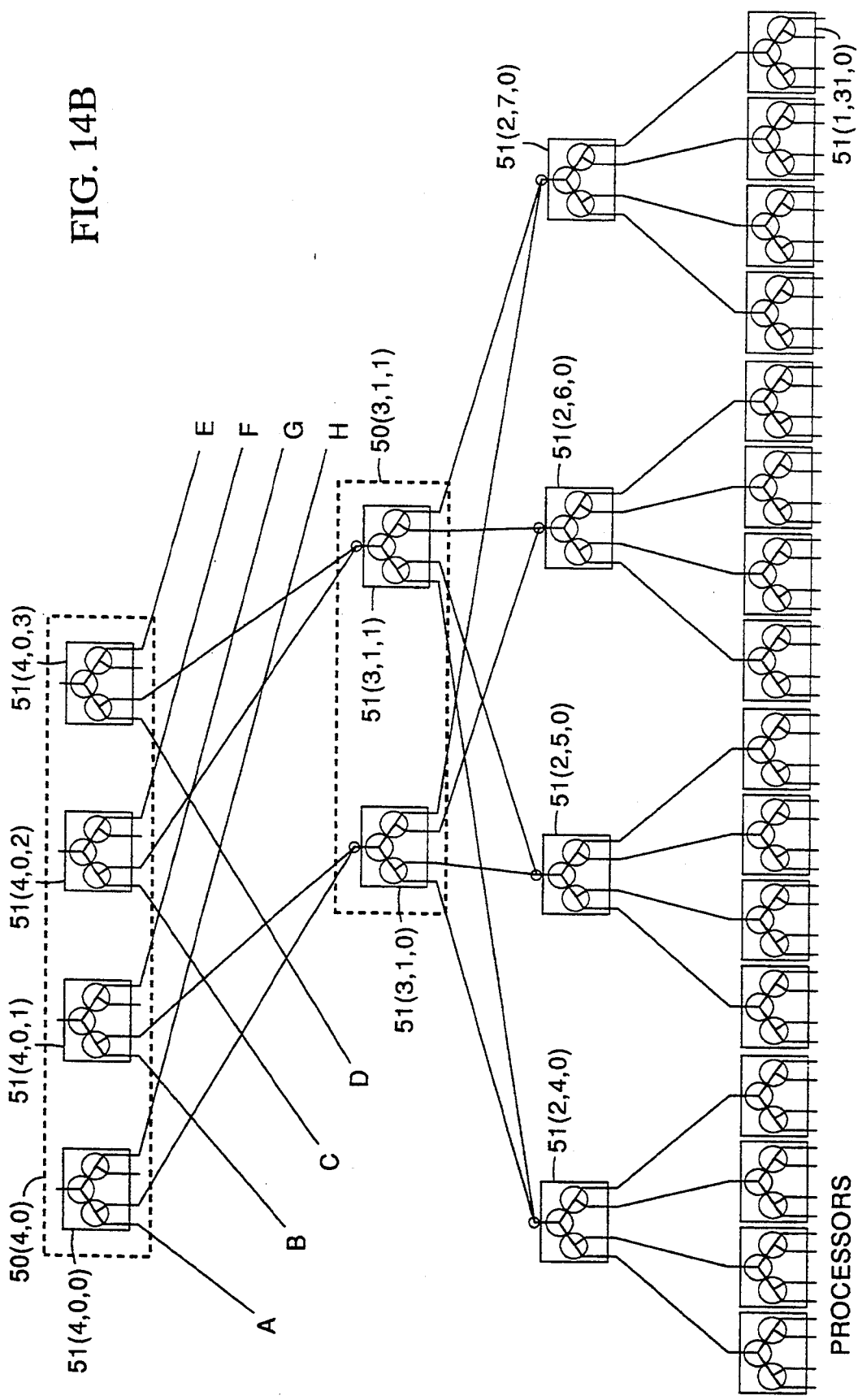
Figure 14C:
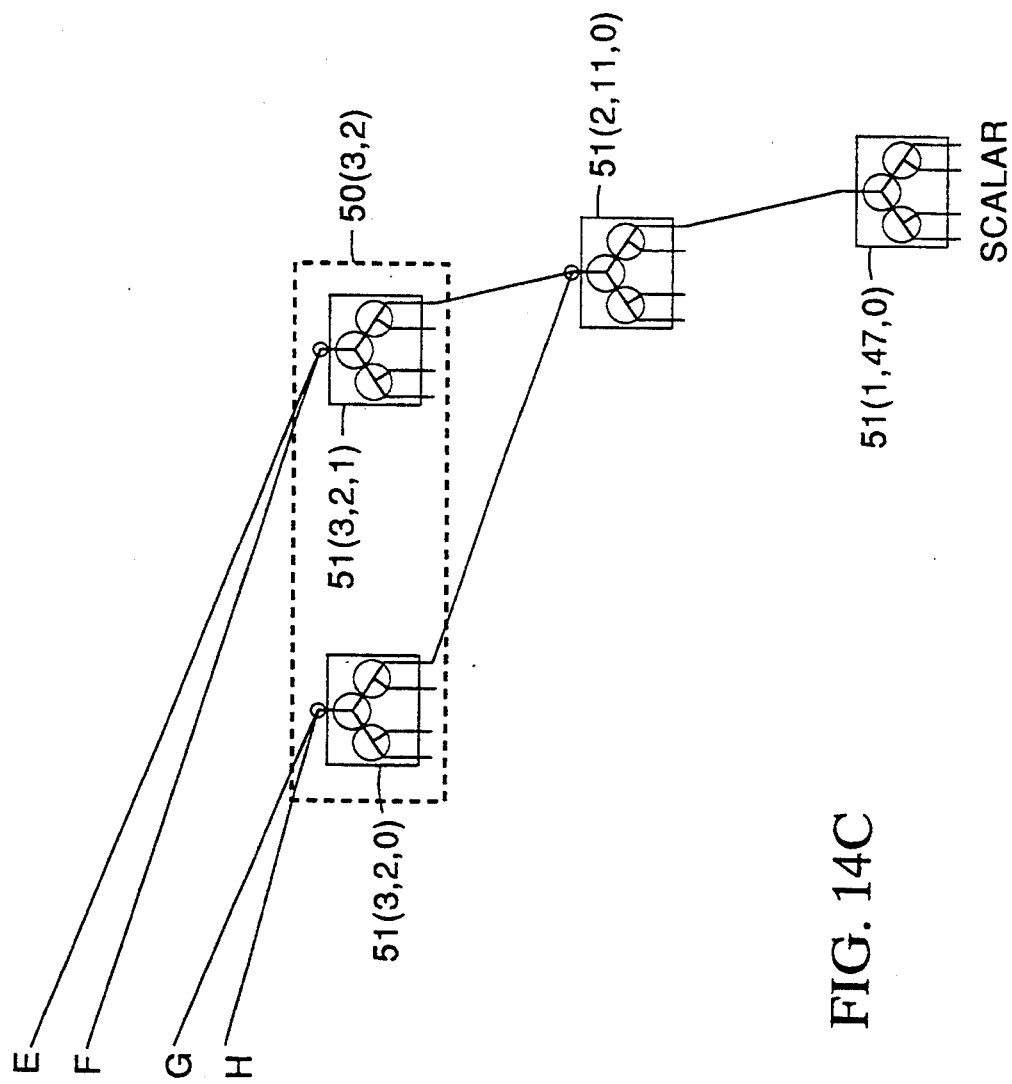

One particular embodiment of the system 10 comprises far fewer scalar processors 12 than, for example, processing elements 11. As shown in FIGS. 9 through 12C, in the section of the fat-tree comprising the control network 14 to which the scalar processors 12 are connected, scalar processors 12 are not connected to every child connection from the first-level control network node groups 51(1,j,k). In that case, the control network node groups 51(i,j,k) for which there is no connection to a scalar processor 12 need not be provided, as is shown in FIGS. 13 through 14C. FIGS. 14A through 14C, when put together as shown in FIG. 13, depict a section of the portion of the control network 14 depicted in FIGS. 9 through 12C, specifically including all control network node groups 51(1,0,0) connected to processing elements 11, and control network node groups 51(1,47,0), 51(2,11,0), and 51(3,2,1) that are necessary to interconnect the Scalar 2 scalar processor 12 and the control network node cluster 50(4,0). As depicted in FIGS. 14A through 14C, the control network node groups 51(1,40,0) through 51(1,46,0) in the first level, none of which are not connected to a scalar processor 12, and control network node group 51(2,10,0) in the second level, which would be connected only to the control network node groups 51(1,40,0) through 51(1,46,0) in the first level, are not provided. Similarly, control network node groups 51(i,j,k) need not be provided in connection with other types of leaves 21 if specific leaves are not provided in the system 10.

As noted above, the scalar processors 12 use the control network 14 to broadcast commands to the processing elements 11. In this operation, a scalar processor 12 transmits a control network message packet, which will be described below in detail in connection with FIG. 17, to the control network node 52(1,j,k,$C_j$) to which it is connected. Each control network node 52(i,j,k,l), as it receives a control network message packet from one or more children, generates therefrom and from status information as described below, a control network message packet, which may include the command, which it transfers to its parent. This continues up the tree to the root node 52(M,0,k,P). The root node, in turn, begins generating, therefrom and from status information which it receives, a control network message packet for transmission to its children, which packet also may include the command. This procedure is repeated as the command is transmitted, in message packets generated and transmitted from control network node to control network node down the tree to its children. As each control network node receives such a downwardly-going message packet, it generates packets including the command for transmission to all of its children, which continues until the command is delivered to the leaves 21 in the scalar processor's partition. The control network 14 thus effectively broadcasts the command to all of the processing elements 11. It will be appreciated that the message packet will be received at leaves 21 comprising scalar processors 12 and input/output processors 13, but these processors can be configured to ignore the command or otherwise use the command in their operations.

Commands from the scalar processors 12 may also be used to control the control network 14. In particular, commands from a scalar processor 12 may control the operation of control network node groups 51(i,j,k) in its partition. Commands from a scalar processor 12 may be used to establish a particular parent node 52(i,j,k,P) in a control network node group 51(i,j,k) as a logical root. As described above, the parent nodes 50(M,0,k,P) of the control network node cluster 50(M,0) jointly constitute the "physical root" of the switched fat-tree comprising the control network 14. A logical root may be located at the control network node group 51(M,0,k) at the physical root in the partition or it may be located at a control network node group 51(i,j,k) at a lower level. In either case, the logical root effectively comprises the root of a sub-tree within the partition whose leaves include at least the scalar processor 12 and one or more other leaves 21 in the partition. If a control network node 52(i,j,k,l) becomes a logical root, while it is a logical root its parent node 52(i+1,j,k,l) in the control network 14 does not transmit downwardly-going message packets thereto.

To facilitate establishment of a logical root, each control network node 52(i,j,k,l) includes a root flag. When the root flag 1407 is set, the control network node 52(i,j,k,l) is a root of the control network 15. If the control network node 52(i,j,k,l) is to be a physical root, the root flag 1407 may alternatively be set by appropriate conditioning of an input signal that controls the control network node. To establish a control network node 52(i,j,k,l) as a logical root, the scalar processor 12 generates a command therefor, termed herein a "configuration" command, which it transmits in a control network message packet up the tree comprising control network 14. The message packet includes a height value identifying the level and sub-level at which the logical root is to be established. Each control network node 52(i,j,k,l) which receives the configuration command determines whether the height value corresponds to its level and sub-level, and if not passes the command in a message packet to the next control network node 51(i,j,l) up the tree. When a control network node 52(i,j,k,l) determines that the height value in the configuration command corresponds to its level and sub-level, it sets its root flag 1407 and begins operating as a root node as described above. In connection with that, the control network node 52(i,j,k,l) notifies its parent control network node 52(i,j,k,l) that it is a logical root.

It will be appreciated that a scalar processor 12 may generate a configuration command to enable a control network node 52(i+x,j,m) at a higher level or sublevel to operate as a logical root. A scalar processor 12 may issue such a configuration command to, for example, increase the number of processing elements 11 in the partition, or to add input/output processors 13 or spare processors 11s to the partition. In addition, a scalar processor 12 may issue such a configuration command to add scalar processors 12 to the partition, which may, for example, permit them to jointly control the partition. In that event, the control network node 52(i,j,k,l) will receive a control network message packet including the configuration command, which will enable the control network node 52(i,j,k,l) currently operating as a logical root to clear its root flag 1407, which, in turn, enables it to stop operating as a logical root. At that point, the control network node 52(i,j,k,l) begins transmitting a message packet, including the configuration command, to its parent control network node 52(i+1,j,k,l). When the configuration command reaches the control network node 52(i,j,k,l) at the level and sub-level identified in the configuration command, that node will set its root flag 1407 and begin operating as a logical root.

To simplify the following description, the term "root node," which may appear with or without the reference numeral 52(i,j,k,l), will be used to generally refer to the physical root control network node 52(M,0,k,P) and to a control network node 52(i,j,k,l) comprising a logical root.

As noted above, the control network nodes 52(i,j,k,l) comprising a partition in the control network 14 also performs several types of arithmetic operations in response to control network message packets therefor, including scan and reduce operations. Scan operations are generally described in Guy E. Blelloch, *Scan Primitives and Parallel Vector Models*, (Ph.D. Dissertation, Massachusetts Institute of Technology: 1988). In a scan operation initiated by processing elements 11 that are logically arranged in a particular ordering, such as with increasing indices "i" in reference numeral 11(i) (with indices increasing, for example, from left to right as shown in FIG. 8), the scan operation for a particular arithmetic operator "*" on items of data "D(i)" maintained by the processing element 11(i) produces at each of the successive processing elements 11 in the ordering the result "R(i)":

$$R(i) = D(0)*D(1)*D(2)* \ldots *D(i-1), \text{ with } R(0) = 0 \quad [\text{Eqn. 1}]$$

In the scan operation, the arithmetic operator may constitute a number of types of operators, including, for example, signed or unsigned addition, OR, XOR (exclusiveOR) and MAX, the latter referencing determination of a maximum of a set of values.

To accommodate scan operations, each control network node 52(i,j,k,l) includes an up data processor 1421, a down data processor 1652, and a scan buffer 1410. To initiate a scan operations, the processing elements 11 transfer control network message packets therefor over the control network 14. The control network message packet provided by each processing element 11(i) includes that processing element's data item D(i).

With reference to FIG. 8, each control network node 52(1,j,k,C₁) and 51(1,j,k,C₂), on receiving a message packet from the processing elements connected thereto, loads the data from the processing element comprising its left child, that is, the processing element 11(i) with the index "i" being zero or an even number, into its scan buffer 1410. In addition, the up data processor 1421 of each control network node 52(1,j,k,$C_i$) performs the arithmetic operation on the data to generate a result that corresponds to the combination of the data received from the two processing elements 11 connected thereto, combined according to the arithmetic operator being used in the scan operation. The control network node 52(1,j,k,$C_i$) uses the value generated by the up data processor 1421 as data in a message packet, which it transmits to its parent.

Each control network node 52(i,j,k,l), except for the root node, on receiving message packets from both its left and right children, performs the same series of operations. In particular, each control network node 52(i,j,k,l) at each sub-level up to the root node:

(a) stores in its scan buffer 1410 the data in the control network message packet that it receives from its left child control network node 52(i-1,j,k,l); it will be appreciated that this value corresponds to the combination of the data from the processing elements in the sub-tree of the control network 14 whose root is the left child control network node 52(i-1,j,k,l), combined according to the arithmetic operator being used in the scan operation, and (b) performs, using its up data processor 1421 the operation, defined by the arithmetic operator being used in the scan operation, in connection with data from both of its children to generate a value which it uses in generating a control network message packet for transmission to its parent. It will be appreciated that this value corresponds to the combination of the data from the processing elements in both sub-trees of the control network 14 whose roots are both child control network nodes 52(i-1,j,k,l) connected thereto.

Thus, at the point at which a control network message packet has been received by the root node, the scan buffer 1410 at each control network node 52(i,j,k,l), other than the root node, contains a value corresponding to the data provided by the processing elements 11 in the sub-tree whose root is the node's left child, processed according to the scan operation's arithmetic operator.

The root node receives, from each child, a value corresponding to the data provided by the processing elements 11 in the sub-tree whose root is the respective child, processed according to the scan operation's arithmetic operator. It will be appreciated that the value received from the left child control network node corresponds to the combination of the data from the processing elements in the subtree of the control network 14 whose root is that left child control network node, and the value received from the right control network node corresponds to the combination of the data from the processing elements in the sub-tree whose root is the right control network node, in both cases the data being combined according to the scan operation's arithmetic operator.

When the root node receives message packets from both of its children containing intermediate results for the scan operation, it transmits message packets to its children to initiate completion of the scan operation. To its left child, the root node transmits a message packet whose data has the value zero. To its right child, the root node transmits a packet whose data has the value received from the left child. As noted above, that value corresponds to the combination of the data from the processing elements in the sub-tree of the control network 14 whose root is that left child control network node, combined according to the scan operation's arithmetic operator.

When each control network node 52(i,j,k,l) below the root node receives a control network message packet from its parent, it (a) uses the down data processor 1652 to generate a value corresponding to the value of the data received from the parent combined with the intermediate result stored in the nodes' scan buffer 1410 according to the arithmetic operator used in the particular scan operation, which it uses in generating a control network message packet for transmission to its right child; it will be appreciated that this value corresponds to the combination of the data from the processing elements 11 in all sub-trees of the control network 14 up to the one whose root is the left child of the control network node, combined according to the arithmetic operator being used in the scan operation, and (b) generates a control network message packet for transmission to its left child, the control network message packet having data with the same value as that in the packet received from the parent; it will be appreciated that this value corresponds to the combination of the data from the processing elements in all subtrees of the control network 14 up to the one whose root is the left child of the parent of the control network node, combined according to the arithmetic operator being used in the scan operation. Thus, the control network message packets transmitted by the control network nodes 52(i,j,k,l) down the tree will propagate the zero value down the left side to the left-most processing element, such as, for example, processing element 11(0). The next processing element 11(1) will receive the combination, as defined by the arithmetic operator, of the zero value propagated from the root node and the value stored in the scan buffer 1410 of the control network node 52(1,0,k, $C_1$), which corresponds to the value of the data transmitted by the processing element 11(0).

The next processing element 11(2) will receive, as the left child connected to the control network node 52(1,0,k,$C_2$) the value stored in the scan buffer 1410 of the control network node 52(1,0,k,P), which, as noted above, corresponds to the combination, as defined by the scan operation's arithmetic operator, of the data from the processing elements 11(0) and 11(1). The processing element 11(3) will receive, as the right child, the combination of that value and the value in the scan buffer 1410 of control network node 52(1,0,k,$C_2$), which, as noted above, corresponds to the data provided by the processing element 11(2). Accordingly, the processing element 11(3) will receive the combination, as defined by the scan operation's arithmetic operator, of the data from processing elements 11(0), 11(1) and 11(2).

It will be appreciated that the control network nodes 52 will similarly combine the data provided to the successive processing elements 11 in the sub-tree of the root node's left child. Accordingly, each processing element 1 l(i) in that subtree will receive a value corresponding to the data from processing elements 11(i-1) through 11(0) combined according to the arithmetic operator of the particular scan operation.

The control network nodes 52(i,j,k,l) in the sub-tree of the root node's right child also combine the data in the control network message packet provided by their respective parents with the data in their respective scan buffer 1410 in a similar manner. As noted above, the root node transmits to its right child a control network message packet including a value corresponding to the combination of the data provided by the processing elements 11 in the sub-tree defined by the root node's left child, combined according to the scan operation's arithmetic operator. It will be appreciated that the control network message packets transmitted by the control network nodes 52(i,j,k,l) in that sub-tree will propagate that value down the left side of the sub-tree to the left-most processing element 11(i), so that that processing element 11(i) also receives a value corresponding to data from processing elements 11(i-1) through 11(0) combined according to the arithmetic operator of the particular scan operation. Since the control network nodes 52(i,j,k,l) in that sub-tree operate in a manner similar to those in the sub-tree defined by the root node's left child, each processing element 1 1(i) will receive a value corresponding to data from processing elements 11(i-1) through 11(0) combined according to the arithmetic operator of the particular scan operation.

The control network 14 can also perform a backward scan operation, in which the scan direction is from right to left, that is, toward processing elements 11(i) of lower indices. In that case, each processing element 11(i) will receive a value corresponding to data from processing elements 11(i+1) through 11(N) (where "N" is the highest index) combined according to the arithmetic operator Of the particular scan operation. In that operation, each control network node 52(i,j,k,l) interchanges control network message packets that it receives at its input terminals from its children, and also the control network message packet that it transmits through the outputs to its children, and otherwise operates similar to that above. This effectively interchanges the left and right children at each level, so that if the control network nodes 52 otherwise operate as described above, the scan direction will be reversed.

In addition, the control network 14 can perform a segmented scan operation, in which the processing elements 11 of a partition may be divided into two or more segments. In each case, the first processing element 11(i) in the first segment is the first processing element 11(i) in the partition. The first processing element 11(i) in each succeeding segment transmits a control network message packet in which a segment bit is set. Each control network node 52(i,j,k,l) also includes a segment flag 1561. Each control network node 52(i,j,k,l) operates as described above, except that in transmitting control network message packets up the control network tree:

(a) if it receives a control network message packet from its right child in which the segment bit is set, it transmits in a control network message packet to its parent data corresponding only to the data in the control network message packet received from the right child; and (b) if it receives a control network message packet from either child in which the segment bit is set, it sets its segment flag 1561, and sets the segment bit in the control network message packet it that transmits to its parent. In either case, the control network node 52 buffers the data received from the left child control network node in its scan buffer 1410, in the same manner as in an unsegmented scan operation as described above.

In connection with control network message packets that are transmitted down the control network tree, each control network node 52, if its segment flag 1561 is set, transmits to its right child a control network message packet whose data corresponds to the value stored in the scan buffer 1410. The control network node 52 transmits to it left child a control network message packet whose data corresponds to the data from its parent, in the same manner as in an unsegmented scan operation as described above.

It will be appreciated that the first processing element 11(i) which is the first in each segment, other than the processing element 11(i) comprising the first in the partition, will not receive the value zero, as required in Eqn. 1 above. However, since those processing elements 11, in initiating the scan operation, transmitted control network message packets whose segment bits were set, they are aware that they are the first processing elements 11(i) in their respective segments, and can interpret the value received as zero.

In a reduce operation for a particular arithmetic operator "*" on items of data "D(i)" maintained by the processing elements 11(i) produces at all of the processing elements 11 the same result "R":

$$R = D(0) * D(1) * D(2) * \ldots * D(i) \qquad \text{[Eqn. 2]}$$

In a reduce operation, the arithmetic operator may constitute a number of types of operators, including, for example, signed or unsigned addition, OR, XOR and determination of a maximum.

In performing a reduce operation, the processing elements 11 transfer message packets therefor to the respective control network nodes 51(1,j,k) of the control network 14. The message packet provided by each processing element 11(i) includes that processing element's data item D(i). With reference to FIG. 8B, each control network node 52(1,j,k,C$_j$), on receiving a message packet from the processing elements connected thereto, performs the operation specified by the mathematical operator to generate an intermediate result, which it transmits in a message packet to its parent node 52(1,j,k,P).

This operation is repeated at successive parent nodes at higher levels in the tree comprising control network 14 until message packets reach the root node. When the root node receives message packets from both of its children, it performs the operation specified by the mathematical operator on the data from its two children to generate a result value. The root node generates message packets whose data is the result value and transmits them to both of its children. Each of the control network nodes 52(i,j,k,l) that receives such a message packet repeats it to both of its children, until they reach the processing elements 11, thereby broadcasting the result to all of the processing elements 11.

As noted above, the leaves 21(i) may comprise a processing element 11 or 11s, a scalar processor 12 or an input/output processor 13. In the above description, only the processing elements 11(i) have been indicated as engaging in scan operations and reduce operations. It will be appreciated, however, that scalar processors 12(i) and input/output processors 13(i) may, along with processing elements 11(i), also engage in such operations. Alternatively, the scalar processors 12(i) and input/output processors 13(i) may abstain from the scan and reduce operations. They may accomplish this either by transmitting control network message packets which contain data having a value of zero, or by transmitting a special type of control network message packet, described below as an abstain type, which the control network nodes 52(i,j,k,l) may treat as containing data having the value zero, or ignore in generating control network messages for transmission to their respective parent nodes.

As noted above, each processing element 11 maintains a message counter which counts data router message packets it transmits and receives over the data router 15. The processing element 11 increments the message counter when it transmits a data router message packet over the data router 15 and decrements the counter when it receives a data router message packet over the data router 15 during a message transfer operation. It will be appreciated that during a message transfer operation some processing elements 11 may transmit more data router message packets than they receive, and thus at the end of the message transfer operation the message counter will have a positive value. On the other hand, some processing elements 11 may receive more data router message packets than they transmit during the message transfer operation, in which case the message counter will have a negative value at the end of the message transfer operation.

The processing elements 11 use the control network 14, in particular enabling a reduce operation, to determine when the data router 15 is empty, that is, when the data router 15 has delivered all data router message packets to processing elements 11. More specifically, each processing element 11, after it transmits all of its data router message packets for the message transfer operation, begins periodically transmitting control network message packets specifying a reduce operator, with signed addition as the arithmetic operator. The data in each control network message packet is the current value of the processing element's message counter. The processing elements 11 iteratively transmit such control network message packets until they receive a control network message packet whose data has the result value of zero. It will be appreciated that, at that point the processing elements 11 have collectively received as many data router message packets as they transmitted during the message transfer operation, and so the data router 15 will be empty of data router message packets.

As noted above in connection with the description of the data router 15 (FIGS. 2 through 4B), the data router node groups 20(i,j) receive corresponding AFD (i,j) all-fall-down signals from the control network 14. As shown in FIG. 7A through FIG. 8, each control network node cluster 50(i,j) generates the AFD(i,j) signal, which is coupled to the corresponding data router node groups 20(i,j) in the data router. The control network nodes 52(i,j,k,l) control the condition of an all-falldown status bit 81, described below in connection with FIG. 17, in the respective control network message packets they generate for transmission to their respective parent nodes, with the condition of the bit in an outgoing control network message packet depending on the conditions of the all-fall-down status bits 81 in the control network message packets they contemporaneously receive from their child nodes or the leaves 21 connected thereto.

In addition, the parent control network node 52(i,j,k,P) in a cluster 50(i,j) generates, in response to the condition of the all-fall-down status bits in the contemporaneously-received control network message packets, corresponding AFD(i,j,k) all-fall-down node signal(s) from which the AFD(i,j) all-fall-down signal is generated for transmission to the data router node groups 20(i,j) having the same indices "i" and "j." In particular, a parent control network node 52(i,j,k,P) asserts the AFD(i,j,k) all-fall-down node signal if it contemporaneously receives control network message packets from both of its child nodes 52(i,j,k,C$_1$) and 52(i,j,k,C$_2$) in which the all-fall-down status bits are set. Since each control network node 52(i,j,k,l), including the child nodes 52(i,j,k,C$_1$) and 52(i,j,k,C$_2$), set the all-fall-down status bits 81 in an outgoing control network message packet if the all-fall-down status bits 81 in contemporaneously-received control network message packets are also set, control network node groups 5 1(i,j,k) in a sub-tree of a partition will assert their respective AFD(i,j,k) all-fall-down node signals if all leaves 21 within the subtree are contemporaneously transmitting control network message packets in which the all-fall-down bits 81 are set. This ensures that AFD-(i,j) all-fall-down signals are asserted, enabling data router nodes 22(i,j,k) in data router node groups 20(i,j) having corresponding indices "i" and "j" to go into the above-described all-fall-down mode, in a sub-tree of the data router 15 in which the leaves 21 are transmitting control network message packets in which all-fall-down bits 81 are set.

If a control network node cluster 50(i,j) comprises one control network node group 51(i,j,k), such as in the first two levels, the AFD(i,j,k) all-fall-down node signal constitutes the AFD(i,j) all-fall-down signal that is coupled to all of the corresponding nodes 22(i,j,k) of the data router node groups 20(i,j) in the data router 15. On the other hand, if the control network node cluster 50(i,j) includes a plurality of control network node groups 51(i,j,k), as is the case in node clusters 50(i,j) above the second level, the control network node cluster 50(i,j) includes an AFD select circuit 55(i,j) to receive the various AFD(i,j,k) node all-fall-down signals from the control network node groups 51(i,j,k) in the cluster 50(i,j) and generate therefrom one AFD(i,j) all-fall-down signal, which is coupled to all of the nodes 22(i,j,k) of the corresponding data router node groups 20(i,j) in the data router 15.

In particular, the AFD select circuit 55(i,j) is configured to selectively couple as the AFD(i,j) all-fall-down signal, the AFD (i,j,k) node all-fall-down signal generated by the one control network node group 51(i,j,k) in the cluster 50(i,j), if any, that is included in the tree defining the partition. It will be appreciated that at most one control network node group 51(i,j,k) within a cluster 50(i,j), namely, the one included in the tree defining the partition, should be enabled assert its AFD (i,j,k) node all-fall-down signal. If any control network node group 51(i,j,k) in a cluster 50(i,j) is included in the tree defining the partition, the AFD select circuit 55(i,j) ensures that only that node group's AFD (i,j,k) node all-fall-down signal is used in generating the AFD (i,j) all-fall-down signal coupled to the associated data router node group 21(i,j).

Figure 15:
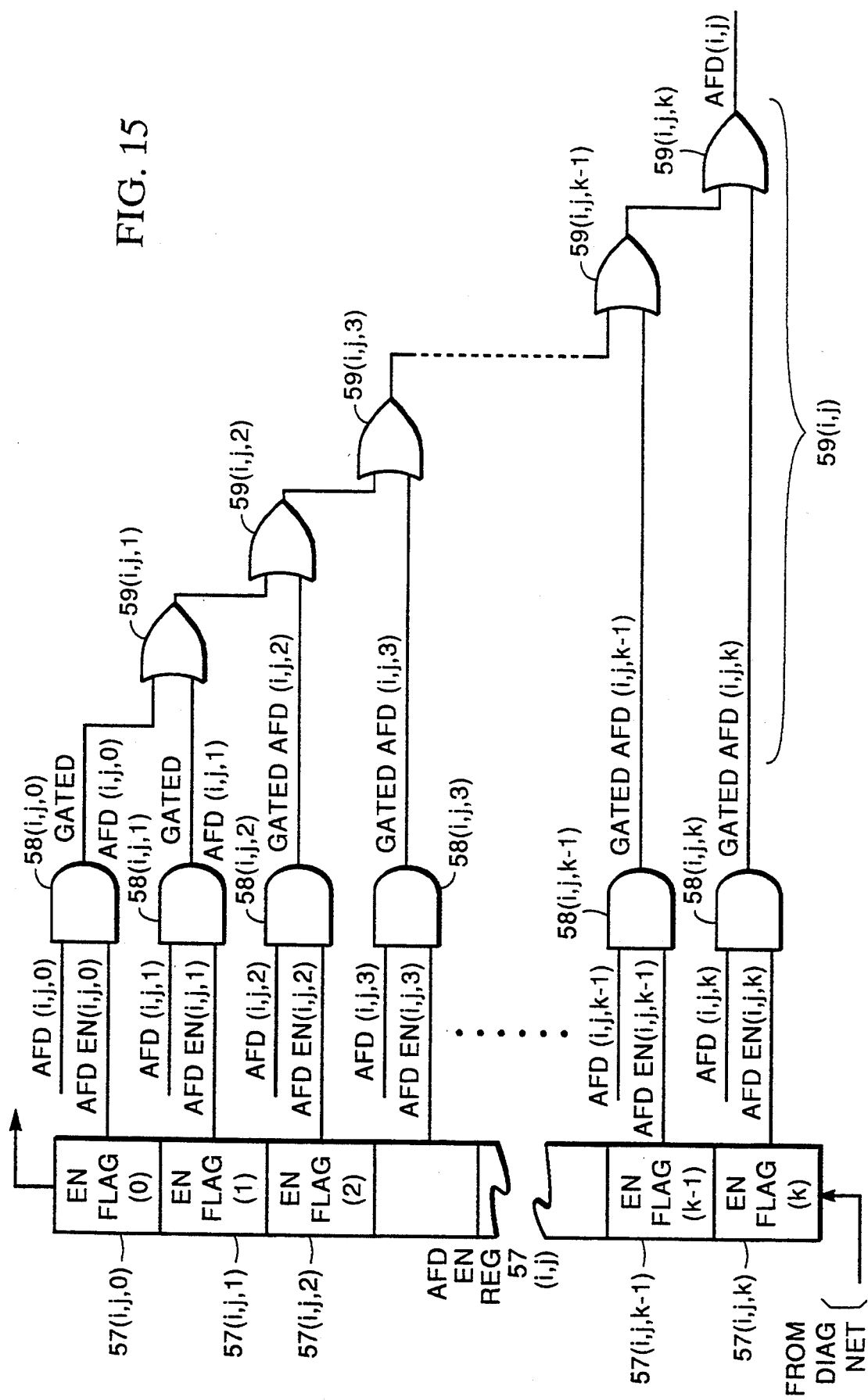
FIG. 15 depicts a block diagram of an AFD SEL circuit depicted in FIGS. 7A through 7C.

The structure of an AFD select circuit 55(i,j) is depicted in FIG. 15. With reference to FIG. 15, the AFD select circuit 55(i,j) includes a mask register 57(i,j), identified on the Fig. as an "all-fall-down enable" register, including a number of enable flags 57(i,j,k) each associated with one of the control network node groups 51(i,j,k) in the cluster 50(i,j). (An enable flag 57(i,j,k) is associated with a control network node group 51(i,j,k)

in a cluster 50(i,j) if the indices "i," "j," and "k" in the reference numerals 50(i,j), 51(i,j,k) and 57(i,j,k) are all the same.) The mask register 57(i,j) is a shift register that is loaded by the diagnostic network 16 so that one enable flag 57(i,j,k) is set and the others are clear. The enable flag 57(i,j,k) that is set is the one associated with the control network node group 51(i,j,k) that is included in the tree defining the partition.

Each enable flag 57(i,j,k) generates an AFD EN (i,j,k) all-fall-down enable signal that controls one input terminal of an AND gate 58(i,j,k). It will be appreciated that at most one enable flag 57(i,j,k) in the register 57(i,j) will assert its AFD EN (i,j,k) all-fall-down enable signal at any one time, and so only the one associated AND gate 58(i,j,k) will be enabled at a time. The other input terminal of each AND gate 58(k) receives the AFD (i,j,k) node all-fall-down signal from the associated control network node group 51(i,j,k). The enabled AND gate 58(i,j,k) associated with the set enable flag 57(i,j,k) will thus be energized when the control network node group 51(i,j,k) asserts its AFD (i,j,k) node all-fall-down signal, thereby asserting its GATED AFD (i,j,k) gated node all-fall-down signal, and will be negated when that node group's AFD (id,k) node all-fall-down signal is not asserted. Since the other AND gates, that is, those AND gates associated with clear enable flags, are not enabled, they will not be energized regardless of the conditions of the AFD (i,j,k) node all-fall-down signals of their associated node groups 51(i,j,k), and so their GATED AFD (i,j,k) gated node all-fall-down signals will remain negated.

The GATED AFD (i,j,k) gated node all-fall-down signals are coupled to an OR network 59(i,j) which generates therefrom the single AFD (i,j) all-fall-down signal that is coupled to all of the nodes 22(i,j,k) of the associated data router node group 20(i,j). The OR network 59(i,j) comprises a chain of OR gates 59(i,j,k), with the first OR gate 59(i,j,1) in the chain receiving the GATED AFD (i,j,0) and GATED AFD (i,j,1) gated node all-fall-down signals from corresponding AND gates 58(i,j,0) and 58(i,j,1). Each of the other OR gates 59(i,j,k) (the index "k" being greater than "1") in the OR network 59(i,j) receives the output signal from the preceding OR gate 59(i,j,k-1) in the chain and the GATED AFD(i,j,k) gated node all-fall-down signal from the AND gate 58(i,j,k). The output signal of each OR gate 59(i,j,k) is asserted if any of the GATED AFD (i,j,k) gated node all-fall-down signals is asserted, and is otherwise negated. The last OR gate 59(i,j,K) in the chain generates the AFD (i,j,) all-fall-down signal, which is asserted if any of the GATED AFD (i,j,k) gated node all-fall-down signals is asserted.

As noted above, the data router node groups 20(i,j), specifically associated OR gates 23(i,j) assert corresponding ERR (i,j) error signals if any of the nodes 22(i,j,k) therein detect selected error conditions. The ERR (i,j) error signal associated with each data router node group 20(i,j) is coupled to the control network node cluster 50(i,j) of corresponding indices "i" and "j." For control network node clusters 50(i,j) in levels in which each cluster has one control network node group 51(i,j,k), the ERR (i,j) signal is coupled directly to the control network node group 51(i,j,k). On the other hand, for control network node clusters 50(i,j) in levels with multiple control network node groups 51(i,j,k) in each cluster 50(i,j), each cluster 50(i,j) includes an error reporter select circuit 56(i,j). The error reporter select circuit 56(i,j) generates a plurality of ERR RPRT (i,j,k) error report signals, which are coupled to associated ones of the control network node groups 51(i,j,k) within the control network node cluster 50(i,j), and which enable them to error signals to their parent control network node groups 51(i+1,j,k) and child control network node groups 51(i-1,j,k). The error reporter select circuit 56(i,j), in response to the assertion of the ERR (i,j) error signal, asserts a selected one or more of the ERR RPRT (i,j,k) error report signals as selected by the diagnostic network 16.

Figure 16:
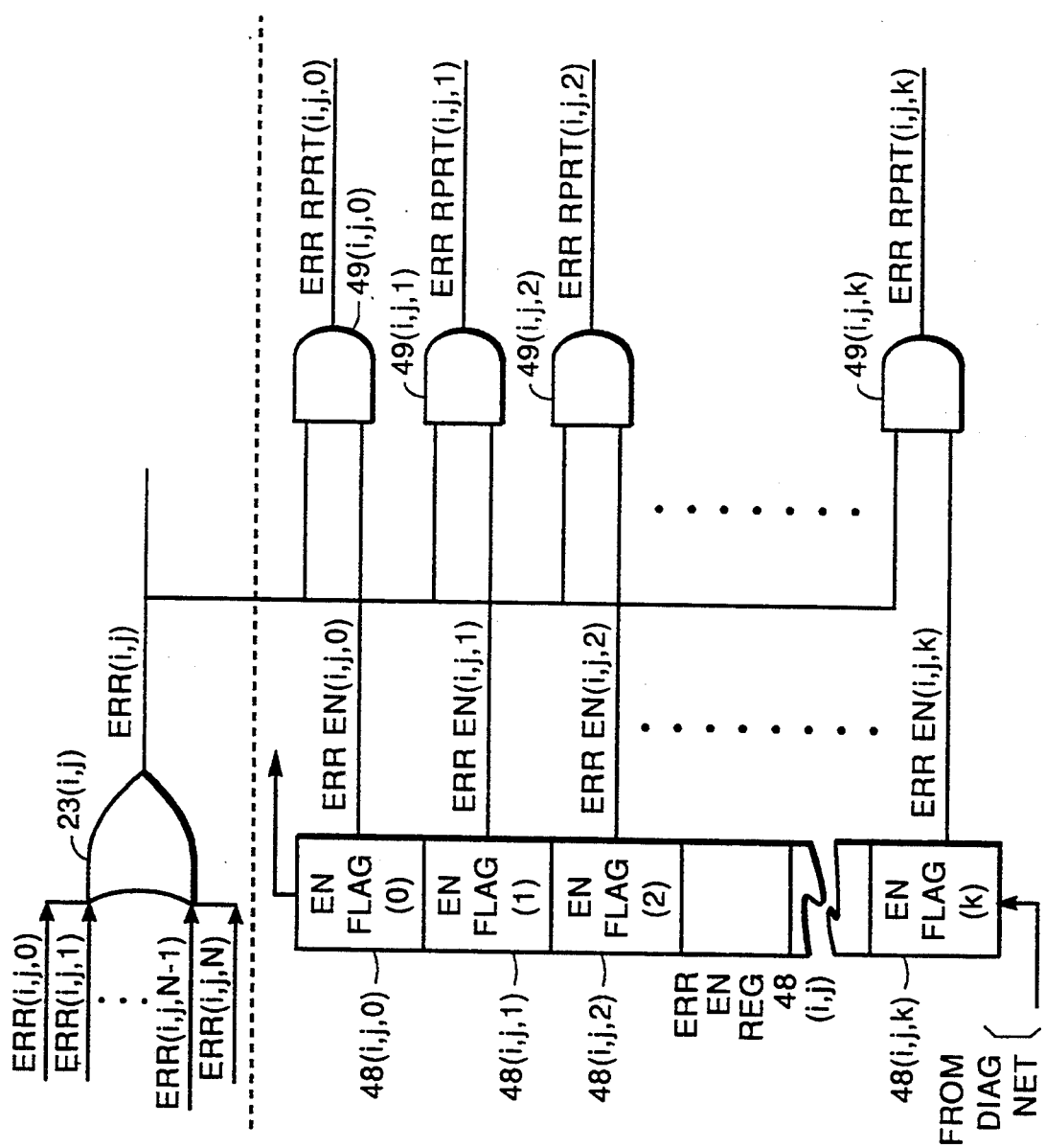
FIG. 16 depicts a block diagram of an ERR RPTR SEL circuit depicted in FIGS. 7A through 7C.

The error reporter select circuit 56(i,j) will be described in connection with FIG. 16. With reference to FIG. 16, the error reporter select circuit 56(i,j) includes mask register 48(i,j), identified on the Fig. as an error enable register, including a number of enable flags 48(i,j,k) each associated with one of the control network node groups 51(i,j,k) in the cluster 50(i,j). (An enable flag 48(i,j,k) is associated with a control network node group 51(i,j,k) in a cluster 50(i,j) if the indices "i," "j," and "k" in the reference numerals 50(i,j), 5 1(i,j,k) and 57(i,j,k) are all the same.) The mask register 48(i,j) is a shift register that is loaded by the diagnostic network 16.

Each enable flag 48(i,j,k) generates an ERR EN (i,j,k) error enable signal that controls one input terminal of an AND gate 49(i,j,k). It will be appreciated that the number of enable flags 48(i,j,k) in the register 48(i,j) asserting their ERR EN (i,j,k) error enable signal at any one time will be determined by the number of enable flag 48(i,j,k) that are set. The other input terminal of each AND gate 49(i,j,k) receives the ERR (i,j) error signal from the OR gate 23(i,j) (see also FIGS. 2 through 4B) of the associated data router node group 20(i,j). The enabled AND gate(s) 49(i,j,k) associated with the set enable flag(s) 48(i,j,k) will thus be energized when the OR gate 23(i,j) asserts its ERR (i,j) error signal, thereby asserting its or their ERR RPRT (i,j,k) error report signal. For those enable flags 48(i,j,k) which are clear, the ERR EN (i,j,k) error enable signals will be negated and the associated AND gates 49(i,j,k) will remain deenergized, thereby maintaining the associated ERR RPRT (i,j,k) error report signals at their negated levels, regardless of whether the ERR (i,j) signal from OR gate 23(i,j) is asserted.

The diagnostic network 16 controls the conditioning of each of the individual enable flags 48(i,j,k). The selection of which enable flags 48(i,j,k) to be set and which to be clear may be based on a number of considerations, in particular whether error signals are to be provided by the control network 14 to one scalar processor in a partition, for example, or to a plurality of scalar processors regardless of the respective partitions. For example, if a control network node cluster 50(i,j) has only one control network node group 51(i,j,k) that is part of a particular partition, the data router nodes 22(i,j,k) in the corresponding data router node group 20(i,j) will only be handling data router message packets related to leaves 21 for the same partition. This will be particularly the case in connection with control network node clusters 50(i,j) in the lower levels of the control network 14. In that case, the data router nodes 22(i,j,k) will generate respective ERR (i,j,k) error signals in response only to errors detected in connection with data router message packets originating from or destined to leaves 21 only in that partition. In that case, it may be desirable to have such errors reported to the scalar processor or processors 12 included in that partition, and so the mask register 48(i,j,k) may be conditioned so that only the enable flag 48(i,j,k) associated with the control network node group 51(i,j,k) in the partition is set.

On the other hand, in connection with a control network node cluster 50(i,j) which may have several control network node groups 51(i,j,k) each in a different partition, the data router nodes 22(i,j,k) in the corresponding data router node group 20(i,j) may be handling data router message packets related to leaves 21 for multiple partitions. This will be particularly the case in connection with control network node clusters 50(i,j) in the upper levels of the control network 14. In that case, the data router nodes 22(i,j,k) may generate respective ERR (i,j,k) error signals in response to errors detected in response to errors detected in data router message packets originating from or destined to leaves 21 in any of the partitions. In that case, it may be desirable to have such errors reported to all of the scalar processors 12, and so the mask register 48(i,j,k) may be conditioned so that the enable flags 48(i,j,k) associated with all control network node groups 51(i,j,k) included in any partition, or all control network node groups 51(i,j,k) in the cluster 50(i,j) is set. It will be appreciated that additional error reporting arrangements may be established by appropriate conditioning of the enable flags 48(i,j,k) of the mask registers 48(i,j) in the respective error reporter select circuits 56(i,j).

FIG. 17 depicts the structure of a control network message packet 60 that is transferred over the control network 14. With reference to FIG. 17, the control network message packet 60 has a fixed length of thirteen "flicks." In one embodiment, each flick has five bits, with the first twelve flicks, identified as FLICK 0 through FLICK 11, including four packet information bits (labelled "PKT INFO" in FIG. 17) and one tag bit. The packet information portion of the first twelve flicks comprise a packet header portion 61 and a packet data portion 62. The thirteenth flick, namely FLICK 12 identified by reference numeral 63, contains a checksum used in error detection. The checksum is generated across all five bits of the successive flicks in the packet 60. The tag bits contain control information as described below.

The packet header portion 61 includes four fields, including a message type field 64, a packet type field 65, a combine function type field 66 and a pattern field 67(0) and 67(1) (collectively identified by reference numeral 67). The packet data portion 62 includes eight four-bit data nibbles 70(0) through 70(7) (generally identified by reference numeral 70) and a four-bit nibble 71 containing global information.

The message type field 64 identifies the type of message contained in the message packet 60. In one embodiment, a packet 60 can contain one of five different types of messages, including an SS single source) message, an MS (multiple source) message, an ABS abstain message, an IDLE message and an NPAC nil packet message. When a scalar processor 12 broadcasts a command to the processing elements 11 for processing thereby, it uses a single source message packet to carry the command. In addition, a scalar processor 12 may also use single source message packets to broadcast other types of control information to one or more of the processing elements 11 or input/output processors 13, or to another scalar processor 12.

A single source message packet is passed by each control network node 52(i,j,k,l) which receives it up the control network tree from node to node until it reaches the root node. The root node transmits the single source message packet down the tree to its children. Each control network node 52(i,j,k,l), which receives a single source message packet from its parent transmits it down the tree to both its children, effectively broadcasting the packet to all of the processing elements 11 in the partition.

Multiple source messages are used by the processing elements 11 to initiate scan and reduce operations as described above. Idle message packets are transmitted when a leaf 21 or control network node 52(i,j,k,l) has no other types of message packets to transmit. A leaf 21 transmits abstain message packets to indicate that it is not participating in a scan or reduce operation. If a control network node 52(i,j,k,l) receives idle or abstain message packets from both of its children, it may transmit a message packet of the same type to its parent. If a control network node 52(i,j,k,l) receives a multiple source message packet from one of its children and an abstain message packet from its other child, it does not thereafter wait for a multiple source message packet therefrom to use in the arithmetic operation specified in the multiple source message packet that it receives from the one child. Instead, the control network node 52(i,j,k,l) forwards the multiple source message packet that it receives to its parent, and, if the abstain message packet came from its left child, stores the data from the message packet in its scan buffer 1410.

A message packet of the nil packet type, unlike message packets of other message types, is only one flick in length. In particular, a nil packet message comprises only the message type flick 64, the contents indicating that the message packet is of the nil packet type. A control network node 52(i,j,k,l) continually transmits messages of the nil packet type to its parent while it [that is, the control network node 52(i,j,k,l)] is a logical root of a partition, and the parent transmits message packets of the same type to that child. If the parent receives a multiple source message packet from its other child, it forwards it to its parent.

The packet type field 65, combine function type field 66 and a pattern field 67 contain further information about the information in the control network message packet 60.

In one particular embodiment, the processing elements 11 can operate in two operational modes, identified herein as "supervisor" and "user." If the message type field 64 indicates that the control network message packet is a single source message packet, the packet type field 65 can identify a message packet as a broadcast supervisor packet or a broadcast user packet. If the packet type field 65 indicates that the control network message packet is a broadcast supervisor packet, it contains a command for execution by the processing elements 11 in the supervisor mode. On the other hand, if the packet type field indicates that the control network message packet contains a broadcast user packet, it contains a command for execution by the processing elements 11 in the user mode.

In addition, if the message type field 64 indicates that the control network message packet is a single source message packet, the packet type field 65 may indicate that the control network message packet is an interrupt packet. The interrupt packet may be used to initiate operations at particular ones of the processing elements 11. The operations and the particular ones of the processing elements 11 to perform them may be identified in the packet data portion 62.

Further, if the message type field 64 indicates that the control network message packet is a single source message packet, the packet type field 65 may indicate that the control network message packet contains configuration information which enables the establishment or elimination of a logical root at a particular control network node 52(i,j,k,l). If the packet type field identifies the message packet as containing configuration information, the first two flicks 70(0) and 70(1) of packet data portion 62 contain data specifying the level and sub-level in control network 14 at which the logical root is to be established. The control network node 52(i,j,k,l) at that level and sub-level which receives the configuration message packet establishes itself as the logical root.

If the message type field 64 identifies the message packet as a multiple source message packet, the packet type field 65 identifies the operation to be performed as a scan involving data in a single packet or a plurality of packets, or to perform an operation to determine whether the data router 15 is empty. The data to be used is contained in data fields 70(0) through 70(7) (generally identified by reference numeral 70) of the packet data portion 62. If the packet type field 65 identifies a scan operation involving data in a single packet, the scan operation is limited to a data value having a single thirty-two bit word. However, if the packet type field identifies a scan operation involving data in a plurality of successively-transmitted packet, which will be identified as a "multi-word scan," the scan operation involves data values of more than thirty-two bits, which are contained in control network message packets 60 successively transmitted by the processing elements 11. In either case, if the packet type field 65 identifies the operation as a scan operation, the pattern field 67 further identifies it as either a scan forward or scan backward operation or a reduce operation, and combine function type field 66 identifies the particular arithmetic operator to be used in the operation.

As has been described above, control network message packets of the multiple source type may be used, with arithmetic operations, to determine whether the data router 15 is empty, using the contents of message counters maintained by the processing elements 11 as data. Similar control network message packets may also be used to perform other control operations using, for example, bits of the global information field 71. For example, the scalar processors 12 may need to be notified when all of the processing elements 11 have finished executing a particular command before they transmit a subsequent command. In that case, each processing element when it has finished executing a command, may transmit a control network message packet 60, of the multiple source type, indicating a reduce operation using the OR operator, with a particular bit in the global information field 71 being set. It will be appreciated that, after all of the processing elements 11 have executed the instruction and transmitted corresponding packets, the root node will as the result of the reduce operation, broadcast control network message packets down the control network tree in which the bit will be set. When the scalar processor 12 receives the resulting control network message packet from the control network node 52(1,j,l) connected thereto, it can determine the condition of the bit and determine therefrom that the command has been executed.

Bits of the global information field 71 may also be used by the processing elements 11. In processing certain commands from the scalar processors 12, the processing elements 11 sometimes may reach a point in processing a command at which they have to verify that all of the processing elements have reached the same point before they proceed. To accomplish that, when each processing element has reached the particular processing point it may transmit a control network message packet as described above, that is, of the multiple source type, indicating a reduce operation using the OR operator, with a particular bit in the global information field 71 being set. When the processing elements 11 receive the resulting control network message packet from their respective control network nodes 52(1,j,l) connected thereto, they can determine therefrom that all of the processing elements 11 have reached the required point in their processing of the command, and continue processing.

The tag bits of the successive flicks in a control network message packet 60 contain various types of control and status information. Several of the tag bits control the flow of control network message packets through the control network 14. Five tag bits comprise scan flow bits, generally identified by reference numerals 72(i) ("i" is an integer from "1" through "5"). The control network nodes 52(i,j,k,l), processing elements 11 and scalar processors 12, as well as any input/output processors 13 which transmit and receive control network message packets over the control network 14, use the scan flow bits to control the transfer of message packets between directly-connected components in the control network 14.

Two tag bits, including a broadcast user flow bit 73 and a broadcast supervisor flow bit 74 are conditioned by the processing elements 11, scalar processors 12 and those input/output processors 13 which transmit control network message packets over the control network 14, to indicate whether they are able to receive control network message packets containing control information for the supervisor and user modes respectively. Each processing element 11, scalar processor 12 and input/output processor 13, respectively, conditions bits 73 and 74 in any control network message packets that it transmits to indicate whether it can receive single source message packets having packet types, as indicated in packet type field 65, of broadcast supervisor type and broadcast user type, respectively.

Another tag bit that controls the control network 14 is a flush bit 75. When a control network node 52(i,j,k,l) receives a control network message packet in which the flush bit 75 is set, it clears its scan buffer. This may be used to clear intermediate results of a scan or reduce operation from the control network 14 during a context switch.

A soft error bit 76 is used by a control network node 52(i,j,k,l) to indicate that it has detected a software error from the contents of a control network message packet 60. For example, if the control network node 52(i,j,k,l) determines that the contents of the packet type field 65 do not identify one of the established packet types for the message type identified in message type field 65, the node may set the soft error bit 76.

As described above, the control network 14 performs segmented scan operations using data in message packets transmitted by the processing elements 11. A segment bit 77, when set, indicates that the control network message packet 60 contains data for the upper end of a segment. A scan overflow bit 80, when set, indicates that the result of the arithmetic operation is larger than can be accommodated in the data fields 70 of the control network message packet 60. The scan overflow bit 80 may also be used to indicate overflow during a reduce operation. If the scan overflow bit 80 is set, the operation can be repeated in a multi-word operation.

Finally, a control network message packet 60 includes the aforementioned AFD all-fall-down bit 81. If a parent control network node 52(i,j,k,P) in a control network node group 52(i,j,k) contemporaneously receives control network message packets 60 from both its children 52(i,j,k,C_i) in which the AFD all-fall-down bit 81 is set, it asserts an AFD(i,j,k) all-fall-down signal, which is supplied, either directly or indirectly through the AFD select circuit 55(i,j) to the data router nodes 22(i,j,k) of the data router node group 20(i,j) having the same indices "i" and "j." Each control network node 52(i,j,k,l) also asserts the AFD all-fall-down bit 81 in an outgoing control network message packet 60 if it contemporaneously receives control network message packets 60 from its children in which the AFD all-fall-down bit 81 is set.

3. Diagnostic Network 16

As noted above, the diagnostic network 16, under control of a diagnostic processor, facilitates testing of other portions of the system 10 to identify, locate and diagnose defects. In addition, the diagnostic network 16 may be used to establish selected operating conditions in the other portions of the system 10 as described below. The general structure of the diagnostic network 16, and its connections to the other elements of the system 10, will be described in connection with FIG. 18A through 18C. The detailed structures of messages transferred over the diagnostic network 16 will be described in connection with FIG. 19.

Figure 18A:
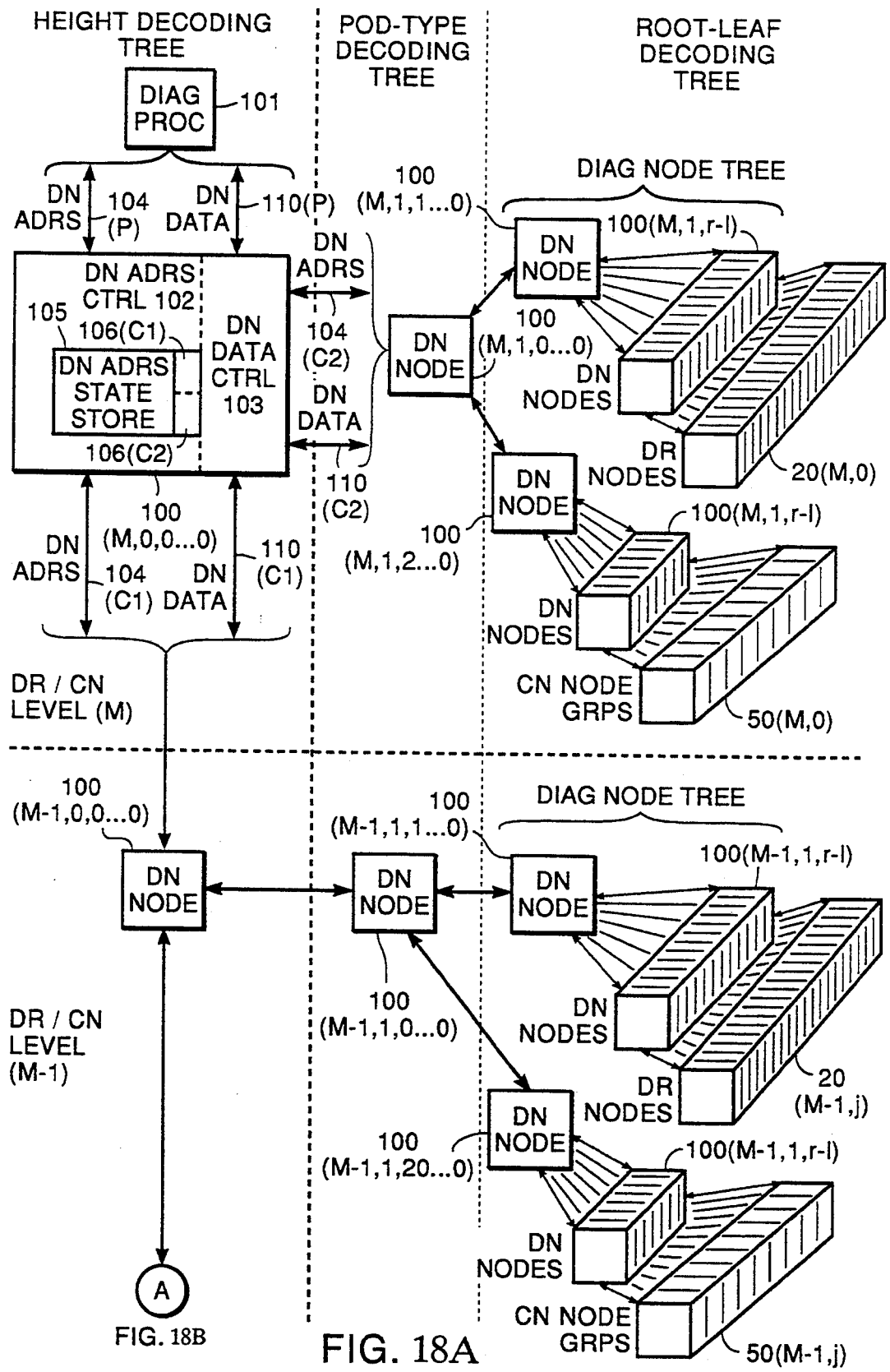
FIGS. 18A through 18C together form general block diagram of the diagnostic network depicted in FIG. 1.
Figure 18B:
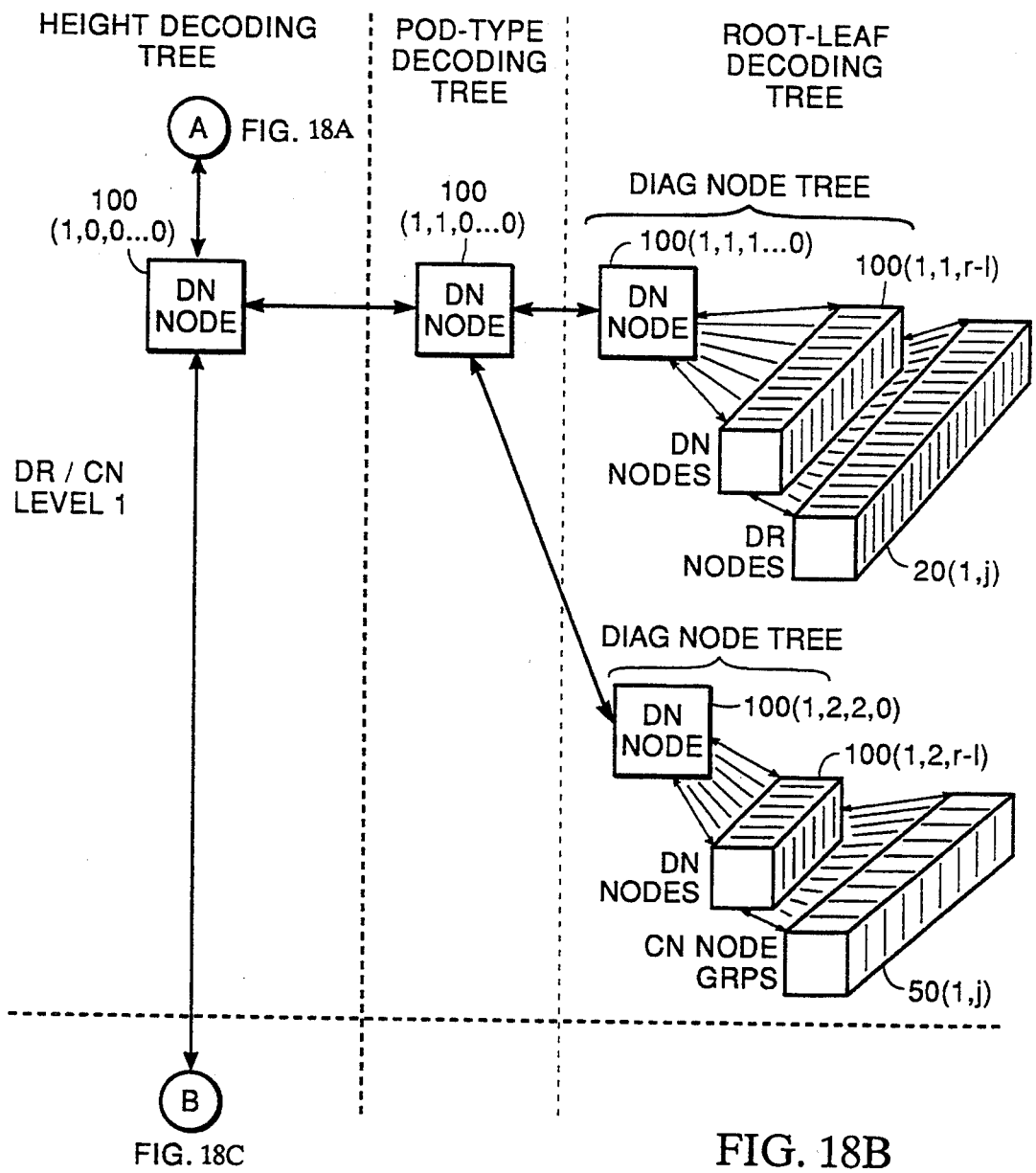
Figure 18C:
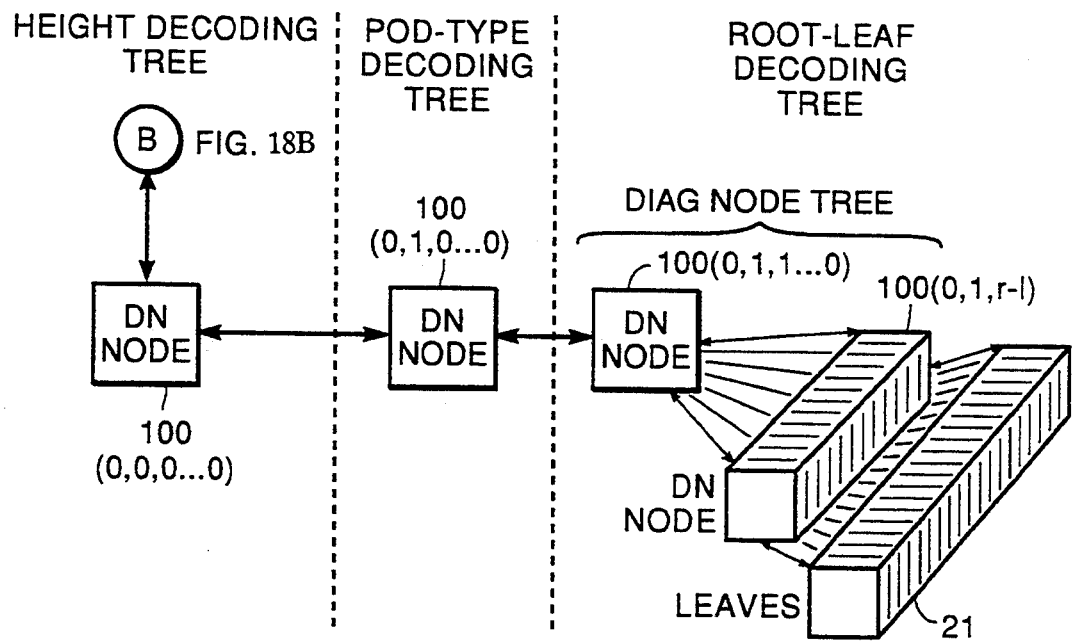

With reference to FIG. 18A through FIG. 18C, the diagnostic network 16 includes a plurality of diagnostic network node generally identified by reference numeral 100(h,p,r-l), where "h" and "p" comprise integers representing a height value and a pod-type value, and "r-1" comprises one or more integers which together comprise a root-leaf value. The various diagnostic network nodes 100(h,p,r-l) are connected in a tree-type structure which actually forms a tree of trees as shown in the Figs. In particular, the diagnostic network 16 includes a high-order tree identified as a height-decoding tree, as represented by the diagnostic network nodes 100(h,p,r-l) in the left-most columns of the respective FIG. 18A through FIG. 18C. Each diagnostic network node 100(h,p,r-l) in the height decoding tree is identified by a reference numeral 100(h,0,0 . . . 0), where the value of "h" is associated with a level in the data router 15 and control network 14. A diagnostic processor 101 is connected to the diagnostic network node 100(h,0,0 . . . 0) at the highest level of the height decoding tree.

The height decoding tree is essentially a linear tree, that is, there is no fanout from level to level in the height decoding tree. The height decoding tree essentially forms the backbone of other lower-level trees in the diagnostic network 16, including a pod-type decoding tree, represented by diagnostic network nodes 100(h,p,r-l) in the middle column of FIG. 18A through FIG. 18C, and a root-leaf decoding tree represented by diagnostic network node 100(h,p,r-l) in the right-hand column of FIGS. 18A through 18C. In particular, depending from each diagnostic network node 100(h,0,0 . . . 0) in the height decoding tree is a diagnostic network node 100(h,1,0 . . . 0), which comprises the pod-type decoding tree. Although only one diagnostic network node 100(h,1,0 . . . 0) is shown in the pod-type decoding tree at each level, the diagnostic network 16 may include multiple decoding nodes connected in a tree structure. In that case, the diagnostic network node 100(h,1,0 . . . 0) will comprise the root of the pod-type decoding tree, and other diagnostic network nodes 100(h,p,0 . . . 0) will comprise intermediate nodes and leaves of the pod-type decoding tree.

In addition, depending from diagnostic network nodes 100(h, 1,0 . . . 0) in the pod-type decoding tree are diagnostic network nodes 100(h,p,r-l) comprising the root-leaf decoding tree. As shown in FIGS. 18A through 18C, depending from each diagnostic network node 100(h,1,0 . . . 0) in the pod-type decoding tree is one or more trees of diagnostic network nodes 100(h,p,r-l) in the root-leaf decoding tree. In the embodiment depicted in FIG. 18A through FIG. 18C, each diagnostic network node 100(h,p,r-l) can accommodate a fan-out of two, and so if the pod-type decoding tree includes one diagnostic network node 100(h,1,0 . . . 0), the diagnostic network 16 at that level may include up to two root-leaf decoding trees, which may connect to diverse types of other components in the system 10. Each root-leaf decoding tree includes a root diagnostic network node 100(h,p,r . . . 0) connected to the pod-type decoding tree, and extends to a plurality of leaf diagnostic network nodes 100(h,p,r-l) connected to a particular type of pods in the system 10.

The portions of system 10 comprising "pods" may depend upon the physical embodiment of the particular system. As depicted on FIG. 18A through FIG. 18C, the data router nodes 22(i,j,k) may comprise one type of pod, the control network nodes 52(i,j,k,l) may comprise a second type of pod, and the leaves 21 may comprise a third type of pod. As shown in FIG. 18A, level "M," which corresponds to the root level of the control network 14 and data router 15, includes two root-leaf decoding trees. One root-leaf decoding tree comprises the diagnostic network nodes identified by reference numerals 100(M,1,1 . . . 0) through 100(M,1,r-l), which is connected to the pods of the data router nodes in the root data router node group 20(M,0). The other root-leaf decoding tree comprises the diagnostic network node identified by reference numeral 100(M,2,1 . . . 0), which is connected to the control network node groups 51(M,0, k) comprising the root control network node cluster 50(M,0).

Similarly, level "M-1," which corresponds to one level below the root level of the control network 14 and data router 15, also includes two root-leaf decoding trees. One root-leaf decoding tree comprises the diagnostic network nodes identified by reference numerals 100(M-1,1,1 . . . 0) through 100(M-1,1,r-l), which is connected to the pods of the data router nodes in the data router node groups 20(M-1,j), one level below the root level. The other root-leaf decoding tree comprises the diagnostic network nodes identified by reference numerals 100(M1,1,2 0 . . . 0) and 100(M-1,1,r-1) which are connected to the pods comprising the control network node groups 51(M-1,j,k) of the control network node cluster 50(M,0) at level "M-1" one level below the root level. The other levels of the diagnostic network 16, down to level "1," which corresponds to the lowest levels in the control network 14 and data router 15, are similar, including two root-leaf decoding trees, one connected to pods comprising the data router node groups 20(i,j) and the other connected to pods comprising the control network node clusters 50(i,j).

As indicated above, the diagnostic network 16 also includes a level "0" connected to leaves 21 in the system 10. That level includes only one root-leaf decoding tree, comprising the diagnostic network nodes $100(0,1,1\ldots0)$ through $100(0,1,r\text{-}l)$, all of which are connected to leaves 21.

A "pod" may comprise an individual data router node $22(i,j,k)$, control network node $50(i,j,l)$ or leaf 21, or groups thereof. In one particular embodiment, a "pod" is a "field-replaceable unit," such as an entire circuit board, which is replaceable by field-service or maintenance personnel, and which may include multiple leaves 21, along with proximate lower-level data router nodes and control network node groups, or data router nodes and control network node groups in the same level or in multiple levels. In that embodiment, the diagnostic network 16 can diagnose and locate failures in such field-replaceable units.

It will be appreciated that, if a pod-type decoding tree at any particular level includes multiple diagnostic network nodes $100(h,p,0\ldots0)$ organized in a tree structure, multiple the root-leaf decoding trees can be provided each depending from a node comprising a leaf of the pod-type decoding tree. Thus, for example, if a particular level in the diagnostic network 16 required three or four root-leaf decoding trees, each connected to pods of particular types, if the fan-out from each level to the next in the pod-type decoding tree is two, the pod-type decoding tree would include at least three diagnostic network nodes $100(h,p,r\text{-}l)$, including a root node and two leaf nodes connected thereto. In that case, each leaf node would be able to connect to two root-leaf decoding trees. It will be appreciated that, if the fan-outs in each of the trees is different from two, the number of levels and number of nodes in each level within each tree may also differ from that specifically described herein. In one particular embodiment, fan-outs in particular diagnostic network nodes $100(h,p,r\text{-}l)$ of both two and eight are used, at different levels in the respective trees comprising the diagnostic network 16.

The diagnostic network nodes $100(h,p,r\text{-}l)$ are generally similar. In brief, each diagnostic network node 100 $(h,p,r\text{-}1)$ includes an address control portion, generally identified by reference numeral 102, and a data control portion, generally identified by reference numeral 103. The address control portion of diagnostic network node $100(M,0,0\ldots0)$ receives address control signals from the diagnostic processor over a bus $104(P)$. The node uses the address control signals to establish address state in an address state store 105.

The address state maintained by the diagnostic network node $100(M,0,0\ldots0)$ enables it to transmit subsequently-received address control signals to (a) one child node, in this case node $100(M\text{-}1,0,0\ldots0)$ over a bus $104(C_1)$, (b) to the other child node, in this case node $100(M,1,0\ldots0)$ over a bus $104(C_{22})$, (c) to both child nodes over the same buses, or, alternatively, (d) to neither child node. The node's address control portion 102 includes flags $106(C_1)$ and $106(C_2)$ each associated with a corresponding bus $104(C_1)$ and $104(C_2)$. If the flag $106(C_i)$ is set in response to the received address control signals, the node is enabled to thereafter transmit the address control signals to the respective child node over a bus $104(C_i)$, and otherwise it is clear.

The diagnostic processor 101 controls the conditioning of each of the flags $106(C_i)$ in the state store 105 of diagnostic network node $100(M,0,0\ldots0)$ serially. After the address state has been established in the state store 105 of diagnostic network node $100(M,0,0\ldots0)$, the node transmits the address control signals that it subsequently receives over bus $104(P)$ from the diagnostic processor 101 over the particular buses $104(C_i)$ whose flags $106(Ci)$ are set. If both flags $106(C_i)$ are set, the diagnostic network node $100(M,0,0\ldots0)$ transmits the address control signals over both buses $104(C_i)$ in parallel. The address control signals thereafter enable either or both of those nodes to condition the flags $106(C_i)$ in their respective address state stores 105, enabling them to thereafter transmit the address control signals received thereby to either or both of the diagnostic network nodes $100(h,p,r\text{-}l)$ connected thereto. This process continues until flags $106(C_i)$ are set in selected ones of the leaf diagnostic network nodes $100(h,p,r\text{-}l)$ in the root-leaf decoding tree. This process may be repeated any number of times to condition flags $106(C_i)$ in any combination of the leaf diagnostic network nodes $100(h,p,r\text{-}l)$.

The sequence of flags $106(C_i)$ that are set in the various diagnostic network nodes $100(h,p,r\text{-}l)$, from the root diagnostic network node $100(1,0,0\ldots0)$ in the height decoding tree to the leaf diagnostic network nodes $100(h,p,r\text{-}l)$ in the root-leaf decoding trees, essentially form paths from the diagnostic processor 101 to selected pods. The paths may be subsequently used to carry diagnostic test data in parallel from the diagnostic processor to the selected pods, and to return test results.

After it has conditioned flags $106(C_i)$ in the various diagnostic network nodes $100(h,p,r\text{-}l)$, the diagnostic processor 101 may also retrieve the state from each of the diagnostic network nodes $100(h,p,r\text{-}l)$. After each flag $106(C_i)$ is conditioned, the diagnostic network node $100(h,p,r\text{-}l)$ may transmit a signal representing its state its state over its bus $104(P)$, which is coupled up the tree to the diagnostic processor 101. If multiple flags are conditioned in diverse nodes in parallel, the diagnostic processor 101 transmits an expected address data signal, which enable the nodes intermediate the originating nodes and the diagnostic processor to combine the signals representing the state of the respective flags in response to a control signal from the diagnostic processor 101.

Thus, if the flags $106(C_i)$ whose conditions are being retrieved are to be set, resulting in asserted state signals, the diagnostic processor 101 may enable the intermediate nodes to logically AND the flag state signals received from their child nodes. In that case, if an intermediate node receives a negated state signal, indicating that the flag $106(C_i)$ whose condition is received is, erroneously, not set, the node will provide a negated state signal, which will be propagated up the tree to the diagnostic processor 101. On the other hand, if the flags whose conditions are being retrieved are to be cleared, resulting in negated state signals, the diagnostic processor 101 may enable the intermediate nodes to logically OR the flag state signals received from their child nodes. In that case, if an intermediate node receives an asserted state signal, indicating that the flag $106(C_i)$ whose condition is received is, erroneously, not clear, the node will provide an asserted state signal, which will be propagated up the tree to the diagnostic processor 101.

After the diagnostic processor 101 has established the address states in the respective diagnostic network nodes 100(h,p,r-l) to selected pods, it may transmit a test data out signal and an expected test data control signal, which are received by the root diagnostic network node 100(M,0,0 . . . 0), over a bus 110(P). The root diagnostic network node 100(M,0,0 . . . 0) transmits the received signals over respective buses 110($C_1$) and 110($C_2$), as determined by the states of the respective flags 106($C_i$), and the other diagnostic network nodes do the same. Thus, the diagnostic network nodes 100(h,p,r-l) couple the test data out signal and expected test data control signal down the respective trees along paths defined by the set flags 106($C_i$). At some point, at least some of the leaf diagnostic network nodes 100(h,p,r-l) will couple test data signals to the selected pods, and obtain test data out signals representing diagnostic test results.

The diagnostic network nodes 100(h,p,r-l) will pass the test data out signals up the paths defined by the set flags 106($C_i$), each node combining the test data out signals received from its children in response to the expected test data control signal in a manner similar to that described above in connection with retrieval of the states of the respective flags. That is, if the test data out signal is expected to be asserted, the diagnostic processor 101 may enable the nodes to logically AND the test data signals received from the pods or child nodes connected thereto. In that case, if an intermediate node receives an erroneous negated test data out signal, the node will provide a negated test data out signal to its parent, which will be propagated up the tree defining the diagnostic network 16 to the diagnostic processor 101. On the other hand, if the test data out signal is expected to be negated, the diagnostic processor 101 may enable the intermediate nodes to logically OR the test data out signals received from the pods or the child nodes connected thereto. In that case, if an intermediate node receives an erroneous asserted test data out signal, the node will provide an asserted test data out signal to its parent, which will be propagated up the tree to the diagnostic processor 101.

If the diagnostic processor 101 receives an erroneous test data out signal, it can thereafter repeat the operations in connection with subsets of the previously-selected pods to identify the one which provided the erroneous signal. In that operation, the diagnostic processor 101 establishes states of the address flags 106($C_i$) in the diagnostic network nodes 100(h,p,r-l) to establish paths therethrough to a selected subset and repeats the test operation in connection with that subset. If the test data out signal indicates an erroneous result, the diagnostic processor 101 can reduce the size of the subset and repeat the operation. If the test data out signal indicates a correct result, on the other hand, the diagnostic processor 101 can repeat the operation in connection with a different subset. In one embodiment, the diagnostic processor 101 performs a binary search operation, iteratively repeating the operation in connection with half of the pods selected during the previous iteration to locate the pod providing the erroneous test data out signal.

Although not shown in FIG. 18A through FIG. 18C, the diagnostic network 16 may include multiple diagnostic processors connected to various ones of the diagnostic network nodes 100(h,p,r-l). Each diagnostic processor may selectively control the portions of the tree defining the diagnostic network 16 below the diagnostic network node 100(h,p,r-l) connected thereto. Alternatively, the diagnostic processors may selectively condition the diagnostic network nodes 100(h,p,r-l) connected thereto to receive signals from, and transmit signals to, their respective parent diagnostic network nodes 100(h,p,r-l). The additional diagnostic processors may facilitate diverse diagnostic operations in various parts of the system 10 in concurrently.

In one specific embodiment, the interface between the leaf diagnostic network nodes 100(h,p,r-l) and the pods comprises the interface defined by the Joint Test Action Group ("JTAG"), as described in IEEE Std. 1149.1 (hereinafter "JTAG specification"). In any event, the interface provides a serial scan chain circuit in each pod. The serial scan chain circuit in each pod may extend through a number of registers and other storage elements in the respective pods, and may be used to establish the states thereof to thereby establish selected operating conditions in the respective pods. For example, the data router nodes 22(i,j,k) and control network nodes 52(i,j,k,l) uses height signals identifying the respective levels, which may be provided by a register thereon that can be loaded through the serial scan chain circuit. These nodes also use signals which indicate whether connections to the respective parent or child nodes are enabled or disabled, which may also be provided by registers loaded through the serial scan chain circuit.

Figure 19:
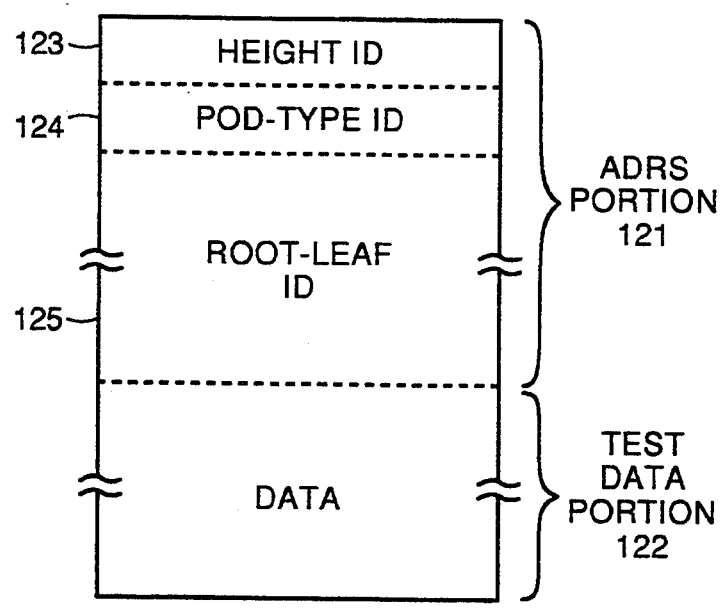
FIG. 19 is a diagram depicting the structure of message packets transferred over the diagnostic network.

FIG. 19 depicts the structure of a diagnostic message packet 120. Diagnostic message packets 120 differ from the data router message packets 30 and control network message packets 60, in that they are not generated by pods connected to the diagnostic network 16 for delivery through the diagnostic network 16 to other pods connected thereto. The diagnostic network message packets are generated by a diagnostic processor for delivery to the pods, which, in turn, generate response data for transmission to the diagnostic processor.

In any event, the diagnostic message packet 120 includes an address portion 121 and a test data portion 122. The address portion 121 conditions the respective address control portions 102 in the diagnostic network nodes 100(h,p,r-l). The test data portion 122 is represented by the test data in and test data out signals. along with the expected test data in signals, coupled through the data control portions 103 of the respective diagnostic network nodes 100(h,p,r-l). Depending on the location of the diagnostic processor generating the diagnostic message packet 120, the packet 120 may include three sections in the address portion 121, including a height identification portion 123, a pod-type identification portion 124 and a root-leaf identification portion 125. Each of the portions 123 through 125 are used by diagnostic network nodes 100(h,p,rl1) in the respective height, pod-type and rootleaf decoding trees to condition the respective flags 106($C_i$) therein. It will be appreciated that the length of the respective portions 123 through 125 will vary, depending upon the number of diagnostic network nodes 100(h,p,r-l) whose flags 106($C_i$) are to be conditioned, and the number of flags in each node.

4. Summary Of General Description Of System 10

It will be appreciated that the communications networks, including the control network 14, the data router 15 and the diagnostic network 16, as previously described, provide a variety of facilities to enable parallel processing by processing elements 11, including the spare processing elements 11s, in connection with programs as enabled by the control processors 12. In particular, the control network 14 provides an efficient arrangement to generally:

(1) enable scalar processors 12 to facilitate and control concurrent processing by the processing elements 11 and 11s by (a) enabling the transfer of processing commands from the scalar processors 12 to the processing elements 11, (b) enabling the data router to empty, through the "all-fall-down" mechanism, to facilitate a context switch operation, and (c) determining when the data router is empty, to facilitate determination of message transmitted over the data router 15 by processing elements 11 and scalar processors 12 in a partition when a message transfer operation have been received;

(2) divide the system 10 into a plurality of partitions, each including a plurality of processing elements 11 and one or more scalar processors 12, which may perform processing separately and independently of the other partitions, with the partitions being of diverse numbers of processing elements 11 and scalar processors 12; and (3) perform selected mathematical operations, including scan and reduce operations.

In addition, the data router 15 provides an efficient arrangement to generally transfer data among the processing elements 11, including the spare processing elements 11s, scalar processors 12 and input/output processors 13. Since the data router 15, unlike the control network 14, is not divided into partitions, the data router 15 may also be used to transfer information, including data, commands and status information, among leaves 21 of different partitions or between leaves 21 which are not in any particular partition. For example, if scalar processors 12 of diverse partitions are to coordinate their operations or the operations of their respective partitions, they may use message packets 30 transferred over the data router 15 to accomplish that.

Similarly, if the input/output processors 13 are to be used for input/output operations in connection with any partition, the data router 15 is also used by the scalar processors 12 and input/output processors 13 to transfer commands and status information for the input/output operations. If such input/output commands and status information were instead transferred over the control network 14, the input/output processors 13 would only be able to operate in connection with input/output operations for the particular respective partitions to which they are connected. It will be appreciated that, if an input/output processor 13 is to be used in connection with input/output operations for a single partition, the control network 14 may be configured to include the input/output processor 13 in that partition and the input/output commands and status information for input/output operations to be performed by the input/output processor 13 may be transferred over the control network 14.

The diagnostic network 16 performs a number of functions. As described above, and as will be further described in the following section, the diagnostic network 16 is used to control various operating conditions, including creation of partitions within the control network 14. The diagnostic network 16 may also be used to identify and particularly locate failures or deficiencies in operation of the system 10.

The system 10 has been described, and is shown in FIG. 1, as having processing elements 11, scalar processors 12, input/output processors 13 and spare processors 11s, as leaves 21(i) in distinct ranges of index "i." In that embodiment, for example, the processing elements 11 may comprise leaves 21(i) with the lowest order values of index "i," the scalar processors 12 may comprise leaves 21(i) of higher-order values of index "i," the input/output processors 13 may comprise leaves 21(i) of even higher-order values of index "i," and the spare processing elements 11s may comprise leaves 21(i) of highest-order values of index "i." It may be clear from succeeding sections that that organization may be advantageous in some regards, particularly in connection with transfers over the data router 15, but the system 10 may comprise any of a number of diverse organizations.

However, having the scalar processors 12 and the input/output processors 13 intermediate processing elements 11 and 11s, as shown in FIG. 1, may reduce the time required to transfer message packets between scalar processors 12 and input/output processors 13, on the one hand, and processing elements 11 and 11s, on the other hand, over either the control network 14 or the data router 15. This organization which can help reduce the command and synchronization time in connection with transfers between the scalar processors 12 and processing elements 11 and 11s. The organization can also help reduce input/output time in connection with transfers between the input/output processors 13 and the processing elements 11 and 11s.

In addition, while the system 10 has been described as having particular ones of the leaves 21 comprising processing elements 11, including spare processing elements 11s, and input/output processors 13 effectively controlled by scalar processors 12, it will be appreciated that any of the leaves 21 identified as any of the particular types of leaves may perform the functions of any or all of the other types of leaves. That is, any of the scalar processors 12 and input/output processors 13 can also function as processing elements 11 and 11s. In addition, any of the processing elements 11 can also function as scalar processors 12 and input/output processors 13. Thus, the system 10 can be provided so that all of the leaves 21 will perform the functions of the processing elements 11 and 11s, with some or all of the processing elements 11 also performing the functions of scalar processors 12 and/or input/output processors 13.

II. Detailed Description Of Particular Circuits

A. General

The remainder of this specification will present details of circuits used in one embodiment to carry out the invention as set forth in the claims. In the following, the detailed logic of a processing element 11(i), in particular details of connection of the processing element 11(i) to the control network 14 and data router 15, will be discussed in connection with FIG. 20 through FIG. 24. Thereafter, the details of an input/output processor 13 will be presented in connection with FIG. 25 through FIG. 30.

B. Processing Element 11(i)

1. General

Figure 20:
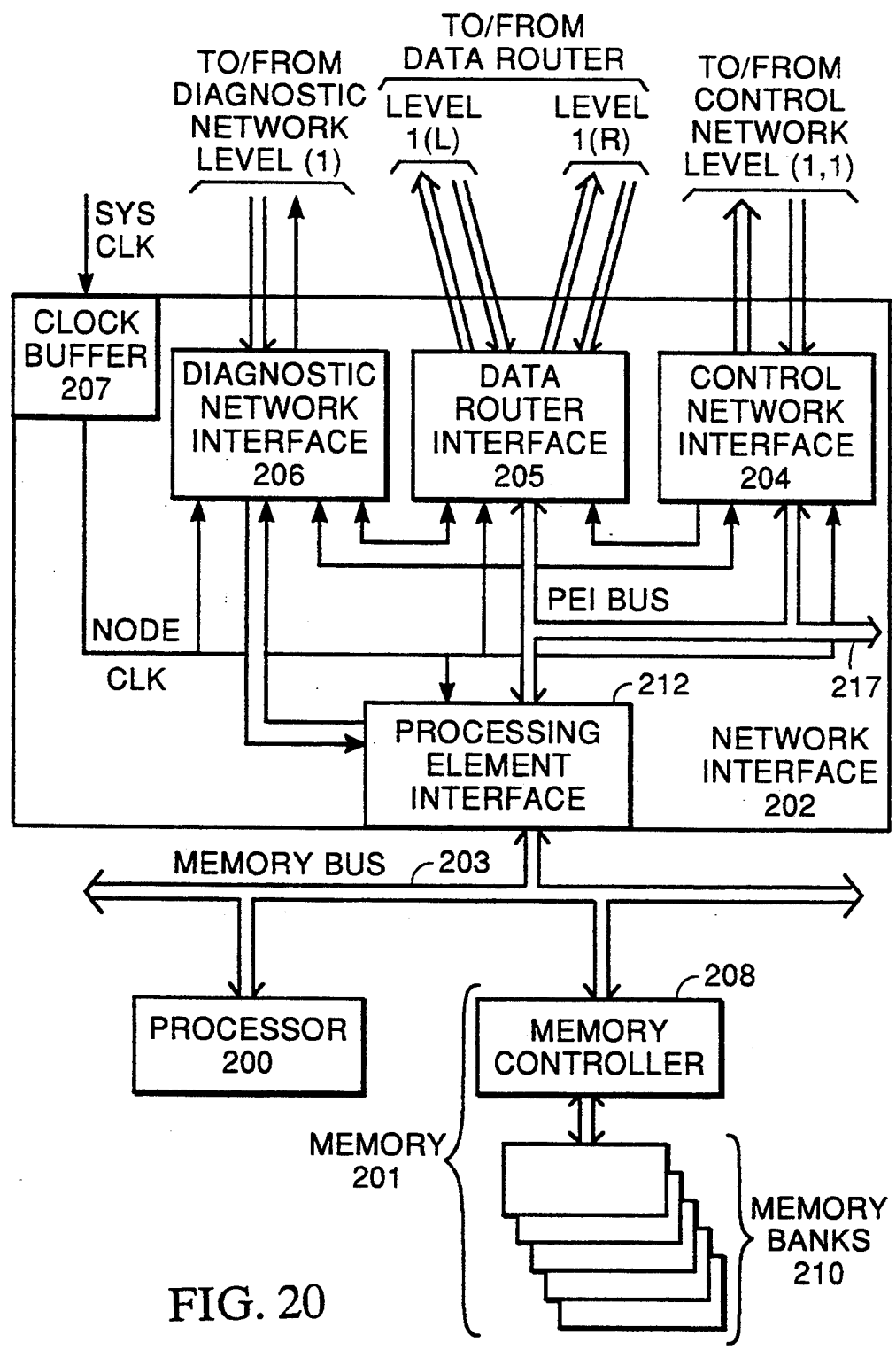
FIG. 20 is a functional block diagram illustrating a processing element in the system depicted in FIG. 1.

FIG. 20 is a general block diagram of a processing element 11 in the computer system 10 depicted in FIG. 1. A scalar processor 12 may have generally block diagram structure and organization, except as noted below. With reference to FIG. 20, a processing element 11 includes a processor 200, memory 201 and network interface 202 all interconnected by a memory bus 203. The network interface 202 interfaces the processing element 11 to the various communication mechanisms 14, 15 and 16 in system 10. In particular, the network interface 202 includes a control network interface 204 that receives (ejects) control network message packets 60 from the control network 14, and that transmits (injects) control network message packets 60 to the control network 14. Similarly, a data router interface 205 receives (ejects) data router message packets 30 from the data router 15 and transmits (injects) data router message packets 30 to the data router 15, and a diagnostic network interface 206 receives diagnostic network message packets from the diagnostic network 16 and transmits diagnostic network results over the diagnostic network 16.

As noted above, scalar processors 12 may be generally similar, at a block diagram level, to the processing element 11 depicted on FIG. 20. Scalar processors 12 may also include, for example, video display terminals (not shown) which may comprise consoles to allow control of the system 10 by an operator. In addition, scalar processors 12 may include such elements as, for example, magnetic disk storage subsystems (also not shown) to store programs and data to be processed. It will be appreciated that processing element 11 may also include such elements.

The network interface 202 includes a clock buffer 207 that receives the SYS CLK system clock signal from the clock circuit 17 and generates a NODE CLK node clock signal in response. In one particular embodiment, the clock buffer 207 comprises a buffer as described in U.S. patent application Ser. No. 07/489,077, filed Mar. 5, 1990, in the name of W. Daniel Hillis, et al., entitled Digital Clock Buffer Circuit Providing Controllable Delay, and assigned to the assignee of the present application. The network interface 202 uses the NODE CLK node clock signal to synchronize its operation with the control network 14, data router 15, and diagnostic network 16. The NODE CLK node clock signal may also be used in generating clock signals for controlling the other components of the processing element 11 shown in FIG. 20, but it will be appreciated that those components may alternatively be controlled by signals other than the NODE CLK node clock signal.

The memory bus 203 transfers address signals that define a processing element address space. The memory 201 includes a memory controller 208 and a plurality of memory banks generally identified by reference numeral 210, the memory banks 210 including a plurality of addressable storage locations within the processing element address space. In addition, the control network interface 204 and data router interface 205 include a plurality of registers, described in more detail below, which are also within the processing element address space.

The interfaces 204, 205 and 206 are connected through a bus 211 to a processing element interface 212, which, in turh, is connected to the memory bus 203. In response to receipt of control network message packets 60 from the control network 14 or diagnostic network 16 or message packets 30 from the data router 15, the processing element interface 212 can interrupt the processor 200. In response to the interrupt, the processor 200 can, by reading appropriate registers in the respective interface 204 or 205, retrieve the contents of the packet from the network interface 202. The processor may store the retrieved packet contents in the memory 201.

In addition, the processor 200 can initiate transfer of a control network message packet 60 over the control network 14 or a data router message packet 30 over the data router 15. In this operation, the processor 200 transmits packet information over bus 203 to particular registers in the network interface 202. The processing element interface 212, in response to address signals over memory bus 203 identifying the registers, receives the packet information and loads it into the respective registers. Upon receiving the packet information, the respective interface 204 or 205 initiates transmission of a message packet 60 or 30 over the respective control network 14 or data router 15.

The processor 200 executes the commands transmitted in control network message packets 16 over the control network 14 by the scalar processors 12 and received by the control network interface 204. In response to a command, the processor 200 processes one or more instructions, which are maintained in memory 201, which may enable the processor 200 to process data in the memory 201. In addition, the instructions may enable the processor 200 to transmit packet information to respective registers in the network interface 202 to initiate a transfer of a packet 30 or 60 over the respective data router 15 or control network 14, or to read information from respective registers to thereby retrieve the received packet information.

2. Data Router Interface 205

Figure 21:
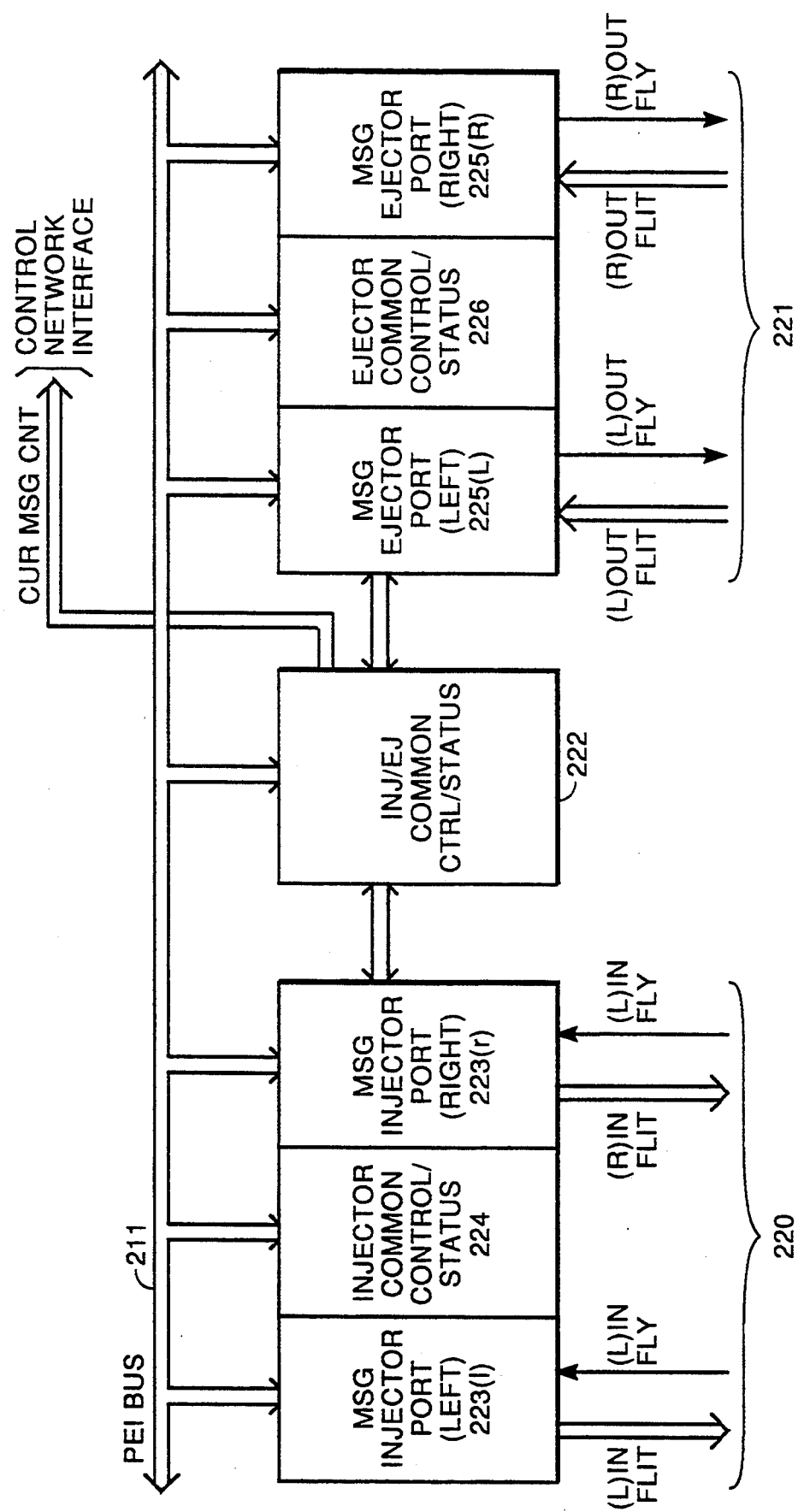
FIG. 21 is a functional block diagram illustrating a data router interface used in a processing element depicted in FIG. 20.

The details of data router interface 205 will be described in connection with FIG. 21 through FIG. 22B. With reference to FIG. 21, the data router interface 205 includes a data router message injector portion 220, a message ejector portion 221 and an injector/ejector common control/status portion 222, all connected to processing element interface bus 211. The data router message injector portion 220 injects data router message packets 30 over the data router 15; that is, it transmits data router message packets 30 to the data router nodes 22(1,j,0) and 22(1,j,1) connected thereto.

The data router message injector portion 220 includes two message injector ports identified as left message injector port 223(1) and right message injector port 223(r) for injecting message packets 30 into the data router 15. In the following, data router node 22(1,j,0) is termed the "left" node, and data router node 22(1,j,1) is termed the "right" node; in that case, left message injector port 223(1) is connected to transmit data router message packets to data router node 22(1,j,0) and right message injector port 223(r) is connected to transmit data router message packets to data router node 22(1,j,1).

Data router message injector portion 220 also includes an injector common control/status portion 224 that connects to, and controls certain operations of, both left and right message injector ports 223(l) and 223(r). For example, when the processor 200 initiates transmission of a data router message packet 30, it may specify that the message packet 30 be transmitted through either the left or the right message injector port 223(l) or 223(r). In that case, the data router interface 205 will transmit the packet 30 through the specified port 223(l) or 223(r). Alternatively, the processor may not specify the particular port 223(l) or 223(r), in which case the injector common control/status portion 224 will select one of the ports 223(l) or 223(r) to transmit the packet 30.

The message ejector portion 221 receives and buffers data router message packets 30 from the data router 15. In addition, the message ejector portion 221 may initiate interrupting of the processor 200 on receiving a new data router message packet, and it transmits the buffered packets over the processing element interface bus 211 in response to a retrieval request from the processor 200. The message ejector portion 221 includes a left message ejector port 225(l) and a right message ejector port 225(r) that are connected to receive data router message packets 30 from data router nodes 22 (1,j,0) and 22(1,j,1), respectively.

Data router message ejector portion 221 also includes an ejector common control/status portion 226 that connects to, and controls certain operations of, both left and right message ejector ports 225(l) and 225(r). For example, if both right and left ejector ports 225(l) and 225(r) have received message packets 30 and the processor 200 has requested that the message data be transmitted to it without identifying either the particular left or right ejector port 225(l) or 225(r), the ejector common control/status portion 226 determines the order in which the ports 225(l) and 225(r) will transmit the packets over the processing element interface bus 211.

To transmit a data router message packet 30 to the data router node 22(1,j,0) connected thereto, the left message injector port 223(l), in synchrony with the NODE CLK node clock signal, iteratively transmits (L) IN FLIT left inject flit signals to transmit successive flits of the packet 30 to the data router node 22(1,j,0). The left message injector port 223(l) may transmit while the data router node 22(1,j,0) is asserting an (L) IN FLY left input fly signal; if the data router node 22(1,j,0) negates the (L) IN FLY left input fly signal the left message injector port 223(l) stops transmitting. The right message injector port 223(r) transmits similar (R) IN FLIT right inject flit signals to data router node 22(1,j,1) in response to an asserted (R) IN FLY right input fly signal.

The left message ejector port 225(l), in synchrony with the NODE CLK node clock signal, iteratively receives (L) OUT FLIT left eject flit signals to for successive flits of the packet 30 from the data router node 22(1,j,0). The left message ejector port 225(l) may enable the data router node 22(1,j,0) to transmit by asserting an (L) OUT FLY left eject fly signal; if the port 225(l) negates the (L) OUT FLY left eject fly signal the data router node 22(1,j,0) stops transmitting. The data router node 22(1,j,1) transmits similar (R) OUT FLIT right eject flit signals to right message ejector port 225(r) in response to an asserted (R) OUT FLY right eject fly signal.

Figure 22B:
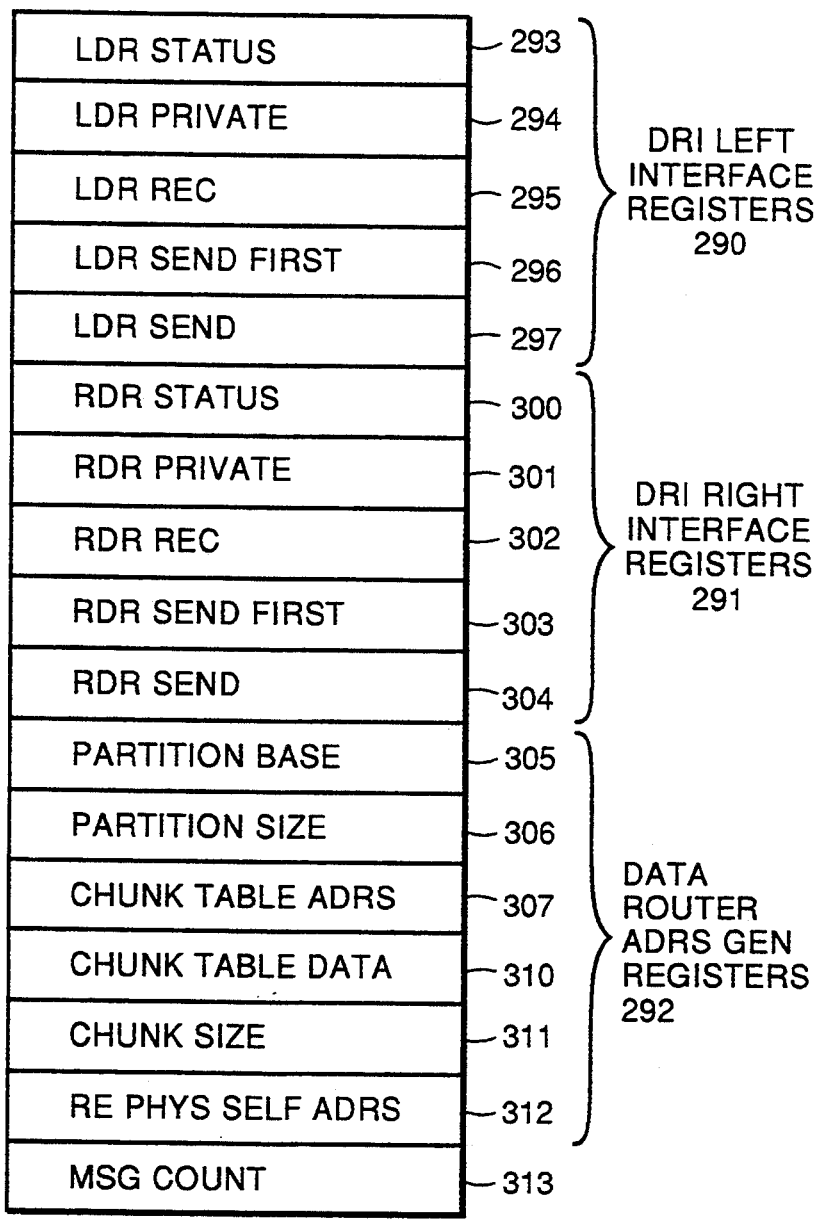

FIG. 22A and FIG. 22B depict the registers in the control/status portions 222, 224 and 226 in the data router interface 205. FIG. 22A depicts the details of a data router interface middle register set 230 which is used by the processor 200 when it does not specify the particular message injector port 223(l) or 223(r) to transmit a particular data router message packet 30, or the message ejector port 225(l) or 225(r) from which it is to receive a data router message packet 30. With reference to FIG. 22A, register set 230 includes two status and control registers, including a status register 231 and a private register 232, a receive register 233, and two transmit registers, namely, a "send first" register 234 and a "send" register 235.

The status register 231 includes a number of fields shown in FIG. 22A. As described below in connection with FIG. 23, each data router message injector port 223(l) and 223(r) includes a first-in first-out buffer which buffers information from processor 200 from which the packet 30 is generated. A send space field 240 identifies the amount of space left in the buffer in the particular port 223(l) or 223(r) that is currently selected to transmit the packet 30. The contents of the send space field 240 are provided by the currently selected left or right data router message injector port 223(l) or 223(r).

Two flags 241 and 242 indicate the status of the last reception and transmission, respectively, of a data router message packet 30 through the currently selected port. If the last data router message packet 30 to be received can be successfully received, flag 241 is set, and if the last data router message packet 30 to be injected was successfully injected, flag 242 is set. The flags 241 and 242 are conditioned by message injector portion 220 and message ejector portion 221, respectively.

A receive message length field 243 indicates the length of the data router message packet 30 received through the currently selected port, and a length left field 244 identifies the amount of data in a data router message packet 30 currently being retrieved by the processor 200 that is remaining to be retrieved. The contents of the receive message length field 243 correspond to the contents of length field 34 (FIG. 5) of the data router message packet 30. The contents of a receive tag field 245 correspond to the contents of the tag field 35 of the same data router message packet 30. The length left field 244 is effectively provided by a counter into which the contents of length field 34 are loaded when the processor 200 begins retrieving the message packet 30, and which is decremented as the message data is transmitted to the processor 200. The contents of fields 243, 244 and 245 are provided by the message ejector portion 221.

A send state field 246 and receive state field 247 identify the state of injection and ejection, respectively, of respective message packets 30 by the message ejector portion 220 and message injector portion 221. The send state field 246, whose contents are provided by the message injector portion 220, indicates whether either or both of the left or right message injector ports 223(l) and 223(r) contain partially-injected data router message packets 30. Similarly, the receive state field 247, whose contents are provided by the message ejector portion 221, indicates whether either or both of the left or right message ejector ports 225(l) and 225(r) contain partially-ejected (that is, received) data router message packets 30.

Finally, a router done flag 248, whose contents are actually provided by the control network interface 204, indicates whether the router is empty following a message transfer operation. The condition of the router done flag 248 is derived from the reduce operation performed over the control network 14 to determine whether the data router 15 is empty as described above.

The private register 232 also includes a number of fields, comprising flags 250 through 256. Several flags, which are included in the ejector common control/status portion 226, control the operation of the message ejector portion 221. A receive interrupt enable flag 250, when set, enables the data router interface 205 to generate an interrupt for transmission by the network interface 202 to processor 200 when a data router message packet 30 is received by the currently selected left or right message ejector port 225(l) or 225(r). A receive stop flag 252, when set by the processor 200, disables reception of subsequent data router message packets 30 by the currently selected left or right message ejector port 225(l) or 225(r). The currently selected port 225(l) or 225(r) stops receiving flits immediately upon the flag 252 being set. A receiver full flag 252, when set by the currently-selected ejector port 225(l) or 225(r), indicates that a buffer maintained by the currently-selected ejector port is full.

The private register 232 also includes a lock flag 251, included in the injector common control/status portion 224, that controls the operation of the message injector portion 220. The lock flag 251 enables or disables the currently selected left or right message injector port 223(l) or 223(r). When set by processor 200, the currently selected left or right message injector port 223(l) or 223(r) ignores subsequent transmissions from processor 200, and the flag 242 in status register 231 is cleared, indicating unsuccessful injection of the data router message packet 30.

The private register 232 also includes three flags that control operation of the data router interface 205 in connection with the all-fall-down mode of the data router 15 as described above. A received all-fall-down flag 254, controlled by the control network interface 204, indicates that it has received a data router message packet 30 while the data router 15 is operating in all-fall-down mode, for which the leaf 21 is not the destination. An all-fall-down interrupt enable flag 255, when set by processor 200, enables the network interface 202 to generate an interrupt request for transmission to the processor upon the setting of the received all-fall-down flag 254. Finally, an all-fall-down enable flag 256, when set by processor 200, enables the control network interface 204 to set the all-fall-down bit 81 of the next control network message packet 60 that it transmits.

The remaining registers in the middle interface register set 230 are used to transmit and receive data router message packet information. A receive register 233 contains a number of words 260(0) through 260(N) representing the data in a data router message packet 30 received through the currently selected left or right message ejector port 225(l) or 225(r). In reference numeral 260(N), "N" is an integer related to the maximum amount of data that can be transmitted in a single data router message packet 30. The data stored in receive register 233 is from the data flits 36 of the received message packet 30. The receive register is represented by a single address in the address space of memory bus 203. The processor can retrieve the data from a message by iteratively using the address in a read operation over memory bus 203. It will be appreciated that the data router interface 205 decrements the contents of the receive length left field 244 as the processor 200 accesses the receive register to retrieve the message data.

Two registers, namely, the send first register 234 and the send register 235 are provided to enable the processor to supply information used by the message injector portion to generate data router message packets 30 for injection into the data router 15. A high-order address field 274 in the first word contains an address value, in the address space defined for the memory bus 203 (FIG. 20) of the network interface 202 and, specifically, of the particular data router send first register being addressed in the control network interface 204. The send first register 234 also includes fields 270 and 271 in which message length and message tag information is loaded. The contents of fields 270 and 271 are copied into the message length and message tag fields 34 and 35 in a data router message packet 30.

The send first register 234 also includes a message address field 273 that is used to generate the contents of message address portion 31 of packet 30, and an address mode field 272. The message address in field 273 can be a physical address, which specifically identifies the leaf 21(y) to receive the message, or a relative address, which identifies a displacement from the leaf 21(x) transmitting the data router message packet 30 to the leaf 21(y) to receive the packet 30. The contents of the address mode field 272 indicate whether the message address in field 273 is an physical address or a relative address.

The send register 235, like receive register 233, contains a number of words 280(0) through 280(N) representing the data in a data router message packet 30 to be transmitted through the currently selected left or right message injector port 223(l) or 223(r). In reference numeral 280(N), "N" is an integer related to the maximum amount of data that can be transmitted in a single data router message packet 30. The data stored in send register 235 is copied into the data flits 36 of the transmitted message packet 30. The send register is represented by a single address in the address space of memory bus 203. The processor can load data into the register by iteratively using the address in a write operation over memory bus 203.

As noted above, the processor 200 uses the data router interface middle register set 230 when it does not specify the particular message injector port 223(l) or 223(r) to transmit a particular data router message packet 30. The data router interface 205 includes two additional register sets, identified as a left and right interface register sets 290 and 291 (shown on FIG. 22B), respectively, which the processor 200 uses when specifies a left or right message injector port 223(l) or 223(r) to transmit a particular data router message packet 30, or a left or right message ejector port 225(l) or 225(r) from which it will retrieve data router message packet data. Both left and right interface register sets 290 and 291 include respective status, private, receive, send first and send registers, identified by reference numerals 293-297 (left register set 290) and 300-304 (right register set 291). The registers in register sets 290 and 291 have fields and flags that are substantially the same as those of respective registers 231-235 of the middle interface register set, except that the left and right interface status registers 293 and 300 do not have fields corresponding to send and receive state fields 246 and 247 or router done flag 248 of status register 231. In addition, left and right interface private registers 294 and 301 do not have fields corresponding to all-fall-down interrupt enable flag 255 or all-fall-down enable flag 256 of private register 232.

The data router interface 205 also includes a set of registers 292 which contain information that it uses, along with the message address information in field 273 of the send first register 234 of the middle interface register set 230 or corresponding fields of send first registers 296 or 303 of the respective left or right interface register set, in generating address information for the message address field 31 of a data router message packet 30 to be transmitted. As described above, the system 10 can be partitioned, and a partition base register 305 and partition size register 306 contain values identifying the base and size of the processing element's partition. In particular, the partition base register 305 contains the index (i) of the leaf 21(i) in the system that is the lowest-indexed element in the partition. In addition, the contents of the partition size register 306 identify the number of leaves 21 in the partition. A physical self address register 312 for a particular leaf 21(i) identifies the leaf's own index "i" in the system 10, which comprises an address or other identifier that uniquely identifies the leaf 21 in the system.

Finally, the registers maintained by the data router interface 205 include the previously-mentioned data router message counter 313. Data router message counter 313 is maintained by the injector/ejector common control/status portion 222. The message counter 313 is incremented to reflect the injection by data router message injector port 220 of a data router message packet over the data router 15 during a message transfer operation, and decremented to reflect the ejection, by the data router message ejector port 221 of a data router message packet 30 that it receives from the data router 15. The injector/ejector common control/status portion 222 generates a CUR MSG CNT current message count signal which identifies the current value of the message counter 313, and which it provides to the control network interface 204 for use in generating a router done control network message as described above.

3. Control Network Interface 204

As noted above, the control network interface 204 receives (ejects) control network message packets 60 from the control network 14, and transmits (injects) control network message packets 60 to the control network 14. A general block diagram of control network interface 204 is shown in FIG. 23.

Figure 23:
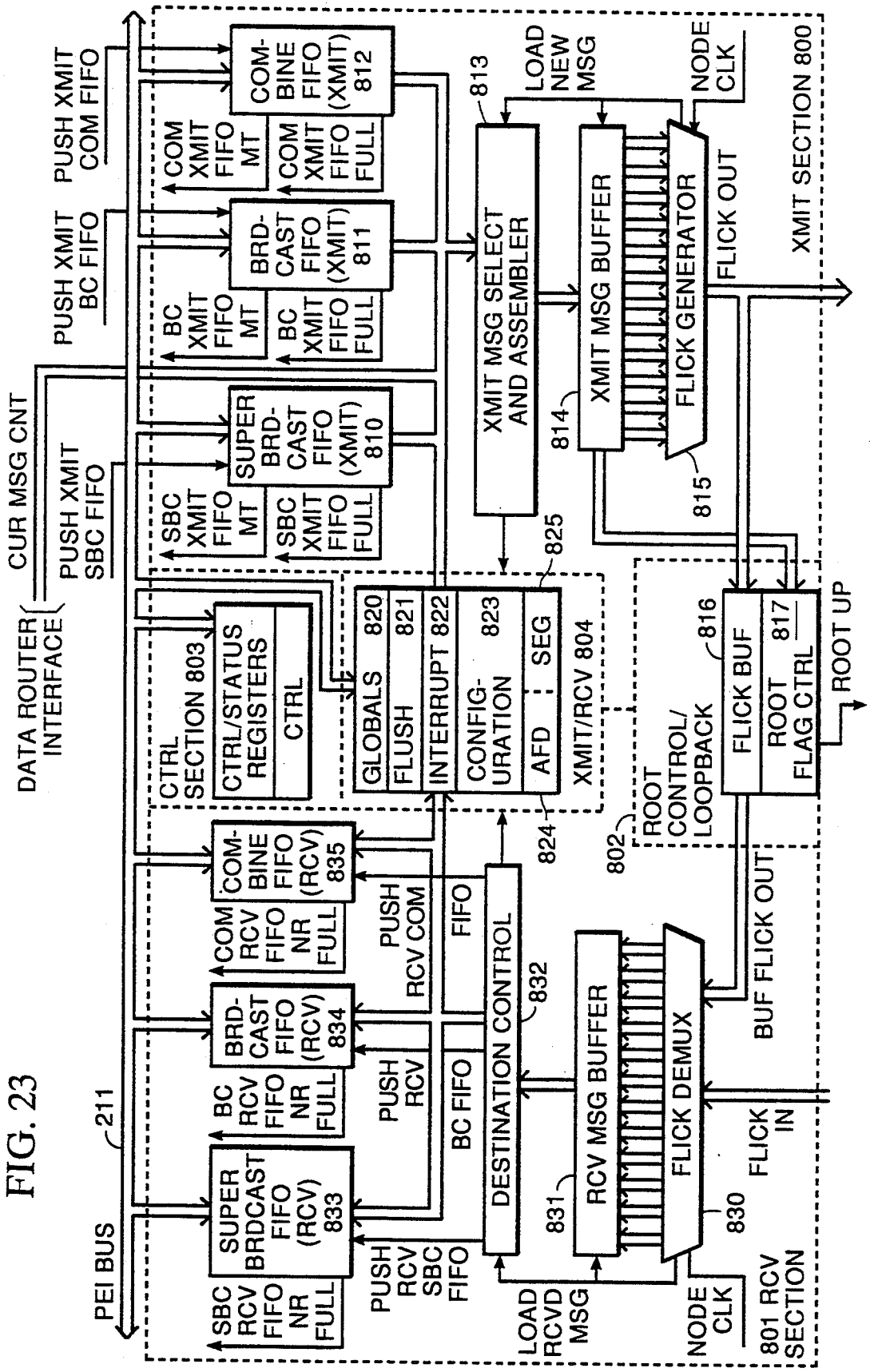
FIG. 23 is a functional block diagram illustrating a control network interface used in the processing element depicted in FIG. 20.

With reference to FIG. 23, the control network interface 204 includes a transmit section 800 that transmits control network message packets 60 over the control network 14, a receive section 801 that receives control network message packets 60 from the control network 14, and a root control/loopback section 802, all of which are controlled by a common control section 803 and set of registers 804. The transmit section 800 transmits, that is, injects, control network message packets 60 over the control network 14. The receive section 801 receives, that is, ejects, control network message packets from the control network 14, in particular, from the control network node 50(1,j) (FIG. 6) connected thereto.

The root control/loopback section 802 determines whether the control network interface 204 is a logical root of a sub-tree, and if so asserts a ROOT UP signal, which is received by the control network node 50(1,j). It will be appreciated that, if the control network interface 204 is asserting the ROOT UP signal, it is the root of a sub-tree that comprises only the single leaf 21.

The common control section 803 maintains several control and status registers and effectively controls the operations of the interface 204 as will be described below. The registers 804 contain information which is used in generating control network message packets 60. The registers 804 can be written by the processor 200 to transmit some control information over the control network 14 in message packets 60 transmitted by the transmit section 800. Alternatively, the registers 804 may be loaded with control information which the receive section 801 obtained from control network message packets 60 received thereby.

Like the data router interface 205, the control network interface 204 also makes use of a number of registers to enable the processor 200 to initiate transfers of message packets 60 over the control network 14, and facilitate reception by the processor 200 of data from control network message packets 60 that the control network interface 204 receives from the control network 14. In particular, the processor may initiate transmissions over the control network 14, by loading information in a supervisor broadcast register set, a broadcast register set and a combine register set provided in the control network interface 204. All of the register sets are generally similar to the send first, send and receive registers 234, 235, and 233, respectively of the data router interface 205 (FIG. 22A), except that the first word of the send first register in the control network interface includes diverse fields, as will be described in connection with FIG. 24. Since the send and receive registers in each of the supervisor broadcast, supervisor, and combine register sets are similar to the correspondingly-named registers as shown on FIG. 22A, they will not be described further herein.

The processor 200 enables the control network interface 204 to generate control network message packets 60 in a manner similar to that in which it enables the data router interface 205 to generate data router message packets 30. In particular, the processor 200 first transmits information to the control network send first register. Thereafter, if the control network message packet 60 is, for example, for a multi-word scan operation, requiring multiple control network message packets 60 each having a thirty-two bit word, the processor 200 can provide the additional words by loading them into the send register in the particular register set.

When the control network interface 204 receives a control network message packet 60 from the control network 14, it enables the processing element interface 212 to interrupt the processor 200, identifying the particular register set into which the information from the message packet 60 was loaded. The processor 200 can obtain the data received from a particular control network message packet 60 by retrieving the contents of the receive register in the particular register set identified in the interrupt.

Figure 24:
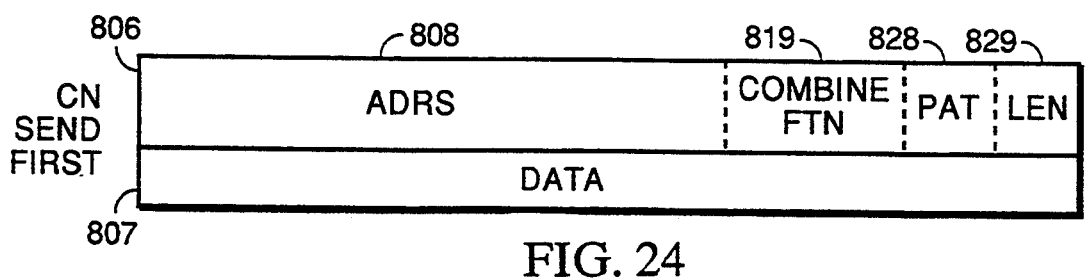
FIG. 24 depicts a register used in the control network interface depicted in FIG. 23.

The send first registers in the supervisor broadcast, broadcast and combine register sets all have the same general structure, which is shown in FIG. 24. With reference to FIG. 24, each send first register includes two words 806 and 807. A high-order address field 808 in the first word 806 contains an address value, in the address space defined for the memory bus 203 (FIG. 20) of the network interface 202 and, specifically, of the particular control network send first register being addressed in the control network interface 204.

The remaining fields 819 through 829 of the first word 806 include information which the control network interface 204 uses in generating the packet header 61. A combine function field 819, and pattern field 828 in the first word 806 of the send first register contain information that is copied into fields 65, 66 and 67, respectively, of the packet header 61. The second word 807 of a send first register contains data to be transmitted in data fields 70 of the packet data 62. If the contents of length field 829 if the send first register indicates that a message is to include multiple thirty-two bit words, each thirty two bit word is sent in a control network message packet 60, with the contents of successive data fields 70 being provided through the send register.

Returning to FIG. 23, the transmit section includes three first-in first-out buffers, namely, a supervisor broadcast transmit first-in first-out buffer (FIFO) 810, a broadcast transmit FIFO 811 and a combine transmit FIFO 812. Generally, the supervisor broadcast transmit FIFO 810 stores information used by the control network interface 204 in creating control network message packets 60 of the single source message type, while the processor 200 is in its supervisor operating mode. Similarly, the broadcast transmit FIFO 811 stores information used by the control network interface 204 in creating control network message packets 60 of the singlesource message type, while the processor 200 is in its user operating mode. The combine transmit FIFO 812 stores information used by the control network interface in creating control network message packets 60 of the multiple-source message type, including router done packets 60 which are used to determine if the data router 15 is empty. Information in the combine transmit FIFO 812 that enables creation of packets other than a router done packet includes the data that will be used in establishing the contents of the data nibbles 70(i) (FIG. 17) of the packet 60. However, information in the combine transmit FIFO 812 that enables creation of router done packets does not include such data; the data is instead provided by the CUR MSG CNT current message count signals from the data router interface 205.

Each FIFO 810 through 812 has data input terminals that are connected to the interface bus 211 and is loaded by the interface 212 with the contents of the send first and send registers of the respective supervisor broadcast, broadcast and combine register set when the processor 200 transfers information thereto. The interface 212 asserts a PUSH XMIT SBC FIFO push transmit supervisor broadcast first-in first-out buffer signal, a PUSH XMIT BC FIFO push transmit broadcast first-in first-out buffer signal or a PUSH XMIT COM FIFO push transmit combine first-in first-out buffer signal to enable the respective FIFO 810 through 812 to receive and store the information.

Each FIFO 810 through 812 generates status signals "XXX" XMIT FIFO FULL transmit buffer full signal and "XXX" XMIT FIFO MT transmit buffer empty signal ("XXX" may comprise "SBC" which identifies the supervisor broadcast transmit FIFO 810, "BC" which identifies the broadcast transmit FIFO 811, or "COM" which identifies the combine transmit FIFO 812) which indicate whether the respective buffer is nearly full or nearly empty. If a particular FIFO 810 through 812 is asserting its "XXX" XMIT FIFO FULL signal, the interface 212 rejects attempts by the processor 200 to load information therein.

Each FIFO 810 through 812 also includes data output terminals that are connected to a transmit message select and assembler circuit 813. Under control of a LOAD NEW MSG load new message signal, circuit 813 receives the "XXX" XMIT FIFO MT signals, determines whether any of them have information to be used in a control network message packet 60, and if so assembles a control network message packet 60. In assembling the message packet, the circuit 813 may also use the contents of registers 804 and CUR MSG CNT current message count signals from the data router interface 205 if the PKT TYPE XMIT signals indicate that the control network message packet 60 is a router done packet.

The transmit message select and assembler 813 couples forty-eight bit words representing the header 61 and data portion 62 of the assembled message packet 60 to a transmit message buffer 814, which latches it in response to the LOAD NEW MSG signal. In response to successive ticks of the NODE CLK signal, a flick generator iteratively selects four-bit nibbles from the transmit message buffer 814 and appends to each selected nibble a high-order bit comprising the tag bit. The flick generator 815 transmits the result as FLICK OUT (4:0) flick output signals to the control network node 50(1,j) connected thereto, and also to a flick buffer 816 in the root control/loopback circuit 802.

As it iteratively transmits the FLICK OUT (4:0) signals, the flick generator 815 generates a checksum, which it transmits as the thirteenth flick of the control network message packet. Contemporaneously with transmission of the last flick of the message packet 60, the flick generator 815 asserts the LOAD NEW MSG load new message signal to enable the transmit message buffer 814 to latch a new word and the circuit 813 to generate a new control network message packet 60 for transmission.

As noted above, the control network interface 204 includes a set of registers 804 that provide information which may also be used in generating message packets. A globals register 820 contains global bits that can be used to perform a global operation as described above. A flush flag 821 can be used to control the flush bit 75 in the control network message packet 60; if set, the flush bit 75 enables the control network 14 to flush intermediate results of a scan operation. An interrupt register 822 can be loaded with an interrupt value that can be transmitted in a single-source message packet of the interrupt type, to broadcast interrupt information to other leaves 21 in the partition.

A configuration register 823 contains a value that can be used in a singlesource message packet of the configuration type to identifies the level and sub-level at which the logical root is to be established for the partition; this information is loaded into flicks 70(0) and 70(1) of the packet data portion 62. An all-fall-down mode flag 824, which is derived from all-fall-down enable bit 256 of the private register 232 (FIG. 22A) is used to initiate an all-fall-down operation in the data router 15; the all-fall-down mode flag 824 is used to condition all-fall-down mode bit 81 of the control network message packet 81. Finally, a segment flag 825, which may be conditioned by the processor 200, is used in segment bit 77 of a multi-source control network message packet 60 to identify the beginning of a segment in a segmented scan operation.

The receive section 801 includes a flick demultiplexer 830 that iteratively receives, at each tick of the NODE CLK signal, either the FLICK IN signals from the control network node 50(i,j) or the BUF FLICK OUT buffered flick out signals from the root control/loopback circuit 802. If the root control/loopback circuit 802 is asserting SEL XMIT select transmit section signal, generally indicating that the control network interface 204 is a logical root, the flick demultiplexer 830 selects the BUF FLICK OUT signals, and otherwise it selects the FLICK IN signals. The flick demultiplexer 830 strips off the tag signals, some of which it buffers, and demultiplexes the other received signals to so that successively received signals are used to form successive nibbles of a forty-eight bit word. At the same time, the flick demultiplexer 830 maintains a running checksum of the signals received at each tick of the NODE CLK signal. The flick generator uses the checksum to determine whether the control network message packet was correctly received, and, if so, it asserts a LOAD RCVD MSG load received message packet signal.

The assertion of the LOAD RCVD MSG signal enables a received message buffer 831 to latch the word generated by the flick demultiplexer. In addition, the asserted LOAD RCVD MSG signal enables a receive message buffer and destination select circuit 832 to examine the word contained in the received message buffer 831, and determine which of a supervisor receiver broadcast FIFO 833, a broadcast receiver FIFO 834, a combine receiver FIFO 835, or one of the registers 804, in which the word should be loaded.

Each FIFO 833, 834 and 835 generates an "XXX RCV FIFO NR FULL receive FIFO nearly full signal ("XXX" may comprise "SBC" which identifies the supervisor receiver FIFO 833, "BC" which identifies the broadcast receiver FIFO 834, or "COM" which identifies the combine receiver FIFO 835) which indicate whether the respective FIFO is nearly full. The "XXX RCV FIFO NR FULL signal is used by the transmit message select and assembler 813 in generating several of the tag signals for the various flicks. In addition, the flick demultiplexer 830 couples several of the tag signals which it receives to the flick generator to control transmission of control network message packets 60 thereby.

C. Input/Output Processor 13

1. General

Figure 25:
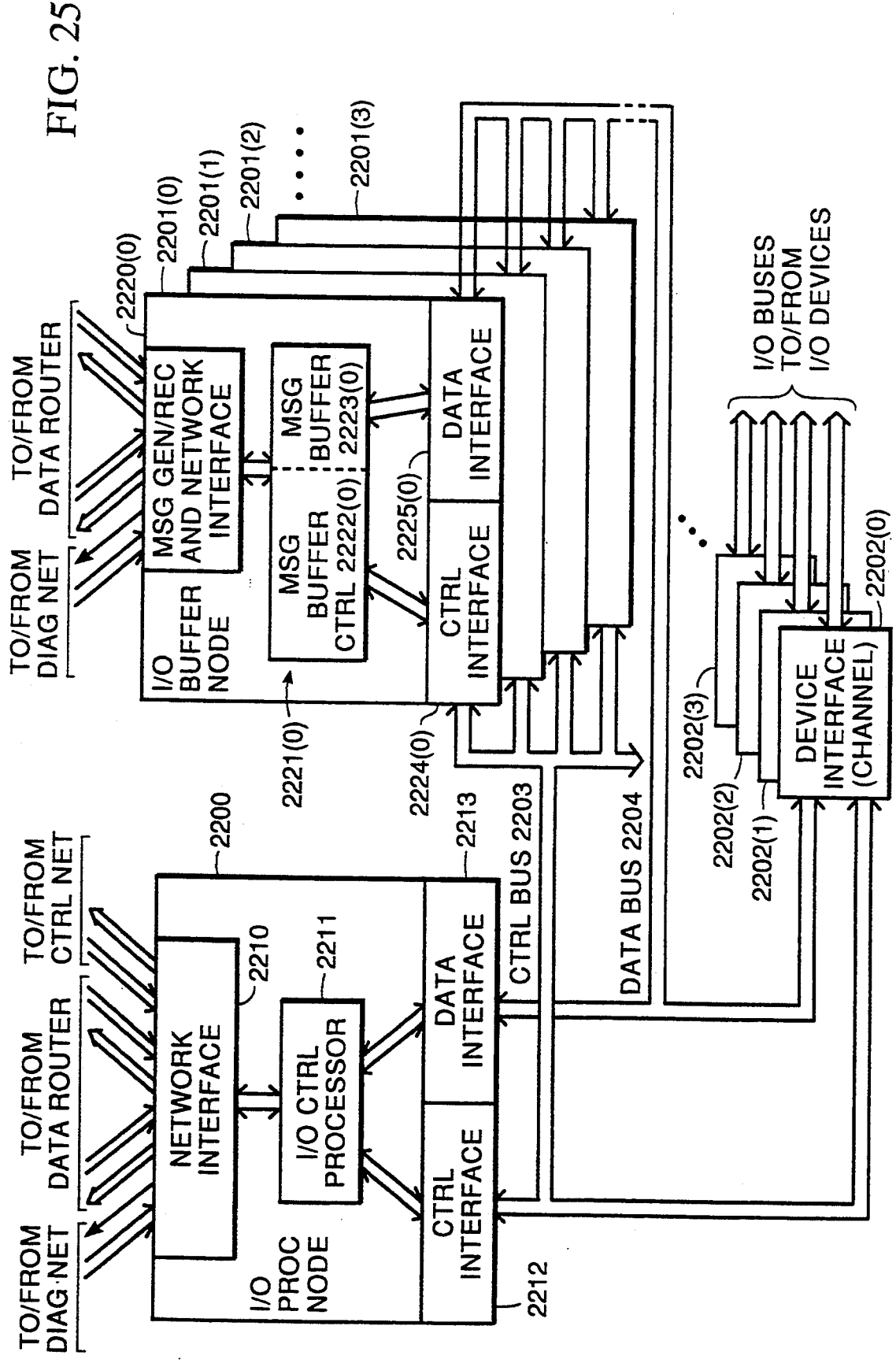
FIG. 25 is a functional block diagram illustrating an input/output processor used in the system depicted in FIG. 1.
Figure 26:
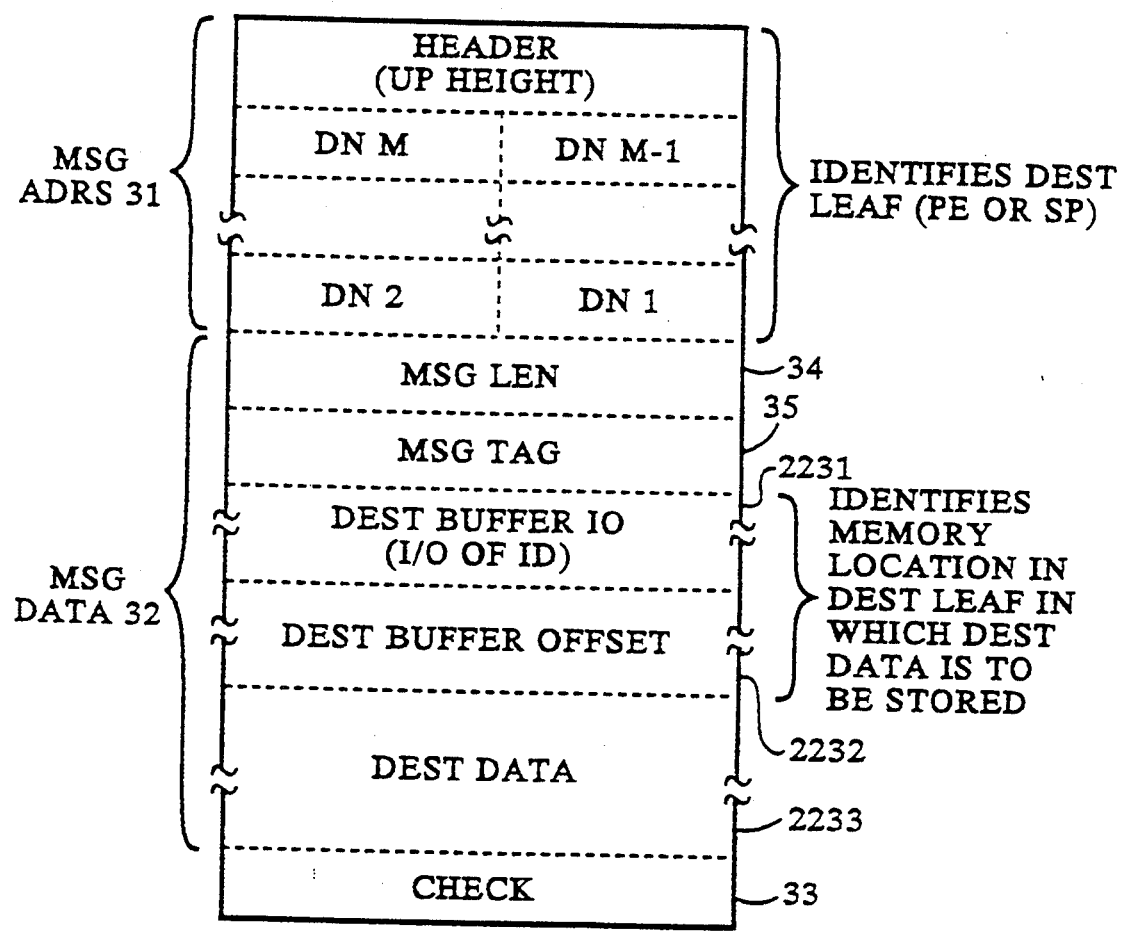
FIG. 26 is a diagram of an input/output message used in connection with the input/output processor depicted in FIG. 25.

FIG. 25 is a general block diagram of an input/output processor 13 used in connection with one embodiment of the system 10. With reference to FIG. 25, an input/output processor 13 includes an input/output processor node 2200, one or more input/output buffer nodes 2201(0) through 2201(N-1) [generally identified by reference numeral 2201(i)] and one or more device interfaces 2202(0) through 2202(M) [generally identified by reference numeral 2202(j)], interconnected by a control bus 2203 and a data bus 2204.

The input/output processor node 2200 and the input/output buffer nodes 2201(i) are connected to the data router 15. The input/output processor node 2200 receives input/output commands from one or more scalar processors 12 controlling input/output operations over the data router 15 and in response enables the input/output buffer nodes 2201(i) and the device interfaces 2202(j) to perform input/output operations to transfer data to or receive data from one or more processing elements 11(i) or scalar processors 12 specified in the command. During and after completion of processing of the input/output command, the input/output processor node 2200 may also provide acknowledgement and status information to the scalar processors 12, which also may be transmitted in messages over the data router 15.

It will be appreciated that, in one embodiment, the input/output commands and acknowledgement and status information are transferred over the data router 15 so that the input/output processor 13 may be used to transfer data to, or receive data from, processing elements 11(i) and scalar processors 12 regardless of the partitioning of the system 10 which may occur in connection with the control network 14. In that embodiment, a connection of the input/output processing node 2200 to the control network 14 may be used to facilitate the transfer of control code to the input/output processing node. If it is instead desired to have an input/output processor 13 engage in input/output operations only with a particular partition, the input/output processor node 2200 may instead receive input/output commands from, and transmit input/output status information over, the control network 14. In any case, the input/output buffer nodes 2201(i) transmit data over, or receive data from, processing elements 11(i) or scalar processors 12 over the data router 15.

Each device interface 2202(j) (also referred to as a "channel") connects to one or more input/output devices (not shown), such as disk or tape storage devices, video display devices, hardcopy output devices, computer networks or the like, over corresponding input/output buses. Under control of the input/output processor node 2200, the device interfaces 2202(j) transfer data from one or more input/output devices over the data bus 2204 to one or more input/output buffer nodes 2201(i) for transfer over the data router 15. The structure of a particular device interface will be determined by the particular types of input/output devices connected thereto, and will not be described in detail.

The input/output processor node 2200 and the input/output buffer nodes 2201(i) are also connected to the diagnostic network 16 to permit them to receive diagnostic message packets 120 (FIG. 19) to facilitate diagnostic and initialization operations using the diagnostic network as described above. In addition, the device interfaces 2202(j) may also be connected to the diagnostic network 16 for the same purpose.

The input/output processor node 2200 includes a network interface 2210, an input/output control processor 2211 and a control bus interface 2212, and may also include a data bus interface 2213. The network interface 2210 is similar to the network interface 202 (FIG. 20) described above. The control bus interface 2212 and data bus interface 2213 facilitate transfer of control information and data respectively, generated by the input/output control processor 2211, to the input/output buffer nodes 2201(i) and device interface(s) 2202(j) in response to an input/output command. The control bus interface 2212 also facilitates receipt of status information and interrupt requests from the input/output buffer nodes 2201(i) and device interface(s) 22020).

In one embodiment, the input/output buffer nodes 2201(i) are all similar, and so only input/output buffer node 2201(0) is shown in detail on FIG. 25. The input/output buffer node 2201(0) includes a message generator/receiver and network interface 2220(0), a message buffer system 2221(0) comprising a message buffer control 2222(0) and a message buffer 2223(0), a control bus interface 2224(0) and a data bus interface 2225(0). The message generator/receiver and network interface 2220(0) includes a network interface that is similar to the network interface 202 described above in connection with FIG. 20. In one particular embodiment, the input/output buffer nodes 2201(i) will not require connections of their network interfaces to the control network 14. Instead of receiving control information over the control network 14, the input/output buffer node 2201(0) receives control information from the input/output processor node 2200 over the control bus 2203 through their control bus interface 2224(0) and in response condition the message buffer control 2222(0) and the data bus interface 2225(0) as described below to enable the input/output buffer node 2201(0) to participate in an input/output operation. If the input/output operation is a transfer of information from the data router 15, the control information facilitates the reception of messages from the data router 15 through the network interface 2220(0) and storage of the data in the message buffer 2223(0) under control of the message buffer control 2222(0). On the other hand, if the input/output operation is a transfer of information over the data router 15, the control information enables the message buffer control 2222(0) to generate messages, using the data in the message buffer 2223(0), for transfer through the network interface 2220(0) over the data router 15. The data bus interface 2225(0) facilitates transfer of data between the device interface(s) 2202(j) or the input/output processor node 2200 and the message buffer 2223(0).

The control bus interface 2224(0) also transfers status information and interrupt requests to the input/output processor node 2200. In one embodiment, the input/output buffer node 2201(0) generates an interrupt request in response to receipt of an all-fall-down message from the data router. In response to receipt of an interrupt request from the input/output buffer node 2201(0), the input/output processor node 2200, over the control bus 2203, enables the message buffer control 2222(0) to transfer the message to it for further operations.

In any case, in response to receipt of an input/output command, the input/output control processor 2211 generates control information for transfer to one or more of the input/output buffer nodes 2201(i) and device interfaces 2202(j) to initiate execution of the command. The particular control information generated for the device interfaces 2202(j) will be determined by the particular type of input/output device (not shown) to be engaged in the transfer. For example, if the input/output device is a disk or tape storage unit, the control information may identify the particular location on the disk or tape from which or to which data is to be transferred. If, on the other hand, the input/output device is a network interface, the control information may identify locations in the network connected thereto from which or to which the data is to be transferred. Other types of input/output devices may require similar types of control information.

In addition, the control information provided to the device interface(s) to engage in an input/output operation includes information about the particular input/output buffer nodes 2201(i) to participate in the input/output operation. If an input/output operation is a transfer from input/output device(s) to processing elements 11(i) or scalar processors 12, the control information provided to the device interfaces 2202(j) will include information to facilitate transfer of the data to particular input/output buffer nodes 2201(i). On the other hand, if the input/output operation is a transfer in the opposite direction, the control information provided to the device interface(s) 2202(j) will include information to facilitate fetching of the data by the device interface(s) 2202(j) from the input/output buffer nodes 2201(i).

Similarly, the control information provided to the input/output buffer nodes 2201(i) includes such information as the processing elements 11(i) or scalar processors to which data is to be transferred, if data is being transferred in that direction, along with information from which the input/output buffer nodes 2201(i) can generate message address portions 31 (FIG. 5) in the data router message packets 30. In addition, the control information includes information from which the input/output buffer nodes 2201(i) can, in turn, generate destination control information for controlling operations by the recipient processing elements 11(i) or scalar processors 12 as described below. The input/output control processor 2211 transfers the control information through a control bus interface 2212 to the device interface(s) 2202(j) and input/output buffer nodes 2201(i) over the control bus 2203.

The data bus 2204 is provided to facilitate the transfer of data received by the input/output buffer nodes 2201(i) over the data router 15 to the device interface(s) 2202(j), or alternatively to transfer data from by the device interface(s) to the input/output buffer nodes 2201(i) for transfer over the data router 15. The input/output processor node 2200 also includes a data bus interface 2213 through which the input/output control processor 2211 may supply data to, or receive data from, the input/output buffer nodes 2201(i) or device interface(s) 2202(j) over the data bus 2204. In one particular embodiment as described below, the device interface(s) 2202(j), when transmitting data to the input/output buffer nodes 2201(i) for transfer to processing elements 11(i) or a scalar processor 12 will transfer successive items of data to selected ones of the successive input/output buffer nodes 2201(i) in a round-robin fashion. That enables a plurality of input/output buffer nodes 2201(i) to transmit data over, or receive data from, the data router 15 in parallel, which, in turn, enables a rapid transfer of data between the processing elements 11(i) and the input/output devices.

Before proceeding further, it will be helpful to describe the format of an input/output message packet 2230. An input/output message packet is essentially a data router message packet 30 (FIG. 5) that is transferred over the data router 15 in an input/output operation. An input/output message packet 2230 is identified by the contents of the tag flit 35 identifying the data router message packet 30 as being for input/output purposes.

It will be appreciated that the format of an input/output message packet 2230 is similar to that of a data router message packet 30 described above in connection with FIG. 5. In particular, it has a message address portion 31, a message length flit 34, a message tag flit 35 and a check portion 33 whose contents are as described above in connection with FIG. 5. The message data portion 32 of an input/output message packet 2230 includes two portions following the tag flit 34, namely a destination buffer identification portion 2231 and a destination buffer offset portion 2232, each of which includes one or more flits. The destination buffer offset portion 2232 is followed by one or more destination data flits 2233 to complete the message data portion 32. In one embodiment, the destination buffer identification portion 2231 and the destination buffer offset portion 2232 together comprise one thirty-two bit word of the message data portion 32. As noted above in connection with FIG. 5, the message length flit 34 indicates the length of the message data portion 32, in one embodiment identifying the number of thirty-two bit words following the message tag flit 35 in the message data portion 32 and including portions 2231, 2232 and 2233.

The contents of the destination buffer identification portion 2231 and the destination buffer offset portion 2232 provide information used by the receiving processing element 11(i) or scalar processor 12, in the case of input/output message packets 2230 transferred from an input/output processor 13, or by an input/output processor 13 in the case of an input/output message packet 2230 received thereby from a processing element 11(i) or a scalar processor 12. In particular, the contents of the destination buffer identification portion 2231 operates as an input/output operation identifier, and are provided by the scalar processors 12 in their input/output commands.

For example, if, as is typical, during input/output operations data is received by the receiver in an input/output buffer maintained thereby, the contents of the destination buffer identification portion 2231 may be used to identify the particular buffer into which the receiver may load the contents of the destination data portion. The contents of the destination buffer offset portion 2232 identifies the particular location in the buffer into which the receiver is to load the contents of the destination data portion 2233. It will be appreciated that a number of distinct input/output operations may be performed in system 10 contemporaneously, with the input/output message packets 2230 having diverse values in their destination buffer identification portions 2231.

In addition, while the particular message transmitter, which may comprise either a processing element 11(i) or a scalar processor 12, on the one hand, or the input/output processor 13, on the other hand, may generate and transmit input/output message packets 2230 in the order in which they have the data to be transmitted, it will be appreciated that the message receivers may receive the input/output message packets 2230 in random order. The contents of the destination buffer offset portion 22 of each input/output message packet 2230 enables the receiver to properly order the data contained in the destination data portions 2233 of the received input/output message packets 2230 that are associated with the particular input/output operation as indicated by the contents of their destination buffer identification portions 2231.

During an input/output operation, the input/output buffer node 2201 transfers messages in one of two general transfer modes, identified herein as a serial mode and a parallel mode. Since an input/output buffer node 2201(i) may participate in a plurality of input/output operations contemporaneously and on an interleaved basis, the input/output buffer node 2201 may transmit and receive serial mode message packets and parallel mode message packets for a plurality of input/output operations contemporaneously. Generally, the serial mode is used in connection with transfers between the input/output processor 13 and a single processing element 11(i) or a scalar processor 12,. On the other hand, the parallel mode is used in connection with transfers between the input/output processor 13 and processing elements 11(i) and scalar processors 12 connected as sequential leaves 21 to the data router 15, although the parallel mode may also be used in connection with transfers to a single processing element 11(i) or scalar processor 12. While generally the processing elements 11(i) participating in an input/output operation may comprise part or all of the processing elements 11(i) in a partition, it will be appreciated that processing elements 11(i) from multiple partitions may participate in a single input/output operation.

With respect to serial mode messages generated by the input/output processor 13 for a particular input/output operation, it will be appreciated that the contents of the message address portions 31 and the destination buffer identification portions 2231 of the messages will all have the same values. In particular, the values of portions 31 and 2231 identify the receiving processing element 11(i) or scalar processor, in the case of the message address portions, and the input/output operation, in the case of the destination buffer identification portions 2231.

In transmitting serial mode messages during an input/output operation, the values of the destination buffer offset portions 2232 will, on the other hand, vary as among the input/output message packets 2230 transmitted for the input/output operation. As noted above, a device interface 2202(j) (FIG. 25) transmits, on a round-robin basis, the successive data items to the successively-indexed input/output buffer nodes 2201(i), which buffer them in their respective message buffers 2223(i) and thereafter transmits them during the input/output operation. As a result, each of the successively-indexed input/output buffer nodes 2201(i) will (a) initially transmit input/output message packets 2230 having successive values in their destination buffer offset portions 2232, using in the message address portion 31 and destination buffer offset portion 2232 values provided by the input/output processor node 2200; and (b) thereafter transmit input/output message packets 2230 in which the values in the destination buffer offset portions 2232 are incremented by a stride value corresponding to the number of input/output buffer nodes 2201(i) participating in the operation, which is also provided by the input/output processor node 2200. Modifying the contents of the destination buffer offset portions 2232 of the input/output message packets 2230 in this way ensures that the receiving processing element 11(i) or scalar processor 12 will load the data items from the destination data portions 2233 of the received input/output message packets into its buffer in the required order, effectively in the order in which they are provided by the device interface 2202(j) to the input/output buffer nodes 2201(i).

In the reverse direction, that is, in serial mode input/output message packets 2230 generated by a processing element 11(i) or a scalar processor 12, if the processing element 11(i) or scalar processor 12 sequentially generates input/output message packets 2230 for successive data items in its buffer, the contents of the message address portions 31 of the successive input/output message packets 2230 will enable the successive packets to be transmitted to the successively-indexed input/output buffer nodes 2201(i), on a round-robin basis. For each round of input/output message packets 2230 transmitted to the input/output buffer nodes 2201(i) [that is, for each sequence of input/output message packets 2230 transmitted to input/output buffer nodes 2201(0) through 2201(N−1)], the contents of the destination buffer offset portion 2232 will have the same value, which is incremented for each round. As a result, the contents of the destination data portions 2233 of each sequence of input/output message packets 2230 will be stored in the corresponding locations in the message buffers 2223(i) of the input/output buffer nodes 2201(i), and input/output message packets 2230 successively received by each input/output buffer node 2201(i) will be stored in successive locations of its message buffer 2223(i). Thus, when a device interface 2202(j) retrieves the data items from the input/output buffer nodes 2201(i), which occurs on a round-robin basis, for transmission to an input/output device, it receives the data items in the same order in which they were transmitted by the processing element 11(i) or scalar processor 12.

It will be appreciated that the processing element 11(i) or scalar processor 12 may, during a serial mode transfer, generate input/output message packets 2230 for data items in a non-sequential order in its buffer, which may assist in minimizing congestion in the data router 15. In that case, the message address portions 31 and destination buffer offset portions may be modified differently than described in the previous paragraph to accommodate the diverse ordering.

With respect to parallel mode messages generated by the input/output processor 13 for a particular input/output operation, it will be appreciated that the contents of the destination buffer identification portions 2231 of the messages will all have the same values, but the contents of the message address portions 31 and the destination buffer offset portions 2232 may differ. In particular, as in a serial mode transfer, the values of destination buffer identification portion 2231 identify the particular input/output operation with which the data item in the destination data portion 2233 is associated.

In a parallel mode transfer operation, however, the values of the destination addresses in the message address portions 31 and of the destination buffer offset portions 2232 of the input/output message packets 2230 transmitted by the input/output buffer nodes 2201(i) will vary. As in a serial mode transfer described above, a device interface 2202(j) (FIG. 25) transmits, on a round-robin basis, the successive data items to the successively-indexed input/output buffer nodes 2201(i) for transmission during the input/output operation. In generating input/output message packets, each input/output buffer node 2201(i) will generate values for the message address portions 31 and the destination buffer offset portions 2232 in accordance with a complex set of operations, described below in connection with FIGS. 28A through FIG. 30 reflecting the numbers of input/output buffers 2201(i) and the numbers of processing elements 11(i) and scalar processors 12 participating in the input/output operation. Similar, but complementary, operations, occur in connection with parallel mode input/output message packets generated by the processing elements 11(i) and scalar processors 12 for transmission to the buffer nodes 2201(i) of input/output processor 13.

The input/output processor 13 depicted in FIG. 25 has been described as participating in an input/output operation to transfer data to or receive data from, a sequence of processing elements 11(i) and scalar processors 12. It will be appreciated, however, that the input/output processor 13 may transfer data to or receive data from one or more other input/output processors 13 during an input/output operation. If the operation is in the parallel transfer mode, the transmitting input/output processor 12 may generate values for the message address portions 31 and destination buffer offset portions 2232 for the input/output message packets 2230 in a manner similar to that for an input/output operation in which data is transferred to processing elements 11(i) and scalar processors 12, in recognition of the fact that the input/output buffer nodes of the destination input/output processor 13, like processing elements 11(i), are essentially connected as plurality sequential leaves of data router 15.

DESCRIPTION OF SPECIFIC CIRCUITS i. Input/Output Message Packet Send Operations With this background, the structure and operation of an input/output buffer node (which will be generally identified here by reference numeral 2201, without an index "i") will be described in detail in connection with FIGS. 27A through 30. FIGS. 27A through 27D together depict a detailed block diagram of the input/output buffer node 2201, with the figures containing diagrams of, respectively, the message generator/receiver and network interface 2220, the message buffer system 2221, including message buffer control 2222 and message buffer 2223, and the data bus interface 2225. Finally, the structure and operation of a component of the message generator/receiver and network interface 2220, which assists in generating destination addresses and destination offsets for use in generating the contents of the message address portion 31 and the destination buffer offset portion 2232 for parallel mode input/output message packets 2230, will be provided in connection with FIGS. 28A through 30.

With initial reference to FIGS. 27A through 27D, as noted above the input/output buffer node 2201 includes a buffer memory 2223 (FIG. 27B) which serves as a buffer for both (a) data items received from a device interface for transmission to a processing element 11(i) or a scalar processor 12, and (b) data items received from a processing element 11(i) or a scalar processor 12 for transmission to a device interface. In one embodiment, the buffer memory 2223 is divided into six buffers, identified as BUF 0, BUF 2, BUF 4, BUF 5, BUF 6 and BUF 7 (generally identified "BUF i"). The two low-order buffers, BUF 0 and BUF 2 are used in connection with buffering of data for parallel mode input/output message packets 2230, and the other buffers are used in connection with buffering of data for serial mode input/output message packets 2230. The index "i" of the particular buffer BUF i corresponds to the value of the contents of the message buffer identification field 2231 of input/output message packets 2230 containing data items from the respective buffer. For received input/output message packets 2230, the data in the destination data field 2233 will be stored in the buffer BUF i, at the offset in the buffer identified by the contents of the destination buffer offset field 2232. Controlling the buffer memory 2223 is a buffer address/control circuit 2241 and a buffer arbiter 2242. The buffer arbiter 2242 receives buffer memory request/control signals from a number of sources in the input/output buffer node 2201, in particular CTRL INT/BUF MEM REQ/CTRL control interface/buffer memory request/control signals from the control bus interface 2224 and WRT/MEM REQ/CTRL write memory request/control signals and RD/MEM REQ/CTRL read memory request/control signals from the data bus interface 2225. In addition, buffer memory request/control signals are provided to the buffer arbiter 2242 by a data send control circuit 2243 and a data receive control circuit 2244 (FIG. 27B), both of which form part of a message and buffer control circuit 2245. The respective buffer memory request/control signals may be used to request access to the buffer memory 2223 from the buffer arbiter 2242 to enable storage of data therein or retrieval of data therefrom.

The buffer arbiter 2242 selects among requests it receives, as well as memory refresh requests from a refresh control circuit (not shown), to enable and control access to the buffer memory 2223. Coincidentally, the buffer arbiter 2242 generates BUF MEM SWITCH CTRL buffer memory switch control signals that controls a buffer memory switch 2246 that, in turn, controls the transfer of signals between a buffer data bus 2247 from the buffer memory 2223, control bus interface 2224 and the data bus interface 2225.

Several other components may also couple signals onto the buffer data bus 2247, namely, a buffer address generator 2250 and a receive FIFO 2252, under control of the buffer arbiter 2242. The buffer address generator 2250 generates address signals that are coupled over the buffer data bus 2247 to the buffer address/control circuit 2241. Essentially, the buffer address generator 2250 comprises a plurality of counters, including a read counter 2250(RD) used in connection with loading data into buffer memory 2223 from the data interface 2225, a write counter 2250(WRT) used in connection with transferring data from buffer memory 2223 to the data interface 2225, and a send counter 2225(SND) used in connection with transfers of data from buffer memory 2223 for use in generating input/output message packets 2230. The buffer address/control circuit 2241, under control of the buffer arbiter 2242, uses the address signals to generate MEM ADRS memory address signals, along with the required MEM CTRL memory control signals, to enable access of specific storage locations in the buffer memory 2223 identified by the address signals. The receive FIFO 2282, which couples data derived from input/output message packets received by the input/output buffer node 2201, is also controlled by the buffer arbiter 2242 through the data receive control circuit 2244.

Figure 27A:
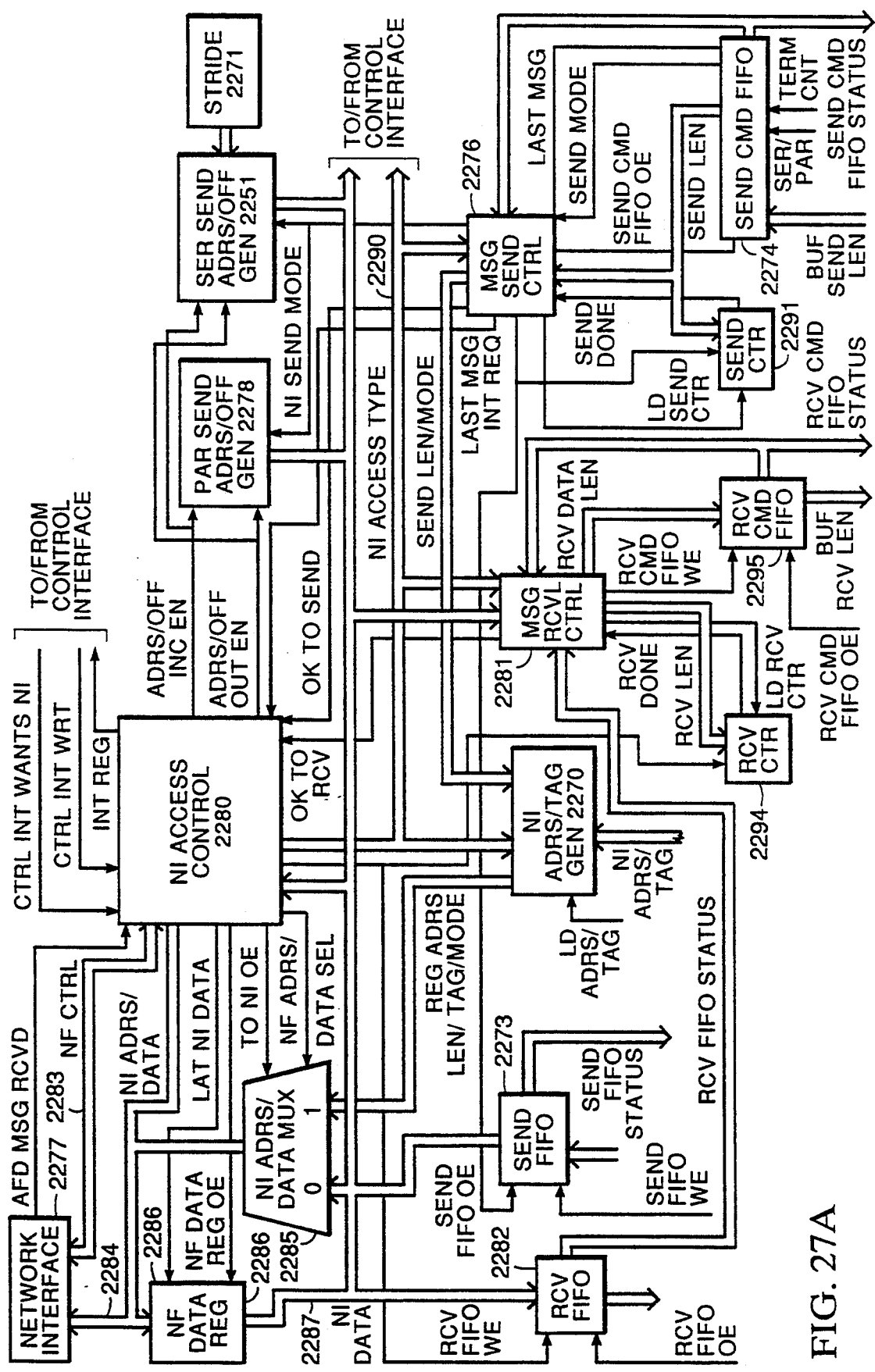
FIGS. 27A through 27D together form a detailed functional block diagram of an input/output buffer node used in the input/output processor shown in FIG. 25.

During an input/output operation in which data is being transferred from an input/output device and a device interface 2202(j), through the input/output buffer node 2201 to one or more processing elements 11(i) and/or scalar processors 12, the input/output processor node 2200 initially may enable the device interface 2202(j) to transfer the data to the input/output buffer node 2201 and the input/output buffer node 2201 to store the data in a designated buffer. Initially, the input/output processor node 2200 loads a base address into the read counter 2250(RD) of the buffer address generator 2250. Thereafter, the input/output processor node 2200, also through the control interface 2224 loads a read transfer count value into a read transfer counter 2253 (FIG. 27D). The READ CNT read count signals define a binary-encoded value specifying the amount of data to be transferred to the buffer memory 2223 from a device interface 2202. In a similar manner, the input/output processor node 2200 loads a control and status register (not shown) with a data transfer command which control a RD TYPE read type signal and an EN RD enable read signal. In one read operation type, identified herein as a "buffered" type, the data will be buffered in the buffer memory 2223, and thereafter the buffered data will be used by the message generator/receiver and network interface 2220 in connection with the generation of messages for transmission over the data router 15. In another read operation type, identified herein as a "fly-by" type, the data will be transferred to the message generator/receiver and network interface 2220 without being buffered. The input/output processor node 2200 then enables the device interface 2202 (FIG. 25) to begin transferring data over the data bus 2204 to the input/output buffer nodes 2201(i). The input/output buffer node 2201 receives the data from the data bus 2204 through a data bus interface circuit 2255. The data bus interface circuit 2255 also receives READ FIFO STATUS signals from a read FIFO 2256. If the READ FIFO STATUS signals indicate that the read FIFO 2256 is not full, the data bus interface circuit 2255 couples the data onto a bus 2257 as TO/FROM DATA BUS signals, and asserts a R FIFO WE read FIFO write enable signal. In response, the read FIFO 2256 latches the TO/FROM DATA BUS signals. The data bus interface circuit 2255 may repeat this operation while the READ FIFO STATUS signals indicate that the read FIFO 2256 is not full.

The READ FIFO STATUS signals are also coupled to a read control circuit 2260. If the READ FIFO STATUS signals indicate that the read FIFO 2256 contains data, and if the EN RD enable read signal from the control and status register 2254 is asserted and the RD TYPE signal identifies the buffered read operation type, the read control circuit 2260 generates RD/MEM REQ/CTRL read memory request and control signals representing a request indicating that the read FIFO 2256 has data to transfer through the buffer memory switch 2246 and over the buffer data bus 2247 for storage in the buffer memory 2223.

The RD/MEM REQ/CTRL read memory request and control signals from the read control circuit 2260 are coupled to the buffer arbiter 2242. When the buffer arbiter 2242 grants the request from the read control circuit 2260, it will enable the buffer address generator 2250 to generate address signals using the read counter 2250(RD). In this operation, the buffer arbiter 2242 enables the buffer address generator 2250 to couple the address signals onto the buffer data bus 2247 and the buffer address/control circuit 2241 to use the address in generating MEM ADRS memory address signals for addressing the buffer memory 2223. In addition, the buffer arbiter 2242 enables the read counter 2250(RD) to increment.

In addition, the buffer arbiter 2242 will also condition the BUF MEM SWITCH CTRL buffer memory switch control signals to enable the buffer memory switch to couple TO/FROM MEM BUF signals from a bus 2263 onto a memory data bus 2264. At that point, the buffer arbiter 2242 will condition the RD/MEM REQ/CTRL signals to notify the read control circuit that it can enable a transfer of data from the read FIFO 2256 to the buffer memory 2223. The read control circuit 2260, in response, will assert an R FIFO OE read FIFO output enable signal to enable the read FIFO to transmit data onto the bus 2263 as the TO/FROM MEM BUF to/from memory buffer signals. The buffer memory switch 2246, as conditioned by the BUF MEM SWITCH CTRL buffer memory switch control signals, will couple the data onto the memory data bus 2264 as BUF MEM DATA buffer memory data signals, which couples the data to data input terminals of buffer memory 2223. The read control circuit 2260 also generates memory control signals which are received by the buffer address/control circuit 2241 to control conditioning of the MEM CTRL memory control signals as necessary to enable the buffer memory 2223 to store the data. Thereafter, the read control circuit 2260 enables the read counter 2250(RD) to increment. Contemporaneous with the transfer of the data to the buffer memory 2223, the read control circuit 2260 asserts a DEC RD XFR CTR decrement read transfer counter signal to enable the read transfer counter to decrement.

Thereafter, the read control circuit 2260 will relinquish control to the buffer arbiter 2242. In connection with the transfer of data from the read FIFO 2256 to the buffer memory 2223, the read control circuit 2260 and buffer arbiter 2242 will iteratively perform these operations until the read transfer counter 2253 counts out. When the read transfer counter 2253 counts out, it asserts a RD TC read terminal count signal to indicate that the amount of data, as identified by the value originally loaded into the read transfer counter 2253, has been transferred to the buffer memory 2223. The read control circuit 2260 may at this point may notify the input/output processor node 2200 of that fact.

When the input/output processor node 2200 receives notifications from all of the input/output buffer nodes 2201(i) that data to be transferred has been loaded into the respective buffer memories 2223, it enables the message buffer control 2221 and message generator/receiver and network interfaces 2220 of the respective input/output buffer nodes 2201(i) to transmit the data in messages over the data router 15. Preliminarily, the input/output processor node 2200, through the control interface 2224, initially loads a send word transfer count value in a send word transfer counter 2265, a message burst count value in a burst counter register 2266 and a message interval value in a message interval register 2267. The send word transfer count identifies the amount of data to be transmitted in the input/output operation, while the burst count value identifies the number of input/output message packets 2230 to be transmitted in a message burst. The message interval value is used to determine a time interval between message bursts to be generated by the input/output buffer node 2201, and is generally useful to throttle message transmission in the serial transfer mode. The input/output processor node 2200 further loads the base address of the buffer in buffer memory 2223 to supply the data in the transfer operation into the send counter 2250(SND) of the buffer address generator 2250 as described above.

In addition, the input/output processor node 2200 loads several registers used to generate addresses. In particular, the input/output processor node 2200, through the control interface 2224, loads a register address and a tag value in a network interface address/tag generator 2270 (FIG. 27A). The network interface address/tag generator 2270 provides NI ADRS/LEN/-TAG network interface bus address, length and tag signals which will be described below in connection with FIG. 27A.

In addition, the input/output processor node 2200 enables the control interface 2224 to load other registers, with the particular registers being determined by whether the transfer operation is a serial mode transfer or a parallel mode transfer. If the transfer operation is a serial mode transfer, the input/output processor node 2200 enables loading of a serial send address/offset generator 225 1 with the address of the destination processing element 11 or scalar processor 12, a buffer identification and an initial destination buffer offset value. In addition, the input/output processor node 2200 loads destination stride register 2271 (FIG. 9). As noted above, during a serial mode transfer, the serial send address/offset generator 2251 will generate the same destination address and buffer identification for all of the input/output message packets 2230. For the destination buffer offset values, however, the serial send offset generator 2251 uses the initial destination buffer offset value in the initial serial mode message generated by the input/output buffer node 2201, and for each successive input/output message packet, it updates the destination buffer offset value by an amount corresponding to the value in the stride register 2271.

On the other hand, if the transfer operation is a parallel mode transfer, the input/output processor node 2200 enables loading of a parallel send address/offset generator 2278 with a number of items of information, which will be described below in connection with FIGS. 28A through 30. The parallel send address/offset generator 2278 generates information used in the destination address portion 31, the destination buffer identification portion 2231 and the destination buffer offset portion 2232 of an input/output message packet 2230. It will be appreciated that, during an input/output operation the parallel send address/offset generator 2278 will generate the same information for the destination buffer identification portion 2231 for all of the input/output message packets 2230, but it will update the information provided for the destination address portion 31 and the destination buffer offset portion 2232 for each subsequent input/output message packet 2230.

After loading the registers as described, the input/output processor node 2200 loads the control and status register (not shown) to enable it to provide an asserted SEND EN send enable signal. The SEND EN send enable signal, when asserted, enables the data send control circuit 2243. In addition, the input/output processor node 2200 loads the control and status register to enable it to control a STAT SER/PAR status register serial/parallel signal, indicating whether the transfer operation is in the serial transfer mode or the parallel transfer mode. The data send control circuit 2243 uses the STAT SER/PAR signal in generating send commands as described below.

In response to the asserted SEND EN send enable signal, the data send control circuit 2243 asserts an LD BURST CNTR load burst counter signal to enable a burst counter 2272 to load BURST CNT burst count signals from the message burst count register 2266. Thereafter, if a send FIFO 2273 is generating SEND FIFO STATUS signals indicating that it has sufficient empty space for data for an input/output message packet 2230, and if a send command FIFO 2274 is generating SEND CMD FIFO send command FIFO signals indicating that it has space for a send command, the data send control circuit enables data and a send command to be loaded into the FIFOs 2273 and 2274, respectively, which are used to generate an input/output message packet 2230.

In that operation, the data send control circuit 2243 initially generates SEND/BUF MEM REQ/CTRL send control/buffer memory request and control signals requesting access to the buffer memory 2223. When the buffer arbiter 2242 selects the request from the data send control circuit 2243, it generates responsive SEND-/BUF MEM REQ/CTRL send control/buffer memory request and control signals to so notify the data send control circuit 2243. In addition, the buffer arbiter 2242 enables the buffer address generator 2250 to transmit the contents of the send counter 2250(SND) onto the buffer data bus 2247 to the buffer address/control circuit 2241, which, in turn, couples the signals from bus 2247 as MEM ADRS signals to the buffer memory 2223 to identify a location whose contents are to be coupled to the send FIFO 2273.

In response to the SEND/BUF MEM REQ/CTRL send control/buffer memory request and control signals notifying the data send control circuit 2243 of its selection by the buffer arbiter 2242, the data send control circuit 2243, in turn, enables the buffer address/control circuit 2241 to generate MEM CTRL memory control signals to enable the buffer memory 2223 to couple the contents of the identified location onto bus 2264. The buffer arbiter 2242 further generates BUF MEM SWITCH CONTROL signals to enable the buffer memory switch 2246 to couple the BUF MEM DATA signals from bus 2264 onto bus 2247. In response to the notification from the buffer arbiter 2242, the data send control circuit 2243 asserts the SEND FIFO WE send FIFO write enable signal to enable the send FIFO 2273 to latch the data on the buffer data bus 2247. The data send control circuit 2243 additionally enables the send counter 2250(SND) to increment, and asserts a DEC SND WRD CTR decrement send word counter signal to enable the send word transfer counter 2265 to decrement. These operations may be repeated a selected number of times, each time using the incremented value maintained by the send counter 2250(SND), to transfer multiple words of data from the buffer memory 2223 to the send FIFO 2273, until either a predetermined maximum number of words have been transferred or, if less than the predetermined maximum number remains to be transferred, the number of words remaining to be transferred.

Thereafter, the data send circuit 2243 will relinquish control to the buffer arbiter 2242. In addition, the data send control circuit 2243 generates signals which represent a send command which it couples to the send command FIFO 2274. As will be described below in connection with FIG. 27A, the send command is used to control generation of an input/output message packet 2230. With particular reference to FIG. 27A, the data send control circuit 2243 generates BUF SEND LEN buffer send length signals, a SER/PAR signal, and a TERM CNT terminal count signal, and a SEND CMD FIFO WE send command FIFO write enable signal to enable the send command FIFO 2274 to latch the other signals in parallel. The BUF SEND LEN signals represent the amount of data coupled from the buffer memory to the send FIFO 2273 for the input/output message packet, and the condition of the SER/PAR serial/parallel signal, which corresponds to the STAT SER/PAR signal from the control and status register (not shown) indicates whether the message transfer operation is in serial mode or parallel mode. The TERM CNT terminal count signal indicates whether the send command is the last send command for a transfer operation, and corresponds to the condition of a XFER DONE transfer done signal when the data send control circuit 2243 generates the send transfer command. The XFER DONE signal indicates whether the send word transfer counter 2265 has decremented to zero to indicate that the input/output operation has been completed.

Contemporaneous with the loading of the send command in the send command FIFO 2274, the data send control circuit 2274 will assert a DEC BC decrement burst counter signal which enables the burst counter 2272 to decrement. If the burst counter 2272 has not decremented to zero, it maintains a BURST DONE signal in a negated condition. In that case, if the send word transfer counter 2265 did not assert the XFER DONE signal for the previous send command, the data send control circuit 2243 generates SEND/BUF MEM REQ/CTRL send control/buffer memory request/control signals to enable the buffer arbiter 2242 to, in turn, initiate the repetition of the above-described operations to transfer additional data to the send FIFO 2273 and load another send command in send command FIFO 2274. These operations are repeated until the burst counter 2272 decrements to zero, at which point it asserts the BURST DONE signal.

In response to the asserted BURST DONE signal, the data send control circuit 2243 asserts a LD MSG TMR load message timer signal, which enables a message interval timer 2275 to load a message interval value from the message interval register 2267. The message interval timer is clocked by a periodic clocking signal (not shown). When the message interval timer 2275 times out, it asserts a MSG INT TO message interval timeout signal, which is coupled to the data send control 2243 to enable it to repeat the operations described above.

These operations are repeated until the send word transfer counter 2265 counts out, at which point the send word transfer counter 2265 asserts the XFER CNT transfer count signal to enable the data send control circuit 2243 to assert the TERM CNT terminal count signal for the message send command at that point, and the data send control circuit 2243 terminates the above-described operations.

With reference again to FIG. 27D, as described above the RD TYPE read type signal coupled to the read control circuit may identify a "fly-by" operation type. In such an operation, the read control circuit 2260 transfers the TO/FROM MEM BUF signals representing data from the read FIFO 2256 directly for storage in send FIFO 2273, without being buffered in the buffer memory 2223. The read control circuit 2260 also generates FLYBY SND CMD fly-by send command signals representing a send command to be loaded into the send command FIFO 2274. To facilitate this operation, the read control circuit 2260 receives the SEND FIFO STATUS and SEND FIFO CMD STATUS signals, which circuit 2260 uses in control its operations in response to the amount of space in the respective FIFOs.

With reference to FIG. 27A, messages are generated by a network interface 2277 for transfer over the data router 15 in response to data transmitted thereto from the send FIFO 2273 under control of a message send control circuit 2276 and a network interface access control circuit 2280. The network interface 2277 also receives messages from the data router 15 as described below. The network interface 2277 is similar to the network interface 202 (FIG. 20) described above. The network interface access control circuit 2280 controls access to the network interface by the message send control circuit 2276, a message receive control circuit 2281, and the input/output processor node 2200 through the control interface 2224. The message receive control circuit 2281 generally controls transfer of message data from input/output message packets 2230 normally received by the network interface 2277, as will be described below. As will also be described below, the input/output processor node 2200 may also provide data to be used in generating an input/output message packet 2230, and may also receive certain input/output message packets 2230, such as all-fall-down messages, through the control interface 2224.

The network interface access control circuit 2280 normally iteratively reads the left, right and "middle" status registers 231, 293 and 300 (FIGS. 22A and 22B) of the network interface 2277 to permit the message send control circuit 2276 to determine whether the network interface 2277 can receive data, through the respective left, right and "middle" send first and send registers as described above (FIGS. 22A and 22B) for an input/output message packet 2230. The reading of the status registers also permits the message receive control circuit 2281 to determine whether the network interface 2277 has received an input/output message packet.

In the reading operation, the network interface access control circuit 2280, over an address/data bus 2284, identifies the appropriate status register and generates NI CTRL network interface control signals onto a control signal bus 2283 to enable the network interface to transmit the contents of the identified status register as signals over the bus 2284. At that point, the network interface access control circuit 2280 asserts a LAT NI DATA latch network interface data signal, which enables an network interface data register 2286 to latch the signals on bus 2284.

Thereafter, the network interface access control circuit 2280 asserts an NI DATA REG OE network interface register output enable signal to enable the contents of the register 2286 to be coupled as NI DATA network interface data signals onto a bus 2287. Contemporaneously, the network interface access control circuit 2280 couples NI ACCESS TYPE network interface access type signals onto a bus 2290 which identify the NI DATA signals on bus 2287 as originating from a status register of the network interface 2277. In response to this encoding of the NI ACCESS TYPE signals, the message send control circuit 2276 and the message receive control circuit 2281 receive the NI DATA signals.

The message send control circuit 2276 also receives the SEND CMD FIFO STATUS signals from send command FIFO 2274. When the data send control circuit 2243 loads signals representing a send command into the send command FIFO 2274, the SEND CMD FIFO STATUS signals indicate that the send command FIFO 2274 is not empty. When that occurs, the message send control circuit 2276 asserts a SEND CMD FIFO OE send command FIFO output enable signal to enable the send command FIFO 2274 to transmit SEND LEN send length, SEND MODE and LAST MSG last message signals representing the first send command therein to the message send control circuit. The message send control circuit contemporaneously asserts an LD SEND CTR load send counter signal to enable a send counter 2291 to load the SEND LEN signals. The message send control circuit 2276 uses the SEND LEN signals and the NI DATA signals representing the condition of the read status register from the network interface 2277, to determine whether the network interface 2277 can receive the amount of data specified by the SEND LEN signals and, if so, it asserts an OK TO SEND signal. As will be described below, the message receive control circuit 2281, if the NI DATA signals indicate that the network interface 2277 has data from a received input/output message packet 2230, may also assert an OK TO RCV signal.

The OK TO SEND and OK TO RCV signals are received by a network interface access control circuit 2280, which arbitrates access to the network interface 2277 by the message send control circuit 2276, the message receive circuit 2281 and the input/output processor node 2200 through the control interface 2224. The network interface access control circuit 2280 grants access to one of these by generating NI ACCESS TYPE network interface access type signals having particular encodings over bus 2290. If the network interface access control circuit 2280 couples NI ACCESS TYPE network interface access type signals onto bus 2290 granting access to message send control circuit 2276, the message send control circuit 2276 couples an NI SEND MODE network interface send mode signal, corresponding to the SEND MODE signal received from the send command FIFO 2274, to the parallel send address/offset generator 2278 and the serial send address/offset generator 2251. In addition, the message send control circuit 2275 couples SEND LEN/MODE send length/mode signals, representing the SEND LEN and SEND MODE signals from the send command, to the network interface address/tag generator 2270.

In response to NI ACCESS TYPE network interface access type signals on bus 2290 granting access to message send control circuit 2276, the message send control circuit 2276 also couples the LAST MSG last message signal to the network interface access control circuit 2280 as a LAST MSG INT REQ last message interrupt request signal. If the LAST MSG signal is asserted, indicating that the send command is the last for the input/output operation, the LAST MSG INT REQ signal is also asserted to enable the network interface access control circuit 2280 to assert an INT REQ interrupt request signal. The asserted INT REQ signal enables the control interface 2224 (FIG. 25) to transmit an interrupt request over control bus 2203 to the input/output processor node 2200, enabling it in turn to determine that the input/output operation has been completed. The input/output processor node 2200 may then initiate another input/output operation in connection with the buffer in buffer memory 2223.

The network interface access control circuit 2280 will thereafter generate NI ACCESS TYPE signals to enable the network interface address/tag generator 2270 to transmit address signals identifying the appropriate left, right or "middle" send first register, the send mode, length and tag signals to multiplexer 2285, and asserts the NI ADRS/DATA SEL and TO NI OE signals to enable the multiplexer 2285 to couple these signals onto bus 2284 as NI ADRS/DATA network interface address/data signals. Contemporaneously, the network interface access control circuit 2280 transmits NI CTRL network interface control signals to enable the network interface 2277 to latch the signals.

Thereafter, the network interface access control circuit 2280 asserts an ADRS/OFF OUT EN address/offset output enable signal, which is received by both the parallel send address/offset generator 2278 and the serial send address/offset generator 2251. The NI SEND MODE signal enables one of the generators 2278 and 2251 to respond to the ADRS/OFF OUT EN signal. If the NI SEND MODE signal indicates a parallel transfer operation, it enables the parallel send address/offset generator 2278 to transmit, in response to the ADRS/OFF OUT EN signal, NI DATA network interface data signals onto bus 2287 representing the destination processing element address, buffer and offset values. On the other hand, if the NI SEND MODE signal indicates a serial transfer operation, it enables the serial send address/offset generator 2251 to transmit such signals in response to the ADRS/OFF OUT EN signal. The network interface access control circuit 2280 negates the NI ADRS/DATA SEL network interface data select signal and asserts the TO NI OE to network interface output enable to enable the multiplexer 2285 to couple these NI DATA signals onto the bus 2284, and generates NI CTRL network interface control signals on bus 2283 to enable the network interface to receive the signals.

The network interface access control circuit 2280 will thereafter negate the ADRS/OFF OUT EN signal causing the enabled generator 2278 or 2251 to remove the signals from the bus 2287. Sometime later the network interface access control circuit will assert an ADRS/OFF INC EN address/offset increment enable signal, which causes the generator 2278 or 2251 which is enabled by the NI SEND MODE signal, to increment. In particular, if the NI SEND MODE signal indicates a serial transfer operation, the assertion of the ADRS/OFF INC EN signal enables the serial send address/offset generator 2251 to increment the destination offset value by an amount corresponding to the value previously loaded in the stride register 2271. On the other hand, if the NI SEND MODE signal indicates a parallel transfer operation, the assertion of the ADRS/OFF INC EN signal enables the serial send address/offset generator 2251 to increment both the destination processing element address value and the destination offset value as described below in connection with FIG. 28 through FIG. 30. Unless the send message command is the last in a message transfer operation, the incremented values will be used in connection with operations for a subsequent send message command.

After negating the ADRS/OFF OUT EN address/offset output enable signal, the network interface access control circuit 2280 generates NI ACCESS TYPE signals to enable the message send control circuit 2276 to, in turn, enable the send FIFO 2273 to iteratively transmit data as NI DATA signals over bus 2287, and the multiplexer 2285 to couple the data over the bus 2284 to the network interface as the NI ADRS/DATA signals. To enable the send FIFO 2273 to transmit the data, the message send control circuit 2276 asserts a SEND FIFO OE send FIFO output enable signal. As the data is transmitted onto bus 2284, the network interface access control circuit 2280 transmits NI CTRL network interface control signals to enable the network interface 2277 to latch the signals. The SEND FIFO OE signal from the message send control circuit 2276 also enables the send counter 2291 to decrement, and when the send counter 2291 has decremented to zero, all of the data in the send FIFO relating to the send command has been transferred. At that point, the message send control circuit 2276 negates the OK TO SEND signal to terminate the transfer operation.

Thereafter, the network interface access control circuit 2280 again iteratively enables the contents of the network interface 2277 status registers to be transferred onto bus 2287. When the message send control circuit 2276 again determines that the send command FIFO 2274 includes a send command and the read status register indicates that the network interface 2277 can receive data for the input/output message packet, it again asserts the OK TO SEND signal to again request access to the network interface 2277. When the network interface access control circuit 2280 grants access to the message send control circuit 2276, the above-described operations are repeated.

ii. Input/Output Message Packet Receive Operations

As described above, the input/output buffer 2201 further receives input/output message packets 2230 from the data router 15 for transmission to an input/output device through a device interface 2202. The reception of input/output message packets 2230 is also initiated by the input/output processor node 2200 in response to an input/output command from a scalar processor 12 initiating an input/output transfer operation. An input/output command for an input/output operation in which the input/output buffer 2201 receives messages in the serial mode will identify a particular one of the serial buffers BUF 4 through BUF 7 of buffer memory 2223 to engage in the input/output transfer operation. In that case, the input/output processor node 2200, through the control interface 2224, loads the control and status register (not shown) to enable it to assert one of the BUF "i" EN enabling signals associated with the buffer. Multiple ones of the serial buffers may be concurrently enabled, in which case the BUF "i" EN signals for each of the buffers will be asserted. When a serial buffer BUF "i" is filled, the input/output processor node 2200 is notified. When the input/output processor node 2200 has received notifications from all of the input/output buffer nodes 2201 participating in the transfer that their respective serial buffers BUF "i," for the same index "i," have been filled, it initiates a transfer of the data therefrom to an input/output device through a device interface 2202. After the data has been transferred, the input/output processor node 2200 may transmit a message packet 30 over the data router 15 to the scalar processor 12 which provided the input/output command indicating that the operation involving that buffer BUF "i" has been completed.

On the other hand, for an input/output operation in the parallel mode, both parallel buffers BUF 0 and BUF 2 will generally be enabled by asserted BUF "i" EN signals and used concurrently for the same operation. If the data to be transmitted to the input/output buffer nodes 2201 is such that the amount of data to be received by each input/output buffer node will fit into a single parallel buffer BUF 0, only that parallel buffer BUF 0 will be enabled and used for the transfer. However, if more data is to be transmitted to each input/output buffer node 2201 than will fit into a single parallel buffer BUF 0, both buffers will be enabled and used concurrently. In particular, the processing elements 11 and scalar processors 12 participating in the input/output operation will generally begin transmitting input/output message packets 2230 whose destination buffer identification portions 2231 identify buffer BUF 0, and thereafter will transmit input/output message packets whose destination buffer identification portions 2231 identify buffer BUF 2. As the input/output buffer nodes 2201 receive the input/output message packets 2230, they will load the data in the respective identified buffers BUF 0 and BUF 2 of buffer memory 2223, as will be described below. As noted above, the input/output buffer nodes may receive the input/output message packets out of order, and so input/output message packets may be received containing data for both buffers in an interleaved manner.

Continuing with the description of a parallel mode transfer, the input/output processor node 2200 also notifies the device interface 2202 participating in the input/output operation of the particular input/output buffer nodes 2201(i) participating in the input/output operation. After notification, the device interface 2202, in a round robin manner, attempts to retrieve words of data from the identified input/output buffer nodes 2201(i). When an input/output buffer nodes 2201(i) determines that its buffer BUF 0 has been filled, the data in that buffer is available and transferable to the device interface 2202, on a word-by-word basis, in response to a retrieval request. If, during the round-robin retrieval operation, the device interface 2202 attempts to retrieve data from an input/output buffer node 2201(i) whose particular buffer has not been filled, it stalls at that input/output buffer node 2201(i) until the buffer has been filled. After an input/output buffer node 2201(i) has transferred all of its data from buffer BUF 0 to the device interface 2202, it can notify input/output processor node 2200, which transmits an acknowledgement to the scalar processor 12 which originated the input/output command that the parallel buffers BUF 0 are empty. The input/output buffer nodes 2201, device interface 2202 and input/output processor node 2200 repeat these operations for parallel buffer node BUF 2.

If the processing elements 11 and scalar processors 12 participating in the parallel mode input/output operation have additional data to transfer, the scalar processor 12 controlling the input/output operation, after receiving the acknowledgement that parallel buffer BUF 0 is empty, may thereafter enable the processing elements 11 and scalar processors 12 participating in the input/output operation to, after finishing the transfer of data for parallel buffer BUF 2, continue transferring data in input/output message packets 2230 identifying parallel buffer BUF 0 as the destination buffer. Similarly, after receiving the acknowledgement that parallel buffer BUF 2 is empty, the scalar processor 12 may enable the processing elements 11 and scalar processors 12 participating in the input/output operation to, after finishing the transfer of data for parallel buffer BUF 0, continue transferring data in input/output message packets 2230 identifying parallel buffer BUF 2 as the destination buffer. These operations continue until the processing elements 11 and scalar processors 12 participating in the transfer have transferred all of the data to be transferred. Thus, in the parallel transfer mode, the parallel buffers BUF 0 and BUF 2 may be iteratively and alternatingly used until all of the data has been transferred to the input/output buffer nodes 2201 participating in the input/output operation.

Figure 27B:
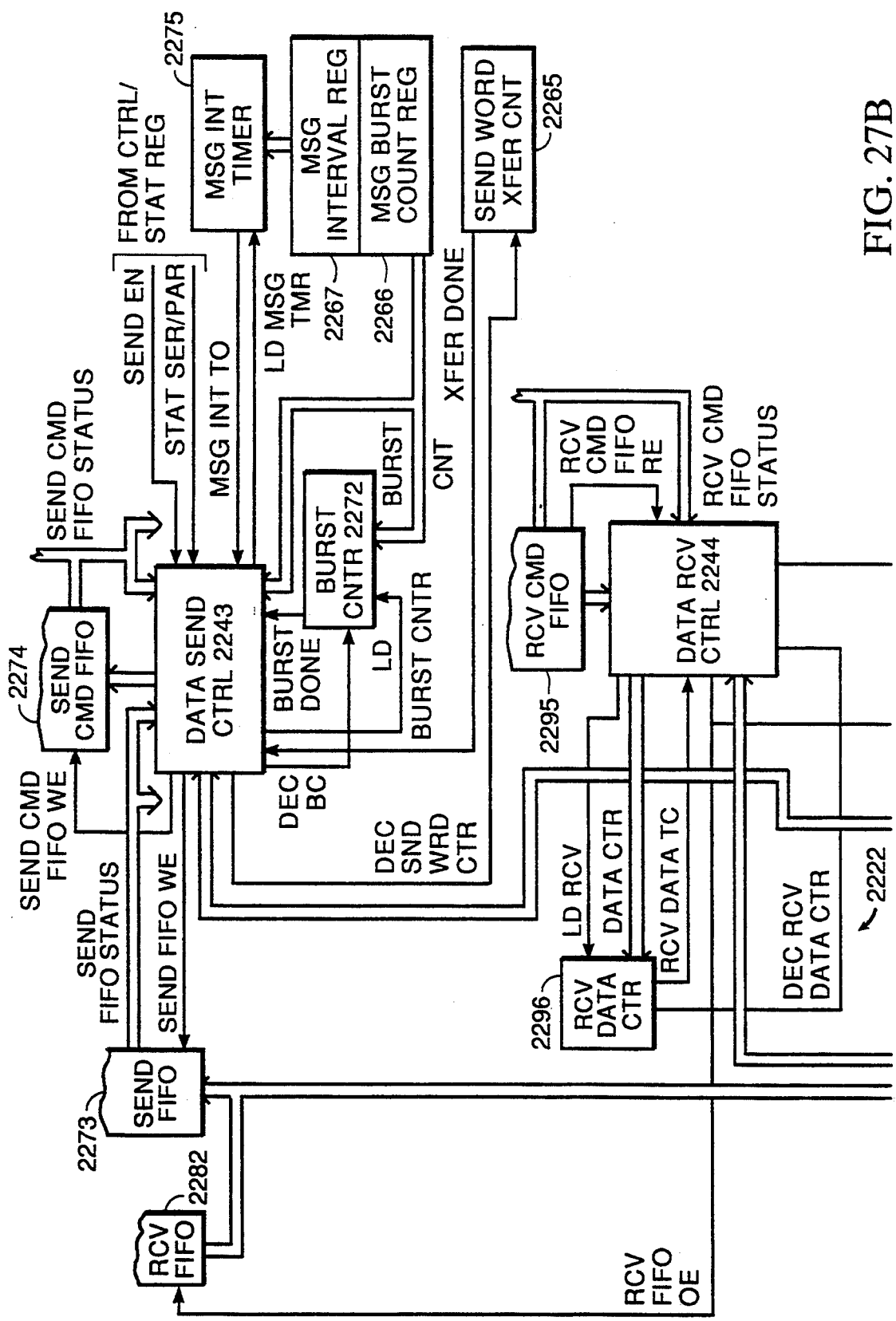
Figure 27C:
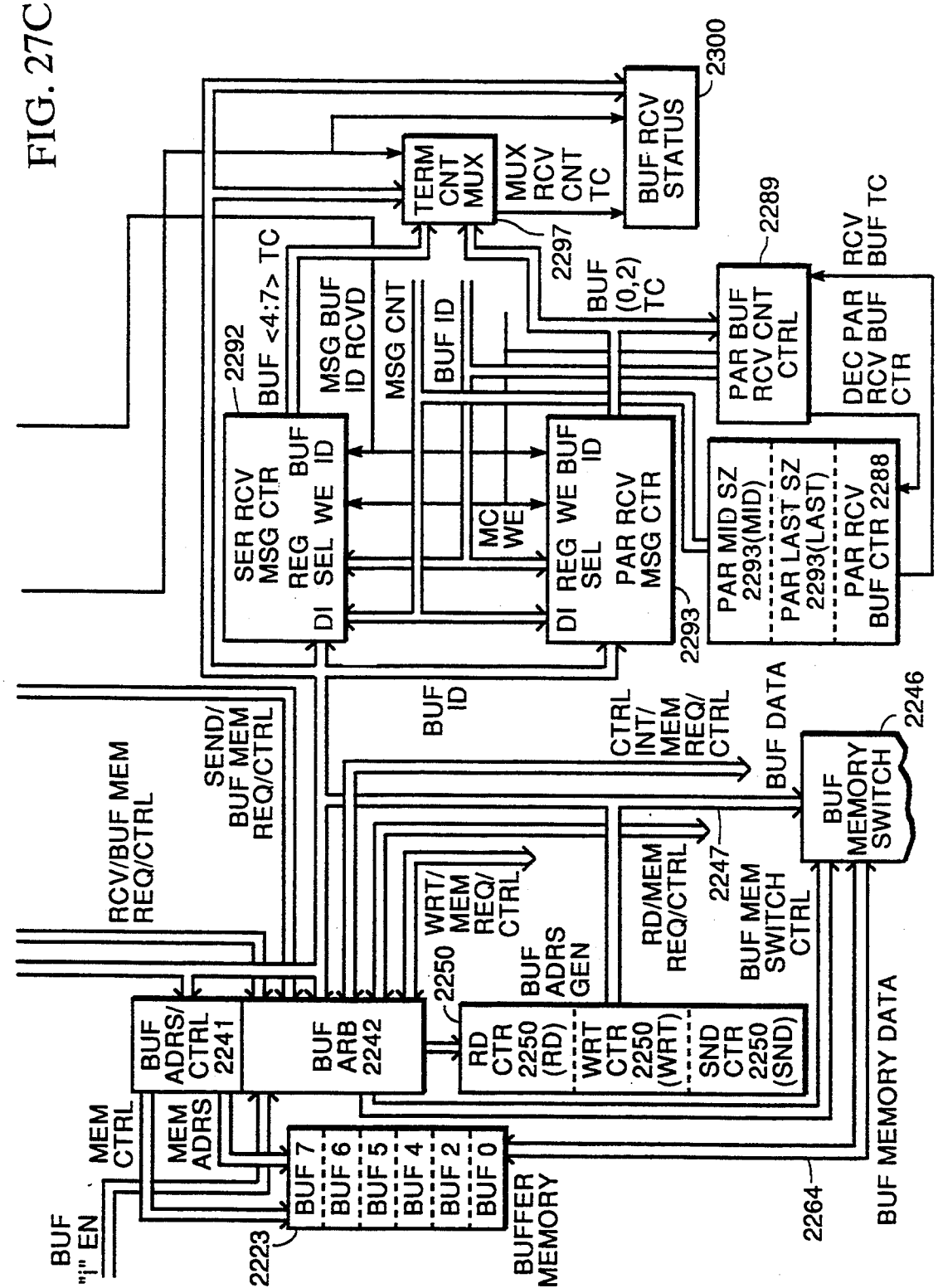
Figure 27D:
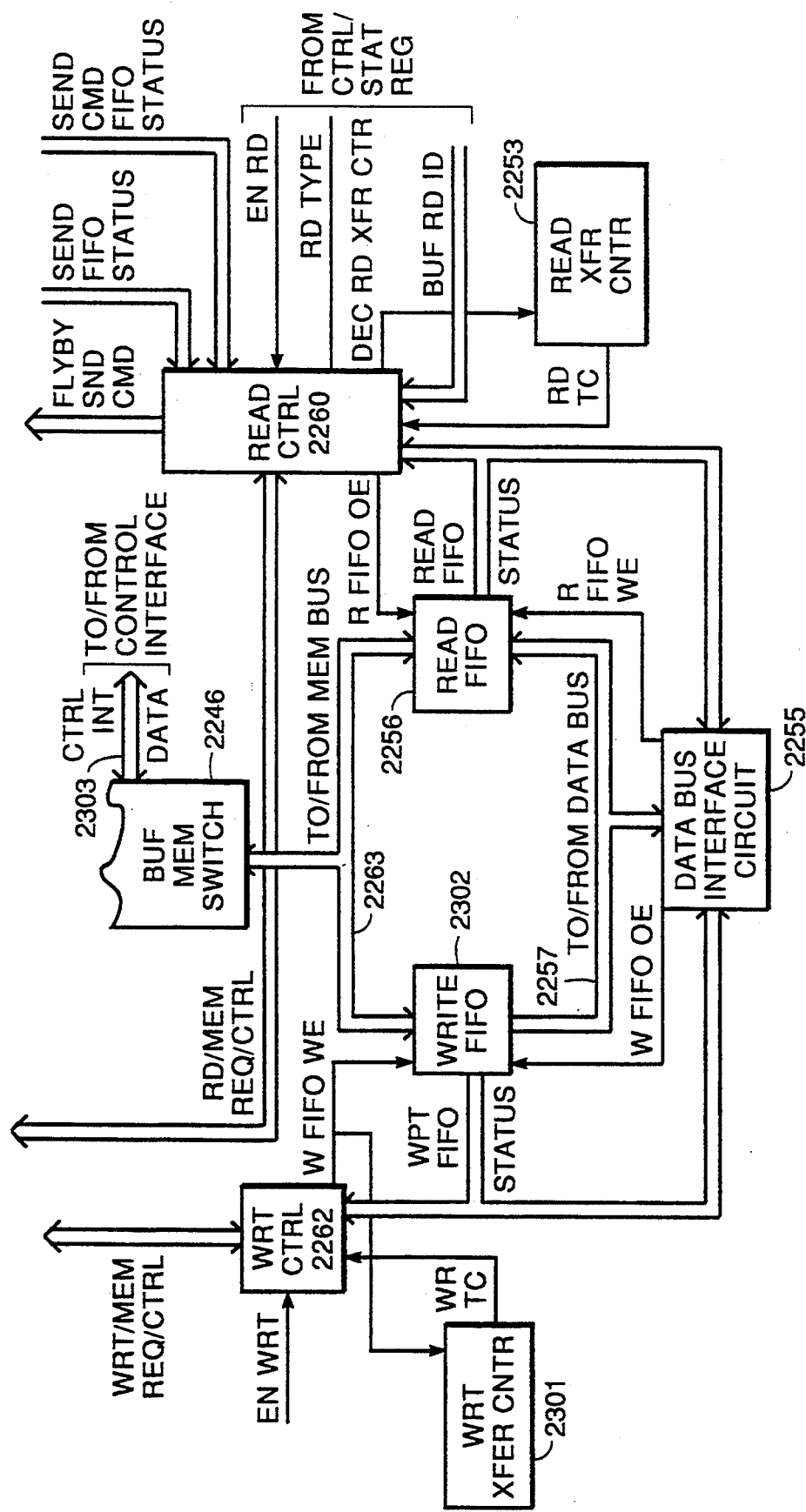

With reference to FIG. 27B, the input/output buffer node 2201 includes two receive message counters, including a serial message counter 2292 and a parallel message counter 2293. The serial message counter 2292 comprises a plurality of counters, each associated with one of the serial buffers BUF 4 through BUF 7. In conditioning the input/output buffer node 2201 to participate in an input/output operation involving reception of input/output message packets 2230 in the serial mode through one of the serial buffers BUF 4 through BUF 7, the control interface, under control of the input/output processor node 2200 loads the counter in serial message counter 2292 associated with the serial buffer with a count value identifying the amount of data to be received. In this operation, the input/output processor node 2200, over the control bus 2203, provides MSG CNT message count signals representing a message count, BUF ID buffer identification signals identifying one of the buffers BUF 4 through 7 in buffer memory 2223, and asserts a MC WE message count write enable signal. In response to the assertion of the MC WE signal, the counter 2292 or 2293 which contains the counter associated with the buffer identified by the BUF ID signals loads the value identified by the MSG CNT signals into the identified buffer.

Similarly, the parallel message counter 2293 comprises a plurality of counters, each associated with one of the parallel buffers BUF 0 and BUF 2. In conditioning the input/output buffer node 2201 to participate in an input/output operation involving reception of input/output message packets 2230 in the parallel mode through the parallel buffers BUF 0 and BUF 2, the control interface 2224, under control of the input/output processor node 2200, loads the counter in serial message counter 2292 associated with the serial buffer with a count value identifying an initial amount of data to be received in the respective buffers. In addition, associated with the parallel message counter 2293 are two additional registers, namely a parallel mid-size register 2293(MID), a parallel last size register 2293(LAST) and a parallel receive buffer counter 2288, all of which may also be loaded by the control interface 2224 under control of the input/output processor node 2200. The values loaded into the counters of parallel message counter 2293 identify the amount of data to be received for the respective buffers BUF 0 and BUF 2 for their initial iterations. The parallel mid-size register 2293(MID) receives a value which will be loaded into the counters of parallel message counter 2293 for subsequent iterations, up to the last iteration at which point the value in the parallel last size register 2293(LAST) is used. The parallel receive buffer counter 2288 receives a value identifying the number of times either of the parallel buffers BUF 0 and BUF 2 will be used during the input/output operation. The values are loaded into registers 2293(MID) and 2293(LAST) and counter 2288 by the control interface 2224 in response to appropriate control signals (not shown).

After the appropriate BUF "i" EN buffer enabling signal has been asserted for a buffer BUF "i", the input/output buffer node 2201 is in condition to receive an input/output message packet 2230 with data to be loaded into that buffer. To determine whether the network interface 2277 has received an input/output message packet 2230, as described above the network interface access control circuit 2280 periodically reads the contents of various status registers of the network interface 2277, which indicates whether it has received a data router message packet 30 from the data router 15. In response to NI ACCESS TYPE network interface access type signals from network interface access control circuit 2280 (FIG. 27A) indicating that a network interface status register is being read, a message receive control circuit 2281 receives the NI DATA signals from bus 2287 representing the contents of the status register being read. With reference to FIG. 22A and FIG. 22B, it will be appreciated that one field of the NI DATA signals will represent the contents of the received message length field 243 of the read status register, and, if the network interface 2277 has received a message, this field will represent a nonzero value. Accordingly, the message receive control circuit 2281 examines the signals representing received message length field and determine whether they represent a non-zero value.

If the message receive control circuit 2281 determines that the portion of the NI DATA signals on bus 2287 representing the received message length field do represent a non-zero value, it determines from RCV FIFO STATUS receive FIFO status signals and RCV CMD FIFO STATUS receive command FIFO status signals whether the receive FIFO 2282 and a receive command FIFO 2295 can receive, respectively, message data from the network interface 2277 and a receive command from the message receive control circuit 2281. If so, it couples the portion of the NI DATA signals on bus 2287 representing the received message length field as RCV LEN receive length signals to inputs of a receive counter 2294. The message receive control circuit 2281 thereafter asserts an LD RCV CTR load receive counter signal to enable the receive counter 2294 to load the RCV LEN signals. Thereafter, the message receive control circuit 2281 will assert an OK TO RCV signal.

The asserted OK TO RCV enables the network interface access control circuit 2280 to, in turn, couple NI ADRS/DATA network interface address and data signals onto bus 2284 representing the address of the receive register 233, 295 or 302 of the appropriate left, right or "middle" data router interface of the network interface 2277, that is, the left, right or "middle" data router interface whose status register provided the non-zero received message length field. In addition, the network interface access control circuit 2280 couples NI CTRL network interface control signals onto bus 2283 to enable the network interface 2277 to transfer the contents of the identified receive register onto bus 2284. The network interface access control circuit 2280 thereafter asserts the LAT NI DATA latch network interface data signal and the NI DATA REG OE network interface data register output enable signal to enable the network interface data register 2286 to latch the signals on bus 2284 and couple them onto bus 2287 as NI DATA network interface data signals.

Contemporaneously, the network interface access control circuit 2280 couples NI ACCESS TYPE signals onto bus 2290 which enable the message receive control circuit 2281 to, in turn, assert a RCV FIFO WE receive FIFO write enable signal. This signal enables the receive FIFO 2282 to receive and latch the NI DATA signals on bus 2287. The assertion of the RCV FIFO WE signal further enables the receive counter 2294 to decrement. The network interface access control circuit 2280 and message receive counter 2281 iteratively perform these operations until the receive counter 2294 counts out, at which point it will assert a RCV DONE receive done signal. In response to the asserted RCV DONE signal, the message receive control circuit 2281 negates the OK TO RCV signal, which causes the network interface access control circuit 2280 to terminate the receive operations. It will be appreciated that the number of iterations, and thus the amount of data transferred from the network interface 2277 to the receive FIFO 2282 will correspond to the message length value loaded the receive counter 2294.

Thereafter, the message receive control circuit 2281 will enable a receive command to be loaded into the receive command FIFO 2295. In this operation, the message receive control circuit 2281 will assert a RCV CMD FIFO WE receive command FIFO write enable signal to enable a receive command FIFO 2295 to load as a receive command RCV DATA LEN received data length signals identifying the amount of data just loaded into the receive FIFO 2282, which relates to the previously-received RCV LEN receive length signals. In one particular embodiment, the RCV LEN signals, which are related to the message length portion 34 of the received input/output message packet 2230 (FIG. 26) identify the length of the destination buffer identification portion 2231, the destination buffer offset portion 2232 and the destination data portion 2233. In that embodiment, the lengths of the destination buffer identification portion 2231 and the destination buffer offset portion 2232 are uniform and fixed as among input/output message packets 2230, and RCV DATA I JEN signals, on the other hand, identify the length only of the destination data portion 2233.

The RCV CMD FIFO STATUS receive command FIFO status signals from the receive command FIFO 2295 are also coupled to the data receive control circuit 2244. The data receive control circuit 2244 controls the transfer of data from the receive FIFO 2282 to the buffer memory 2223. When the RCV CMD FIFO STATUS signals indicate that the receive command FIFO 2295 is not empty, that is, that it contains a receive command, it asserts a RCV CMD FIFO RE receive command FIFO read enable signal to enable the receive command FIFO 2295 to transmit the receive command to the data receive control circuit 2224.

As noted above, the receive command from the receive command FIFO 2295 identifies the amount of data in the receive FIFO 2282 from the destination data portion 2233 received from an input/output message packet 30. After receiving the receive command from the receive command FIFO 2295, the data receive control circuit 2244 couples the receive command to a receive data counter 2296 and asserts a LD RCV DATA CTR to enable the receive data counter 2296 to load the receive command. The data receive control circuit 2244 will use the receive data counter 2296 to control the amount of data which the data receive control circuit 2244 will enable to be transmitted from the receive FIFO 2282 in response to the receive command.

After loading the receive command into the receive data counter 2296, the data receive control circuit 2244 generates RCV/BUF MEM REQ/CTRL receiver/buffer memory request/control signals that are coupled to the buffer arbiter 2242 to request access to the buffer data bus 2247 and buffer memory 2223. When the buffer arbiter 2242 grants access to the data receive control circuit 2244, it asserts a RCV FIFO OE receive FIFO output enable signal that enables the receive FIFO 2282 to transmit a first word of data onto the buffer data bus 2247.

It will be appreciated that the first word will comprise information from the destination buffer identification portion 2231 and the destination buffer offset portion 2232 of the input/output message packet 2230. The buffer arbiter 2242 receives the signals and determines whether the buffer identified by the signals on bus 2247 representing the destination buffer identification portion 2231 is enabled, that is, whether the buffer's BUF "i" EN buffer enable signal is asserted. If not, an error has occurred the buffer arbiter 2242 enables the control interface 2224 (FIG. 25) to request interrupt service from the input/output processor node to perform selected error recovery operations. The input/output buffer node 2201 may thereafter halt receive operations.

If the buffer arbiter 2242 determines that the identified buffer is enabled, it couples an acknowledgement over the RCV/BUF MEM REQ/CTRL signals to the data receive control circuit 2244 and enables the buffer address/control circuit to receive the signals from the buffer data bus 2247 and to use them as address signals in addressing the buffer memory 2223. In addition, the signals from the buffer data bus 2247 representing the destination buffer identification portion 2231 are coupled as BUF ID buffer identification signals to the serial message counter 2292, the parallel message counter 2293, a terminal count multiplexer 2297 and a receive buffer status register circuit 2300. In response to the acknowledgement from the buffer arbiter 2242, the data receive control circuit asserts a MSG BUF ID RCVD message buffer identification received signal, which enables the message counter 2292 or 2293 maintaining a counter for the identified buffer identified by the BUF ID signals to decrement. The terminal count multiplexer 2297 and receive buffer status register-circuit 2300 will use the BUF ID signals as described below.

Thereafter, the data receive control circuit 2244 again asserts the RCV FIFO OE signal to enable the receive FIFO 2282 to transmit the next word onto the buffer data bus 2247. It will be appreciated that this word comprises the beginning of the destination data portion 2233 of the input/output message packet 2230. In addition, the data receive control circuit asserts a DEC RCV DATA CTR decrement receive data counter signal which enables the receive data counter 2296 to decrement. Contemporaneously, the buffer arbiter 2242 conditions the BUF MEM SWITCH CTRL buffer memory switch control signals to enable the buffer memory switch to couple word on the buffer data bus 2247 to the data input terminals of the buffer memory 2223. The buffer memory 2223, in turn, stores the word in the location identified by the previously received address signals. The buffer arbiter 2242 then enables the buffer address/control circuit 2241 to increment the address signals to point to the next location in buffer memory 2223.

Following the storage of data in the buffer memory 2223, if the value maintained by the receive data counter 2296 has not decremented to zero, the counter 2296 maintains a RCV DATA TC received data terminal count signal in a negated condition. As a result, the data receive control circuit 2244 again asserts the RCV FIFO OE receive FIFO output enable signal to again enable transfer of further data from the receive FIFO 2282 onto bus 2247 and the receive data counter 2296 to further decrement. In addition, the data receive control circuit 2244 enables the buffer address control circuit 2241 to increment the address previously coupled to the buffer memory 2223 to point to the next location, and to generate control signals to enable the buffer memory 2223 to store the data. At some point, the value maintained by the receive data counter 2296 will decremented to zero, at which point the data receive control circuit 2244 operation required for the receive command received from the receive command FIFO 2295 will be finished. Thereafter, the data receive control circuit 2244 will relinquish control to the buffer arbiter 2242. If the RCV CMD FIFO STATUS receive command FIFO status signals indicate that the receive command FIFO 2295 contains a further receive command, the data receive control circuit 2244 will repeat the operations described above in connection with that command.

As described above, the MSG BUF ID RCVD message buffer identification received signal asserted by the data receive control circuit 2244 which enables the counter maintained by the message counter 2292 or 2293 for the identified buffer identified by the BUF ID signals to decrement and the terminal count multiplexer 2297 and receive buffer status register circuit 2300 to latch the BUF ID signals. The serial and parallel message counters 2292 and 2293 maintain a running record of the number of messages received by each buffer BUF i of the buffer memory 2223 during input/output transfer operations involving each buffer after initialization. The serial message counter 2292 generates BUF <4:7> TC buffers 4 through 7 terminal count signals each associated with one of the serial buffers BUF 4 through BUF 7 of the buffer memory 2223. Similarly, the parallel message counter 2293 generates BUF (0,2) TC buffer 0 or 2 terminal count signals each associated with one of the parallel buffers BUF 0 and BUF 2. When the counter of the serial or parallel message counter 2292 or 2293 associated with a particular buffer BUF i counts out, the counter asserts the one of the BUF <4:7> TC or the BUF (0,2) TC signals associated with the buffer BUF i.

In response to the asserted MSG BUF ID RCVD message buffer identification received signal, the terminal count multiplexer 2297 selects one of the BUF <4:7> TC signals or the BUF (0,2) TC signals associated with the previously-latched latched BUF ID buffer identification signals, and couples the selected signal as a MUX RCV CNT TC multiplexed receive count terminal count signal to the buffer receive status register circuit 2300. The condition of the MUX RCV CNT TC signal will reflect the condition of the buffer "i" terminal count signal associated with the buffer BUF i identified by the BUF ID signals. Accordingly, the condition of the MUX RCV CNT TC signal will reflect the status of the input/output operation being performed in connection with the buffer BUF i. Also in response to the assertion of the asserted MSG BUF ID RCVD signal, the buffer receive status register circuit 2300 latches the MUX RCV CNT TC signal in a register location associated with the condition of the previously-latched BUF ID signals, to enable the circuit 2300 to register the condition of the buffer BUF i.

At some point in receiving input/output message packets for a buffer BUF i, a counter of the respective serial or parallel message counter 2292 or 2293 will count out, at which point it will assert the corresponding BUF i TC buffer "i" terminal count signal, and the buffer receive status register circuit 2300 will register the condition of that buffer. If the buffer is a serial buffer BUF 4 through BUF 7, when the corresponding BUF i TC signal is asserted, the control interface 2224 is enabled to interrupt the input/output processor node 2200. When corresponding serial buffers of all input/output buffer nodes 2201 participating in the serial mode input/output operation have been filled, the input/output processor node 2200 initiates a write operation as described below to transfer the data to a device interface 2202.

On the other hand, for transfers involving the parallel buffers BUF 0 and BUF 2, the BUF i TC buffer terminal count signals are coupled to a parallel buffer receive count control circuit 2289. Initially, when the parallel buffer receive count control circuit 2289 determines that the BUF 0 TC buffer "0∞ terminal count signal is asserted, it initiates a transfer of the data from buffer BUF 0 to the data interface 2225 as described below. Contemporaneously, the parallel buffer receive count control circuit 2289 enables the BUF 0 EN signal to be negated so that any further attempts to load data into that buffer from receive FIFO 2282 will be treated as an error as described above. The BUF 0 EN signal will remain negated until the data has been transferred from buffer BUF 0 to the data interface as described below. In addition, the parallel buffer receive count control circuit 2289 asserts DEC PAR RCV BUF CTR decrement parallel receive buffer counter signal, which enables the parallel receive buffer counter 2288 to decrement. If the parallel receive buffer counter has not counted out, it maintains a RCV BUF TC receive buffer terminal count signal in a negated condition, which enables the parallel buffer receive count control circuit 2289 to, in turn, enable the parallel receive message counter 2293 to load the value from the parallel middle size register 2293(MID) in the counter associated with parallel buffer BUF 0.

On the other hand, if the parallel receive buffer counter 2288 has counted out, it asserts the RCV BUF TC signal, which enables the parallel buffer receive count control circuit 2289 to, in turn, enable the parallel receive message counter 2293 to load the value from the parallel last size register 2293(LAST) in the counter associated with the parallel buffer BUF 0. These operations enable the parallel receive message counter 2293 to load a count value to be used in connection with subsequently-received input/output message packets 2230 whose destination buffer identifications identify parallel buffer BUF 0 during the input/output operation. The input/output buffer nodes 2201(i) then notify the input/output processor node 2200 that their parallel buffers BUF 0 of the input/output buffer nodes have been emptied, and the input/output processor node 2200 may thereafter so notify the scalar processor 12 from which it received the input/output command. The scalar processor 12 may thereafter enable further use of the parallel buffer BUF 0 by the processing elements 11 and scalar processors 12 participating in the input/output operation. Contemporaneously, the parallel buffer receive count control circuit 2289 enables the BUF 0 EN buffer enable signal to be asserted, so that data may again be loaded into the buffer BUF 0.

If additional data is to be transferred from the input/output buffer nodes 2201 to the device interface 2202, when BUF 2 TC signals from all of the input/output buffer nodes 2201 are asserted, the same operations are performed in connection with parallel buffer BUF 2 to transfer the data from parallel buffer BUF 2 to the device interface 2202 and to enable the parallel receive message counter 2293 to load a count value to be used in connection with subsequently-received input/output message packets 2230 whose destination buffer identifications identify parallel buffer BUF 2 during the input/output operation. These operations occur alternatingly in connection with parallel buffers BUF 0 and BUF 2 until all of the data to be transferred has been transferred.

In connection with an input/output operation in the serial mode, when the input/output processor node 2200 determines that a corresponding serial buffer BUF 4 through 7 of all of the input/output buffer nodes 2201 has received an amount of data corresponding to the values originally loaded into the corresponding counters in the respective serial or parallel message counters 2292 or 2293, it initiates a write operation in connection with the data interface circuits 2225 and a device interface 2202(j) to enable the data to be transferred from the input/output buffer 2201 through the device interface 2202(j) to an input/output device. As with read operations described above, a device interface 2202(j), when obtaining data from the input/output buffer nodes 2201 for transmission to an input/output device, receives the data on a round-robin basis.

To initiate a write operation in connection with an input/output buffer node 2201, the input/output processor node 2200 initially, through the control interface 2224, loads a write transfer counter 2301. In that operation, the control interface 2224, in response to signals over the control bus 2203, generates WRT CNT write count signals and asserts a LD WRT CNTR load write counter signal to enable the write transfer counter 2301 to load the WRT CNT signals. The input/output processor node 2200 also, in a manner described above, loads write counter 2250(WRT) of the buffer address generator 2250 with a value corresponding to the base address of the buffer BUF i whose contents are to be transferred.

The write control circuit 2262 also receives WRT FIFO STATUS write FIFO status signals from a write FIFO 2302 which indicate the status of the write FIFO 2302. In response to the asserted EN WRT enable write signal, and if the WRT FIFO STATUS signals indicate that the write FIFO 2302 is not full, the write control circuit 2262 initiates a transfer of data from the buffer BUF i of buffer memory 2223 to the write buffer 2302 using an address provided by the write counter 2250(WRT). In this operation, the write control circuit 2262 operates in a manner similar to the read control circuit 2260. In particular, the write control circuit 2262 generates WR MEM REQ/CTRL write memory request and control signals identifying a write request, which it transmits to the buffer arbiter 2242.

When the buffer arbiter 2242 grants the request from the write control circuit 2262, it will enable the buffer address generator 2250 to transmit the value maintained by the write counter 2250(WRT) as address signals for the particular buffer BUF i of buffer memory 2223 into which the data will be loaded. In this operation, the buffer arbiter 2242 enables the buffer address generator 2250 to couple the address signals onto the buffer data bus 2247 and the buffer address/control circuit 2241 to use the address in generating MEM ADRS memory address signals for addressing the buffer memory 2223. Thereafter, the buffer arbiter 2242 enables the counter associated with the buffer to increment, so that the buffer address generator 2250 will be prepared to provide the address signals for the next location of the buffer as necessary.

In addition, the buffer arbiter 2242 will also condition the BUF MEM SWITCH CTRL buffer memory switch control signals to enable the buffer memory switch to couple TO/FROM MEM BUF signals from bus 2263 onto the bus 2247. At that point, the buffer arbiter 2242 will condition the WR MEM REQ/CTRL signals to notify the write control circuit 2262. The write control circuit 2262 enables the buffer address/control circuit 2241 to condition the MEM CTRL memory control signals as necessary to enable the memory to transmit the data from the location identified by the address signals from the buffer address generator 2250 onto bus 2264 as BUF MEM DATA buffer memory data signals. The buffer memory switch 2246, as conditioned by the BUF MEM SWITCH CTRL buffer memory switch control signals, will couple the data from a memory data bus 2264 onto bus 2263 as the TO/FROM MEM BUF to/from memory buffer signals to the input terminals of the write FIFO 2302. The write control circuit 2262 will assert a W FIFO WE write FIFO write enable signal to enable the write FIFO 2302 to load the data from the bus 2263.

The WRT FIFO STATUS write FIFO status signals from the write FIFO 2302 are also coupled to the data bus interface circuit 2255. When the WRT FIFO STATUS signals indicate that the write FIFO 2302 contains data, if a device interface 2202 is requesting a data transmission from the data bus interface circuit 2255, it asserts a W FIFO OE write FIFO output enable signal to enable the write FIFO 2302 to transmit data as TO/FROM DATA BUS signals on bus 2257. The data bus interface circuit will then transmit the data over the data bus 2204.

The asserted W FIFO OE write FIFO write enable signal also enables the write transfer counter 2301 to decrement. Before the value maintained by the write transfer counter 2301 reaches zero, it maintains a WR TC write terminal count signal in a negated condition, which enables the write control circuit 2262 to repeat the operations described above. The write control circuit 2262 may repeat the operations until the WRT FIFO STATUS write FIFO status signals indicate that the write FIFO 2302 is full, or until the write transfer counter 2301 asserts the WR TC write terminal count signal indicating that it has decremented the value maintained thereby to zero. If the WRT FIFO STATUS signals indicate that the write FIFO 2302 is full, but the write transfer counter 2301 has not asserted the WR TC, the write control circuit 2262 may pause temporarily and resume operations after the WRT FIFO STATUS signals again indicate that the write FIFO 2302 is full.

On the other hand, when the write transfer counter 2301 asserts the WR TC signal, the write control circuit 2262 has transferred an amount of data to the write FIFO 2302, for transmission by the data bus interface circuit 2255 to the device interface 2202, as enabled by the input/output processor node 2200. Accordingly, the write control circuit 2262 has completed its operations in connection with the write transfer operation.

Similar operations occur in connection with transferring data from a parallel buffer BUF 0 or BUF 2 in connection with an input/output operation in the parallel mode.

iii. Input/Output Operations Involving Input/Output Processing Node

The input/output processor node 2200 can directly transfer data to and from locations in the buffer memory 2223 of an input/output buffer node 2201 to either provide data for transmission in input/output message packets 2230 over the data router 15 or to retrieve data that the input/output buffer node 2201 received over the data router 15. In addition, the input/output processor node 2200 can access the network interface 2277 of an input/output buffer node 2201.

The input/output processor node 2200 may access a network interface 2277 to, or example, handle a data router message packet 30 that was received from the data router 15 in all-fall-down mode. In that operation, if a network interface 2277 receives an all-fall-down message packet, instead of transferring the message packet 30 through the buffer memory 2223, the message packet 30 is transferred from the network interface 2277 to the input/output processor node 2200 through the control interface 2224. Sometime later, the input/output processor node 2200 will initiate the re-transmission of the all-fall-down message packet through the control interface 2224 and the network interface 2277. When it receives an all-fall-down message, the network interface 2277 asserts an AFD MSG RCVD all-fall-down message received signal, in response to which the network interface access control circuit 2280 couples to the control interface 2224 an INT REQ interrupt request signal. In response to the INT REQ signal, the control interface 2224 transmits a request for service to the input/output processor node 2200, which enables the input/output processor node 2200 to initiate an access operation with the network interface 2277.

To initiate transfer of data to or from the buffer memory 2223, the input/output processor node 2200, over the control bus 2203, enables the control interface 2224 to, in turn, generate CTRL INT/BUF MEM REQ/CTRL control interface/buffer memory request and control signals (FIG. 27B) that it couples to the buffer arbiter 2242 to request access to the buffer memory 2223. The CTRL INT/BUF MEM REQ/CTRL signals further contain the address of a storage location in the buffer memory 2223, including a buffer identification and offset value, and a transfer type operation, that is, whether data is to be stored in, or transferred from, the buffer memory 2223. When the buffer arbiter 2242 grants the request from the control interface 2224, it will enable the buffer address control circuit 2241 to use the address received in the CTRL INT/BUF MEM REQ/CTRL signals in generating MEM ADRS memory address signals for addressing the buffer memory 2223.

In addition, the buffer arbiter 2242 will also condition the BUF MEM SWITCH CTRL buffer memory switch control signals to enable the buffer memory switch 2246 to couple signals between bus 2264 and a bus 2303 to the control interface 2224. If CTRL INT/BUF MEM REQ/CTRL control interface/buffer memory request/control signals indicate that the transfer operation is to store data in the buffer memory 2223, the control interface 2224 couples CTRL INT DATA control interface data signals onto bus 2303, which the buffer memory switch 2246, in turn, couples over bus 2247 as the BUF MEM DATA buffer memory data signals to the buffer memory 2223. The buffer address/control circuit 2241, under control of the control interface 2224, conditions MEM CTRL memory control signals as necessary to enable the buffer memory 2223 to store the data in the location identified by the address signals.

Alternatively, if the CTRL INT/BUF MEM REQ/CTRL control interface/buffer memory request/control signals indicate that the transfer operation is to retrieve data in the buffer memory 2223, the buffer address/control circuit 2241 conditions MEM CTRL memory control signals as necessary to enable the buffer memory 2223 to couple the data in the location identified by the address signals onto bus 2247 as the BUF MEM DATA buffer memory data signals. The buffer memory switch 2246, in turn, couples these signals over bus 2303 as the CTRL INT DATA control interface data signals to the control interface 2224.

To initiate transfer of data to or from the network interface 2277 (FIG. 27A), the input/output processor node 2200, provides the identification of a network interface register (FIG. 22A and FIG. 22B) over the control bus 2203 and, if the data transfer is to be to the network interface, the data. In response, the control interface 2224 transfers the register identification to the network interface address/tag generator 2270 and asserts a CTRL INT WANTS NI control interface wants network interface signal. In addition, the input/output processing node enables the control interface to condition a CTRL INT WRT control interface write signal, which if asserted indicates a transfer of data to the network interface 2277 through the control interface 2224 to the input/output processor node 2200. If the CTRL INT WRT signal is negated, data is to be transferred from the network interface 2277 through the control interface 2224 to the input/output processor node 2200.

As noted above, the network interface access control circuit 2280 controls access to the network interface 2277 by the control interface 2224. When the network interface access control circuit 2280, in response to the asserted CTRL INT WANTS NI signal, grants access to the control interface 2224, it couples NI ACCESS TYPE network interface access type signals so indicating onto bus 2290. At that point, the network interface address/tag generator 2270 couples the address received from the control interface 2224 to the multiplexer 2285. The network interface access control circuit 2280 asserts the NI ADRS/DATA SEL network interface address and data select signal and the TO NI OE to network interface output enable signal to condition the multiplexer 2285 to couple the address signals from the network interface address/tag generator 2270 to onto bus 2284 as the NI ADRS/DATA signals. Contemporaneously, the network interface access control circuit 2280 couples NI CTRL network interface control signals over bus 2283 to enable the network interface 2277 to use the signals on bus 2284 as address signals.

Thereafter, if the CTRL IN WRT control interface write signal is asserted, indicating that data is to be loaded into the identified register, the network interface access control circuit 2280 couples NI ACCESS TYPE signals onto bus 2290 to, in turn, enable control interface 2224 to couple the data onto bus 2287. The network interface access control circuit 2280 maintains the TO NI OE signal asserted and negates the NI ADRS/DATA SEL signal to enable the multiplexer 2285 to couple the data from bus 2287 to the network interface 2287 over bus 2284. Contemporaneously, the network interface access control circuit 2280 couples NI CTRL network interface control signals over bus 2283 to enable the network interface 2277 to load the data on bus 2284 in the previously-identified register.

Alternatively, if the CTRL IN WRT control interface write signal is negated, indicating that data is to be coupled to the control interface from the identified register, after enabling the network interface 2277 to receive NI ADRS/DATA signals representing a register address, the network interface access control circuit 2280 negates the TO NI OE signal to disable the multiplexer 2285. The network interface access control circuit 2280 also couples NI CTRL network interface control signals over bus 2283 to enable the network interface 2277 to couple the data from the previously-identified register onto the bus 2284 as the NI ADRS/DATA network interface/data signals. Contemporaneously, the network interface access control circuit 2280 asserts the LAT NI DATA latch network interface data signal to enable the network interface data register 2286 to latch the data signals on bus 2284, and the NI DATA REG OE network interface data register output enable signal to enable the network interface data register 2286 to couple the latched signals onto bus 2287. The network interface access control circuit 2280 couples NI ACCESS TYPE signals onto the bus 2290 to enable the control interface 2224 to receive the NI DATA data signals on bus 2287. After receiving the NI DATA data signals over bus 2287, the control interface 2224 can transfer them to the input/output processor node 2200 over the control bus 2203 to complete the operation.

iv. Parallel Send Address/Offset Generator 2278

As described above, the parallel send address/offset generator 2278 generates information from which the network interface 2277 generates the message address portion 31 and the destination buffer offset portion 2232 of an input/output message packet 2230. In particular, during a parallel mode transfer, for each input/output message packet 2230 generated by its input/output buffer node 2201(i), the parallel send address/offset generator 2278 generates a relative address to the destination processing element 11(i) or scalar processor 12 and a destination buffer offset value. The network interface 2277 uses the relative address to generate the message address portion 31 of the input/output message packet, which relates to the displacement between the input/output buffer and the destination processing element 11(i) or scalar processor 12. The network interface also uses the destination buffer offset value directly in the destination buffer offset portion 2232.

Figure 28A:
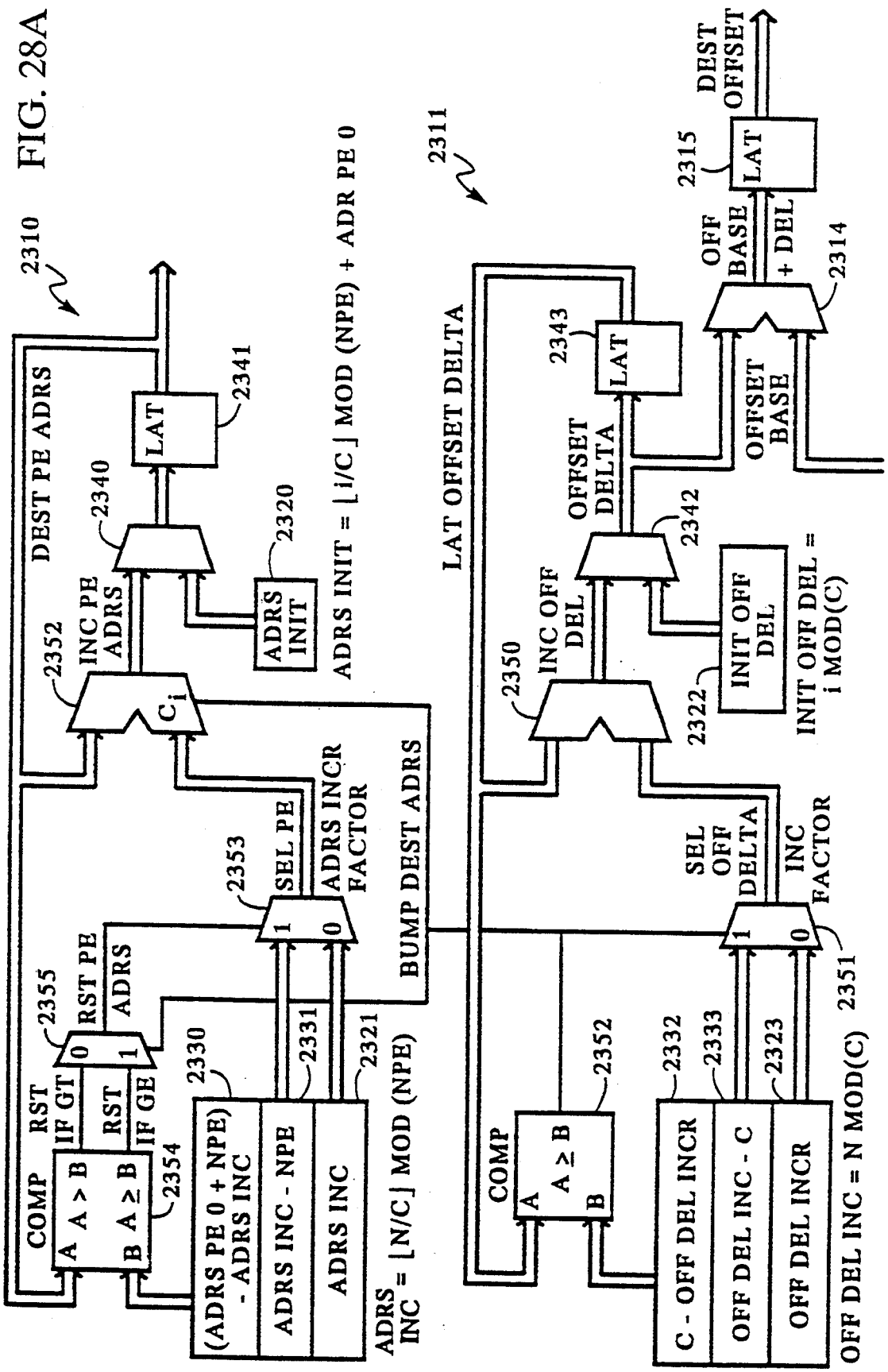
FIGS. 28A and 28B together form a logic diagram of an address generator used in the input/output buffer node depicted in FIGS. 27A through 27D.
Figure 28B:
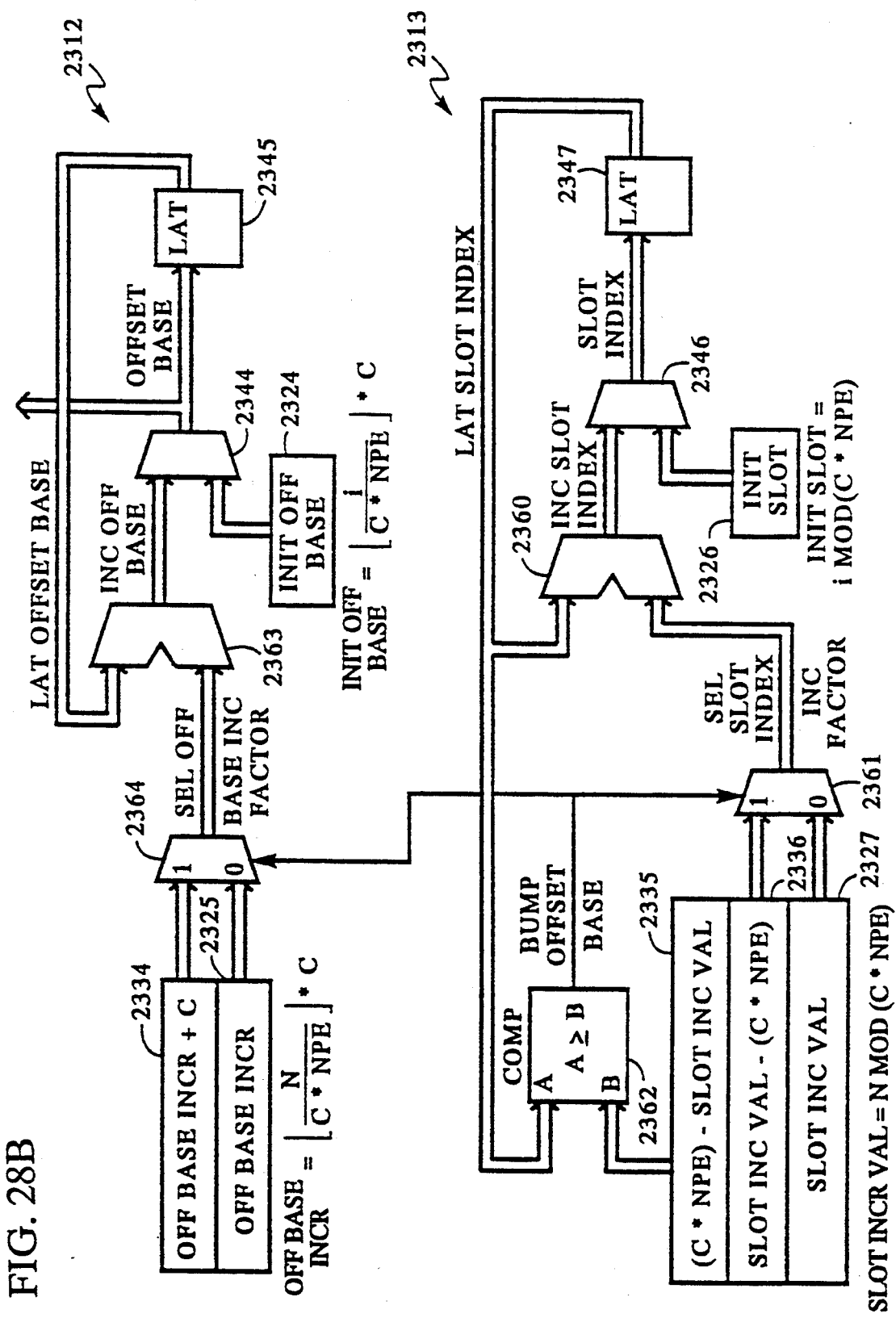
Figure 29:
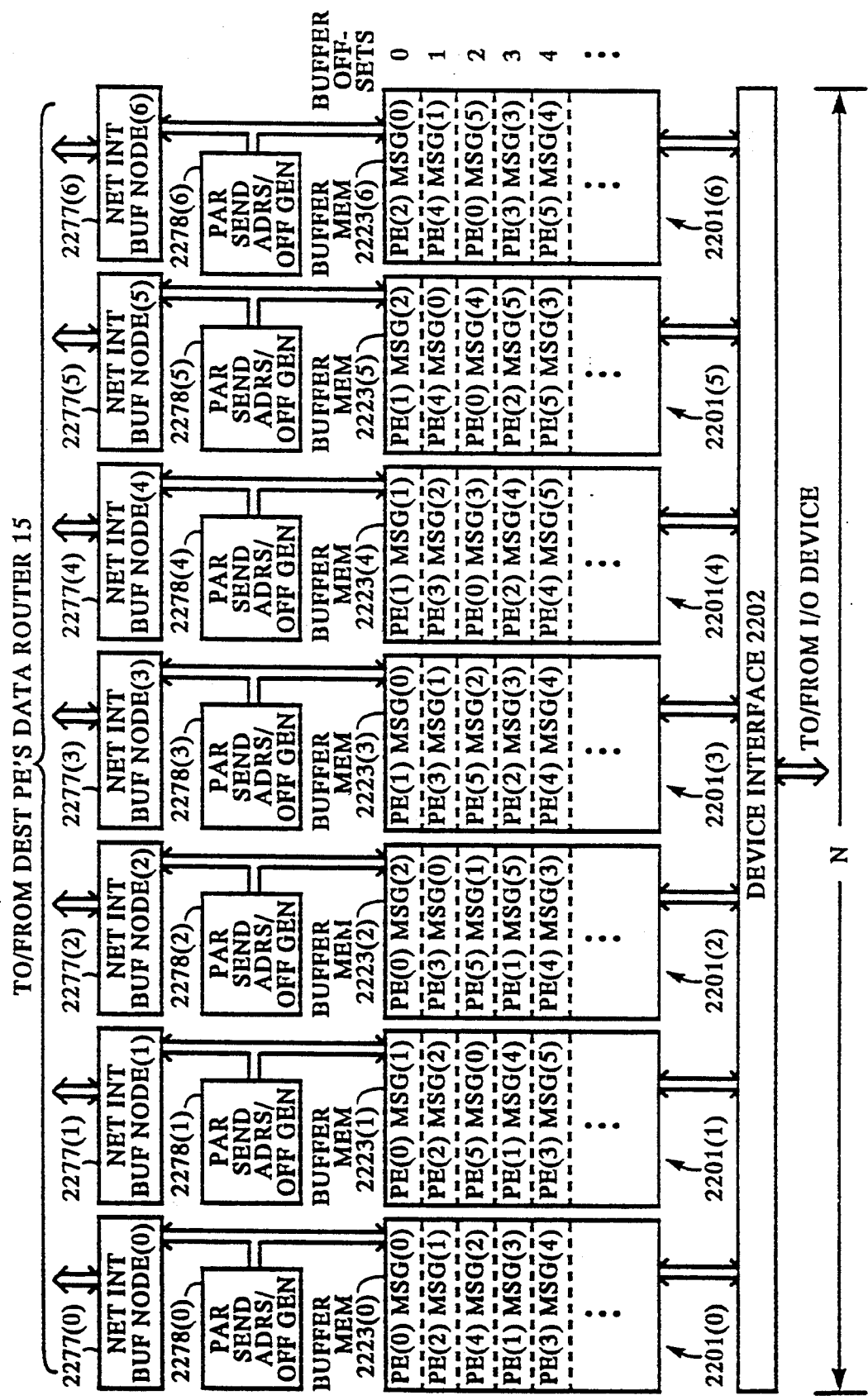
FIGS. 29 and 30 together form a diagram illustrating a data transfer operation between input/output buffer nodes and processing elements, which are useful in understanding the operation of the address generator depicted in FIGS. 28A and 28B.
Figure 30:
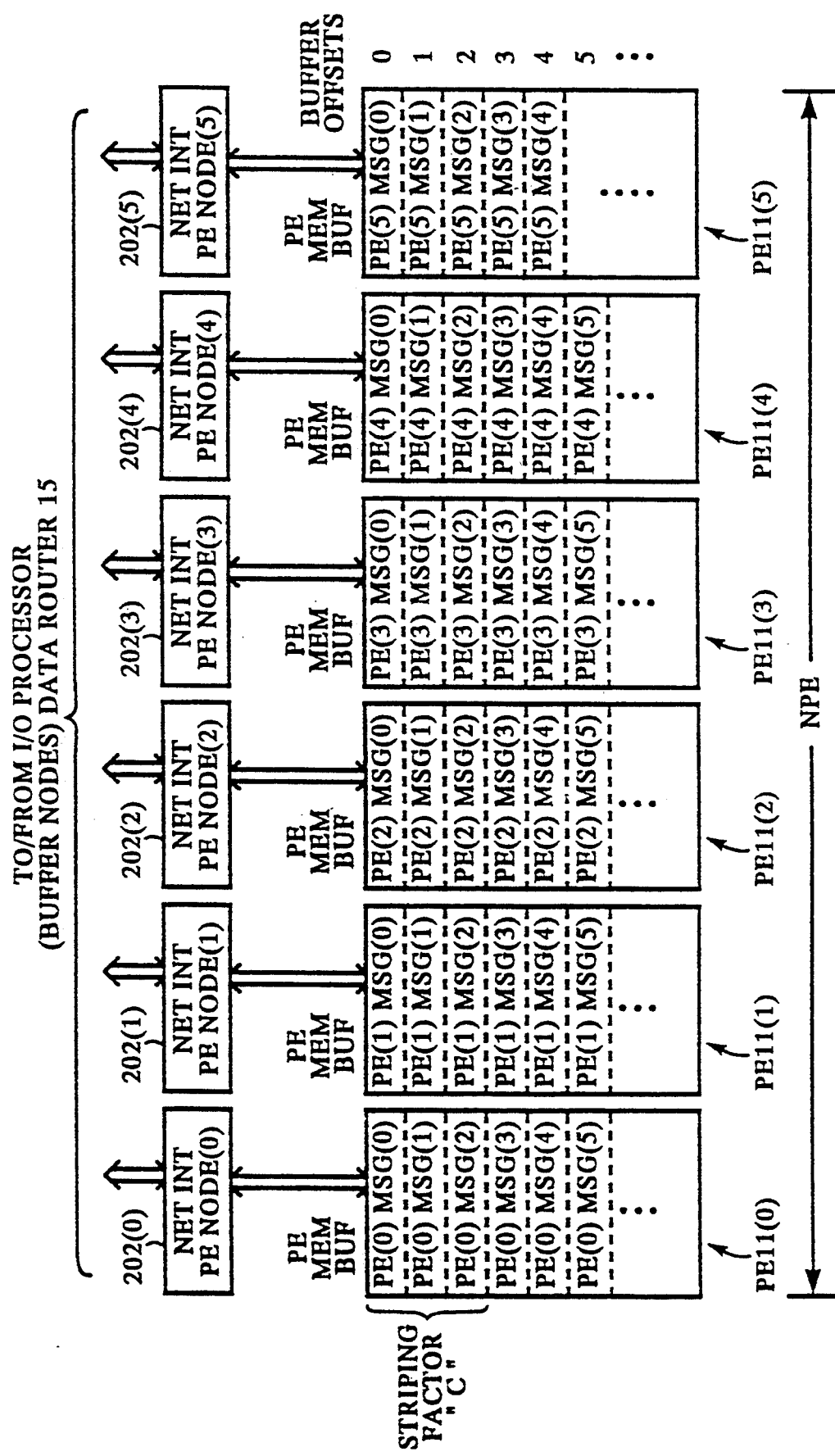

A detailed block diagram of the parallel send address/offset generator 2278 is shown in FIG. 28A and FIG. 28B. Before proceeding with a detailed description of the structure and operation of the parallel send address/offset generator 2278, a brief description of a parallel mode message transfer operation will be presented in connection with FIG. 29 and FIG. 30. These FIGS. schematically depict, respectively, a number of input/output buffer nodes 2201(0) through 2201(6) (FIG. 29) of an input/output processor 13 participating in an input/output operation with a partition of processing elements identified by reference numerals 11(0) through 11(5) (FIG. 30). In particular, FIG. 29 schematically represents, for each input/output buffer node 2201(i), the network interface 2277(i), the parallel send address/offset generator 2278(i) and a parallel mode buffer in the buffer memory 2223(i). Similarly, FIG. 29 schematically represents the network interface 202(i) (FIG. 20) and a memory buffer in the processing element memory 201 for each processing element 11(i). The number of input/output buffer nodes and processing elements participating in an input/output operation will be generally identified as "N" and "NPE," respectively.

As described above and as represented schematically in FIG. 29, if, during the input/output operation, data is to be transferred in input/output message packets from an input/output device (not shown) to the processing elements, the device interface 2202 transfers data to the buffers of the input/output message buffers 2201(i) on a round-robin basis. That is, the device interface 2202 will transmit to input/output buffer node 2201(0) the first item of data, to input/output buffer node 2201(1) the second item of data, to input/output buffer node 2201(2) the third item of data, and so forth, where each "item of data" refers to the amount of data which it receives from the input/output device to be transmitted in an input/output message packet. After the device interface 2202 transmits an item of data to the last input/output buffer node to be participating in the input/output operation, here input/output buffer node 2201(7), it transmits the next item of data to input/output buffer node 2201(0), thereby ensuring that data is transmitted to the input/output buffer nodes in round-robin fashion.

The items of data transmitted to the input/output buffer nodes 2201(i) are arranged by the input/output device and device interface 2202 so that they will be directed to the processing elements 11(i) of increasing values of index "i," also on a round-robin basis with respect to the index of the processing element reference numeral. However, a selected number of sequential items of data directed to the input/output buffers 2201(i) may be intended for the same processing element, which number is termed herein a "striping factor," and which is generally identified as "C."

In addition, as described above, the items of data sequentially received by an input/output buffer node 2201(0) are stored at locations having successive offsets in the buffers of respective buffer memories 2223(i). In both FIG. 29 and FIG. 30, the base of a buffer, that is, the location with a zero offset is depicted at the uppermost location in the respective buffer, and successive offsets are represented by the successively descending positions in the buffer.

Thus, for example, using the example depicted in FIG. 29 and FIG. 30 of seven input/output buffer nodes 2201(0) through 2201(6), six processing elements 11(0) through 11(5), and a striping factor of three, the data items for the first three messages for processing element 11(0) are transferred from the device interface 2202 to input/output buffer nodes 2201(0) through 2201(2) and are represented in the respective buffer memories 2223(0) through 2223(2) as "PE(0) MSG(0)" through "PE(0) MSG(2)."

The device interface 2202 next transmits the data items for the first three messages for processing element 11(1) to input/output buffer nodes 2201(3) through 2201(5) and are represented in the respective buffer memories 2223(3) through 2223(5) as "PE(1) MSG(0)" through "PE(1) MSG(2)." Thereafter, the device interface 2202 transmits the data item for the first message for processing element 11(2) to input/output buffer node 2201(6), and the data items for the second and third messages for the same processing element 11(2) to input/output buffer node 2201(0) and 2201(1). These data items are represented in the respective buffer memories 2223(6), 2223(0) and 2223(1) by the legends "PE(2) MSG(0)", "PE(2) MSG(1)" and "PE(2) MSG(3)," respectively. The device interface transmits the successive items of data to the input/output buffer nodes 2201 in the same way.

In the following, data items will be generally identified "PE(x) MSG(y)," where "x" identifies the processing element and "y" identifies the offset. With reference to FIG. 29, it can be observed that the first data item PE(0) MSG(0) of the first series of data items provided by the input/output device to be transmitted to processing element 11(0) is in the buffer of buffer memory 2223(0) of input/output buffer node 2201(0) at offset zero. The last data item PE(5) MSG(2) of the first series of data items to be transmitted to the last processing element 11(5) is in the buffer of buffer memory 2223(3) of input/output buffer node 2201(3) at offset 2. This set of buffer locations across the buffers of the group of input/output buffer nodes 2201(0) through 2201(6) that are participating in an input/output operation will be termed a "frame."

More generally, a frame is a set of buffer locations, across the buffers of the input/output buffer nodes participating in an input/output operation, extending from the first data item PE(x) MSG(y) in a series to be transmitted as a stripe to the first processing element 11(0) to the last data item PE(x) MSG(y) in the corresponding series to be transmitted as the same stripe to the last processing element 11(5). Each of the sequence of frames in the buffer memories 2223(i) will be identified by a frame identifier value. That is, the frame containing locations from offset zero of the buffer of buffer memory 2223(0), which contains data item PE(0) MSG(0), to offset two of the buffer of buffer memory 2223(3), which contains data item PE(5) MSG(2), will be identified as frame zero. Similarly, the frame containing locations from offset two of the buffer of buffer memory 2223(4), which contains data item PE(0) MSG(3) to the offset of the buffer memory which contains data item PE(5) MSG(5) (not shown) will be identified as frame one, and so forth.

The series of data items PE(x) MSG(y) in a frame that are to be transferred to a particular processing element 11(i) or scalar processor 12 will be termed a "stripe." Each of the sequence of stripes in the buffer memories will be identified by a stripe offset value, which identifies the offset of the stripe from the beginning of a frame. That is, in the first frame, the data items in the first stripe, that is, the stripe at offset zero and containing data items PE(0) MSG(0) through PE(0) MSG(2), are to be transferred to the first processing element 11(0) in the series participating in the input/output operation. Similarly, data items in the second stripe, that is, the stripe at offset one and containing data items PE(1) MSG(0) through PE(1) MSG(2) are to be transferred in input/output message packets 2230 to the second processing element 11(1) in the series participating in the input/output operation, and so forth.

Each buffer location in the frame will also be termed a slot and will be identified by a slot offset value identifying the offset of the particular slot from the beginning of a frame. Thus, the location of offset zero of the buffer of buffer memory 2223(0) has a slot offset value of zero, the location of offset zero of the buffer of buffer memory 2223(1) has a slot offset value of one, and so forth. The location of offset two of the buffer of buffer memory 2223(3), which contains data item PE(5) MSG(2), has a slot offset value of fourteen. Similarly, the location of offset two of the buffer of buffer memory 2223(4), which contains data item PE(0) MSG(3), which is the first slot of the second frame, has a slot offset value of zero. It will be appreciated that the number of slots, and thus the number of data items PE(x) MSG(y), in a frame, corresponds to the number of processing elements NPE times the striping factor C.

As also described above, the input/output buffer nodes 2201(i) transmit the successive data items PE(x) MSG(y) in their respective buffer memories to the processing elements 11(i), as represented on FIG. 30. As shown on FIG. 30, each processing element receives the messages containing the data items for its index "x" in the data item identification PE(x) MSG(y), and stores them in successive offsets "y." Thus, it will be appreciated that the indices "x" and "y" in the data item identification PE(x) MSG(y) reference the processing element identification and the offset, respectfully.

It will further be appreciated that complementary operations will occur in an input/output operation in the reverse direction to transfer data items from the successive buffer offsets of the processing elements 11(i), through the buffer memories 2223 of the input/output buffer nodes and to the input/output device. In that case, however, the processing element 11(0) will transmit the first three data items PE(0) MSG(0), PE(0) MSG(1), and PE(0) MSG(2) in its buffer to the input/output buffer nodes 2201(0) through 2201(2), and so forth. Thus, the input/output buffer node identifications used in the address portions 31 of the input/output message packets will be related to the index "y" of the data item identification PE(x) MSG(y), and the buffer offset will be related to the index "x."

The parallel send address/offset generator 2278(i) in each input/output buffer node 2201(i) generates, for each input/output message packet, information providing the processing element identification "x," in particular, the address of the processing element relative to the input/output buffer node 2201(i), and the offset "y" for the data item PE(x) MSG(y). In this operation, the parallel send address/offset generator 2278(i) operates using several items of information, including:
  (a) the number of input/output buffer nodes "N" participating in the input/output operation,
  (b) the striping factor "C,"
  (c) the number of processing elements "NPE" participating in the input/output operation,
  (d) the index "i" of the input/output buffer node 2201(i), and
  (e) the address of the first processing element 11(0) in the partition participating in the input/output operation, relative to the base of the processing element of the system.

These items of information may be provided by the input/output processor node 2200 when initiating the input/output operation.

From these items of information, the parallel send address/offset generator 2278 may determine the following initial values used in connection with generating the first input/output message packet 2230 in the input/output operation:
  (a) an initial destination processing element address value,
  (b) an initial destination offset value, comprising (i) an initial offset base value and (ii) an initial offset delta value, both of which the parallel send address/offset generator 2278 will use to determine an initial destination processing element buffer offset value, and
  (c) an initial slot value,
and the following incrementation values used in connection with generating subsequent input/output message packets 2230, if any, in the input/output operation:
  (d) a destination processing element address incrementation value,
  (e) offset incrementation values, including (i) an offset base incrementation value and (ii) an offset delta incrementation value, and
  (f) a slot incrementation value.

It will be appreciated that these values may alternatively be provided by the input/output processor node 2200 when initiating the input/output operation.

A parallel send address/offset generator 2278(i), a detailed block diagram of which is depicted in FIGS. 28A and 28B, includes four general sections, namely, a destination processing element address generating section 2310, an offset delta generating section 2311, an offset base generating section 2312, and a slot count section 2313. The offset base generating section 2312 and offset delta generating section 2311 generate, respectively, OFFSET BASE and OFFSET DELTA signals which are coupled to an adder 2314. The adder 2314, in turn, generates DEST OFFSET destination offset signals representing a value corresponding to the arithmetic sum of the values represented by the OFFSET BASE and OFFSET DELTA signals, which are latched in a latch 2315. The parallel send address/offset generator 2278(i) also couples the DEST OFFSET signals over bus 2287, to be used by the network interface 2277 in generating the destination buffer offset portion of an input/output message packet.

A destination offset value is essentially formed from two components, one relating to the frame identifier of the frame containing the data item PE(x) MSG(y) being transmitted by the input/output buffer node, and the other relating to the offset of the slot containing the data item PE(x) MSG(y) in the series within the frame that is to be transferred to the same processing element 11(i) or scalar processor 12. In particular, the binary-encoded value represented by the OFFSET BASE signals, generated by the offset base generating section 2312, represents the component relating to the frame identifier value. Similarly, the binary-encoded value represented by the OFFSET DELTA signals represents the component relating to the position of the slot containing the data item in the sequence within a stripe.

The offset base generating section uses the initial offset base value and the offset base incrementation value, as well as the striping factor "C" and a BUMP OFFSET BASE signal from the slot count section 2313 in generating the OFFSET BASE signal. The initial offset base value for a parallel send address/offset generator 2278(i) relates to the frame of the first data item to be transmitted during the input/output operation. The frame identifier value of the data item PE(x) MSG(y) corresponds to the greatest integer in the quotient of (a) the input/output buffer node's index "i", divided by (b) the number of data items in a frame, which corresponds to the striping factor "C" times the number "NPE" of processing elements 11(i) participating in the input/output operation. The frame identifier, in turn, is multiplied by the striping factor "C," since for each subsequent frame the base offset value for the first data item PE(x) MSG(y) in each stripe corresponds to this value.

The offset base incrementation value is related to the number of frames that the input/output buffer node will increment between transmission of input/output message packets 2230. It will be appreciated that the number of frames will correspond to the greatest integer in the quotient of (a) the number "N" of input/output buffer nodes 2201(i) participating in the input/output operation, divided by (b) the number of slots in a frame, that is, the striping factor "C" times the number "NPE" of processing elements 11(i) participating in the input/output operation. This value is also multiplied by the striping factor "C," since the base for each subsequent frame will begin with a value corresponding to the frame identifier times the striping factor.

It will be appreciated that, if the number "N" of input/output buffer nodes 2201(i) participating in the input/output operation is not a multiple of the number of slots in a frame, the offset of the slot containing the data item PE(x) MSG(y) being transmitted will change for each subsequent input/output message packet. The change in the slot offset corresponds to the remainder of the quotient of (a) the number "N" of input/output buffer node 2201(i) participating in the input/output operation, divided by (b) the number of slots in a frame, that is, the striping factor "C" times the number "NPE" of processing elements 11(i) participating in the input/output operation, which remainder, in turn, corresponds to the number "N" modulo the number of slots in a frame. As a result of this change in slot offset, the offset base generating section 2312 further increments the base offset value when the change of the offset of the slot from one input/output message packet 2230 to the next would extend beyond the number of slots in a frame. The slot count section 2313 generates the BUMP OFFSET BASE signal when this condition occurs.

The slot count section 2313 maintains a running index of the slot in the frame of the data item PE(x) MSG(y) for which the parallel send address/offset generator 2278(i) is currently generating DEST PE ADRS and DEST OFFSET signals. The slot count section 2313 uses the initial slot value and the slot incrementation value, as well as a correction value corresponding to the number of slots in a frame, to maintain the running index of the slot in the frame of the data item PE(x) MSG(y) for which the parallel send address/offset generator 2278(i) is currently generating DEST PE ADRS and DEST OFFSET signals. The initial slot value corresponds to the value of the index "i" of the parallel send address/offset generator 2278(i), modulo the number of slots in a frame. The slot incrementation value is, as noted above, the number "N" of input/output buffer modules 2201(i), modulo the number of slots in a frame. When the slot count section 2313 generates a slot count value that exceeds the number of slots in a frame, it asserts the BUMP OFFSET BASE signal and reduces the slot count value by the number of slots in a frame. The result is the offset of the slot in the next frame.

The destination processing element address generating section 2312 uses (i) the initial destination processing element address value, (ii) the destination processing element address incrementation value, (iii) the number of processing elements "NPE" participating in the input/output operation, (iv) the address of the first processing element 11(0) in the partition participating in the input/output operation, relative to the base of the processing element of the system, and (v) a BUMP DEST ADRS bump destination address signal from the offset delta generating section in generating DEST PE ADRS destination processing element address signals. The parallel send address/offset generator 2278(i) couples the DEST PE ADRS signals as NI DATA signals over bus 2287 (FIG. 27B), and are ultimately used by the network interface 2277 in generating the message address portion 31 of the input/output message packet 2230.

It will be appreciated that, for the sequence of stripes in a frame, all of the data items PE(x) MSG(y) in slots in a stripe are to be transmitted in input/output message packets 2230 to one processing element 11(i) or scalar processor 12 participating in the input/output operation. The initial destination processing element address value for each parallel send address/offset generator 2278(i) thus relates to the stripe offset value for the stripe within the frame containing the first data item PE(x) MSG(y) to be transmitted by the input/output buffer node 2201(i). The stripe offset value, in turn, corresponds to the greatest integer of the quotient of the input/output buffer node's index "i" divided by the striping factor "C," modulo the number of stripes in a frame. The number of stripes in a frame corresponds to "NPE," the number of processing elements 11(i) and scalar processors 12 participating in the input/output operation.

The stripe offset value so generated is actually the offset, from the first processing element 11(0) or scalar processor 12 in the partition participating in the input/output operation, for the first input/output message packet 2230 to be generated by the input/output buffer node. Accordingly, the initial destination processing element address value is this stripe offset value plus the address of the first processing element 11(0) or scalar processor 12 participating in the input/output operation relative to the base of the processing element of the system 10.

The destination processing element address incrementation value is used by a parallel send address/offset generator 2278(i) when generating a destination processing element address for each subsequent input/output message packet 2230 generated by its input/output message buffer 2201(i). The destination processing element address incrementation value is related to the number of stripes within a frame that the input/output buffer node 2201(i) will increment between transmission of input/output message packets 2230. Thus, the destination processing element address incrementation value corresponds to the sum of the greatest integer of the number "N" of input/output buffer nodes 2201(i) participating in the input/output operation divided by the striping factor "C," modulo the number of stripes in a frame, that is, "NPE."

It will be appreciated that, if the number "N" of input/output buffer nodes 2201(i) participating in the input/output operation is not a multiple of the number of stripes in a frame, the offset of the slot containing the data item PE(x) MSG(y) being transmitted within a stripe will change for each subsequent input/output message packet. The change in the slot offset corresponds to the remainder of the quotient of (a) the number "N" of input/output buffer nodes 2201(i) participating in the input/output operation, divided by (b) the number of slots in a stripe, that is, the striping factor "C", which remainder, in turn, corresponds to the number "N" modulo the striping factor. As a result of this change in slot offset within a stripe, destination processing element address generating section 2310 further increments the destination processing element address when the change of the offset of the slot from one input/output message packet 2230 to the next would extend beyond the number of slots in a stripe. The offset delta generating section 2311 generates the BUMP DEST ADRS signal when this condition occurs.

The offset delta generating section 2311 also generates the OFFSET DELTA signal, which, as noted above, represents the component of the DEST OFFSET signal whose binary-encoded value identifies the position of the slot of the data item PE(x) MSG(y) being transmitted within a stripe, that is, within the series of data items within frame that are to be transmitted to the same processing element 11(i) or scalar processor 12. In addition, the offset delta generating section 2311 generates the BUMP DEST ADRS bump destination address signal which is directed to the destination processing element address generating section 2310.

The initial offset delta value for a parallel send address/offset generator 2278(i) corresponds to the offset of the slot containing the first data item PE(x) MSG(y) to be transmitted by the parallel send address/offset generator 2278(i) within the stripe. Thus, the initial offset delta value corresponds to the remainder in the quotient of (a) the index "i" of input/output buffer node 2201(i), divided by (b) the number of slots in a frame, that is, the striping factor "C" times the number "NPE" of processing elements 11(i) participating in the input/output operation. Otherwise stated, the initial offset delta value corresponds to the input/output buffer node's index ¢i," modulo the striping factor "C".

The offset delta incrementation value is related to the number of slots within a stripe that the input/output buffer node 2201(i) will increment between transmission of input/output message packets 2230. As noted above, the number of stripes that the input/output buffer node 2201(i) will increment between transmission of input/output message packets 2230 is related to the change, if any, of the destination processing element address value as determined by the destination processing element address generating section 2310. Thus, the offset delta incrementation value is the remainder in the quotient of (a) the number "N" of input/output buffer nodes 2201(i) participating in the input/output operation, divided by (b) the number of slots in a stripe, that is, the striping factor "C." Otherwise stated, the offset delta incrementation value corresponds to the number "N" of input/output buffer nodes 2201(i) participating in the input/output operation, modulo the striping factor "C."

It will be appreciated that, if the incrementation of the offset delta value by the offset delta generating section 2311 from one input/output message packet 2230 to the next would result in an offset delta value greater than or equal to the striping factor "C," the offset delta value would actually relate to a slot in a stripe advanced beyond the stripe which is identified by the destination processing element address value as determined by the destination processing element address generating section 2310. This advanced stripe, in turn, includes slots whose data items PE(x) MSG(y) are to be transmitted to the next processing element 11(i) beyond that identified by the destination processing element address value. When that occurs, the offset delta generating section 2311 asserts the BUMP DEST ADRS bump destination address signal, to enable the destination processing element address generating section 2310 to further increment the destination processing element address. In addition, the offset delta generating section 2311 subtracts the striping factor from the incremented offset delta value, to point to the position of the slot, within the stripe associated with the destination processing element address generated by the destination processing element address generating section 2310 for the data item being transmitted, of the data item PE(x) MSG(y) being transmitted in the input/output message packet.

Similarly, at some point the destination processing element address generating section 2310 will increment the destination processing element address to be above the address of the highest-indexed processing element 11(i) or scalar processor 12 participating in the input/output operation. At that point, the destination processing element address generating section 2310 corrects the destination processing element address to a value which is the address of one of the processing elements or scalar processors participating in the transfer. In this operation, the destination processing element address generating section 2310 reduces the incremented destination processing element address by an amount corresponding to NPE, the number of processing elements participating in the input/output operation. This will ensure that the destination processing element address points to a processing element or scalar processor participating in the input/output operation during the operation.

With this background, the structure and operation of parallel send address/offset generator 2278(i) will be described in connection with FIG. 28A and FIG. 28B. Initially, the initial destination processing element address from the input/output processor 2200, which is represented by block 2320, is coupled through multiplexer 2340 and latched in latch 2341. In addition, the destination processing element address increment value is stored in latch 2321 of the destination processing element address generating section 2310.

Similarly, the initial offset delta value and initial offset base value from the input/output processor 2200, which are represented by blocks 2322 and 2324, respectfully, are coupled through multiplexers 2342 and 2344, respectfully, as OFFSET DELTA and OFFSET BASE signals, respectfully. These signals are latched in latches 2343 and 2345, respectfully. They are also concurrently coupled to an adder 2314, which generates an OFF BASE+DEL offset base plus delta signal whose binary-encoded value represents the sum of binary-encoded value of the OFFSET DELTA and OFFSET BASE signals. The OFF BASE+DEL signal is latched in a latch 2315, which provides the DEST OFFSET destination offset signal.

Contemporaneously, the offset delta increment value and offset base increment value are stored in registers 2323 and 2325, respectively, of the offset delta generating section 2311 and offset base generating section 2312. The initial slot value, represented by block 2326, is coupled through multiplexer 2346 and stored in latch 2347, and the slot increment value is stored in register 2327 of the slot count section 2313.

In addition, various other values are stored in other registers. The destination processing element address generating section 2310, includes registers 2330 and 2331. As noted above, when incrementing to generate the destination processing element address values, at some point the incrementation may generate a value which represents a processing element address beyond the range of processing elements 11(i) or scalar processors 12 participating in the input/output operation. The value in register 2330 is used to assist in detecting such a condition.

As will be described below in connection with FIG. 28A, when incrementing the destination processing element address value, the destination processing element address generating section 2310 selects between the values in registers 2321 and 2331, depending on the relationship between the previously determined destination processing element address value and the contents of register 2330. The value in register 2330 is used to determine when the destination processing element address value has been incremented to a point at which it would, when next incremented, identify a processing element 11(i) or scalar processor 12 beyond those participating in the input/output operation. Such a value corresponds to (a) the address of the last processing element 11(i) or scalar processor 12 participating in the input/output operation, which is the address of the first processing element 11(0) or scalar processor 12 plus the number "NPE" of processing elements or scalar processors participating in the input/output operation, less (b) the amount by which it would be incremented, that is, the address increment value. If the destination processing element address generating section 2310 determines that the previously-determined destination processing element address value is less than the value stored in register 2330, the destination processing element address value, if incremented by the address increment value in register 2321, would remain in its permissible range. In that case, the destination processing element address generating section 2310 uses the value in register 2321 in the incrementation.

However, if the destination processing element address generating section 2310 determines that the previously-determinded destination processing element address value is greater than or equal to the value in register 2330, if the destination processing element address value were incremented by the address increment value, it would be beyond its permissible range. In that case, as noted above, the incremented destination processing element address value is reduced by a value corresponding to the number "NPE" of processing elements and scalar processors participating in the input/output operation. The contents of register 2331 corresponds to the address increment value, reduced by the value "NPE." When this value is added to the previously-determined destination processing element address value, the result would be equivalent to reducing the incremented destination processing element address value by the value "NPE."

Similarly, the offset delta generating section 2311 includes two registers 2332 and 2333. As noted above, the offset delta value varies over a range relating to the striping factor, and the values in these registers are used to limit the offset delta value to that range. As will be described below in connection with FIG. 28A, when incrementing the offset delta value, the offset delta generating section 2311 selects between the values in registers 2323 and 2333, depending on the relationship between the previously-determined offset delta value and the contents of register 2332. The value in register 2332 is used to determine when the offset delta value has been incremented to a point at which it would, when next incremented, represent an offset delta value beyond its permissible range, that is, equal to or greater than the striping factor "C". Such a value corresponds to (a) the striping factor "C", less (b) the amount by which it would be incremented, that is, the offset delta increment value. If the offset delta generating section 2311 determines that the previously-determined offset delta value is less than the value stored in register 2332, the offset delta value, if incremented by the offset delta increment value in register 2323, would remain in its permissible range. In that case, the offset delta generating section 2311 uses the value in register 2323 in the incrementation.

However, if the offset delta generating section 2311 determines that the previously-determinded offset delta value is greater than or equal to the value in register 2332, if the delta offset value were incremented by the delta increment value, it would be beyond its permissible range. In that case, as noted above, the incremented delta offset value is reduced by the striping factor "C" and the BUMP DEST ADRS signal asserted to control the destination processing element address generating section 2310. The contents of register 2333 corresponds to the delta increment value, reduced by the striping factor "C." When this value is added to the previously-determined delta offset value, the result would be equivalent to reducing the incremented delta offset value by the striping factor "C."

The offset base generating section 2312 also has a register 2334 which stores a value corresponding to the offset base increment value plus the striping factor "C."The value in the register 2325 is used when the slot count section 2313 determines that the previously-incremented offset base value is to be incremented by the offset base increment value. On the other hand, the value in the register 2334 is used in the incrementation of the offset base value, which, as described above, is further incremented by an amount corresponding to the striping factor "C."

Finally, the slot count section 2313 includes two registers 2335 and 2336. Register 2335 stores a value which is used to determine when the slot index value has been incremented to a point at which it would, when next incremented, represent a slot index value beyond its permissible range, that is, equal to or greater than the number of slots in a frame, the striping factor "C" times the number "NPE" of processing elements 11(i) or scalar processors 12 participating in an input/output operation. The value in register 2335 is the striping factor "C" times the number "NPE," less the slot increment value. The value in register 2336 is the slot increment value less the number of slots in a frame.

As will be described below in connection with FIG. 28B, when incrementing the slot count value, the slot count section 2313 selects between the values in registers 2327 and 2336, depending on the relationship between the previously-determined slot count value and the contents of register 2335. The value in register 2335 is used to determine when the slot count value has been incremented to a point at which it would, when next incremented, identify a slot offset greater than the number of slots in a frame. Such a value corresponds to (a) the number of slots in a frame, which is the striping factor "C" times the number "NPE" of processing elements 11(i) and scalar processors 12 participating in the input/output operation, less (b) the slot increment value. If the slot count section 2313 determines that the previously-determined slot increment value is less than the value stored in register 2335, the slot increment value, if incremented by the slot increment value in register 2327, would remain in its permissible range. In that case, the slot count section 2313 uses the value in register 2327 in the incrementation.

However, if the slot count section 2313 determines that the previously-determinded slot count value is greater than or equal to the value in register 2335, if the slot count value were incremented by the slot increment value, it would identify a slot beyond the end of the current frame. In that case, as noted above, the slot count section 2313 asserts the BUMP OFFSET BASE signal, to enable the offset base section 2312 to use the value in register 2334 in the incrementation of the offset base value. In addition, the slot count section 2313 generates an new slot count value whose value is incremented by the slot increment value and reduced by a value corresponding to the number of slots in a frame. The contents of register 2331 corresponds to the slot increment value, reduced by the value corresponding to the number of slots in a frame. When this value is added to the previously-determined slot count value, the result would be equivalent to reducing the incremented slot count value by the value corresponding to the number of slots in a frame.

After the input/output processor node 2200 has loaded the various registers as described above, and enabled the initial values to be loaded into latches 2341, 2343, 2315, 2345 and 2347 for the initial input/output message packet 2230 to be generated by the input/output buffer node, the network interface access control circuit 2280 (FIG. 27A) enables various sections 2310, 2311, 2312 and 2313 to concurrently perform a series of iterations to facilitate the generation of DEST PE ADRS signals and DEST OFFSET signals for use in connection with generation of input/output message packets 2230 for the subsequent data items PE(x) MSG(y) to be transmitted by the input/output buffer node.

With reference initially to FIG. 28A, in the offset delta generating section 2311, the LAT OFFSET DELTA latched offset delta signals from the latch 2343, which at this point have a binary-encoded value corresponding to the initial offset delta value, are coupled to one input terminal of an adder 2351. A second input terminal of adder 2351 receives a SEL OFFSET DELTA INC FACTOR selected offset delta increment factor signal from a multiplexer 2351. The adder 2350 generates INC OFF DEL incremented offset delta signals which are coupled as the OFFSET DELTA signal to the input terminal of latch 2343 and to one input terminal of adder 2314, which, in combination with the OFFSET BASE signal generated during the iteration by the offset base generating section 2312 as described below, will generate the DEST OFFSET destination offset signal. The INC OFF DEL signal from adder 2350 represents the incremented delta offset value for the iteration.

The SEL OFFSET DELTA INC FACTOR selected offset delta increment factor signal is provided by multiplexer 2351 under control of a comparator 2352. The comparator 2352, in turn, also receives the LAT OFFSET DELTA signal from latch 2343, as well as the signal from register 2332, and generates in resposne the BUMP DEST ADRS bump destination address signal. The comparator 2352 negates the BUMP DEST ADRS signal if it determines that the binary-encoded value of the LAT OFFSET DELTA signal is less than the value represented by the signal from the register 2332. When that occurs, the binary-encoded value of the LAT OFFSET DELTA signal, if incremented by adder 2350 by the offset delta increment value in register 2323, will remain within the permissible range of the offset delta value. Accordingly, the negated BUMP DEST ADRS signal enables the multiplexer to couple the signal from register 2323 as the SEL OFF DELTA INC FACTOR selected offset delta increment factor signal to adder 2350. The adder generates an INC OFF DEL incremented offset delta signal, which the multiplexer 2342 couples as the OFFSET DELTA signal to input terminals of latch 2343 and of adder 2314.

On the other hand, the comparator 2343 asserts the the BUMP DEST ADRS signal if it determines that the binary-encoded value of the LAT OFFSET DELTA signal is greater than or equal to the value represented by the signal from the register 2332. When that occurs, the binary-encoded value of the LAT OFFSET DELTA signal, if incremented by adder 2350 by the offset delta increment value in register 2323, will be beyond permissible range of the offset delta value. Accordingly, the asserted BUMP DEST ADRS signal enables the multiplexer to couple the signal from register 2333 as the SEL OFF DELTA INC FACTOR selected offset delta increment factor signal to adder 2350. Since, as noted above, the binary-encoded value of the signal from register 2333 corresponds to the delta increment value, reduced by the striping factor "C", when the adder generates an INC OFF DEL incremented offset delta signal, the binary-encoded value of the INC OFF DEL signal will be within the required range. The multiplexer 2342 couples the INC OFF DEL signal as the OFFSET DELTA signal to input terminals of latch 2343 and of adder 2314.

The destination processing element address generating section 2310 operates in a manner generally similar to the operation of the slot count section 2313. In destination processing element address generating section 2310, destination processing element address signals from the latch 2343, which at this point have a binary-encoded value corresponding to the initial destination processing element address value, are coupled to one input terminal of an adder 2352. A second input terminal of adder 2352 receives a SEL PE ADRS INCR FACTOR selected processing element address increment factor signal from a multiplexer 2353. Adder 2352 further has a carry input terminal "$C_i$" that is controlled by the BUMP DEST ADRS bump destination address signal. The adder 2352 generates an INC PE ADRS incremented processing element address signal which is coupled as to the input terminal of latch 2341. The INC PE ADRS signal from adder 2352 represents the incremented destination processing element address value for the iteration.

The SEL PE ADRS INCR FACTOR selected processing element address increment factor signal is provided by multiplexer 2353 under control of a comparator 2354 and multiplexer 2355. The comparator 2354, in turn, also receives the DEST PE ADRS destination processing element address signal from latch 2341, as well the signal from register 2330. Comparator 2354 provides two output signals, including a RST IF GT reset if greater than signal and a RST IF GE reset if greater than or equal to signal. The comparator 2354 asserts the RST IF GT signal if the binary-encoded value of the DEST PE ADRS signal is greater than the binary-encoded value of the signal from register 2330. On the other hand, the comparator asserts the RST IF GE signal if the binary-encoded value of the DEST PE ADRS signal is greater than or equal to the binary-encoded value of the signal from register 2330. Thus, comparator 2354 asserts the RST IF GE signal, but not the RST IF GT signal, if the binary-encoded value of the DEST PE ADRS signal corresponds to the value stored in register 2330.

The multiplexer 2355, under control of the BUMP DEST ADRS bump destination address signal, selectively couples one of the RST IF GE or RST IF GT signals as a RST PE ADRS reset processing element address signal to control multiplexer 2353. If the offset delta generating section 2311 is asserting the BUMP DEST ADRS signal, the multiplexer 2355 couples the RST IF GT reset if greater than signal to the multiplexer 2353 as the RST PE ADRS reset processing element address signal. On the other hand, if the offset delta generating section 2311 is negating the BUMP DEST ADRS signal, the multiplexer 2355 couples the RST IF GE reset if greater than or equal to signal as the RST PE ADRS signal.

The multiplexer 2355 ensures that, when the destination processing element address generating section 2310 uses the BUMP DEST ADRS bump destination address signal, which is coupled to the carry in input terminal $C_i$ of the adder 2352, to further increment the destination processing element address value, it does not increment the value beyond the permissible range of destination processing element address values. If the BUMP DEST ADRS signal is negated, so that the destination processing element address value will not be further incremented thereby, multiplexer 2355 couples the RST IF GT reset if greater than signal as an RST PE ADRS reset processing element address signal. Under this condition, if the comparator 2355 determines that the binary-encoded value of the DEST PE ADRS destination processing element address signal is less than or equal to the binary-encoded value of the signal from register 2330, the RST IF GT signal will be negated. The negated BUMP DEST ADRS signal will enable multiplexer 2355 to couple the negated RST IF GT signal to the multiplexer 2353, which, in turn, enables the multiplexer 2353 to couple an SEL PE ADRS INC FACTOR selected processing element address increment factor signal representing the the address increment value to the second input terminal of adder 2352. Adder 2352 generates an INC PE ADRS incremented processing element address signal representing the sum of the binary-encoded values of the DEST PE ADRS signal, the SEL PE ADRS INC FACTOR signal, which the multiplexer 2340 couples the INC PE ADRS signal to the input terminal of latch 2341.

If, however, while the BUMP DEST ADRS signal is negated the comparator 2355 determines that binary-encoded value of the DEST PE ADRS signal is greater than the binary-encoded value of the signal from register 2330, the RST IF GT signal will be asserted. In that case, the RST PE ADRS signal will also be asserted, enabling the multiplexer 2353 to couple an SEL PE ADRS INC FACTOR selected processing element address increment factor signal corresponding to the address increment value reduced by the value "NPE," to the second input terminal of adder 352. Adder 2352 generates an INC PE ADRS incremented processing element address signal representing the sum of the binary-encoded values of the DEST PE ADRS signal and the SEL PE ADRS INC FACTOR signal. The multiplexer 2340 couples the INC PE ADRS signal to the input terminal of latch 2341.

If, on the other hand, the BUMP DEST ADRS signal is asserted, the adder 2352 will generate INC PE ADRS incremented processing element address signals whose binary-encoded value corresponds to the sum of the binary-encoded values of the DEST PE ADRS destination processing element address signals and the SEL PE ADRS INC FACTOR selected processing element address increment factor, as further incremented since the BUMP DEST ADRS signal is asserted. In that case, to ensure that the adder 2352 does not increment the DEST PE ADRS signal to provide a destination processing element address beyond that for the processing elements 11(i) and scalar processors 12 participating in the input/output operation, the BUMP DEST ADRS signal enables the multiplexer 2355 to couple the RST IF GE reset if greater than or equal to signal as the RST PE ADRS signal.

Accordingly, if the comparator 2355 determines that the binary-encoded value of the DEST PE ADRS destination processing element address signal is less than the binary-encoded value of the signal from register 2330, the RST IF GE signal will be negated. The asserted BUMP DEST ADRS signal will enable multiplexer 2355 to couple the negated RST IF GE signal to the multiplexer 2353, which, in turn, enables the multiplexer 2353 to couple an SEL PE ADRS INC FACTOR selected processing element address increment factor signal representing the the address increment value to the second input terminal of adder 2352. Adder 2352 generates an INC PE ADRS incremented processing element address signal representing the sum of the binary-encoded values of the DEST PE ADRS signal, the SEL PE ADRS INC FACTOR signal, along with the asserted BUMP DEST ADRS signal as applied to its carry in terminal $C_i$, which the multiplexer 2340 couples the INC PE ADRS signal to the input terminal of latch 2341.

If, however, while the BUMP DEST ADRS signal is asserted the comparator 2355 determines that binary-encoded value of the DEST PE ADRS signal is greater than or equal to the binary-encoded value of the signal from register 2330, the RST IF GE signal will be asserted. In that case, the RST PE ADRS signal will also be asserted, enabling the multiplexer 2353 to couple an SEL PE ADRS INC FACTOR selected processing element address increment factor signal corresponding to the address increment value reduced by the value "NPE," to the second input terminal of adder 2352. Adder 2352 generates an INC PE ADRS incremented processing element address signal representing the sum of the binary-encoded values of the DEST PE ADRS signal, the SEL PE ADRS INC FACTOR signal, along with the BUMP DEST ADRS signal at its carry-in input terminal $C_i$. The multiplexer 2340 couples the INC PE ADRS signal to the input terminal of latch 2341.

With reference to FIG. 28B, in the slot count section 2313, the Lat SLOT INDEX latched slot index signal from the latch 2347, which at this point have a binary-encoded value corresponding to the initial slot index value, are coupled to one input terminal of an adder 2360. A second input terminal of adder 2360 receives a SEL SLOT INDEX INC FACTOR selected slot index increment factor signal from a multiplexer 2361. The adder 2360 generates an INC SLOT INDEX incremented slot index signal which multiplexer 2346 couple as a SLOT INDEX signal to the input terminal of latch 2343. The SEL SLOT INDEX INC FACTOR selected slot index increment factor signal is provided by multiplexer 2361 under control of a comparator 2362.

The comparator 2362, in turn, also receives the LAT SLOT INDEX signal from latch 2347, as well as the signal from register 2335, and generates in response the BUMP OFFSET BASE bump offset base signal. The comparator 2362 negates the BUMP OFFSET BASE signal if it determines that the binary-encoded value of the LAT slot index signal is less than the value represented by the signal from the register 2335. When that occurs, the binary-encoded value of the LAT SLOT INDEX signal, if incremented by adder 2360 by the slot increment value in register 2327, will remain within the permissible range of the slot index value. Accordingly, the negated BUMP OFFSET BASE signal enables the multiplexer 2361 to couple the signal from register 2327 as the SEL SLOT INDEX INC FACTOR selected slot index increment factor signal to adder 2360. The adder generates an INC SLOT INDEX incremented slot index signal, which the multiplexer 2346 couples as the SLOT INDEX signal to input terminals of latch 2347.

On the other hand, the comparator 2362 asserts the the BUMP SLOT INDEX signal if it determines that the binary-encoded value of the LAT OFFSET DELTA signal is greater than or equal to the value represented by the signal from the register 2335. When that occurs, the binary-encoded value of the LAT SLOT INDEX signal, if incremented by adder 2360 by the increment slot index value in register 2327, will be beyond permissible range of the slot index value. Accordingly, the asserted BUMP OFFSET BASE signal enables the multiplexer 2361 to couple the signal from register 2336 as the SEL SLOT INDEX INC FACTOR selected slot index increment factor signal to adder 2360. Since, as noted above, the binary-encoded value of the signal from register 2336 corresponds to the slot increment value, reduced by the number of slots in a frame, when the adder 2360 generates an INC SLOT INDEX incremented slot index signal, the binary-encoded value of the INC slot signal will be within the required range. The multiplexer 2346 couples the INC SLOT INDEX signal as the SLOT INDEX signal to the input terminal of latch 2347.

In the offset base generating section 2312, the LAT OFFSET BASE latched offset base signal from the latch 2345, which at this point has a binary-encoded value corresponding to the initial offset base value, is coupled to one input terminal of an adder 2363. A second input terminal of adder 2363 receives a SEL OFF BASE INC FACTOR selected offset base increment factor signal from a multiplexer 2364. The adder 2363 generates an INC OFF BASE incremented offset base signal which multiplexer 2344 couples as the offset base signal to the input terminal of latch 2345 and to one input terminal of adder 2314. As described above, adder 2314 generates an OFFSET BASE+DEL offset base plus delta signal, whose binary-encoded value corresponds to the sum of the binary-encoded values of the OFFSET BASE and OFFSET DELTA signals, and which is coupled to the input terminal of latch 2315.

The SEL OFF BASE INC FACTOR selected offset base increment factor signal is provided by multiplexer 2364 under control of the BUMP OFFSET BASE signal from comparator 2362. As described above, the comparator 2362 negates the BUMP OFFSET BASE signal if it determines that the binary-encoded value of the LAT slot index signal is less than the value represented by the signal from the register 2335. When that occurs, the binary-encoded value of the LAT SLOT INDEX signal, if incremented by adder 2360 by the slot increment value in register 2327, will remain within the permissible range of the slot index value. In that case, the negated BUMP OFFSET BASE signal enables the multiplexer 2364 to couple the signal from register 2325, representing the offset base increment value, as the SEL OFF BASE INC FACTOR selected offset base increment factor signal to adder 2363. The adder 2363 generates an INC OFF BASE incremented offset base signal, which the multiplexer 2346 couples as the OFFSET BASE signal to input terminals of latch 2347 and adder 2314.

On the other hand, the comparator 2362 asserts the the BUMP SLOT INDEX signal if it determines that the binary-encoded value of the LAT OFFSET DELTA signal is greater than or equal to the value represented by the signal from the register 2335. When that occurs, the binary-encoded value of the LAT SLOT INDEX signal, if incremented by adder 2363 by the increment slot index value in register 2327, will be beyond permissible range of the slot index value. Accordingly, the asserted BUMP OFFSET BASE signal enables the multiplexer 2364 to couple the signal from register 2334, representing the offset base increment value plus the striping factor "C" as the SEL OFF BASE INC FACTOR selected offset base increment factor signal, to adder 2363. In that case, adder 2363 generates an INC OFF BASE incremented offset base signal whose a binary-encoded value corresponds to the binary-encoded value of the LAT OFFSET BASE signal, incremented by both the offset base increment value and the striping factor "C."

As noted above, the various sections 2310, 2312, 2312 and 2313 of the parallel send address/offset generator 2278(i) iteratively perform these operations under control of the network interface access control circuit 2280 (FIG. 27A), during each iteration to generate the DEST PE ADRS destination processing element address signals and DEST OFFSET destination offset signals to be used in connection with generation of the input/output message packet 2230. During each iteration, the input/output message packet 2230 transmitted by the input/output buffer 2201(i) includes one data item PE(x) MSG(y) from one of the parallel buffers BUF 0 or BUF 2 (FIG. 27B) of its buffer memory 2223(i). After the input/output buffer 2201(i) has transmitted all of the data items PE(x) MSG(y), the network interface access control circuit 2280 may terminate the input/output operation.

It will be appreciated that numerous modifications may be made the parallel send address/offset generator 2278(i) described above. For example, instead of providing separate adders and comparators for the various sections 2310, 2311, 2312 and 2313, the parallel send address/offset generator may have a single adder and comparator, which may be shared among the various sections. In such an embodiment, the adder and comparator would be used in separate phases, during each phase to generate signals representing the destination processing element address value, offset delta value, offset base value and slot index value. In that case, the adder and comparator would be used to generate the offset delta value before the destination processing element address value, since they will require the BUMP DEST ADRS signal to generate the destination processing element address value. In addition, the adder and comparator would be used to generate the slot index value before the destination base value, since they will require the BUMP OFFSET BASE signal to generate the offset base value. Such an embodiment may be useful in reducing the physical size of the circuit comprising the parallel send address/offset generator 2278(i), although it will be appreciated that it may require mor time to generate the destination processing element address value and destination offset value since they are determined in a four phase sequence.

In addition, it will be appreciated that the destination processing element address value and destination offset value may be determined using a suitably-programmed microprocessor.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A digital computer comprising:
A. a plurality of message generating elements each generating and receiving messages;
B. a network for transferring messages generated by said message generating elements among said message generating elements, said network comprising a plurality of node clusters interconnected in a tree pattern from a lower leaf level to an upper root level, each said node cluster including at least one node group said node clusters in a level above at least one predetermined level having a larger number of said node groups than said node clusters of said predetermined level,
node groups of the lower leaf level receiving messages from, respectively, at least one message generating element and a higher-level node group and generating in response messages for transfer to, respectively, a higher-level node group and a message generating element,
ii. the respective node groups between the lower leaf level and the upper root level receiving messages from, respectively, at least one lower-level node group and a higher-level node group and generating in response messages for transfer to, respectively, a higher level node group and a lower level node group, iii. node groups of said upper root level receiving messages from at least one lower-level node group and generating in response messages for transfer to said at least one lower-level node group, each said node group in the node clusters of said predetermined level including a selective message coupling circuit, in response to a partition control signal, for selectively coupling messages between the node group and a selected one of the upper-level node groups; and C. a partition control circuit, coupled to each of the message coupling circuits of each of the node groups, for generating said partition control signal to separately control said message coupling circuits thereby to establish at least one partition comprising selected ones of said message generating elements in which said network transfers messages generated by said selected message generating elements only among said selected message generating elements.

2. A computer as defined in claim 1 in which each said message coupling circuit comprises a multiplexer/demultiplexer and a control circuit for receiving the partition control signal to enable the multiplexer/demultiplexer to selectively couple messages between the node group and the selected one of the upper-level node groups.

3. A computer as defined in claim 1 further including a data router connected to said message generating elements for transferring data messages each containing data among said message generating elements, said node clusters generating data router control signals for controlling said data router in accordance with selected contents of said messages transferred by said node clusters.

4. A computer as defined in claim 3 in which said data router comprises a plurality of data router node groups interconnected in a tree pattern corresponding to the tree pattern of said network with each said data router node group having a corresponding node cluster, with each said network node cluster generating a data router control signal for controlling the associated data router node group.

5. A computer as defined in claim 4 in which each said network node group generates a data router control enabling signal in response to said selected contents of said control messages, each said network node cluster with said one network node group coupling the data router control enabling signal to the associated data router node group as the data router control signal, and each said network node cluster having a plurality of control network node groups further including a control signal selection circuit for generating a data router control signal for the associated data router node group in response to the data router control enabling signals from the said network node groups of the said network node cluster.

6. A computer as defined in claim 5 in which each control signal selection circuit includes:

A. a control signal enable register including a plurality of control signal enable flags each associated with a network node group of the control network node cluster, the control signal enable flag associated with the selected network node group having an enable condition and other control signal enable flags having a disable condition;

B. a plurality of control signal gate circuits each associated with a network node group of the network node cluster for generating a gated control signal corresponding to the data router enabling signal if the associated control signal enable flag has an enable condition; and C. a control signal consolidation circuit for generating said control signal in response to the gated control signal from said control signal gate circuits.

7. A computer as defined in claim 4 in which each said data router node group further generates a status signal whose condition reflects selected status conditions, each said network node cluster with one said network node group receiving the status signal from the associated data router node group and using the status signal in generating a message and each said network node cluster having a plurality of network node groups further including a status signal coupling circuit connected to the said network node groups of the associated said network node cluster for selectively coupling the status signal as a gated status signal to the selected network node group, the selected network node group using the status signal in generating a message.

8. A computer as defined in claim 7 in which each status signal coupling circuit includes:

A. a status signal enable register including a plurality of status signal enable flags each associated with a network node group of the control network node cluster, the status signal enable flag associated with the selected network node group having an enable condition and other status signal enable flags having a disable condition;

B. a plurality of status signal gate circuits each connected to a network node group of the network node cluster for generating the gated status signal corresponding to the status signal if the associated status signal enable flag has an enable condition.

9. A computer as defined in claim 3 further comprising an input/output element for facilitating transfer of data between said message generating elements and a data source over said data router in response to input/output commands, said input/output commands being generated by at least some of said message generating elements, said message generating elements transferring said input/output commands to said input/output element over said data router so as to provide that said input/output element can receive input/output commands from message generating elements of any of said partitions.

10. A digital computer comprising:

A. a plurality of control processors each generating control messages;

B. a plurality of processing elements, each said processing element receiving at least some of said control messages and performing processing operations in response to ones of the control messages that are received by the processing element;

C. a control network for transferring said control messages from said control processors to said processing elements, said control network comprising a plurality of node clusters interconnected in a tree pattern from a lower leaf level to an upper root level, each said node cluster including at least one node group said node clusters in a level above at least one predetermined level having a larger number of said node groups than said node clusters of said predetermined level, i. in a plurality of up-tree each from one of said control processors to a node group of the upper root level, a node group of the lower leaf level receiving messages from said one control processor and generating in response messages for transfer to a higher-level node group along said up-tree path, each said node groups between the lower leaf level and the physical root level along said up-tree path receiving control message from a node group at a lower level and generating in response control messages for transfer to a node group at a higher level along said up-tree path, ii. each said node group in down-tree paths between the upper root level and the processing elements receiving messages from a higher-level node group and generating in response messages for transfer to, respectively, at least one lower level node group or processing element, iii. each said node group of said upper root level receiving messages from a lower-level node group of one of said up-tree paths and generating in response messages for transfer to at least one node group of a down-tree path, each said node group in the node clusters of said predetermined level including a message coupling circuit, in response to a partition control signal, for selectively coupling messages between the node group and a selected one of the uper-level node groups; and C. a partition control circuit, coupled to each of the message coupling circuits of each of the node groups, for generating said partition control signal to separately control said message coupling circuits thereby to establish at least one partition comprising selected ones of said message generating elements in which said network transfers messages generated by said selected message generating elements only among said selected message generating elements, the partition being established so that the processing elements receive control messages in response to control messages generated by at least one of said control processors through one of said node groups at the upper root level.

11. A computer as defined in claim 10 in which each said message coupling circuit comprises a multiplexer/demultiplexer and a control circuit for receiving the partition control signal to enable for the multiplexer/demultiplexer to selectively couple messages between the node group and the selected one of the upper-level node groups.

12. A computer as defined in claim 10 further including a data router connected to said processing elements for transferring data messages each containing data among said processing elements, said control network nodes generating data router control signals for controlling said data router in accordance with selected contents of said control messages.

13. A computer as defined in claim 12 in which said data router comprises a plurality of data router node groups interconnected in a tree pattern corresponding to the tree pattern of said control network with each said data router node group having a corresponding control network node cluster, with each said control network node cluster generating a data router control signal for controlling the associated data router node group.

14. A computer as defined in claim 13 in which each said control network node group generates a data router control enabling signal in response to said selected contents of said control messages, each said control network node cluster with one control network node group coupling the data router control enabling signal to the associated data router node group as the data router control signal, and each said control network node cluster having a plurality of said control network node groups further including a control signal selection circuit for generating a data router control signal for the associated data router node group in response to the data router control enabling signals from the control network node groups of the control network node cluster.

15. A computer as defined in claim 14 in which each said control signal selection circuit includes:

A. a control signal enable register including a plurality of control signal enable flags each associated with a control network node group of the control network node cluster, the control signal enable flag associated with the selected control network node group having an enable condition and other control signal enable flags having a disable condition;

B. a plurality of control signal gate circuits each associated with a control network node group of the control network node cluster for generating a gated control signal corresponding to the data router enabling signal if the associated control signal enable flag has an enable condition; and C. a control signal consolidation circuit for generating said control signal in response to the gated control signal from said control signal gate circuits.

16. A computer as defined in claim 13 in which each said data router node group further generates a status signal whose condition reflects selected status conditions, each said control network node cluster with one control network node group receiving the status signal from the associated data router node group and using the status signal in generating a message and each said control network node cluster having a plurality of said control network node groups further including a status signal coupling circuit connected to the control network node groups of the associated control network node cluster for selectively coupling the status signal as a gated status signal to the selected control network node group, the selected control network node group using the status signal in generating a message.

17. A computer as defined in claim 16 in which each status signal coupling circuit includes:

A. a status signal enable register including a plurality of status signal enable flags each associated with a control network node group of the control network node cluster, the status signal enable flag associated with the selected control network node group having an enable condition and other status signal enable flags having a disable condition;

B. a plurality of status signal gate circuits each connected to a control network node group of the control network node cluster for generating the gated status signal corresponding to the status signal if the associated status signal enable flag has an enable condition.

18. A computer as defined in claim 12 further comprising an input/output element for facilitating transfer of data between said processing elements and a data source over said data router in response to input/output commands, said input/output commands being generated by at least some of said control processors, said processing elements transferring said input/output commands to said input/output element over said data router to facilitate reception by said input/output element of input/output commands from control processors of any of said partitions.

19. A digital computer comprising a plurality of message generating elements each generating and receiving messages, a network for transferring messages among the message generating elements, the network comprising:

a plurality of node clusters interconnected in a tree pattern from a lower leaf level to an upper root level, each said node cluster including at least one node group, said node clusters in a level above at least one predetermined level having a larger number of said node groups than said node clusters of the predetermined level for transferring messages generated by said message generating elements among said message generating elements, each said node group in the node clusters of the predetermined level including a selective message coupling circuit, in response to a partition control signal, for selectively coupling messages between the node group and a selected one of the upper-level node groups; and a partition control circuit, coupled to each of the message coupling circuits of each of the node groups, for generating said partition control signal to separately control the message coupling circuits of the node groups to partition the network into a plurality of partitions so that messages generated by the message generating elements in a selected group are transferred to only the message generating elements in the selected group.

* * * * *